(12) United States Patent
  Huegel

(10) Patent No.: US 8,683,501 B2
(45) Date of Patent: *Mar. 25, 2014

(54) APPLICATION OF ENHANCED TELEVISION SERVICES USING BACK-END CORE SOFTWARE

(75) Inventor: Michael L. Huegel, Cherry Hill, NJ (US)

(73) Assignee: icueTV, Inc., Cherry Hill, NJ (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/143,365

(22) PCT Filed: Dec. 31, 2009

(86) PCT No.: PCT/US2009/069882
§ 371 (c)(1),
(2), (4) Date: Jul. 6, 2011

(87) PCT Pub. No.: WO2010/110832
PCT Pub. Date: Sep. 30, 2010

(65) Prior Publication Data
US 2011/0271293 A1    Nov. 3, 2011

Related U.S. Application Data

(63) Continuation-in-part of application No. 12/552,235, filed on Sep. 1, 2009, now Pat. No. 8,132,212.

(60) Provisional application No. 61/144,772, filed on Jan. 15, 2009, provisional application No. 61/093,713, filed on Sep. 2, 2008.

(51) Int. Cl.
H04N 7/16         (2011.01)

(52) U.S. Cl.
USPC .............. 725/1; 725/2; 725/3; 725/4; 725/5; 725/6; 725/7; 725/8; 725/37; 725/38; 725/39; 725/40; 725/41; 725/42; 725/43; 725/44; 725/45; 725/46; 725/47; 348/14.01; 348/14.04; 348/14.05; 386/200; 386/201; 386/224; 370/464; 370/465

(58) Field of Classification Search
USPC .......... 725/1, 2–8, 37–47; 386/200, 201, 224; 348/14.01, 14.04, 14.05; 370/464, 465
See application file for complete search history.

(56) References Cited

U.S. PATENT DOCUMENTS 7,237,253 B1 *  6/2007  Blackketter et al. ............ 725/61
8,369,799 B2 *  2/2013  Taylor .............................. 455/88

(Continued)

OTHER PUBLICATIONS

PCT Written Opinion of the International Searching Authority for corresponding PCT International Application No. PCT/US2009/055635, International filing date: Jan. 9, 2009, dated Apr. 29, 2010 (4 pages).

(Continued)

*Primary Examiner* — Nasser Goodarzi
*Assistant Examiner* — Paul Graham

(57) ABSTRACT

A method and system to permit TV viewers to interact with program content broadcast over a subscriber network, such as cable, satellite, internet, or cellular telephone. The details of the ability for the viewer to interact is embedded as data in the program signal. The subscription provider broadcasts a visual indicator as a small icon during programming that informs the viewer that interaction is permitted. The viewer then uses a remote control to purchase products, vote on events, respond to polls, download files, request information, and request callback actions. The TV viewer uses the remote control to send information to a set-top box front-end application, and to iteratively create transactions that are batched and then sent to a back-end core application and database which then handles fulfillment.

19 Claims, 165 Drawing Sheets

(56) References Cited

U.S. PATENT DOCUMENTS

| | | | |
|---|---|---|---|
| 2002/0157101 A1* | 10/2002 | Schrader et al. | 725/64 |
| 2002/0184623 A1* | 12/2002 | Hodge et al. | 725/37 |
| 2003/0126611 A1* | 7/2003 | Chernock et al. | 725/105 |
| 2003/0135424 A1* | 7/2003 | Davis et al. | 705/26 |
| 2004/0003406 A1* | 1/2004 | Billmaier | 725/60 |
| 2004/0249726 A1* | 12/2004 | Linehan | 705/26 |
| 2006/0031285 A1 | 2/2006 | Ruhnke et al. | |
| 2006/0184989 A1* | 8/2006 | Slothouber | 725/110 |
| 2007/0101351 A1* | 5/2007 | Bagsby et al. | 725/1 |
| 2007/0192206 A1* | 8/2007 | Manesh et al. | 705/26 |
| 2009/0018898 A1 | 1/2009 | Genen | |
| 2009/0111392 A1* | 4/2009 | Taylor | 455/88 |
| 2010/0060802 A1* | 3/2010 | Huegel | 348/734 |
| 2011/0083069 A1* | 4/2011 | Paul et al. | 715/234 |

OTHER PUBLICATIONS

PCT International Search Report for corresponding PCT International Application No. PCT/US2009/055635, International filing date: Jan. 9, 2009, dated Apr. 29, 2010 (3 pages).

PCT International Search Report for corresponding PCT International Application No. PCT/US2009/069882, International filing date: Dec. 13, 2009, dated Apr. 29, 2010 (3 pages).

Non-Final Office Action; Mailed Dec. 13, 2011 for corresponding U.S. Appl. No. 12/552,235.

Notice of Allowance; Mailed Jan. 6, 2012 for corresponding U.S. Appl. No. 12/552,235.

* cited by examiner 1.0 ETS Core - Subscriber
  — 2.0 My Orders
  — 3.0 My Downloads
  — 4.0 My Wish list
  — 5.0 My Profile
  — 6.0 My Votes
  — 7.0 Go Shopping
  — 8.0 Shopping cart
  — 9.0 Support
  — 10.0 Register
  — 11.0 Login
  — 12.0 Logout

FIG. 7B

APPLICATION OF ENHANCED TELEVISION SERVICES USING BACK-END CORE SOFTWARE

CROSS REFERENCE TO RELATED APPLICATION

The Present Application claims the benefit of and priority to US Provisional Patent Application Ser. No. 61/144,772 (hereinafter, the '772 Provisional Application) filed on Jan. 15, 2009 entitled ENHANCED TELEVISION SERVICES—BACK-END CORE SOFTWARE. The Present Application is also a continuation-in-part (CIP) of U.S. patent application Ser. No. 12/552,235 (hereinafter, the '235 Application) filed on Sep. 1, 2009 entitled ENHANCED TELEVISION SERVICES and issued as U.S. Pat. No. 8,132,212 as well as PCT International Application Ser. No. PCT/US09/55635 (hereinafter, the '635 Application), which is the international counterpart of the '235 Application. Both the '235 and '635 Applications further claimed the benefit of and priority to both the '772 Provisional Application and U.S. Provisional Patent Application Ser. No. 61/093,713 (hereinafter, the '713 Provisional Application) filed on Sep. 2, 2008 entitled ENHANCED TELEVISION SERVICES. The Present Application claims the benefit of and priority to the '235 Application, the '635 PCT Application, the '772 Provisional Application, and the '713 Provisional Application and the '635 PCT Application. The '235 Application, the '635 PCT Application, the '772 Provisional Application, and the '713 Provisional Application are all incorporated herein by reference in their entirety. The subject matter of this application is also related to that of U.S. patent application publication no. US 2012/0144414.

BACKGROUND OF THE INVENTION

The '235 Application disclosed an interactive television system that allows subscribers to perform a great many functions than those currently available by using their TV remote controls.

Interactive television is very attractive to cable service providers. Cable companies are in the process of adopting the "Enhanced TV Binary Interchange Format" (EBIF) and the "Open Cable Application Platform" (OCAP). EBIF is a multimedia content format defined by a specification developed under the "OpenCable" project of CableLabs (Cable Television Laboratories, Inc.). The primary purpose of EBIF is to present to a television viewer one or more multimedia pages, similar to web pages, but specialized for use within an enhanced television or an interactive television system. Action sequences are executed as a result of firing certain predefined events, such as a page load event, a key press event, a click event, etc. These events are triggered by the viewer using the remote control. Execution of all events are serialized and controlled by event handlers. On the other hand, OCAP is an operating system layer designed for consumer electronics that connects to a television system. Unlike operating systems on a personal computer, the cable company controls what OCAP programs run on the consumer's television set. Also designed by CableLabs for the cable networks of North America, OCAP programs are intended for interactive services such as eCommerce, online banking, Electronic program guides, and digital video recording. The OCAP standard has not yet been approved by the FCC.

A Multiple System Operator (MSO) is an operator of multiple cable television systems. A cable system in the US, by FCC definition, is a facility serving a single community or a distinct governmental entity, each with its own franchise agreement with the cable company. Though in the strictest sense any cable company that serves multiple communities is thus an MSO, the term today is usually reserved for companies that own a very large number of cable systems.

The '235 Application disclosed an innovative suite of products and services bundled as Enhanced Television Service (ETS). ETS functions both on an EBIF and OCAP platform. ETS delivers a host of interactive functions specifically tailored to the broadcast program or commercials. The enhanced and empowered media is then transmitted to the MSO in any one of the many available formats for eventual transmission to the viewer. Invisible and unobtrusive until invoked by the viewer's existing remote control, the enhanced media suddenly reveals a wealth of onscreen information and choices. With no additional equipment installation or modification, the standard cable television remote control transforms the once passive viewer into a participant ordering information downloads, voting, responding and making instant purchases. The ETS handles all of these transactions from order processing to billing and fulfillment. By delivering a host of interactive functions, cable television operators empowered with the ETS solution can increase their competitive position while maximizing their networks financial potential. Through an intuitive portal application, advertisers are able to create and manage their own enhanced television events. They control the look, feel and exact moment the trigger is available to the viewer. Advertisers/Vendors can also upload products for sale or download and associate them with events described above. The portal also provides statistical data on the performance of events in a dashboard like manner. Also through an intuitive web portal subscribers can look at order history, wish lists, download items and purchase promotional products. This web portal resides in the MSO's web portal. Again, ETS handles all of these transactions from order processing to billing and fulfillment.

A TV viewer will hereinafter be referred to interchangeably as a subscriber or a viewer. Subscribers can interact with the broadcast program or commercial with the remote control. They can participate in the following transactions using the ETS system:

1—Purchase

By using the remote control, a subscriber can view the products on the panel of the TV and they are able to purchase that product.

2—Polling/Voting

By using the remote control, a subscriber can vote for a particular event that is shown on the TV.

3—Request/Download Information

By using the remote control, a subscriber can request any particular information. They can also request an information download of specific software.

4—View Transaction history

By using the remote control, a subscriber can view their past transaction history on the TV panel. These transactions can be a type of confirmed, unconfirmed and wish list items.

The ETS System provides the following features:

Subscriber is able to interact with the TV using the special remote control to request downloads, purchase products and vote.

Subscriber is able to view order history, download products and buy wish list items and promotional items using a web browser.

Administrator/Subscriber/Vendor is able to login into the system using a web browser.

Vendor is able to create their own events on the system and add products associated with those events.

Vendor is able to interpret the reporting details mentioned on the portal.

Vendor is also able to maintain and keep track of all the events they prepared and scheduled to run on the television.

Administrator is able to understand the transactions in the system.

Administrator has the ability to manipulate the orders using the provided portal and tools.

Administrators can update and maintain user data, product data and order data within the system.

Typically, when viewer interaction is possible, an icon (called an iBug) will appear on the screen (usually in the lower right-hand corner). At that point, the viewer will be able to press a button on the remote control that would bring up a menu that is specific to the currently viewed channel. By contrast, the GUIDE button brings up a universal guide no matter what channel is being viewed.

SUMMARY OF THE INVENTION

The subscriber interacts directly with a software system called ETS Edge that was described in detail in the '235 Application. To perform its functions, the ETS Edge front-end software must interact with more extensive back-end software called ETS Core. The ETS Core software was described in overview in the '235 Application. Every MSO will have multiple ETS Edge systems that are geographically located on its head ends. In addition to multiple ETS Edges, every MSO will have one ETS Core system that is centrally located within that MSO. The data from multiple ETS Core systems will go to the Data Warehouse on regular basis for persistent storage and reporting purposes. The Present Application describes the ETS Core system in detail.

ETS Core—Administrative Portal

Figure 4A:
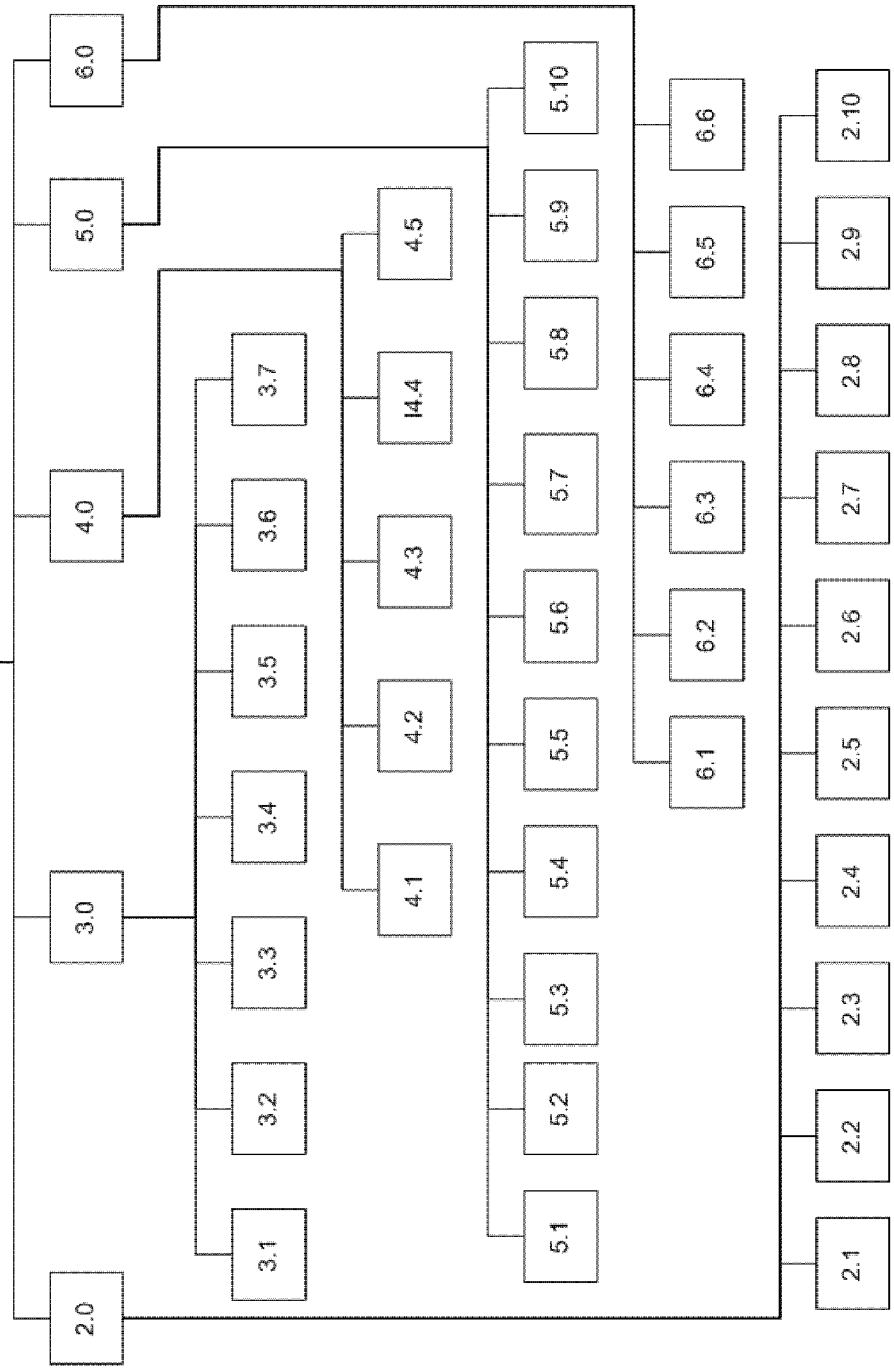

FIG. 4A High Level Hierarchy—HIPO Showing Module Numbers

Figure 4B:
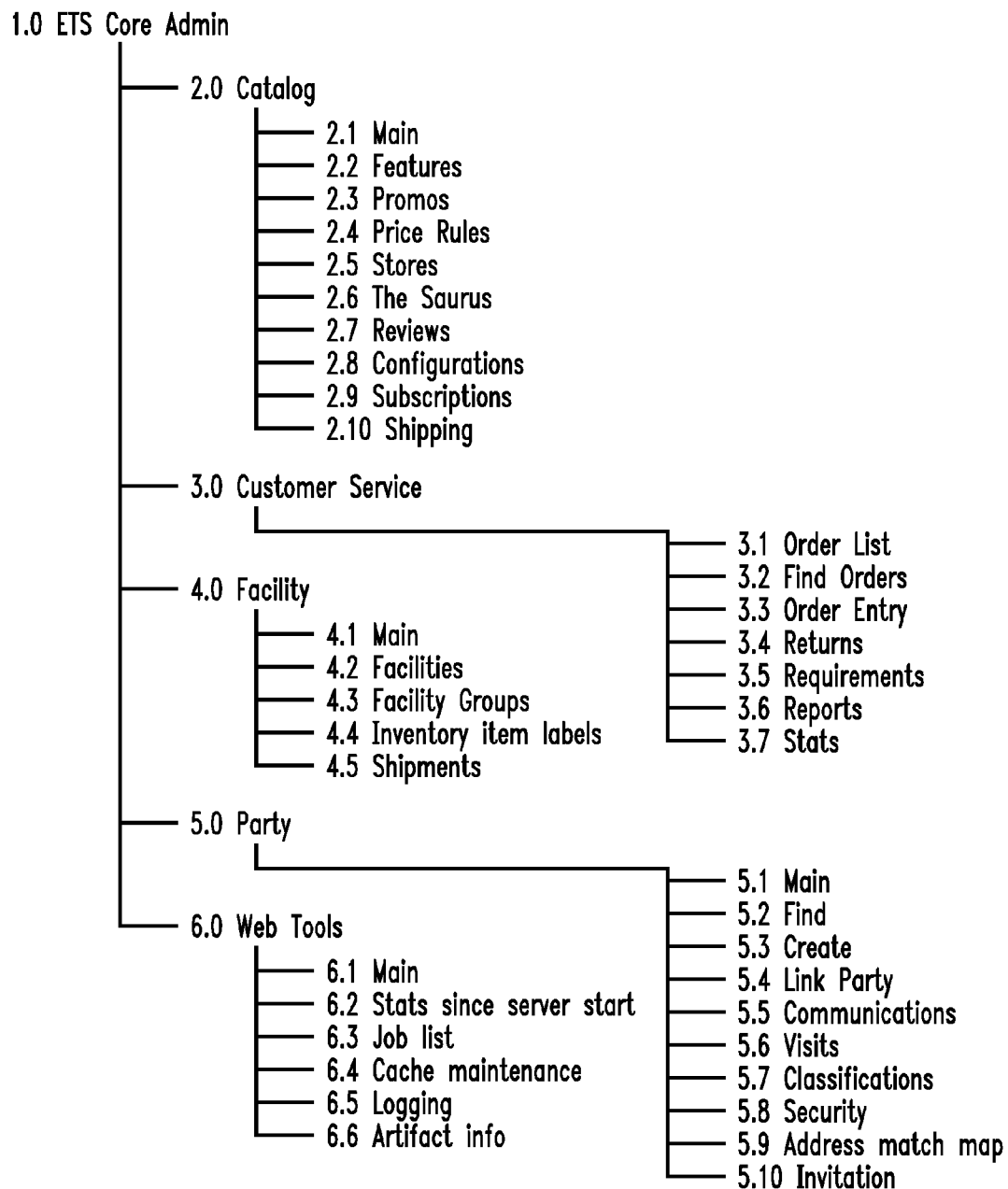

FIG. 4B High Level Hierarchy—Naming Modules

Figure 5:
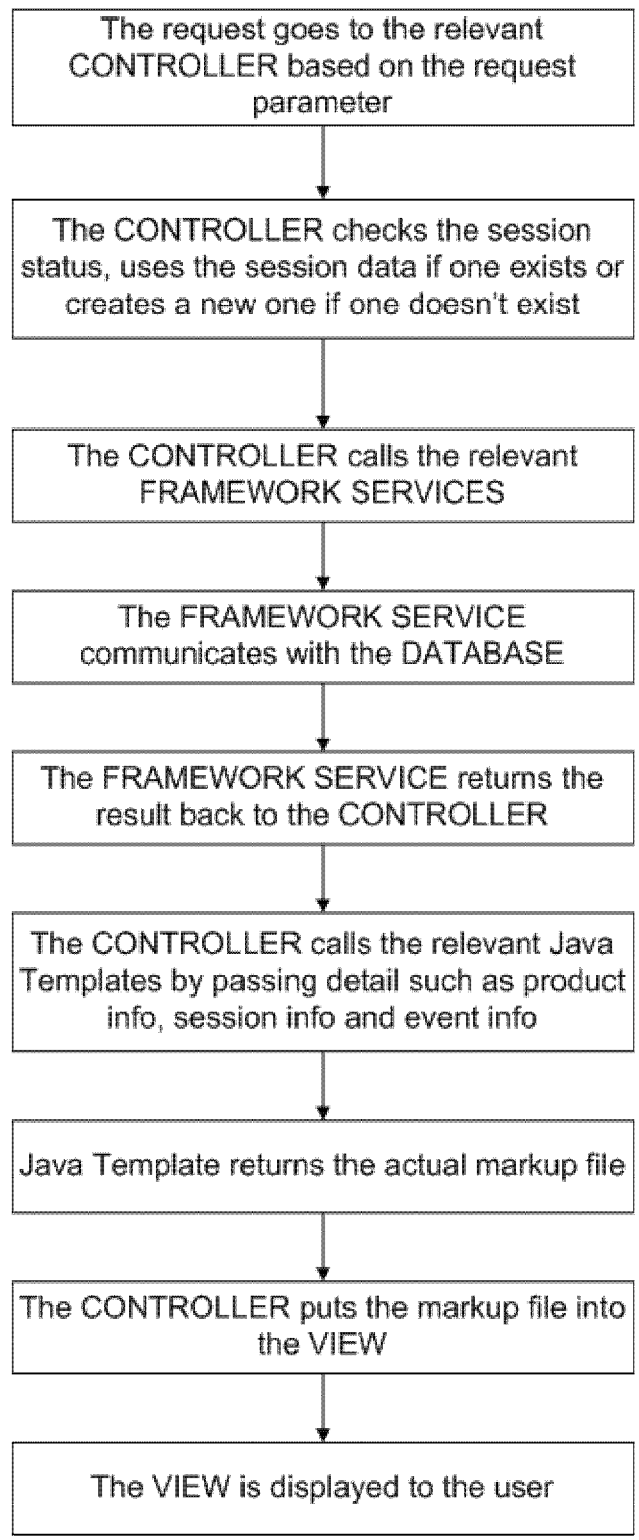

FIG. 5 Architecture Flow

ETS Core—Subscriber Portal

Figure 6:
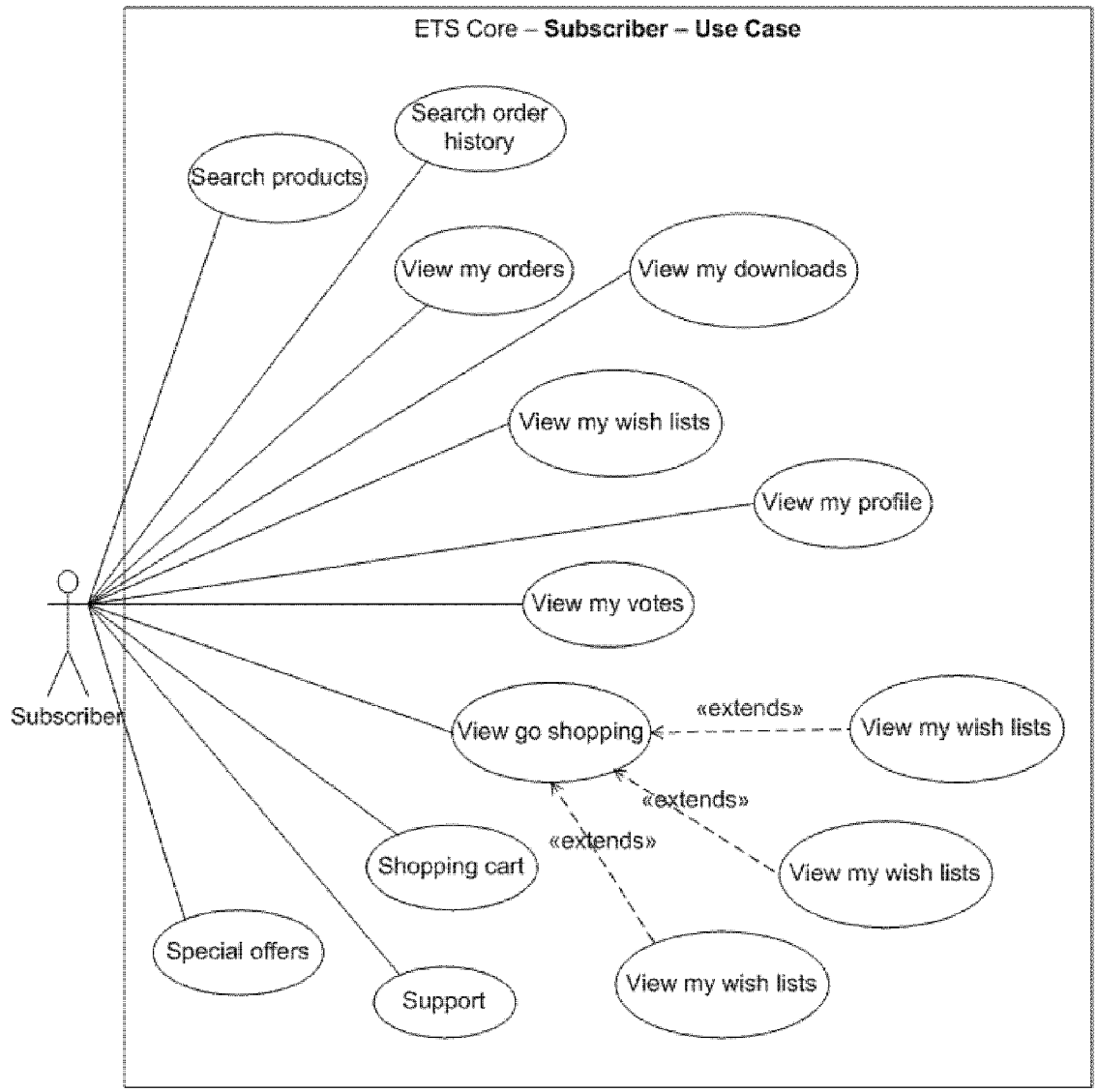

FIG. 6 Conceptual Model

Figure 7A:
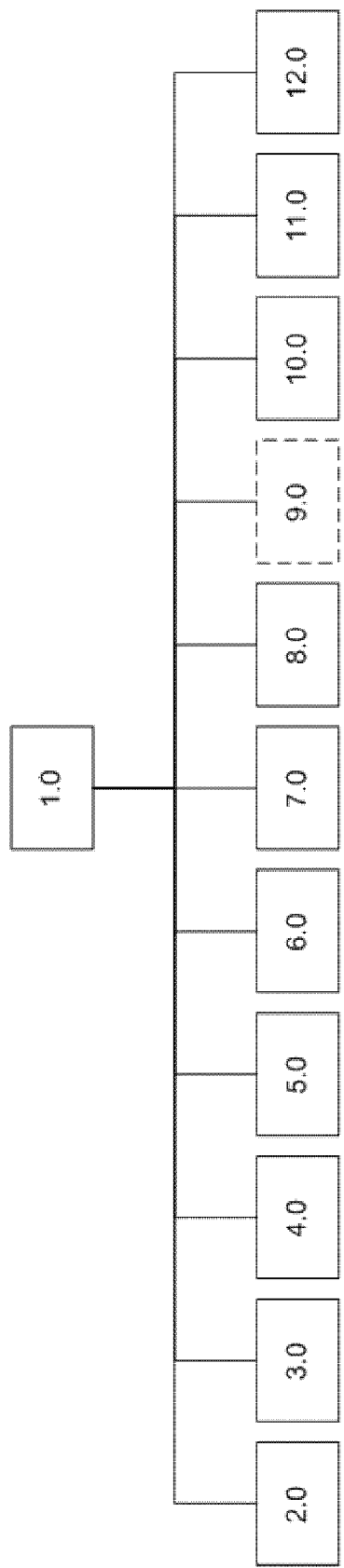

FIG. 7A High Level Hierarchy—HIPO Showing Module Numbers

FIG. 7B High Level Hierarchy—Naming Modules

Figure 8A:
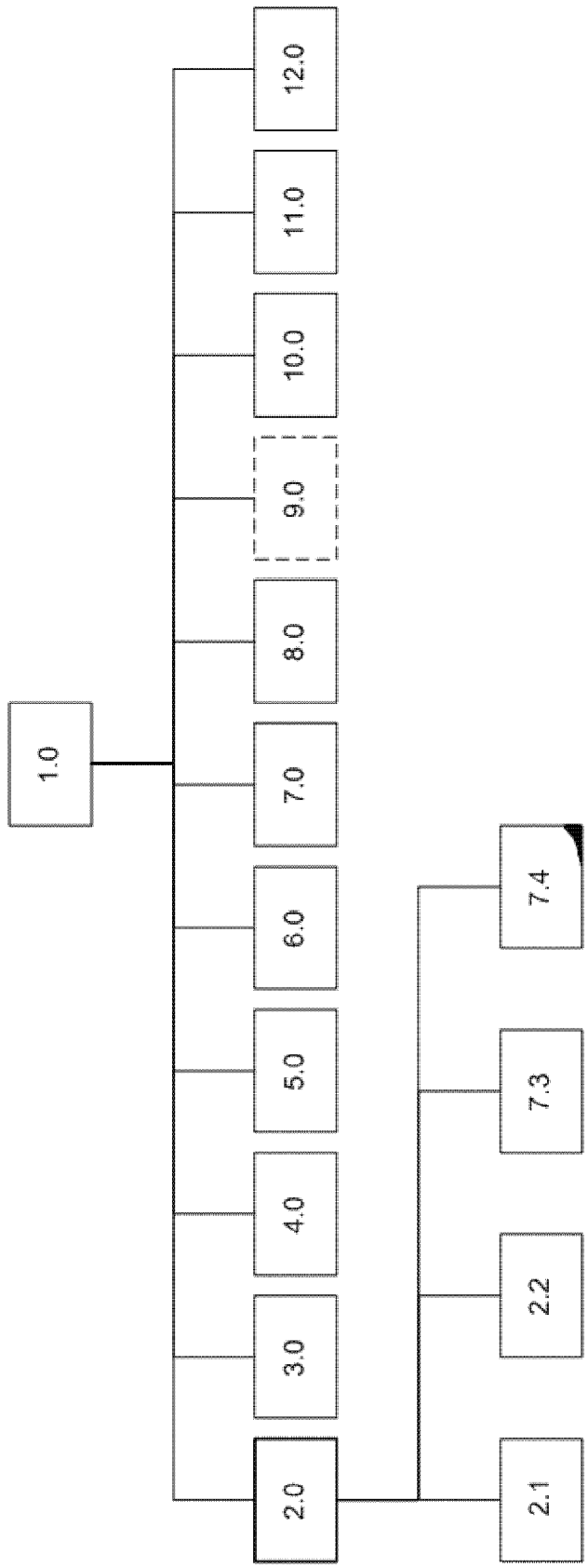

FIG. 8A Module 2.0 My Orders—Hierarchy—HIPO Showing Module Numbers

Figure 8B:
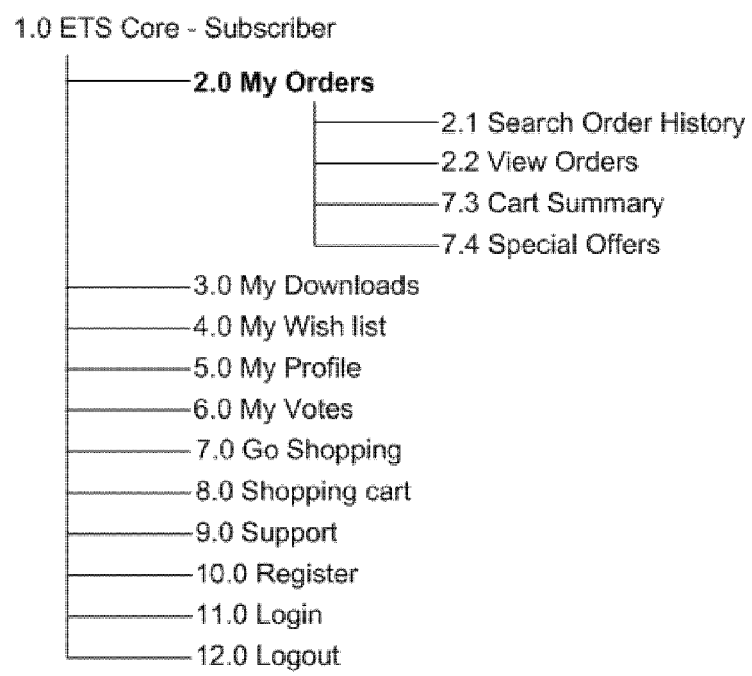

FIG. 8B Module 2.0 My Orders—Naming Sub-Modules

Figure 9:
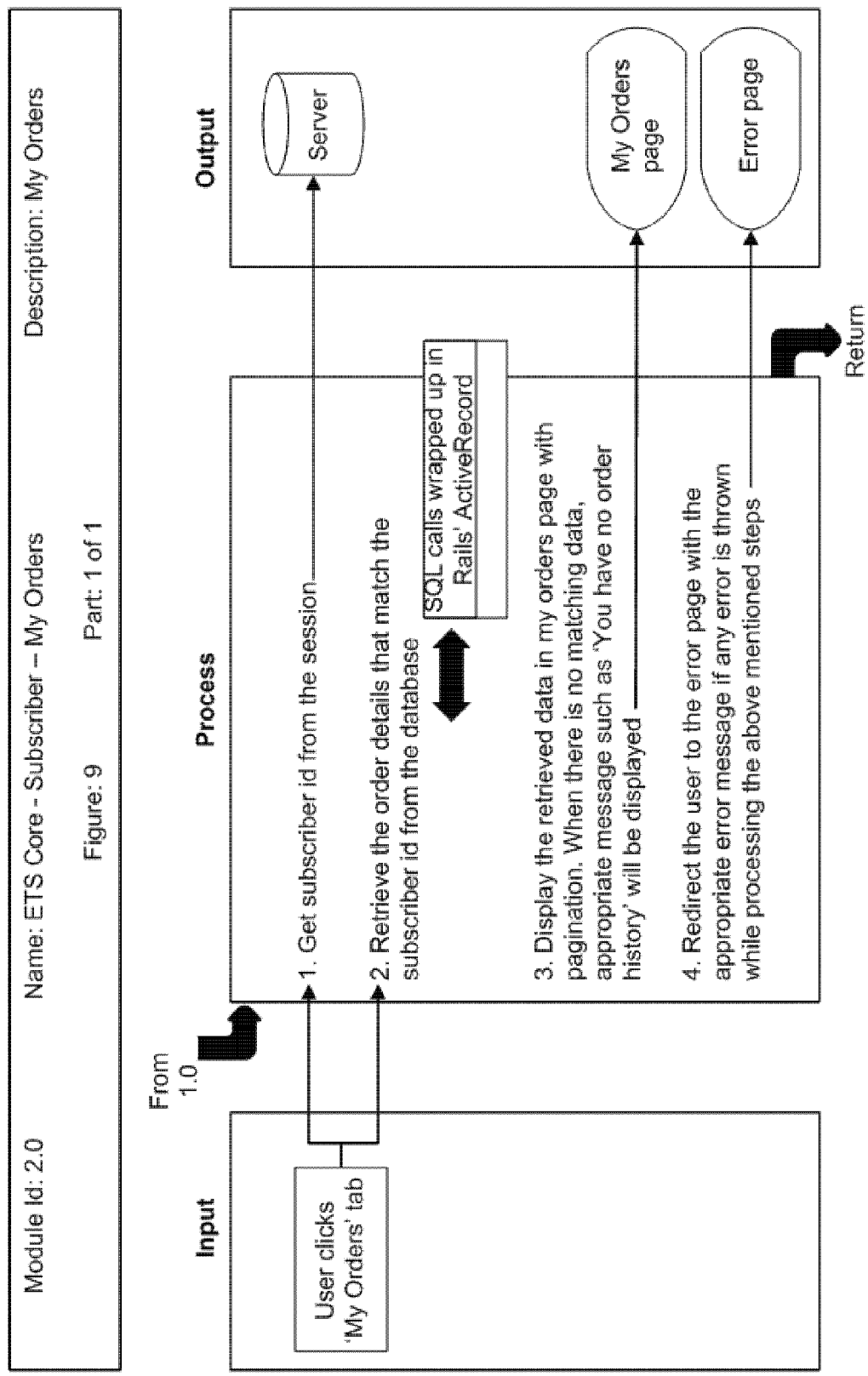

FIG. 9 Module 2.0 My Orders—IPO

Figure 10A:
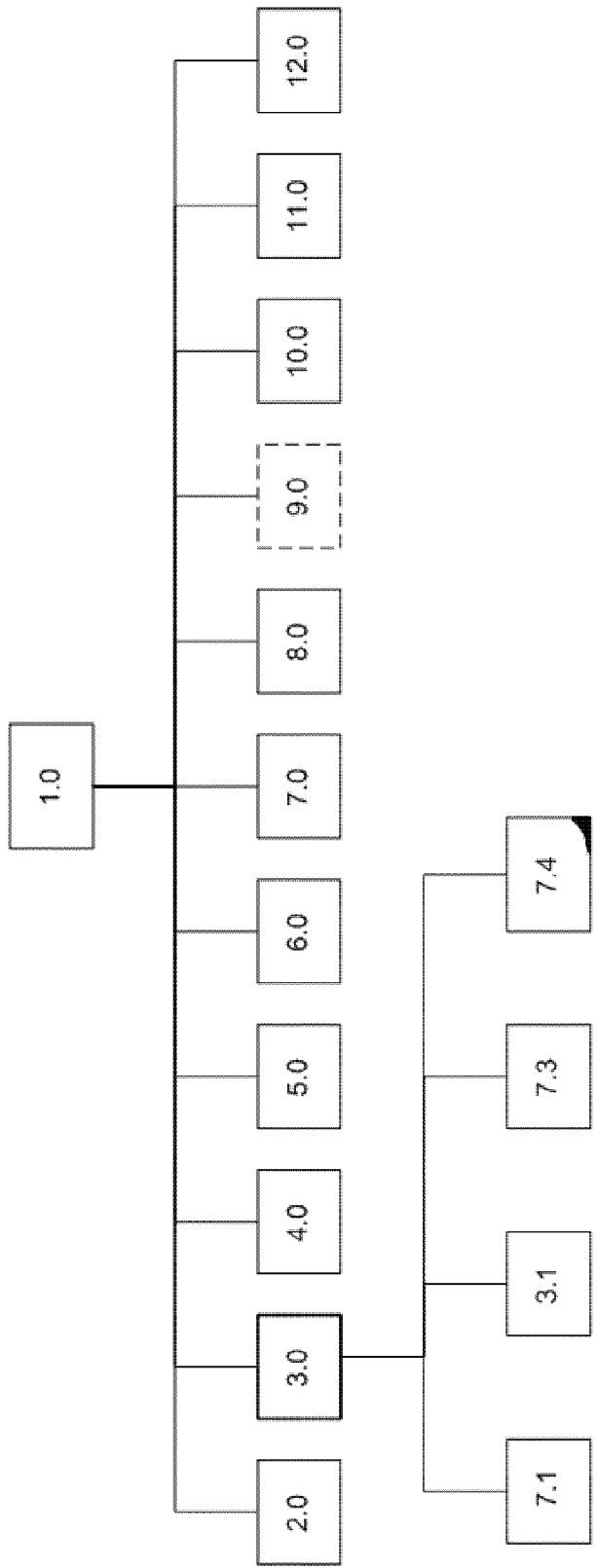

FIG. 10A Module 3.0 My Downloads—Hierarchy—HIPO Showing Module Numbers

Figure 10B:
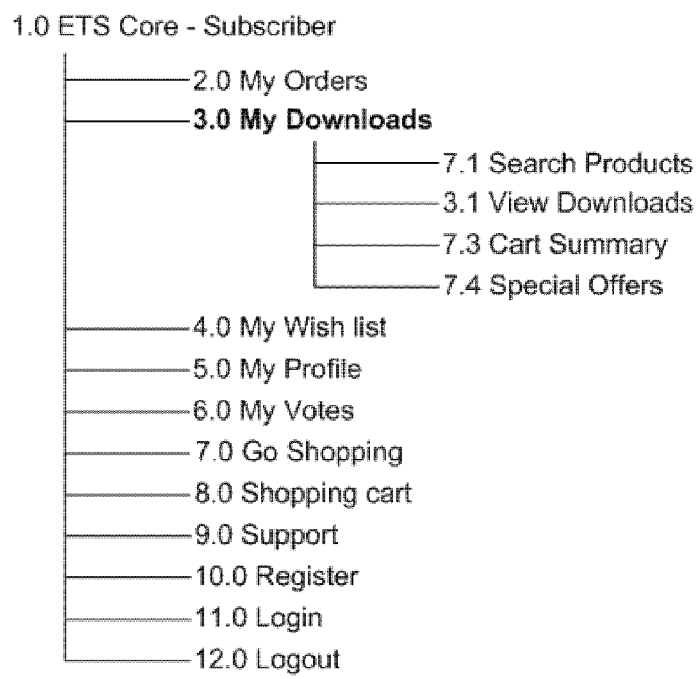

FIG. 10B Module 3.0 My Downloads—Naming Sub-Modules

Figure 11:
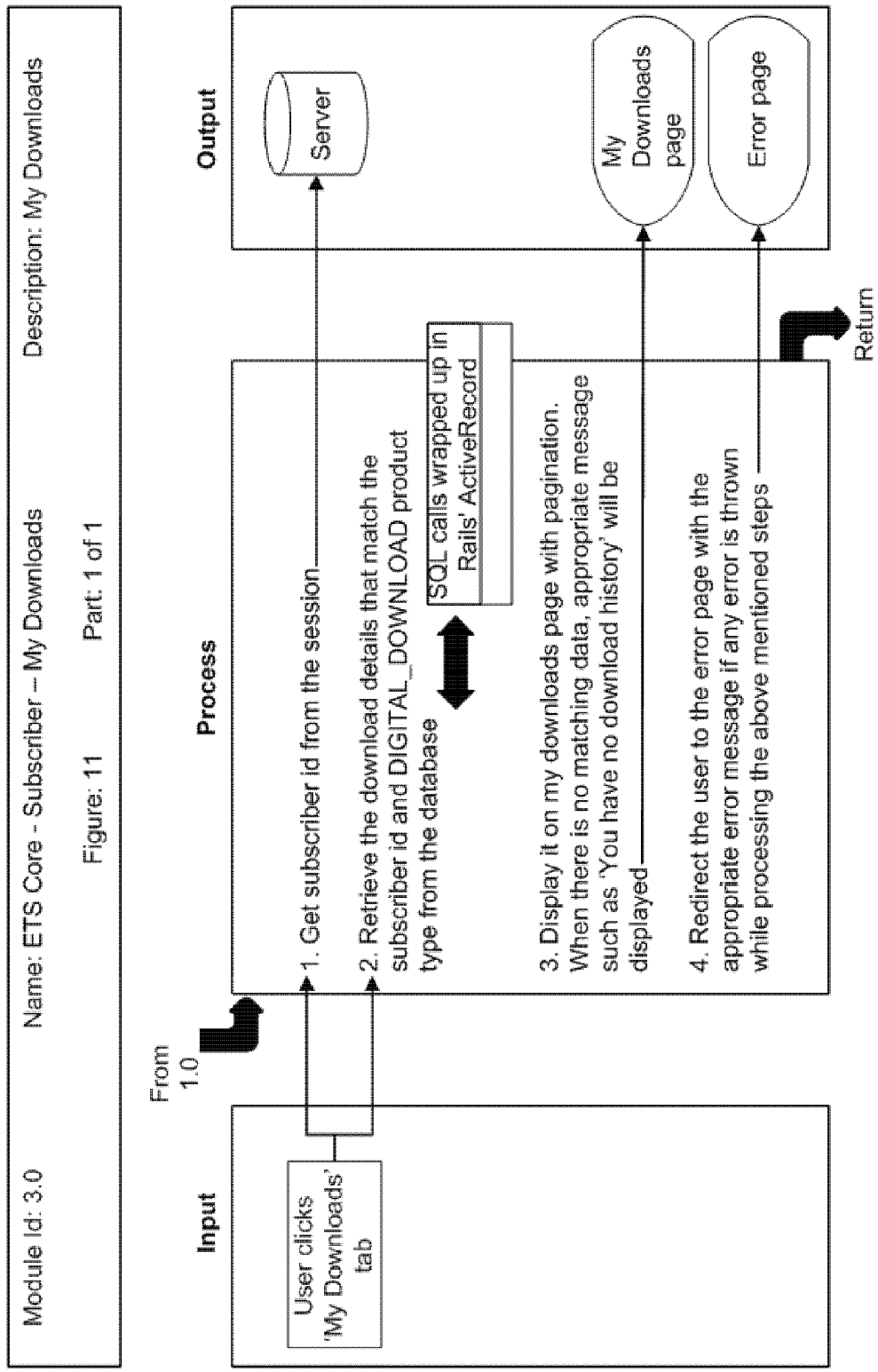

FIG. 11 Module 3.0 My Downloads—IPO

Figure 12A:
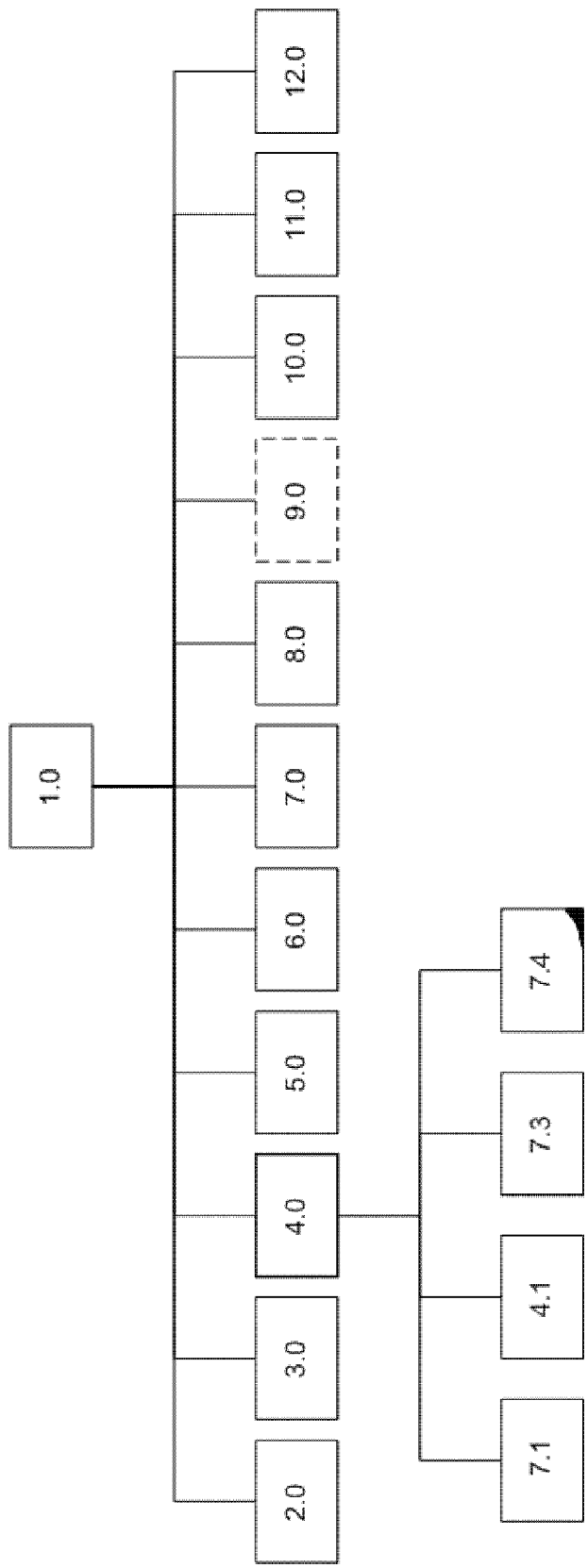

FIG. 12A Module 4.0 My Wish List—Hierarchy—HIPO Showing Module Numbers

Figure 12B:

FIG. 12B Module 4.0 My Wish List—Naming Sub-Modules

Figure 13:
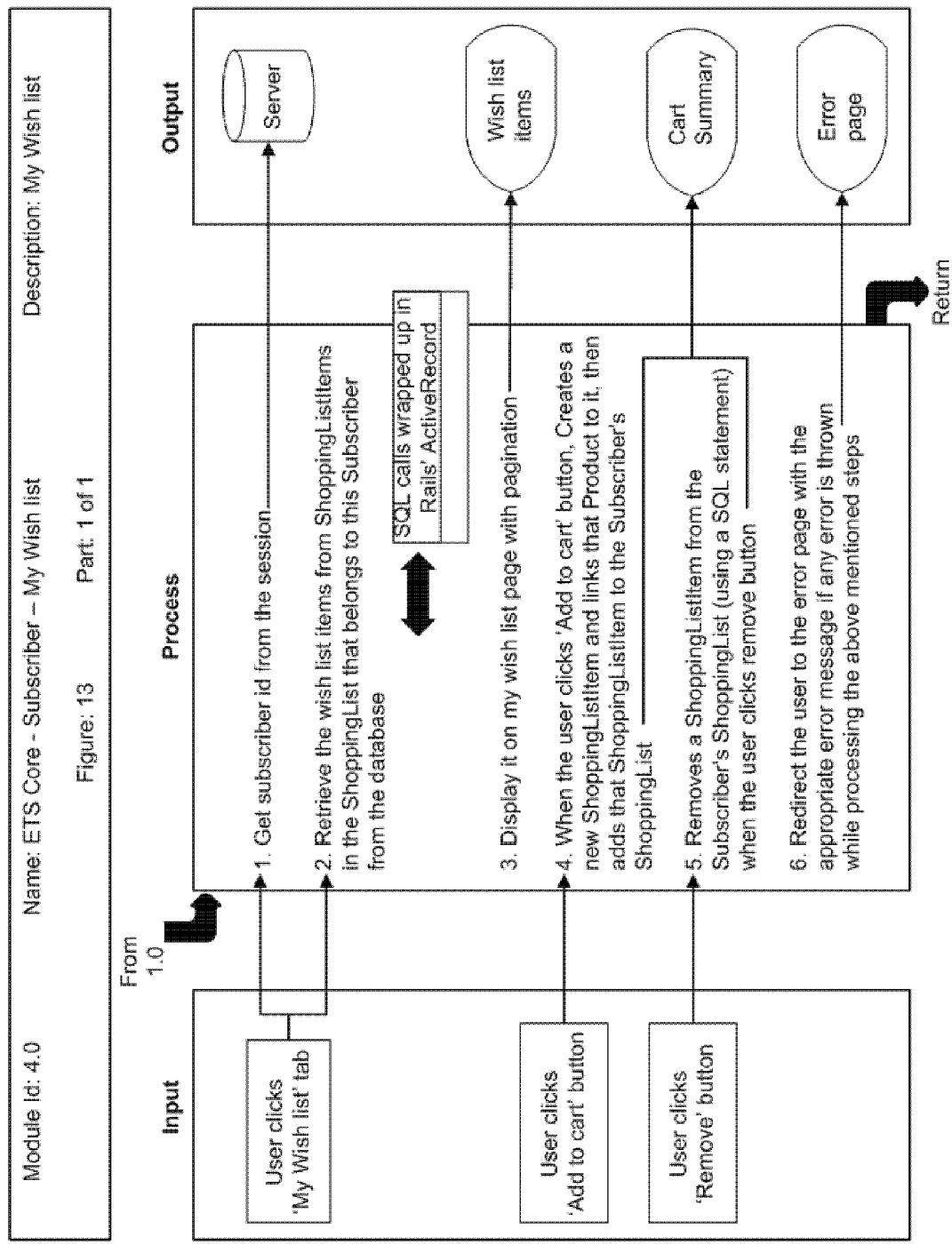

FIG. 13 Module 4.0 My Wish List—IPO

Figure 14A:
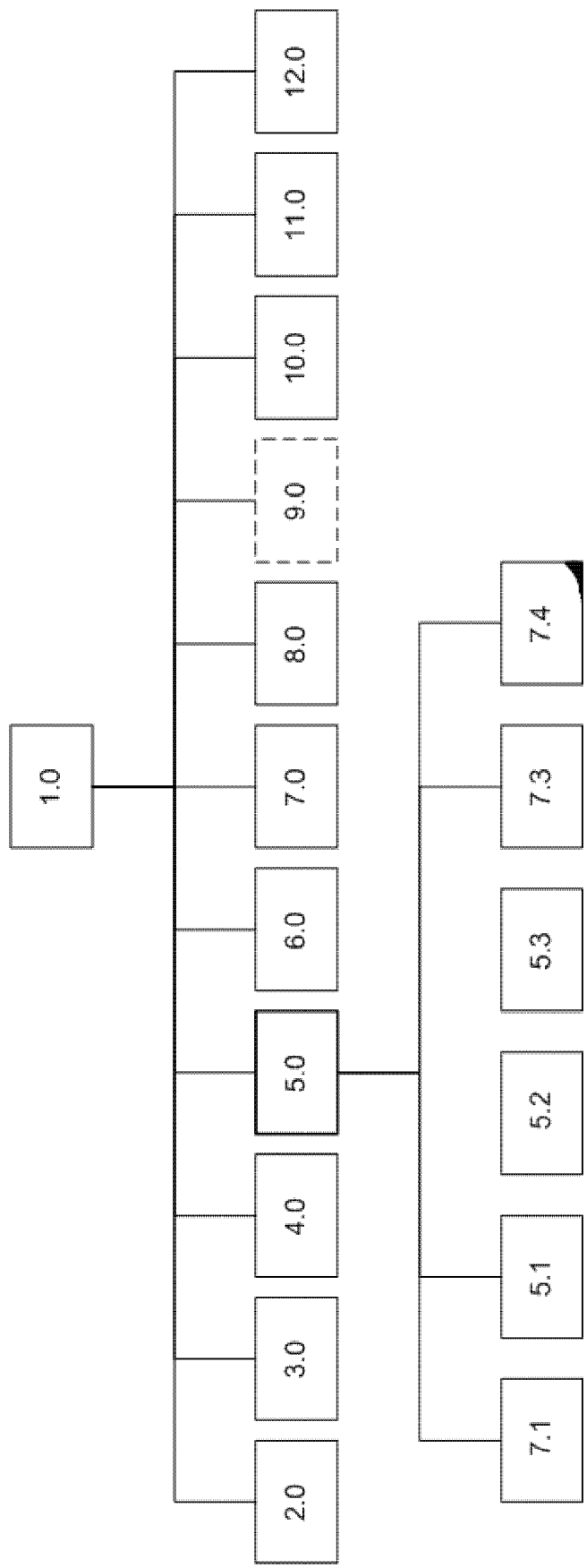

FIG. 14A Module 5.0 My Profile—Hierarchy—HIPO Showing Module Numbers

Figure 14B:
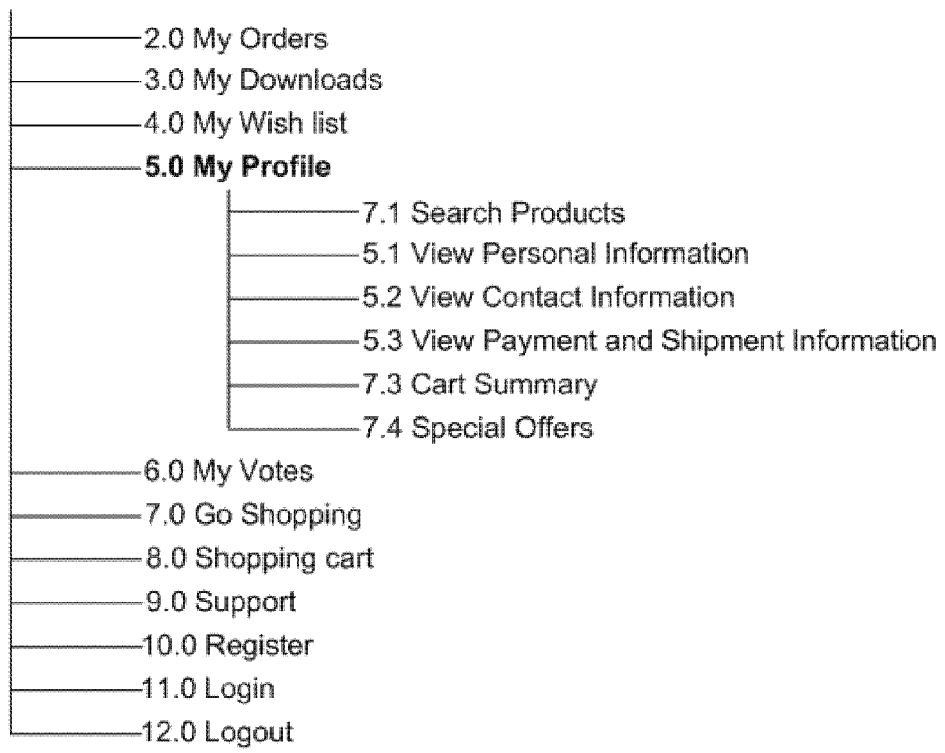

FIG. 14B Module 5.0 My Profile—Naming Sub-Modules

Figure 15:
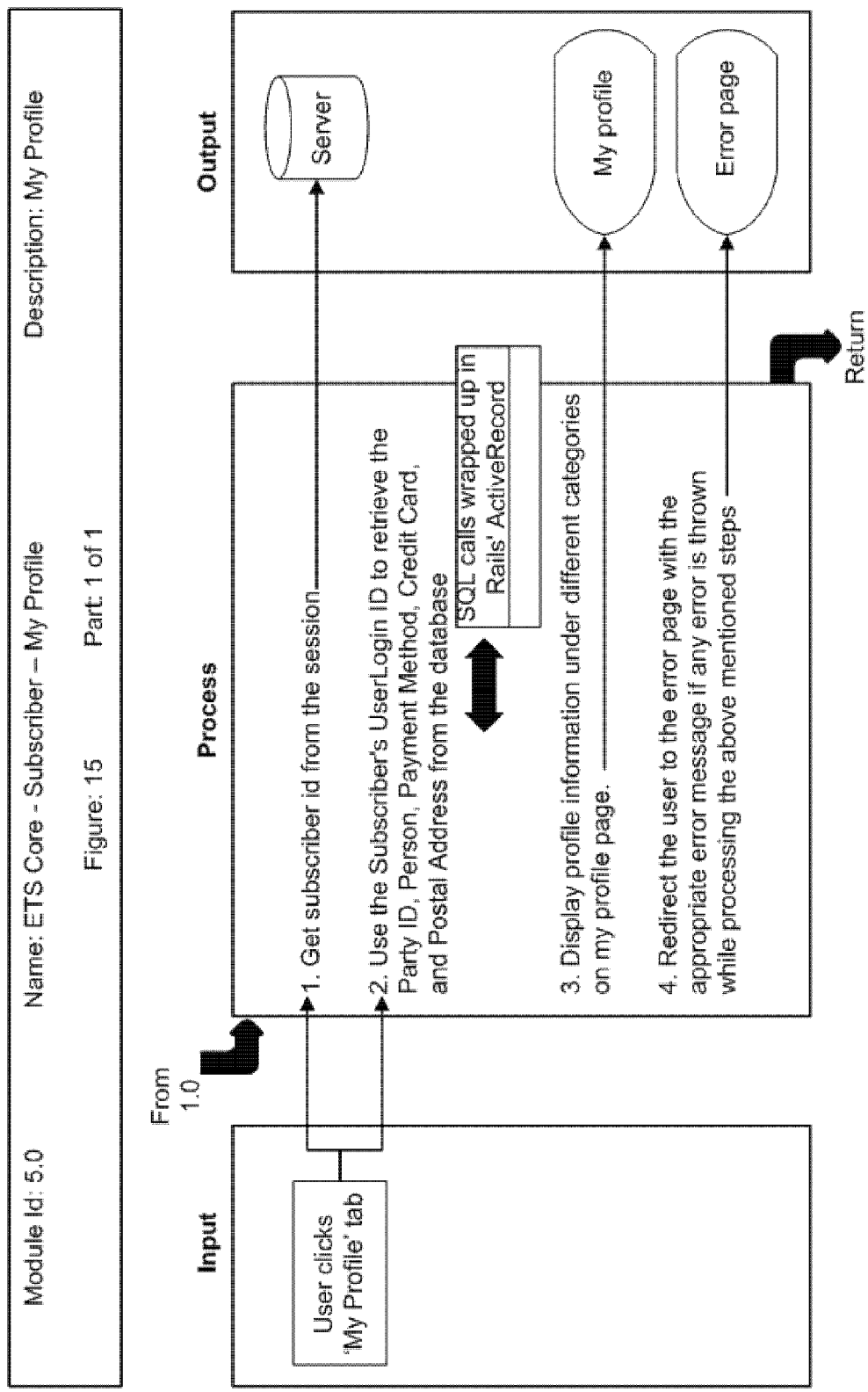

FIG. 15 Module 5.0 My Profile—IPO

Figure 16A:
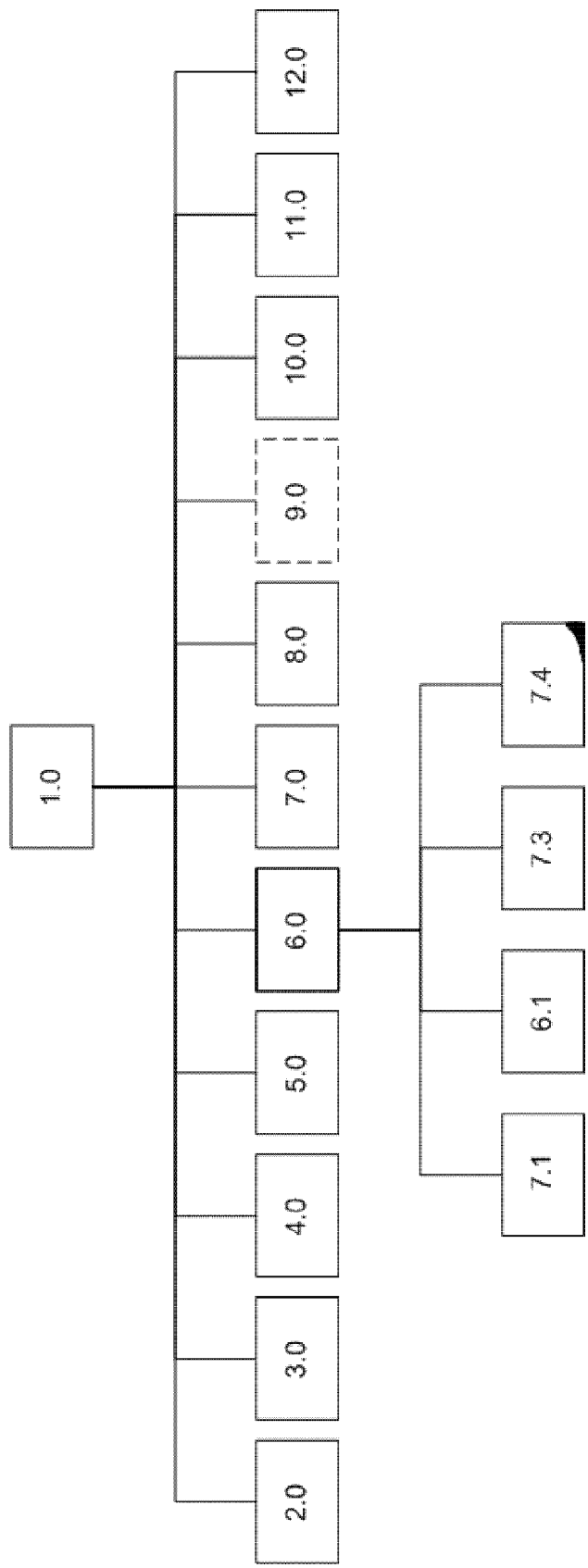

FIG. 16A Module 6.0 My Votes—Hierarchy—HIPO Showing Module Numbers

Figure 16B:
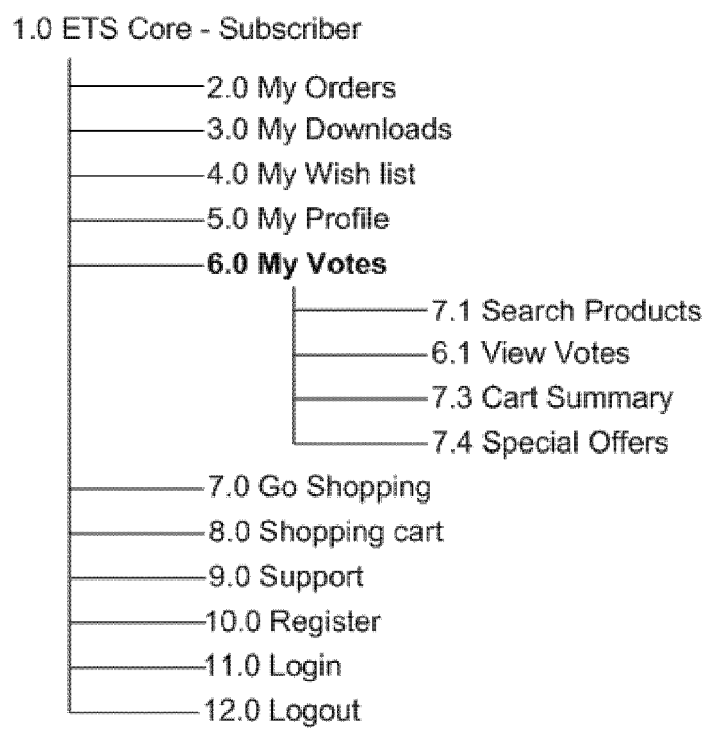

FIG. 16B Module 6.0 My Votes—Naming Sub-Modules

Figure 17:
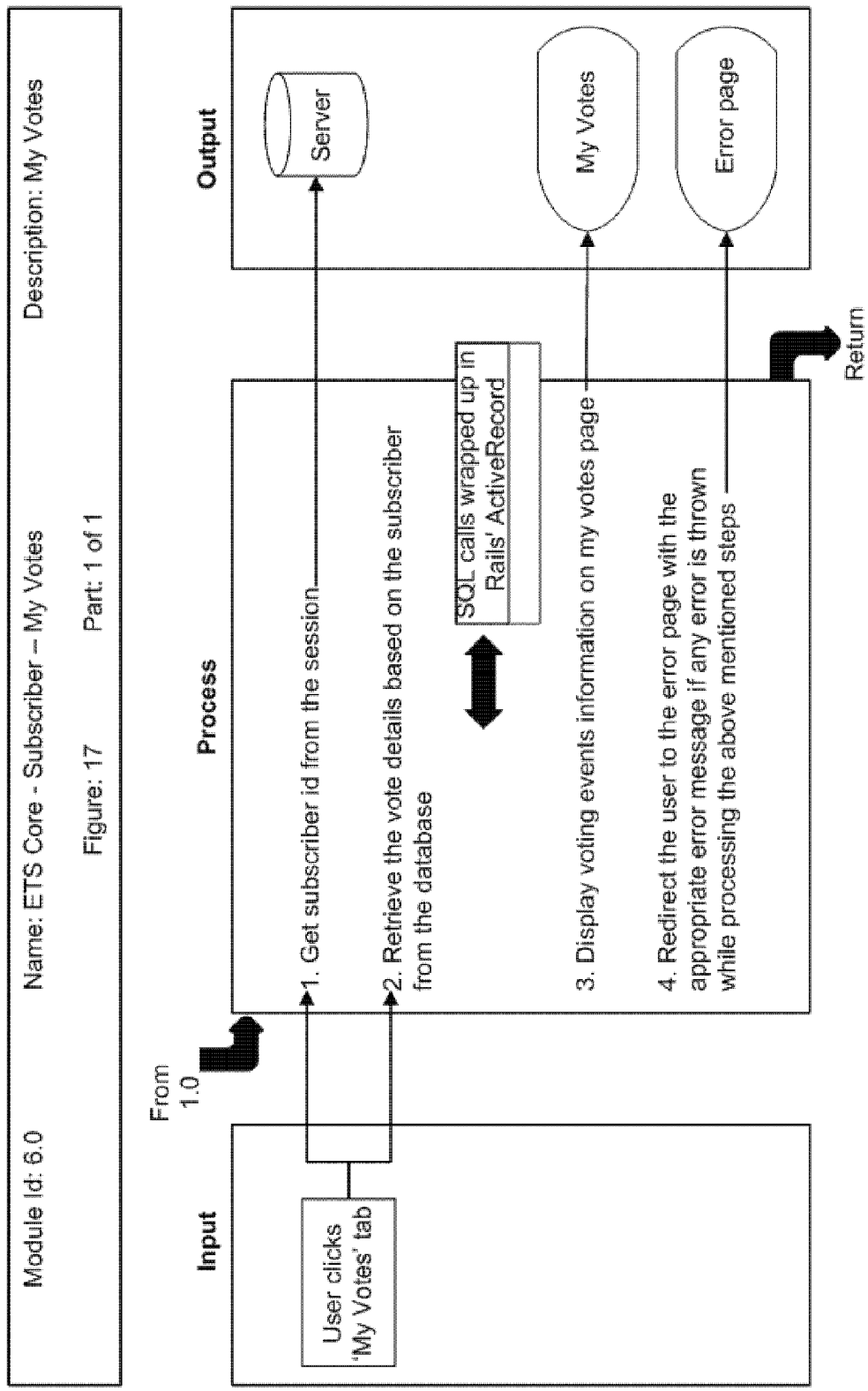

FIG. 17 Module 6.0 My Votes—IPO

Figure 18A:
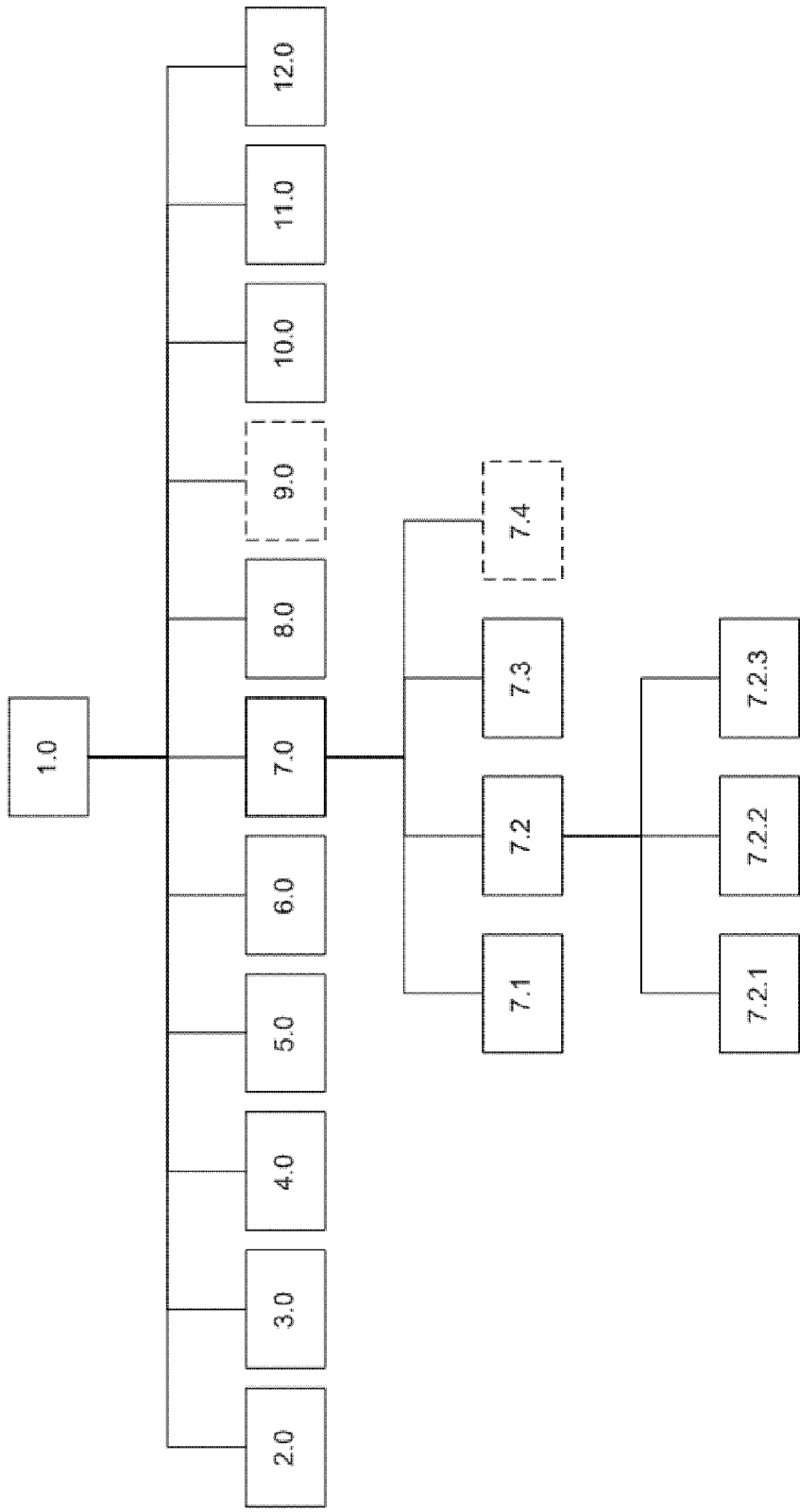

FIG. 18A Module 7.0 Go Shoppin—Hierarchy—HIPO Showing Module Numbers

Figure 18B:
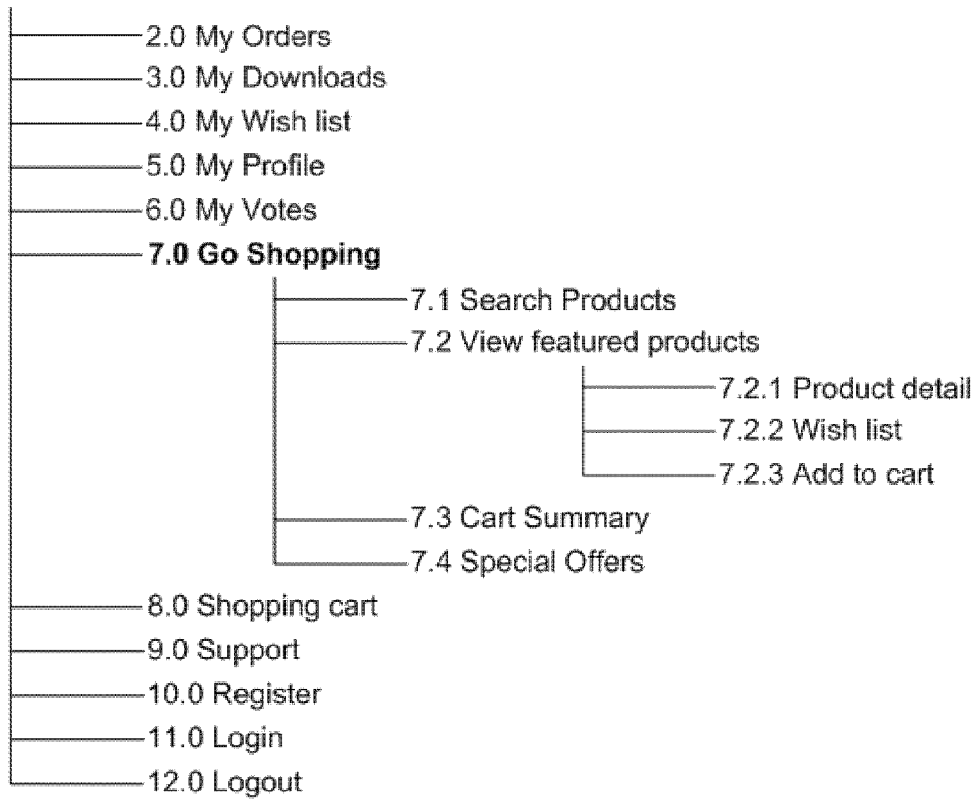

FIG. 18B Module 7.0 Go Shopping—Naming Sub-Modules

Figure 19:
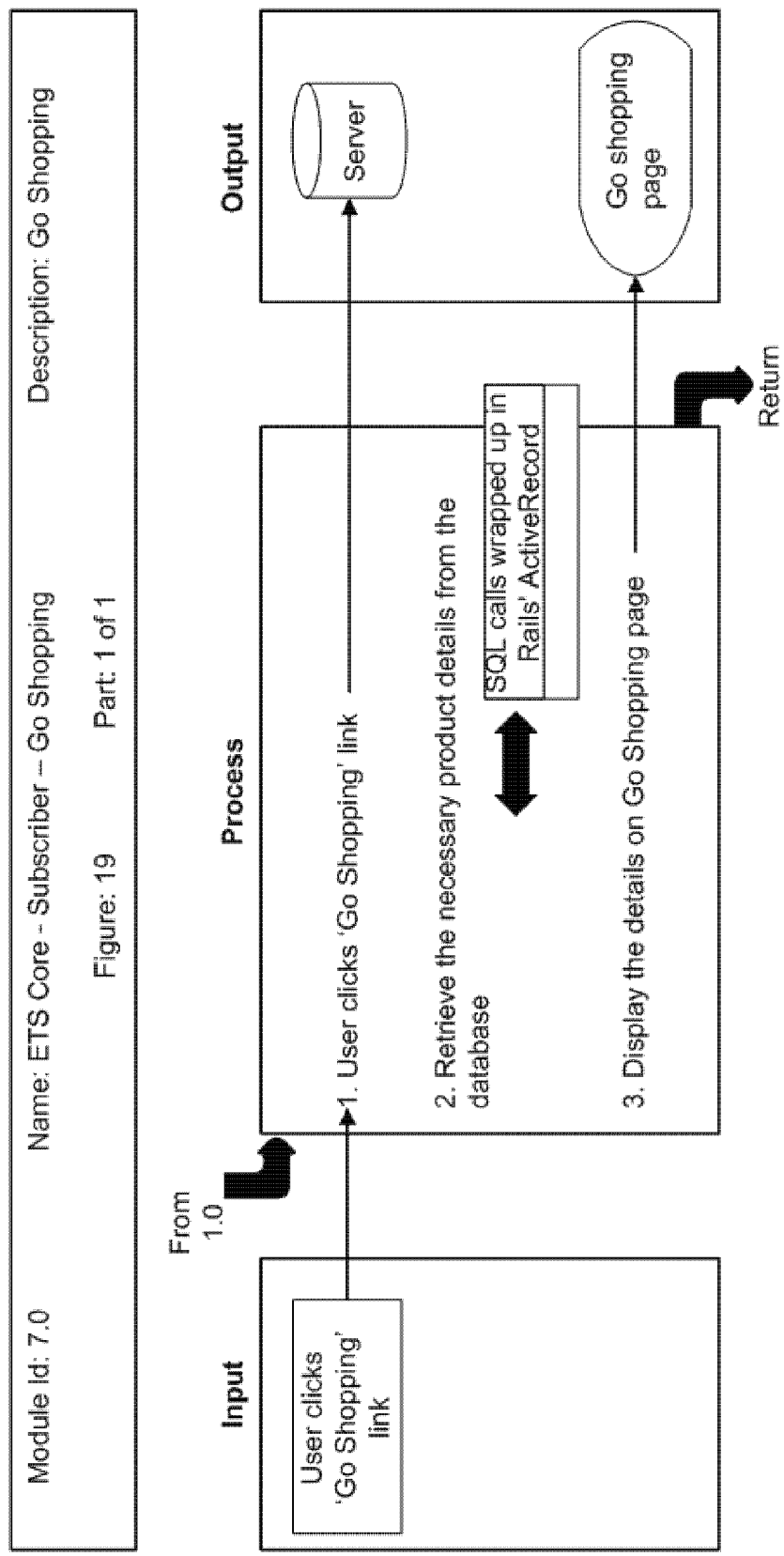

FIG. 19 Module 7.0 Go Shopping—IPO

Figure 20A:
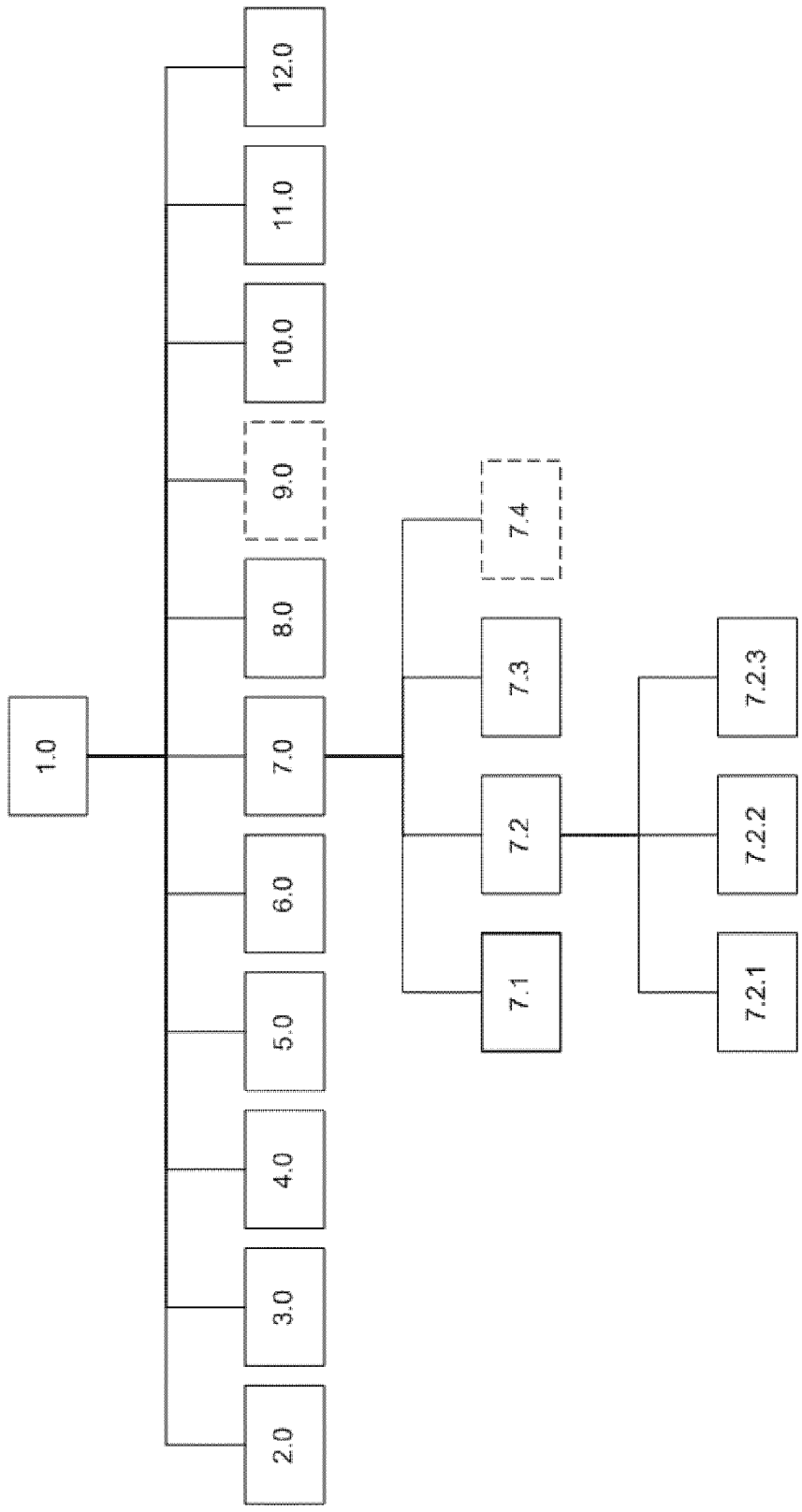
Figure 20B:
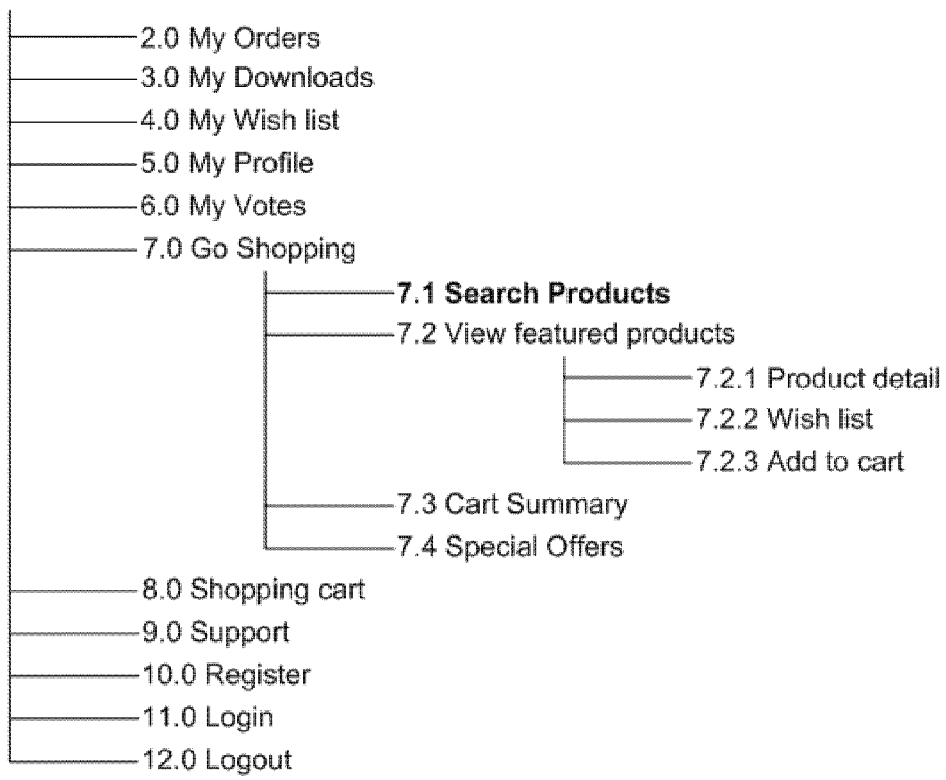
Figure 21:
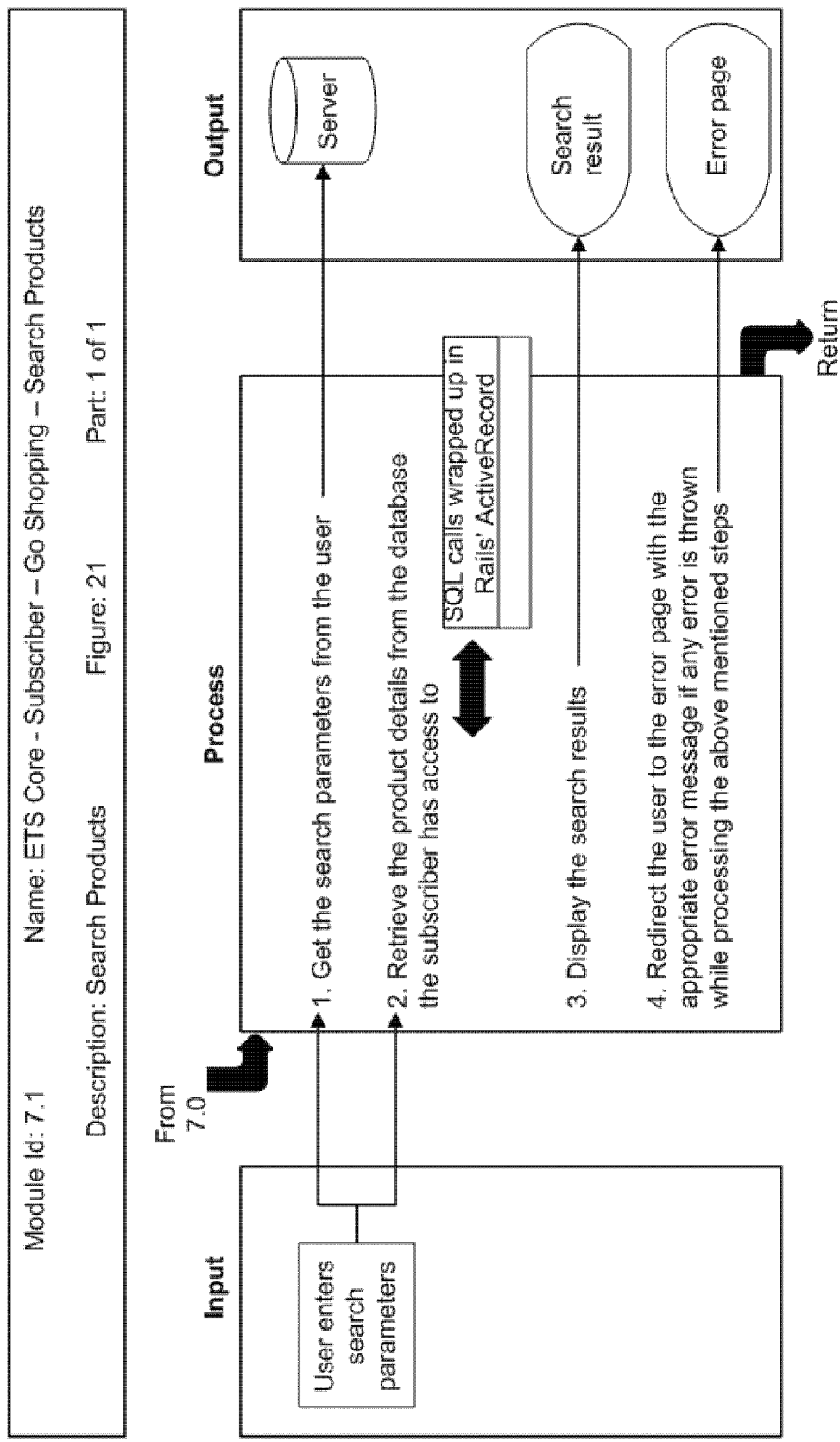
Figure 22A:
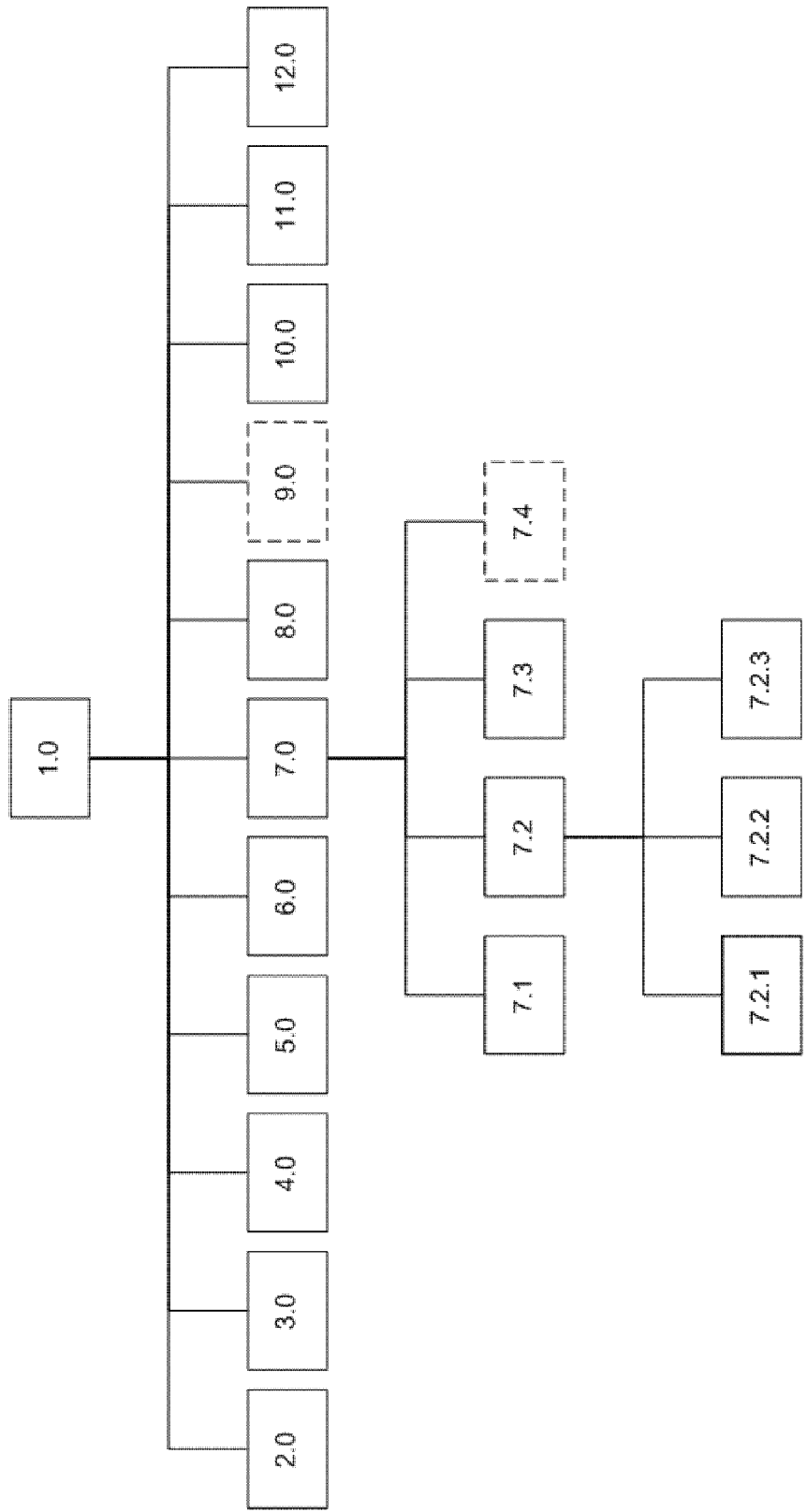
Figure 22B:
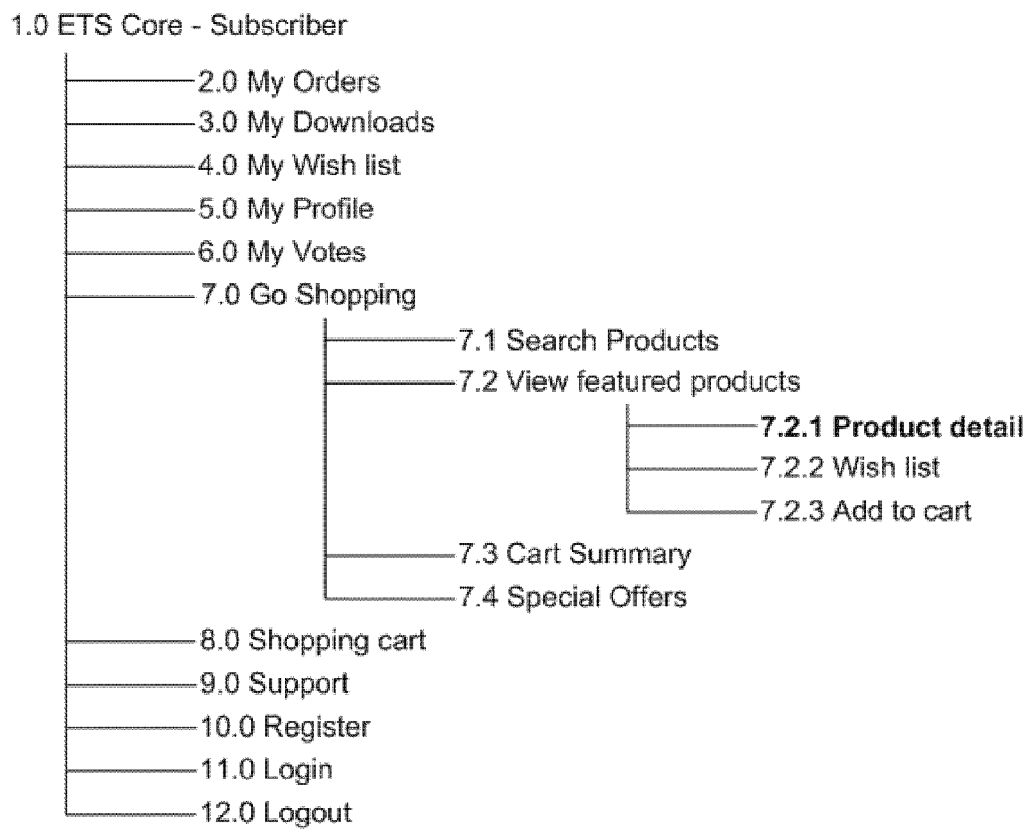
Figure 23:
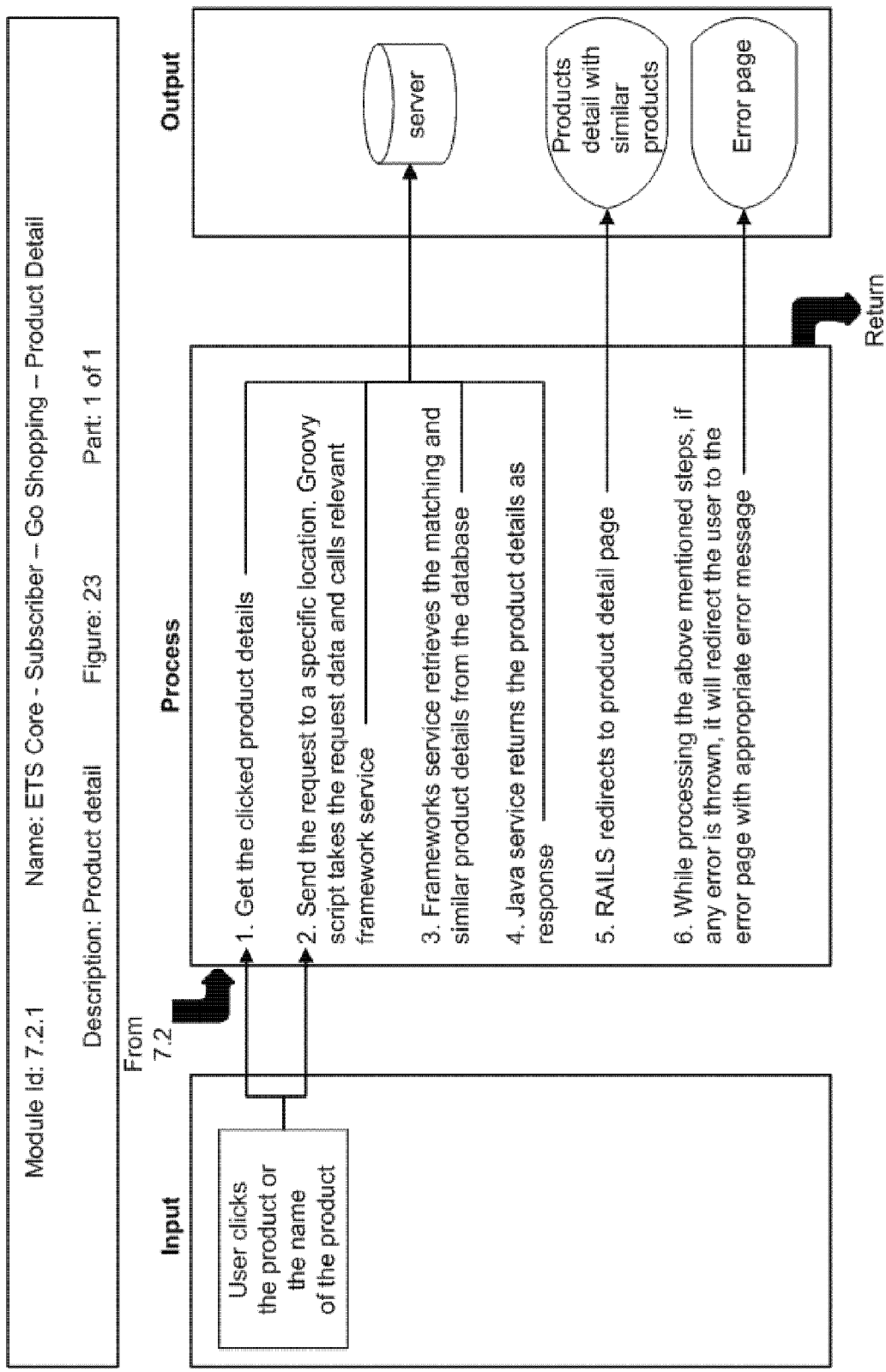
Figure 24A:
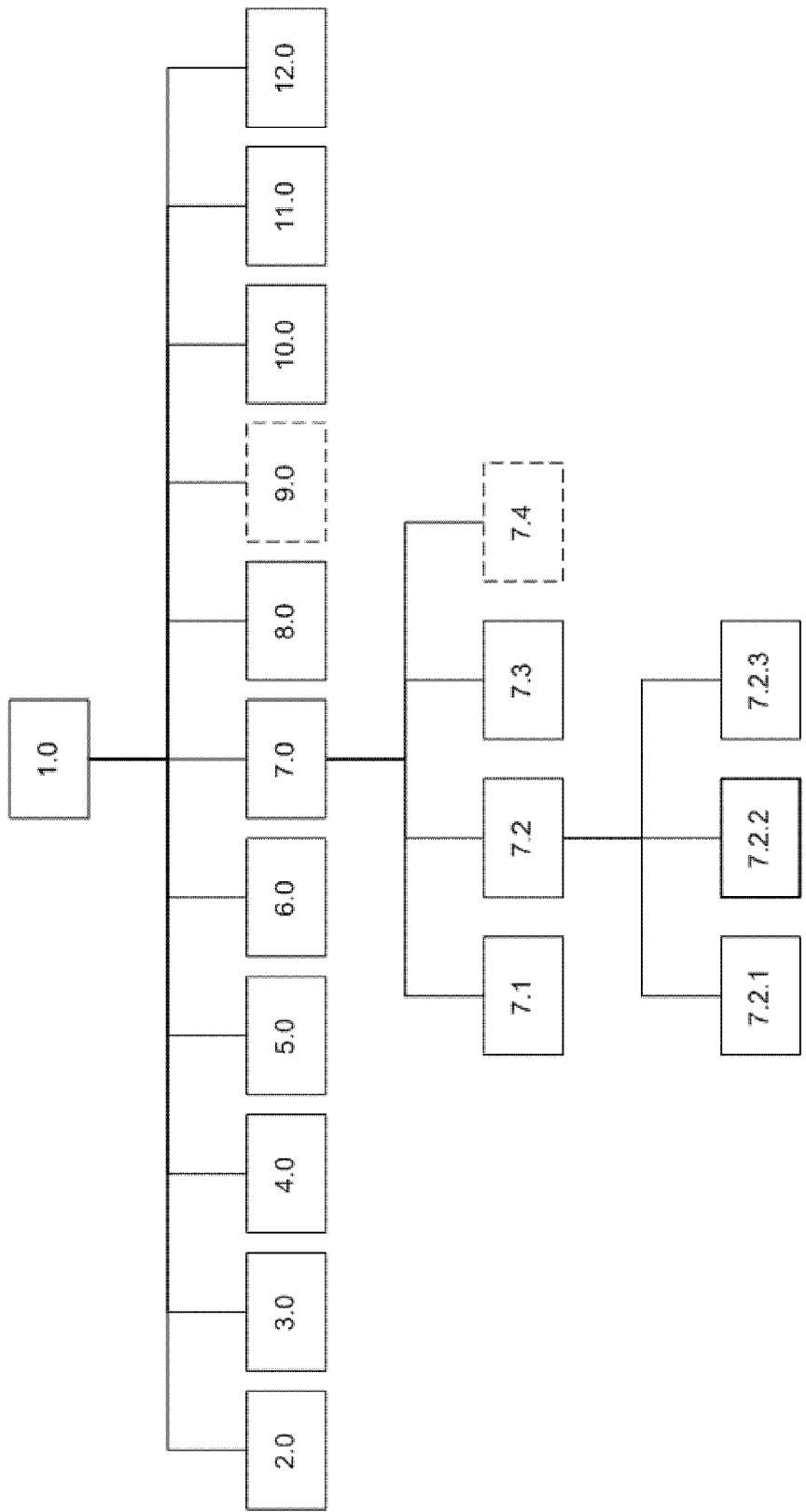
Figure 24B:
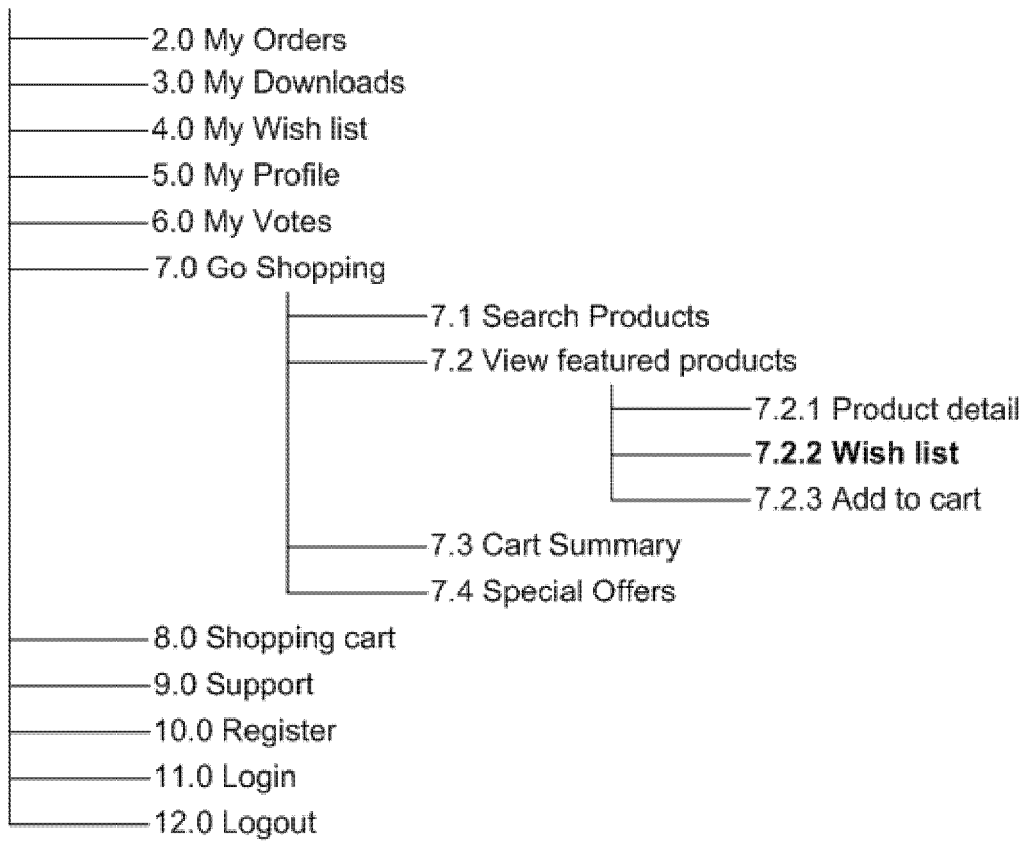
Figure 25:
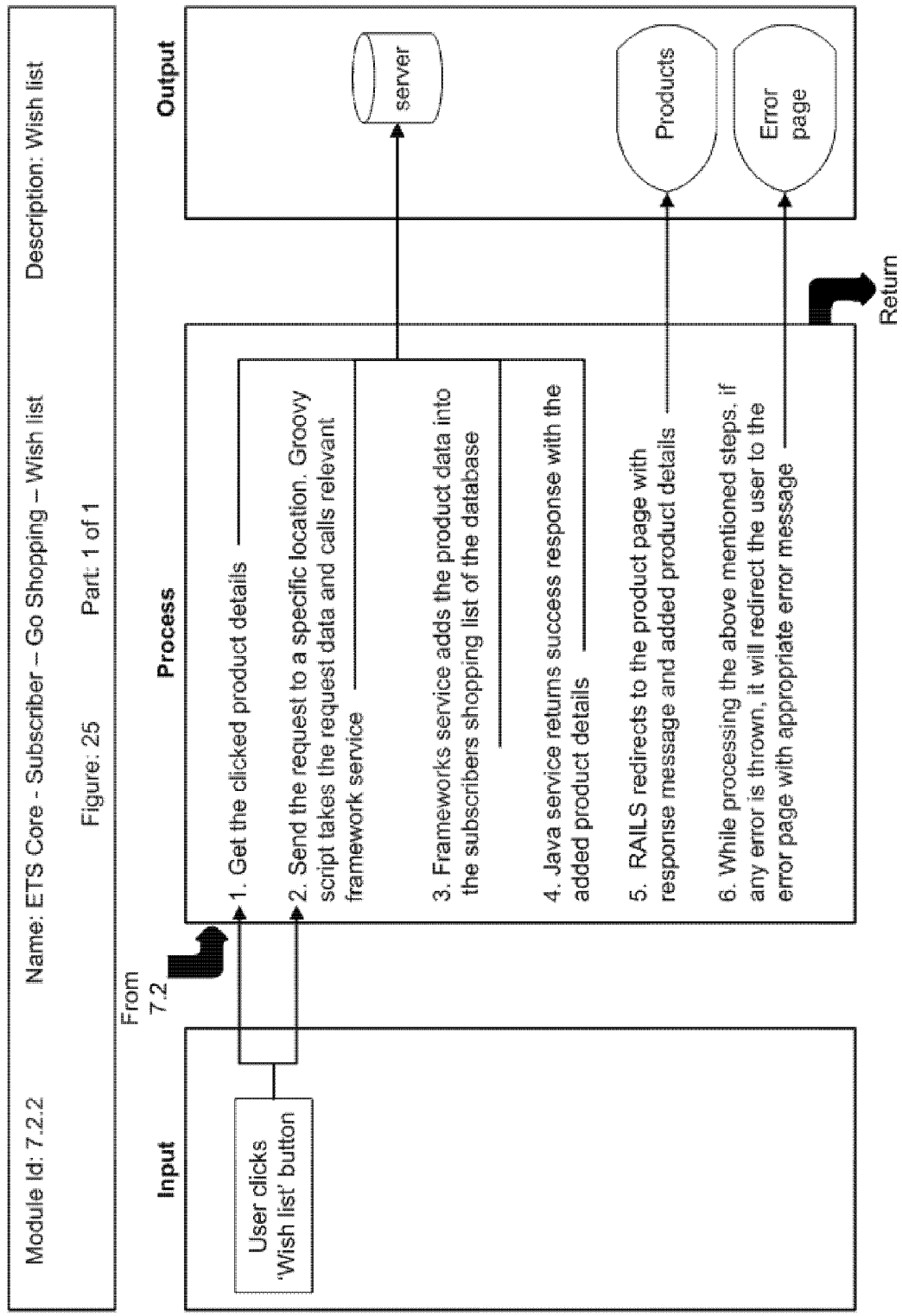
Figure 26:
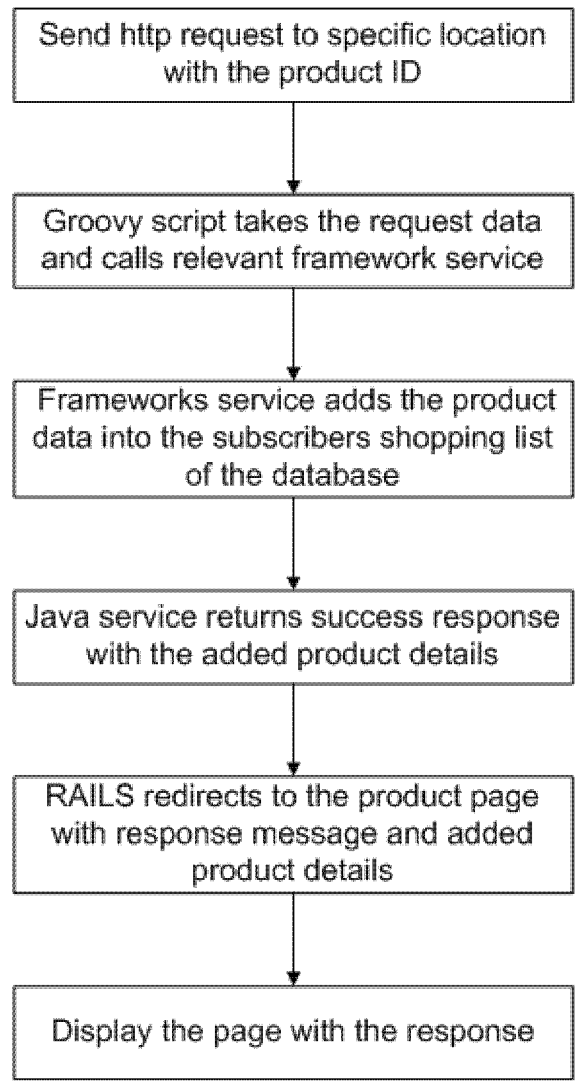
Figure 27A:
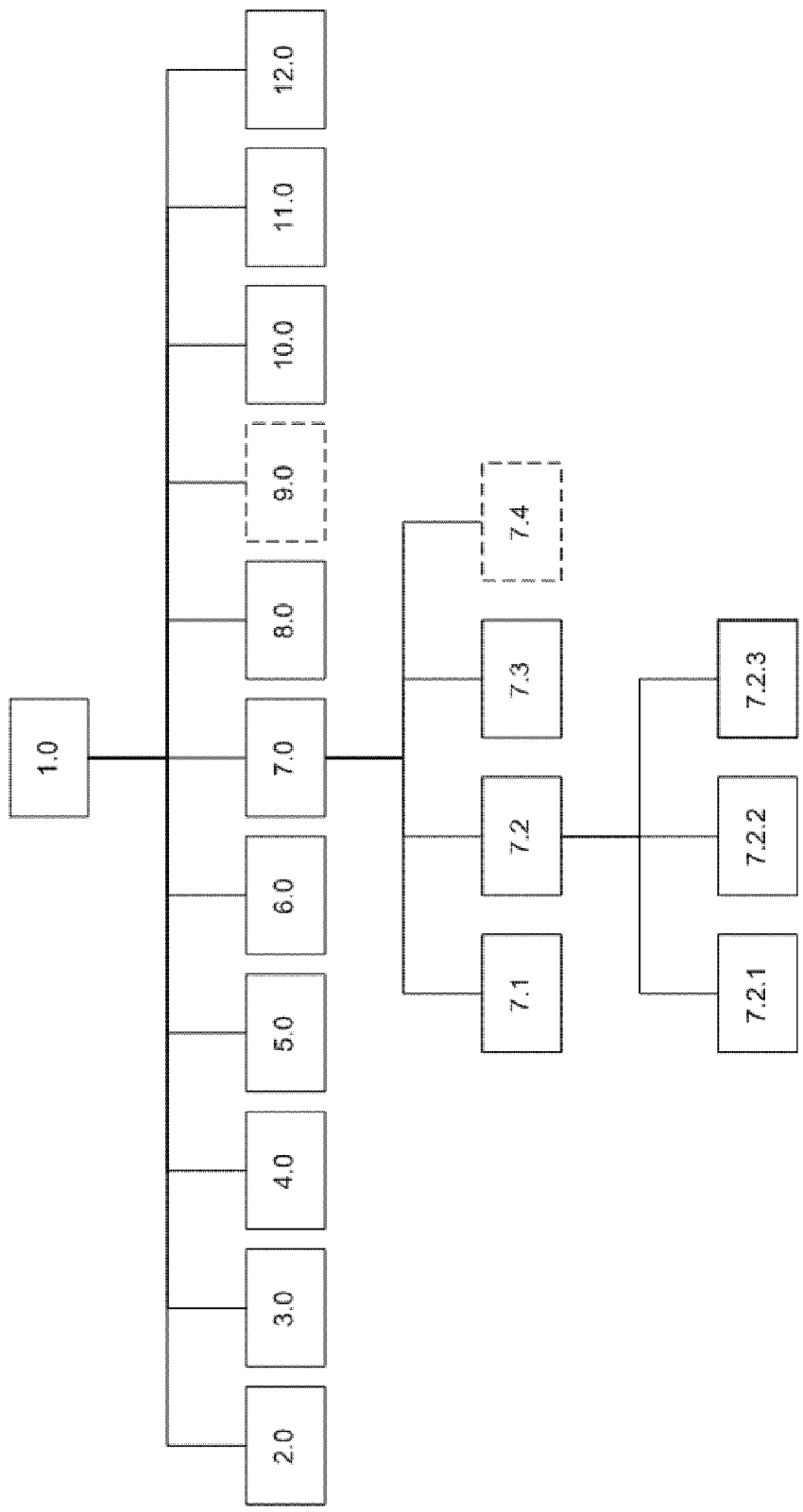
Figure 27B:
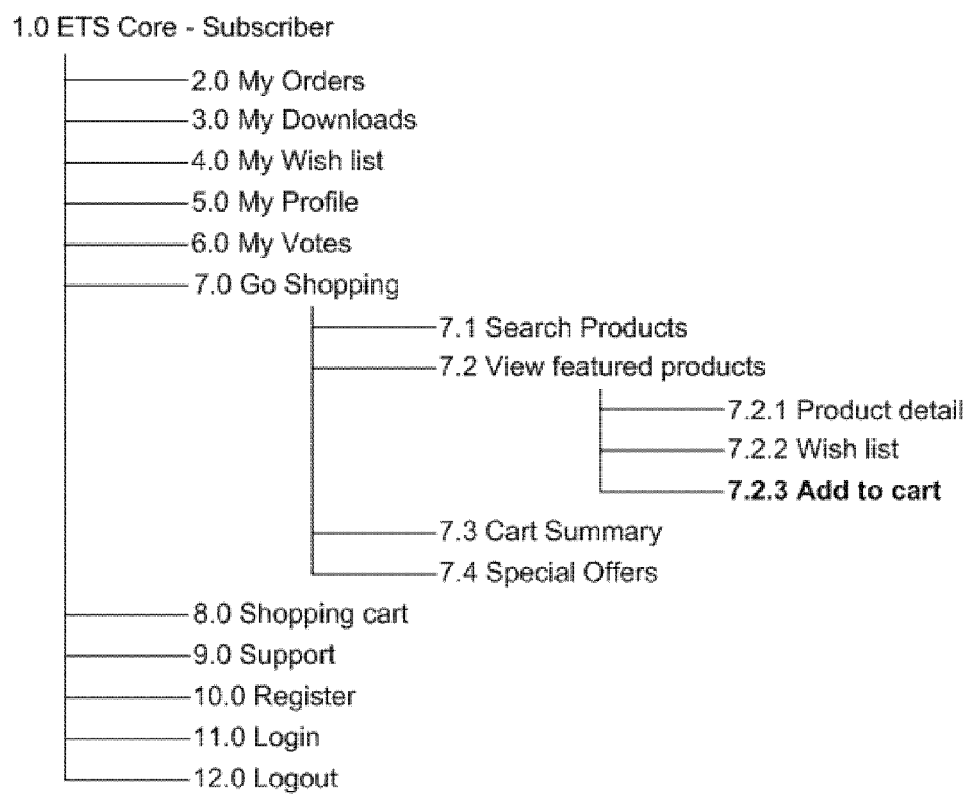
Figure 28:
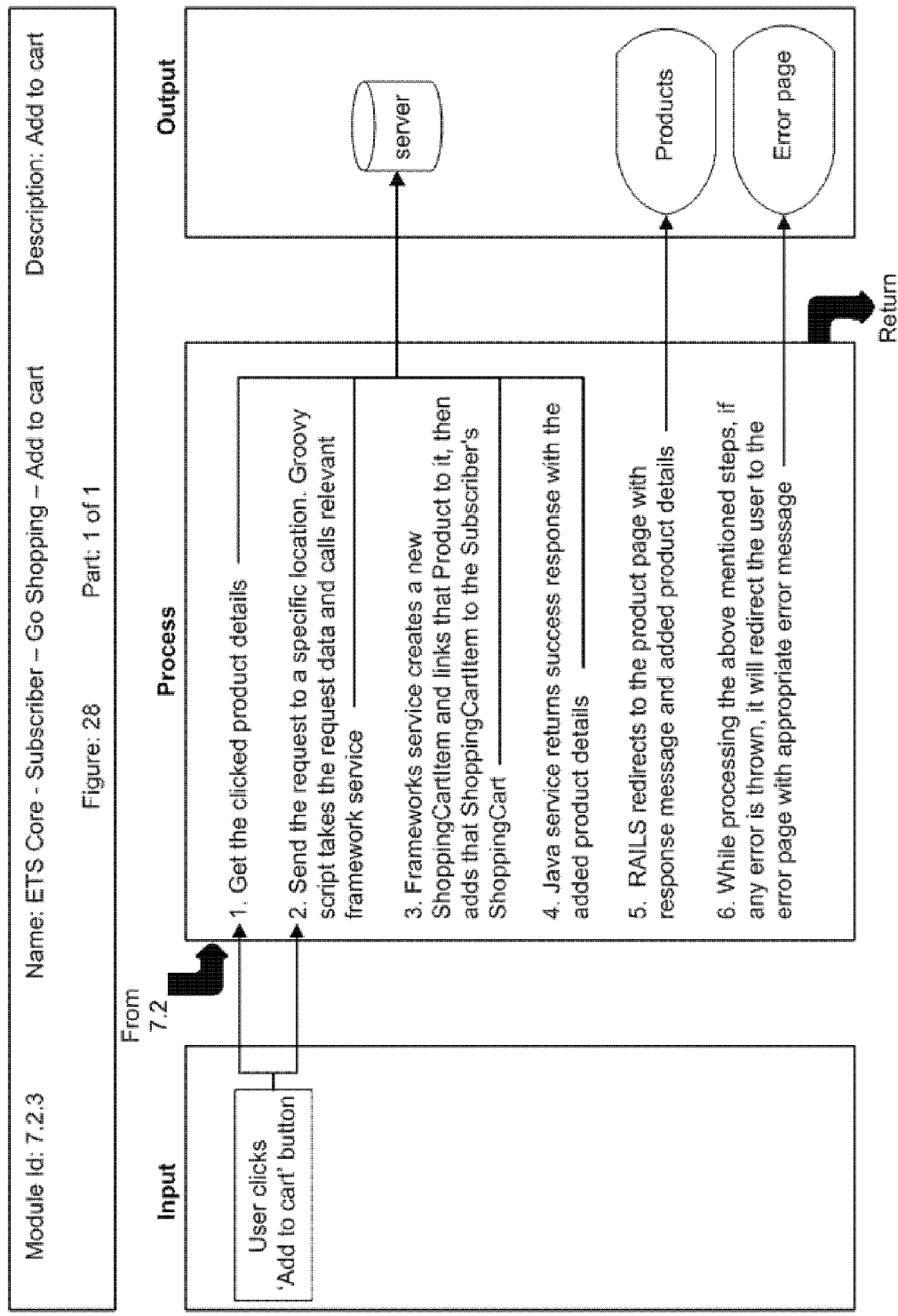
Figure 29:
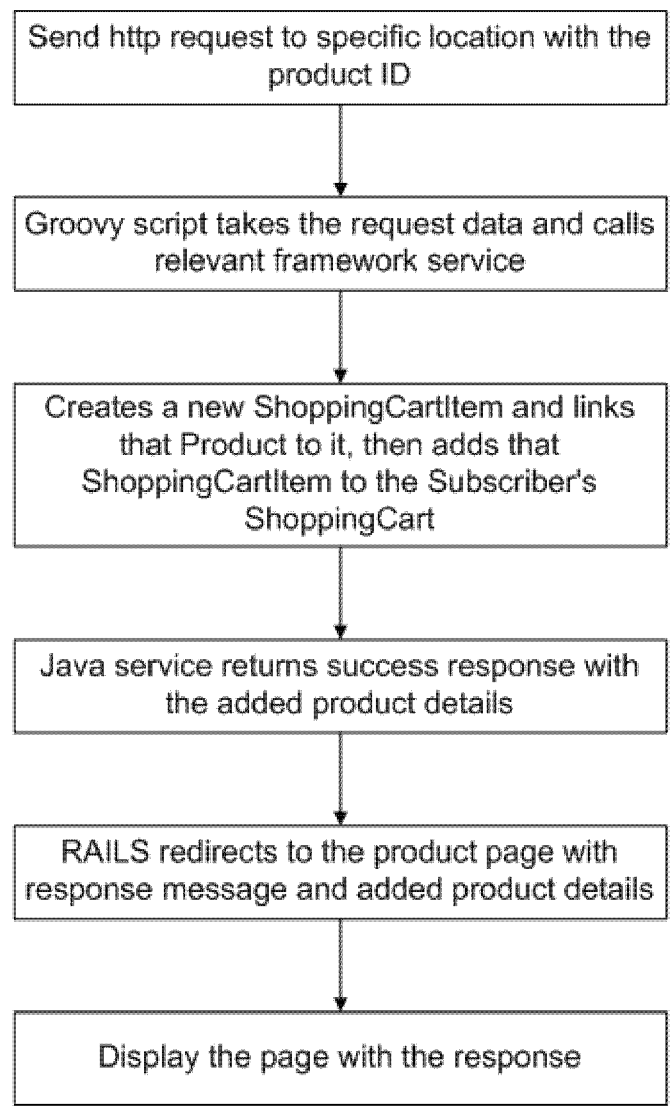
Figure 30A:
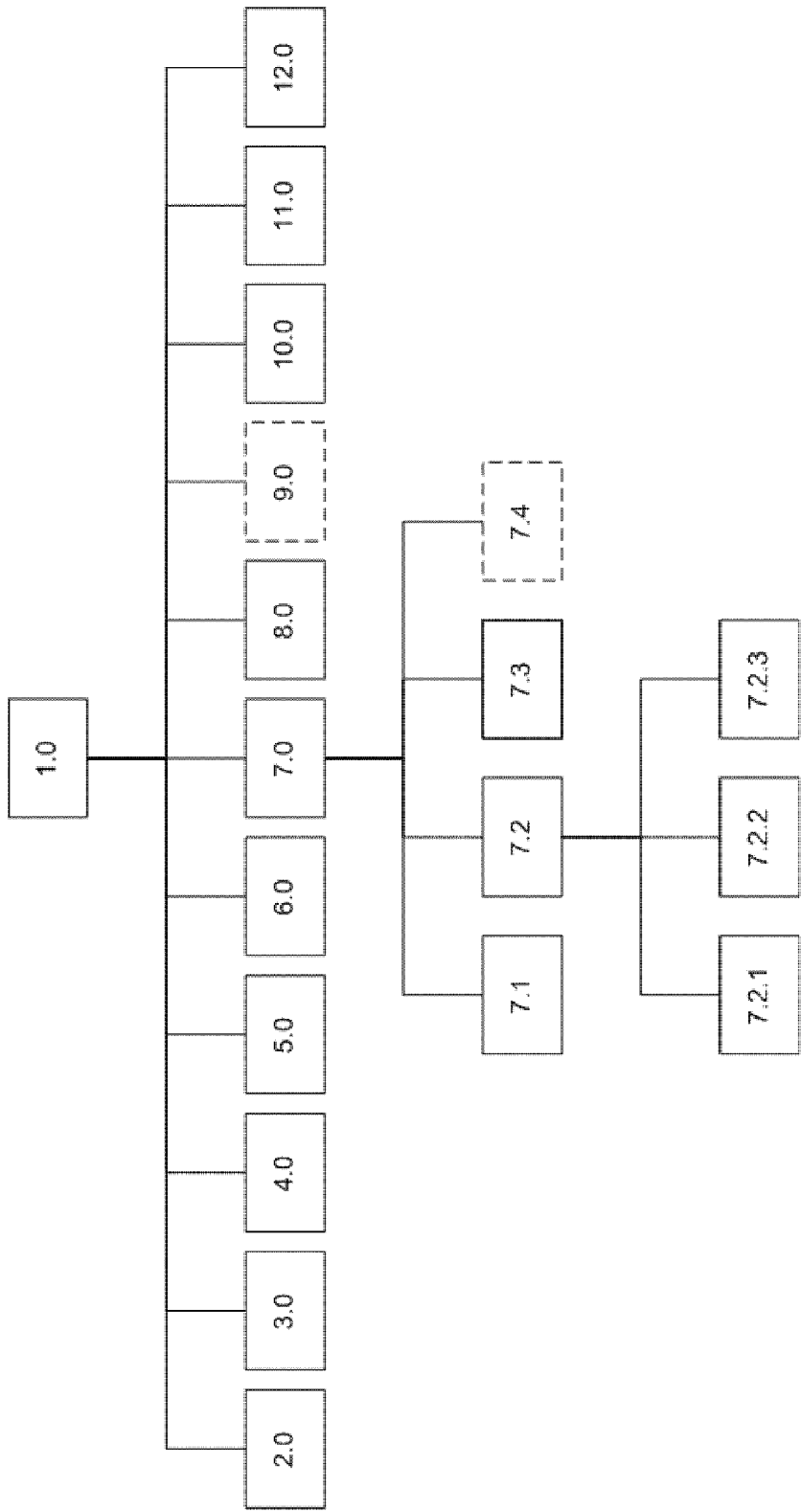
Figure 30B:
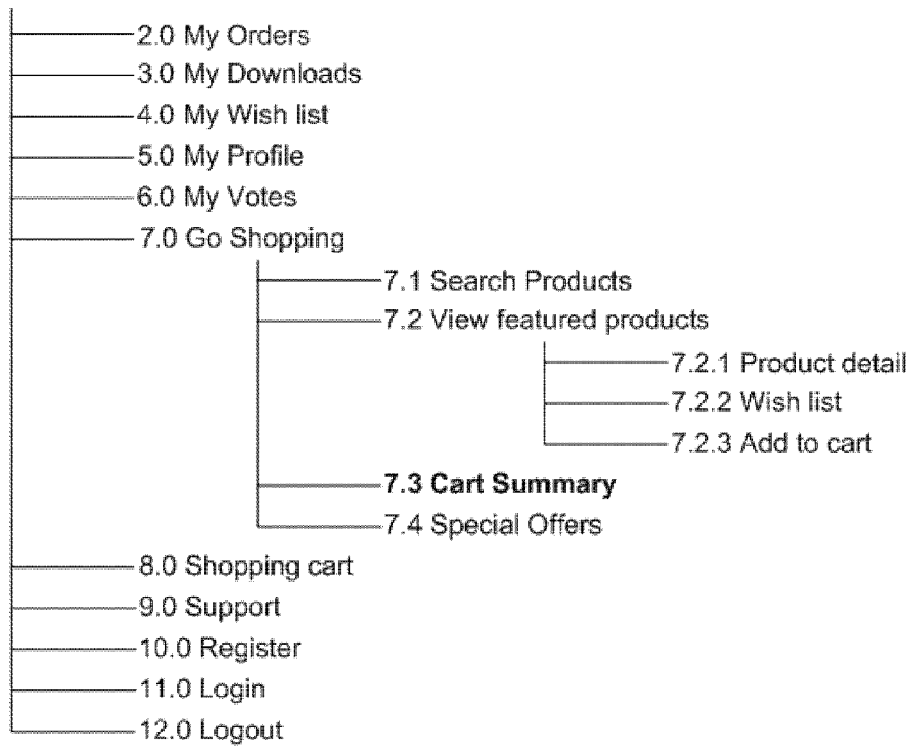
Figure 31:
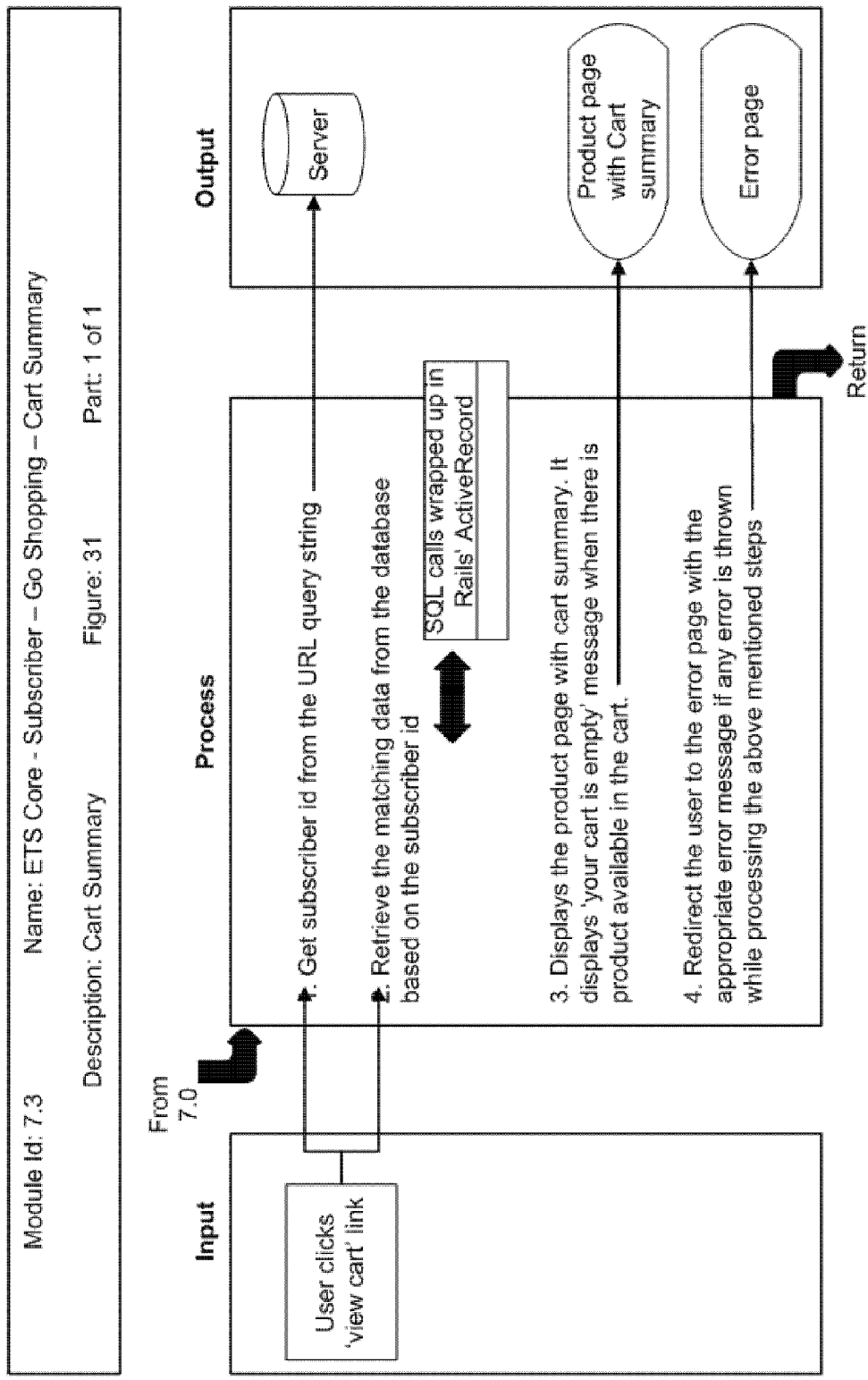
Figure 32A:
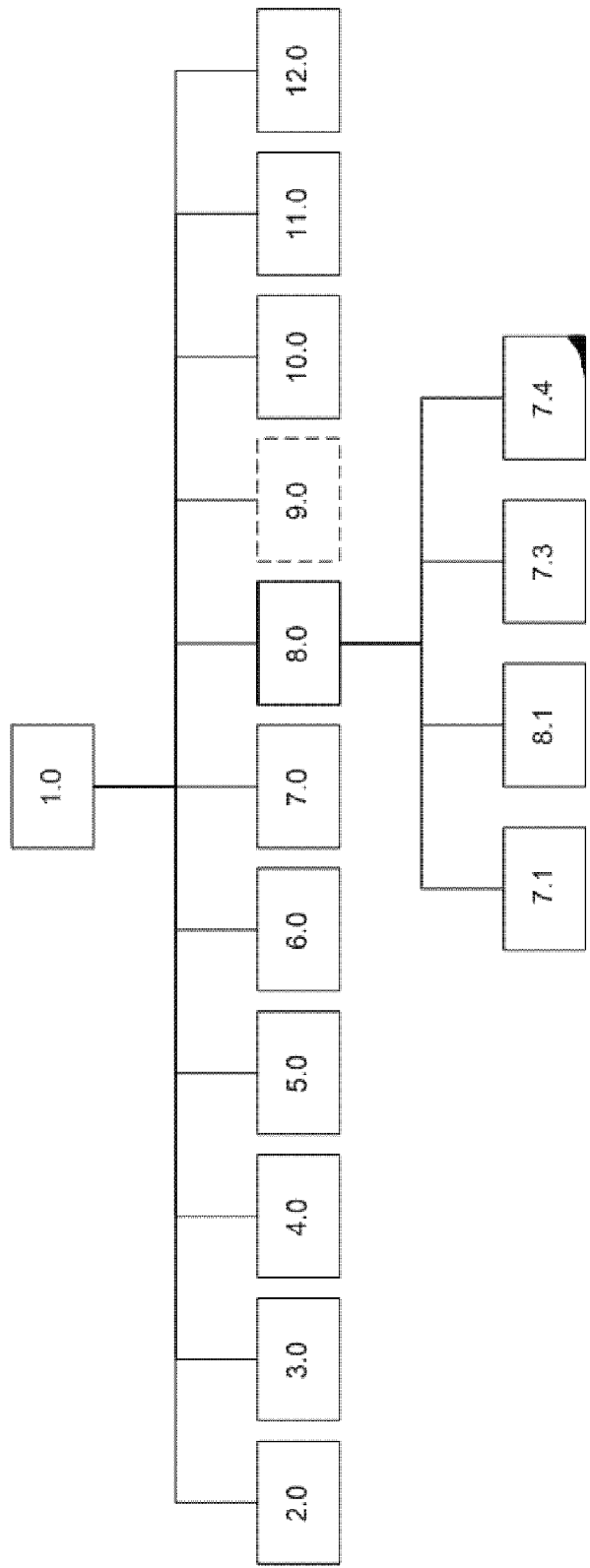
Figure 32B:
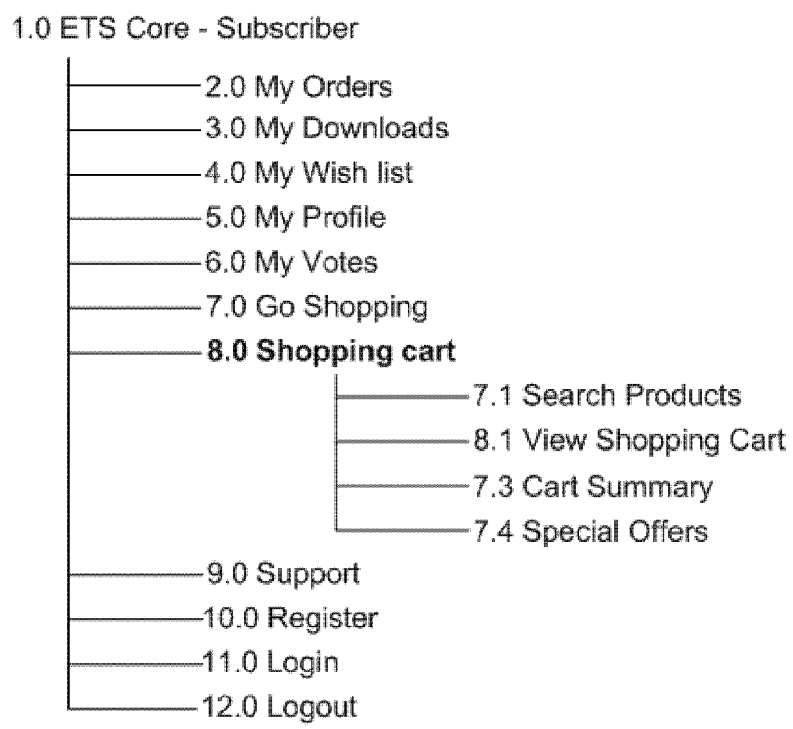
Figure 33:
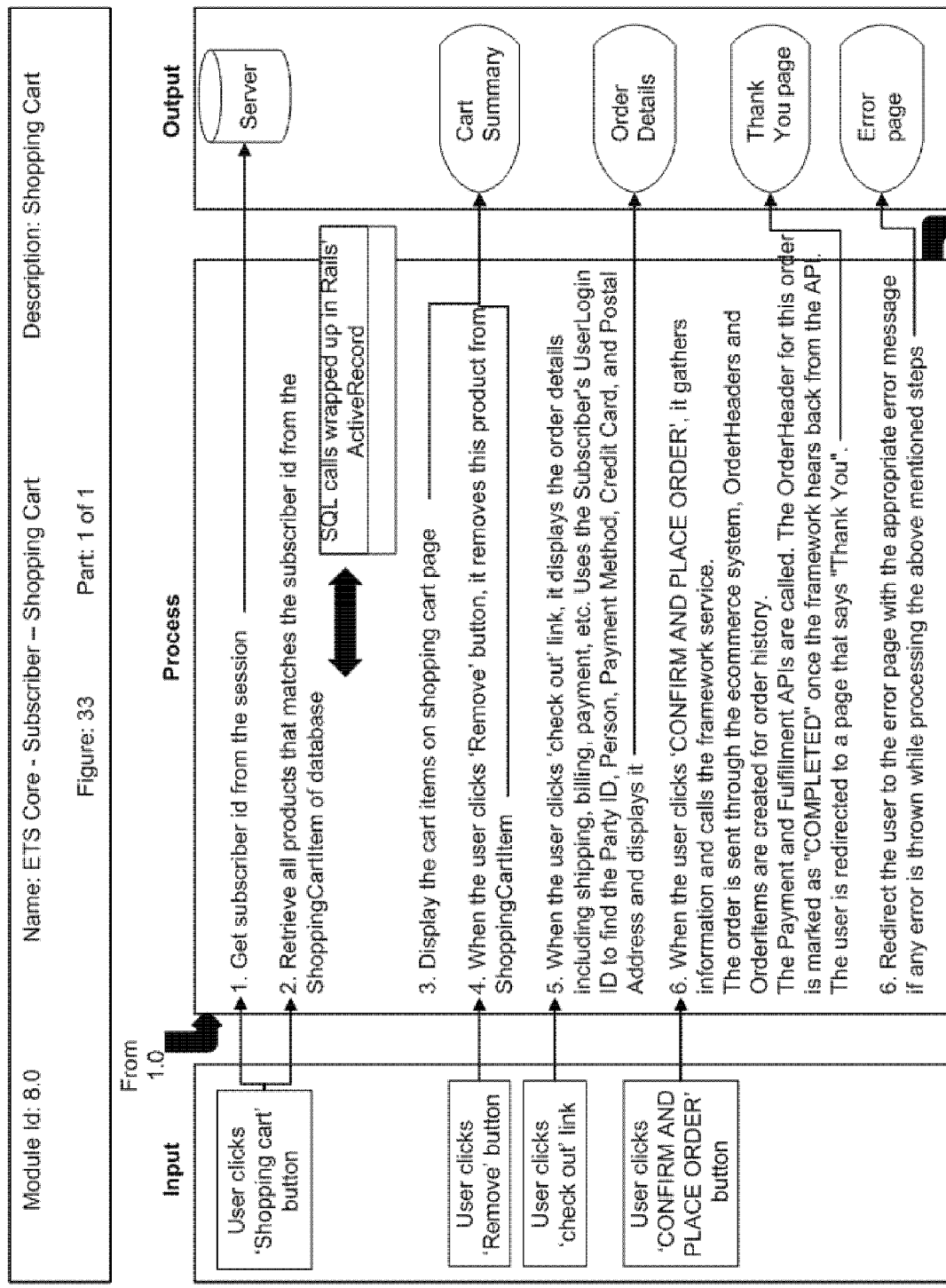
Figure 34:
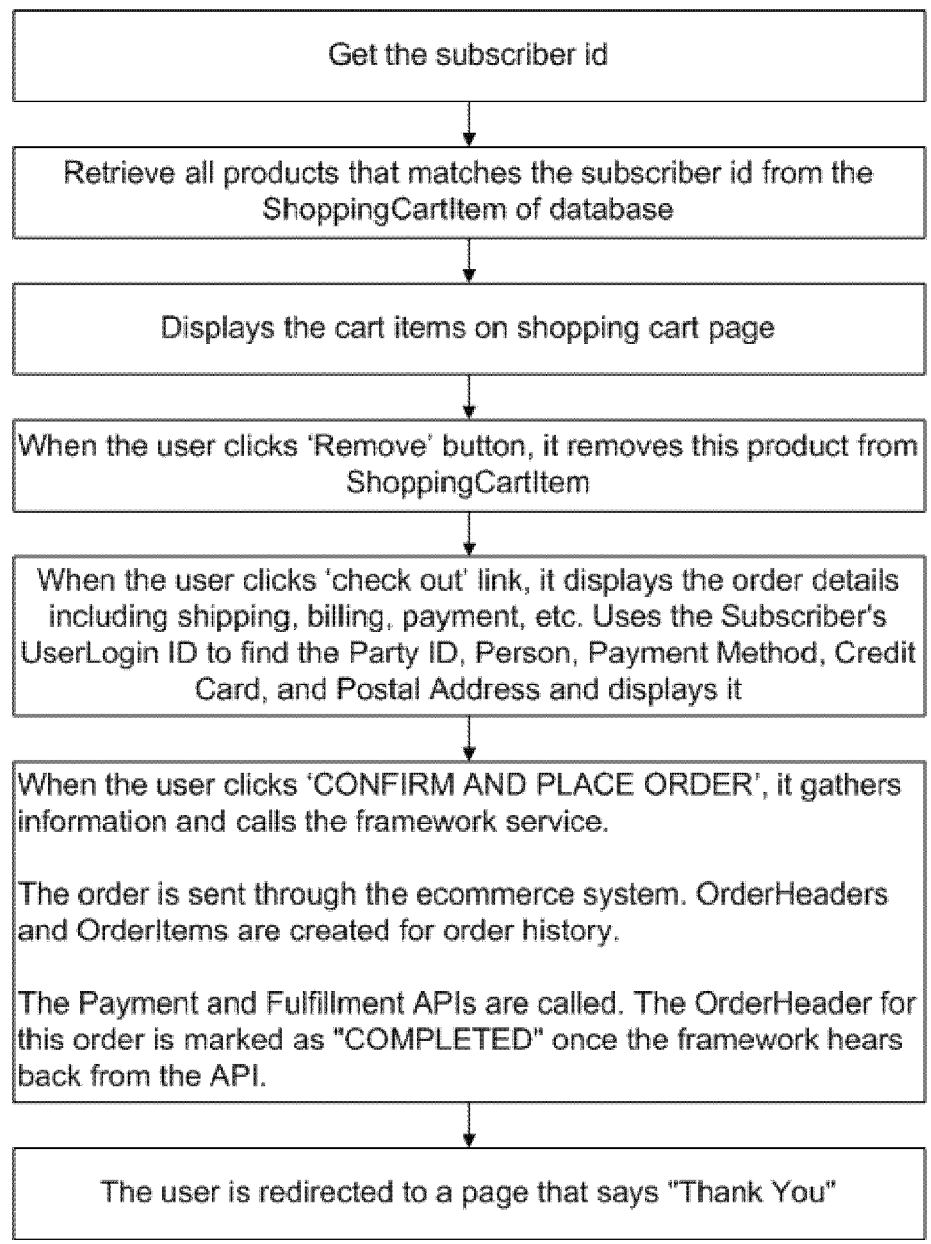
Figure 35A:
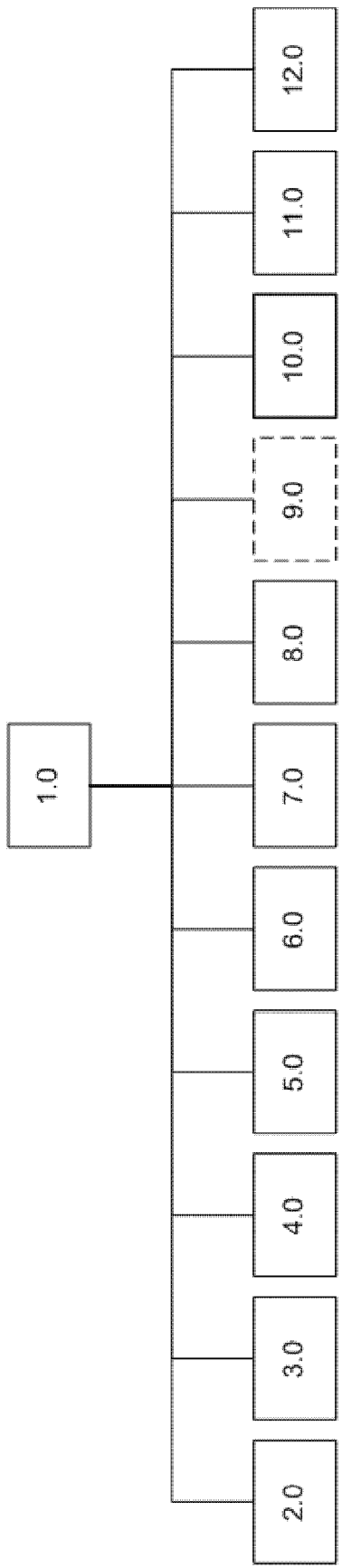
Figure 35B:
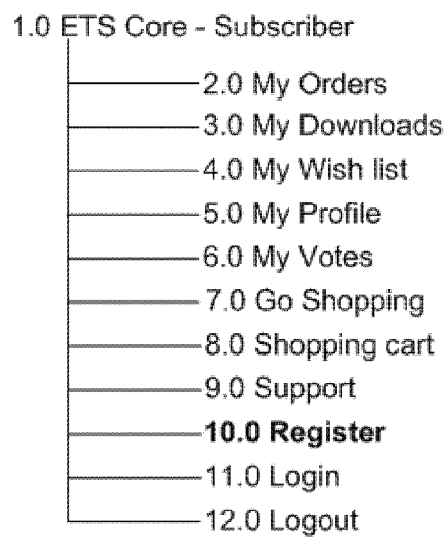
Figure 36:
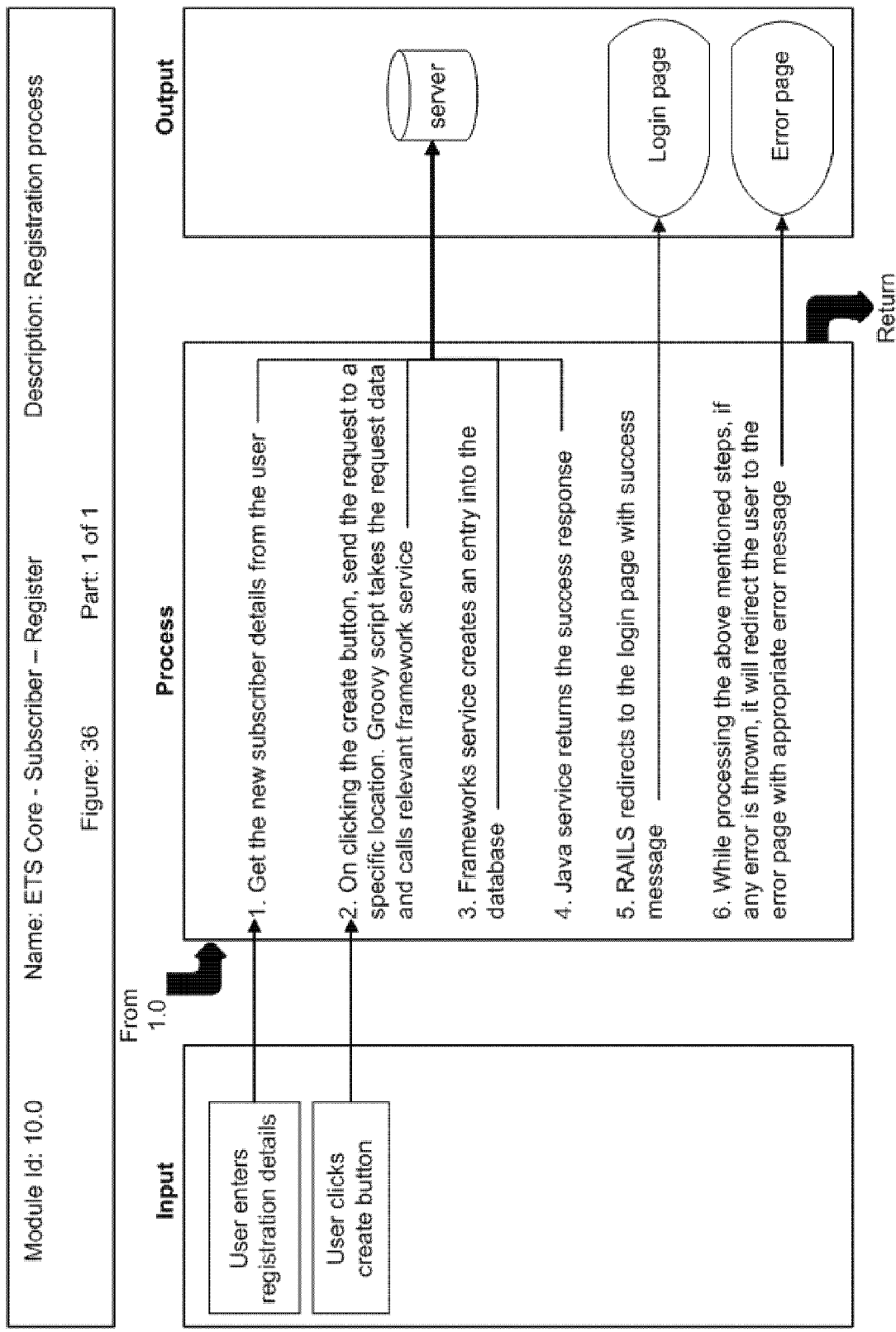
Figure 37:
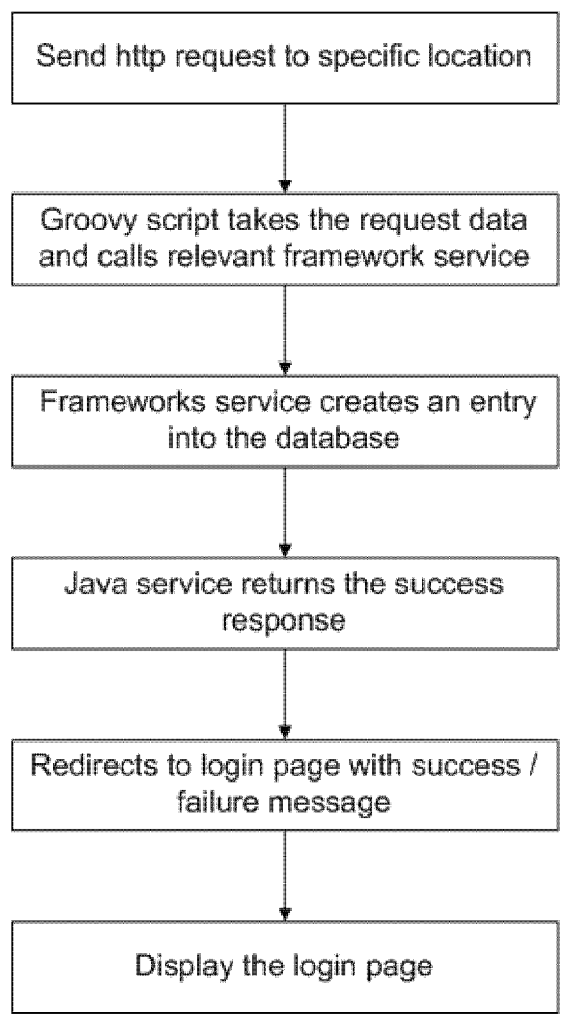
Figure 38A:
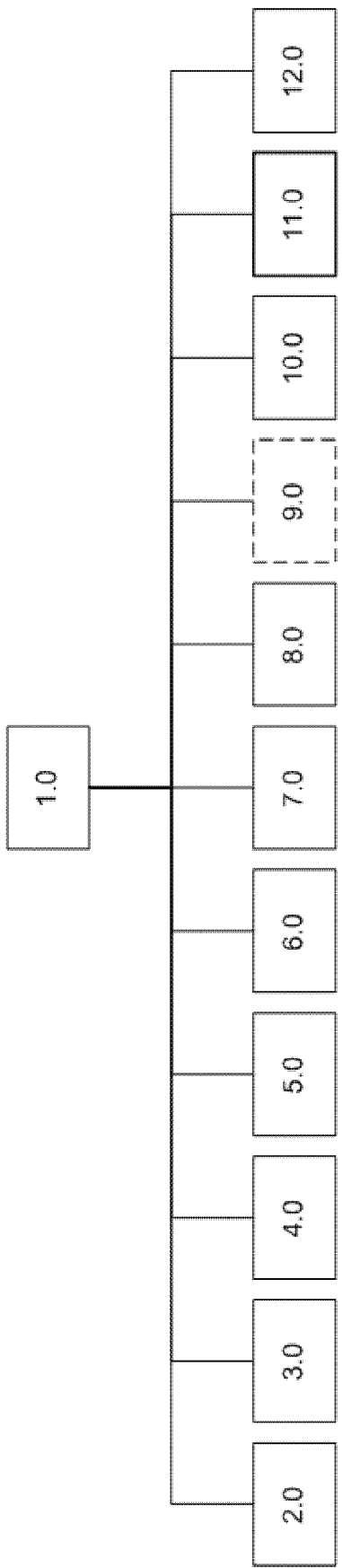
Figure 38B:
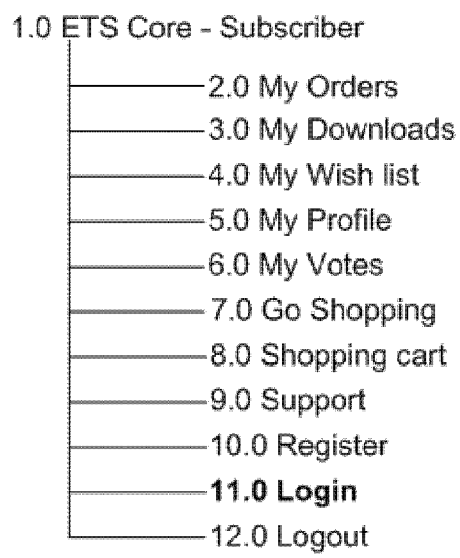
Figure 39:
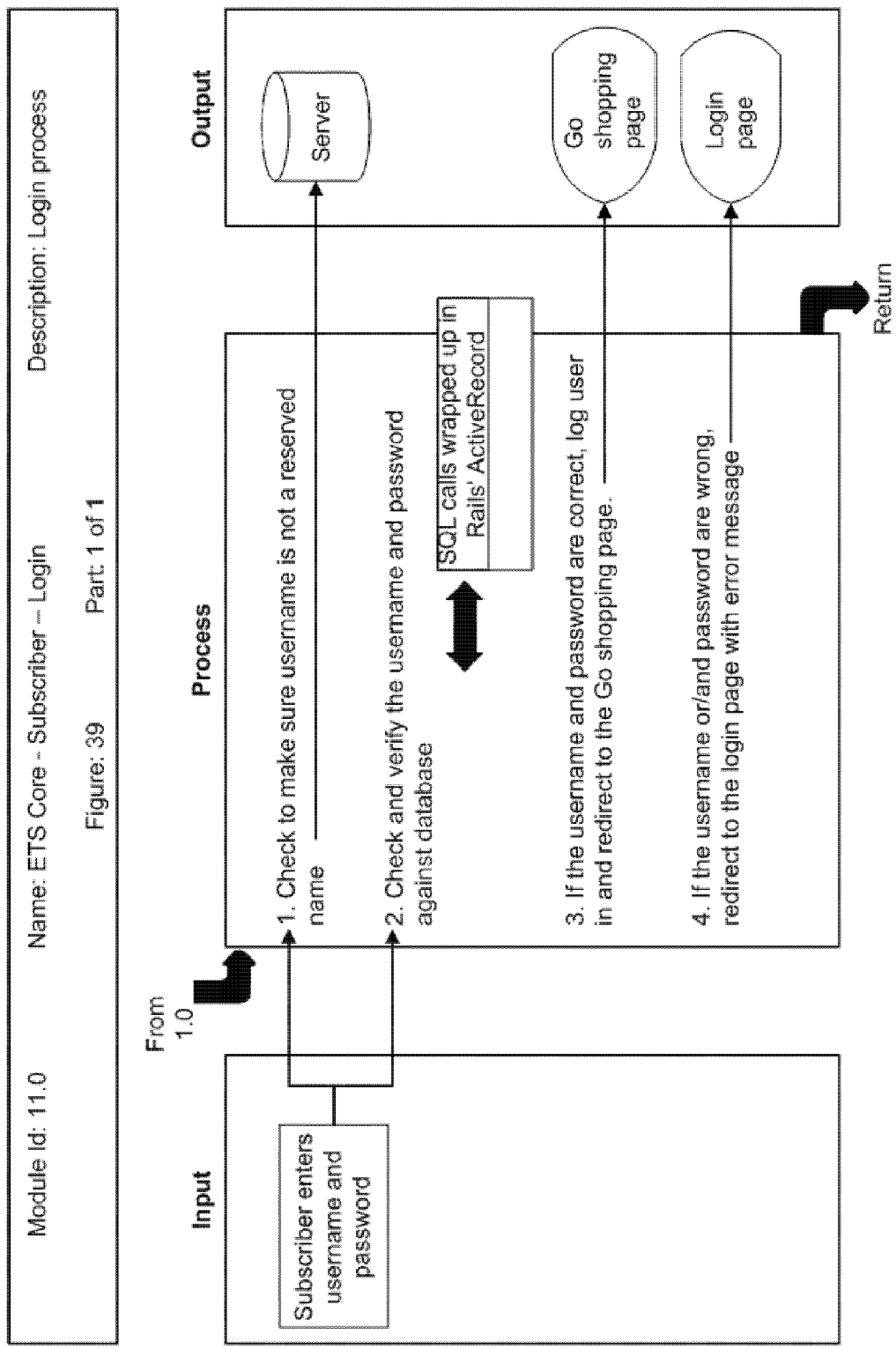
Figure 40A:
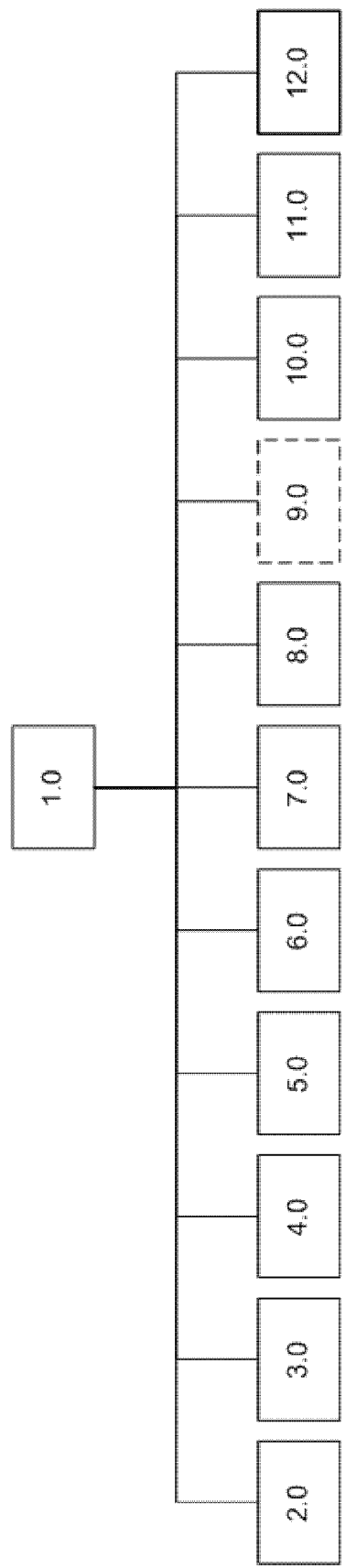
Figure 40B:
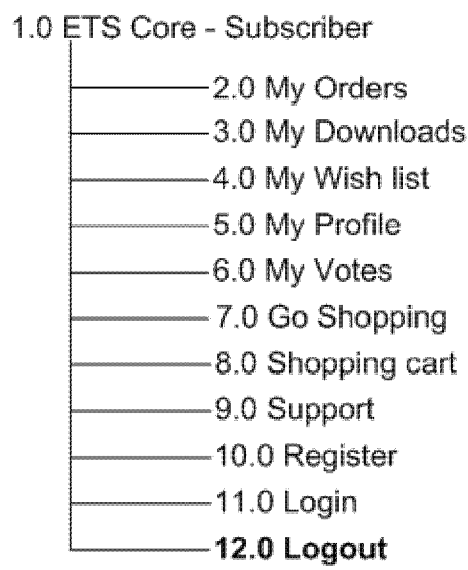
Figure 41:
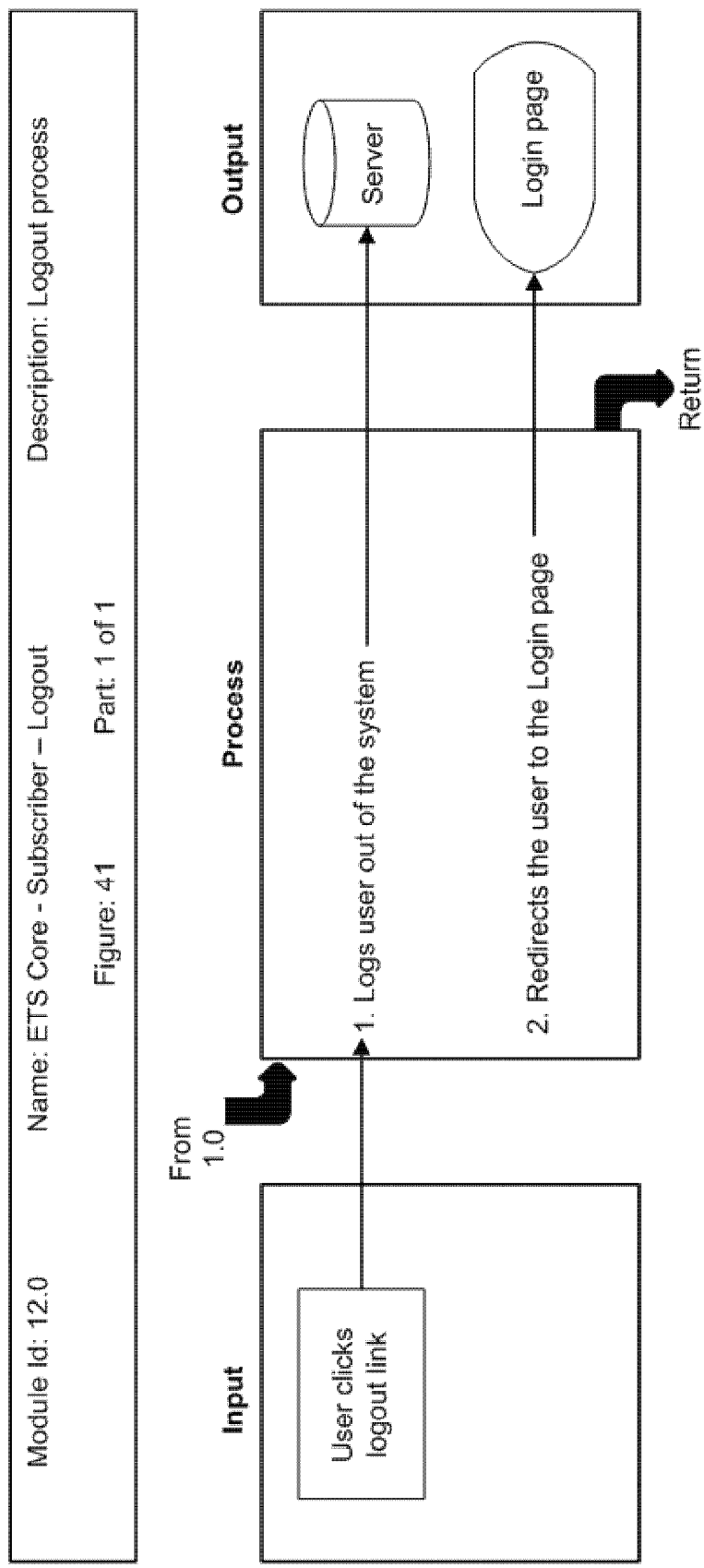
Figure 42:
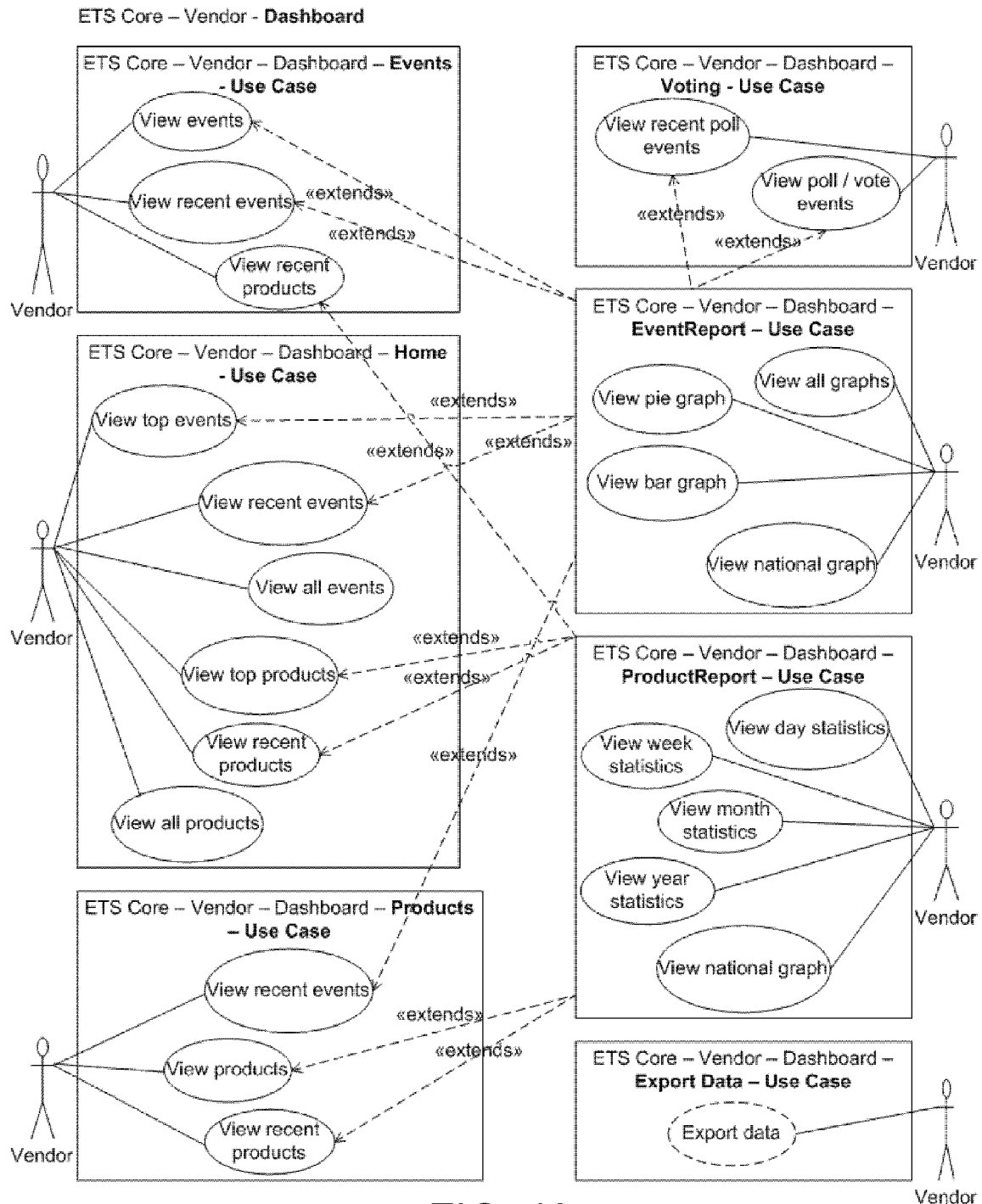
Figure 43A:
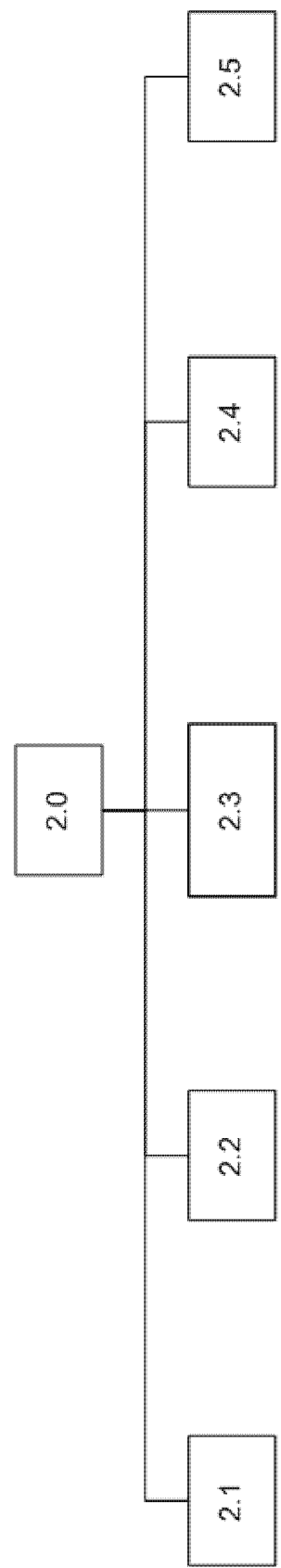
Figure 43B:
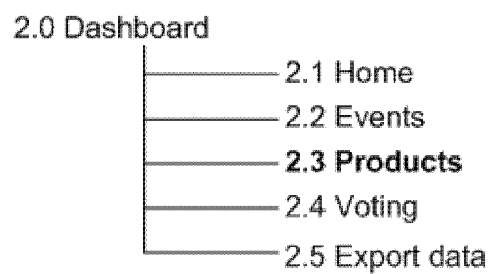
Figure 44:
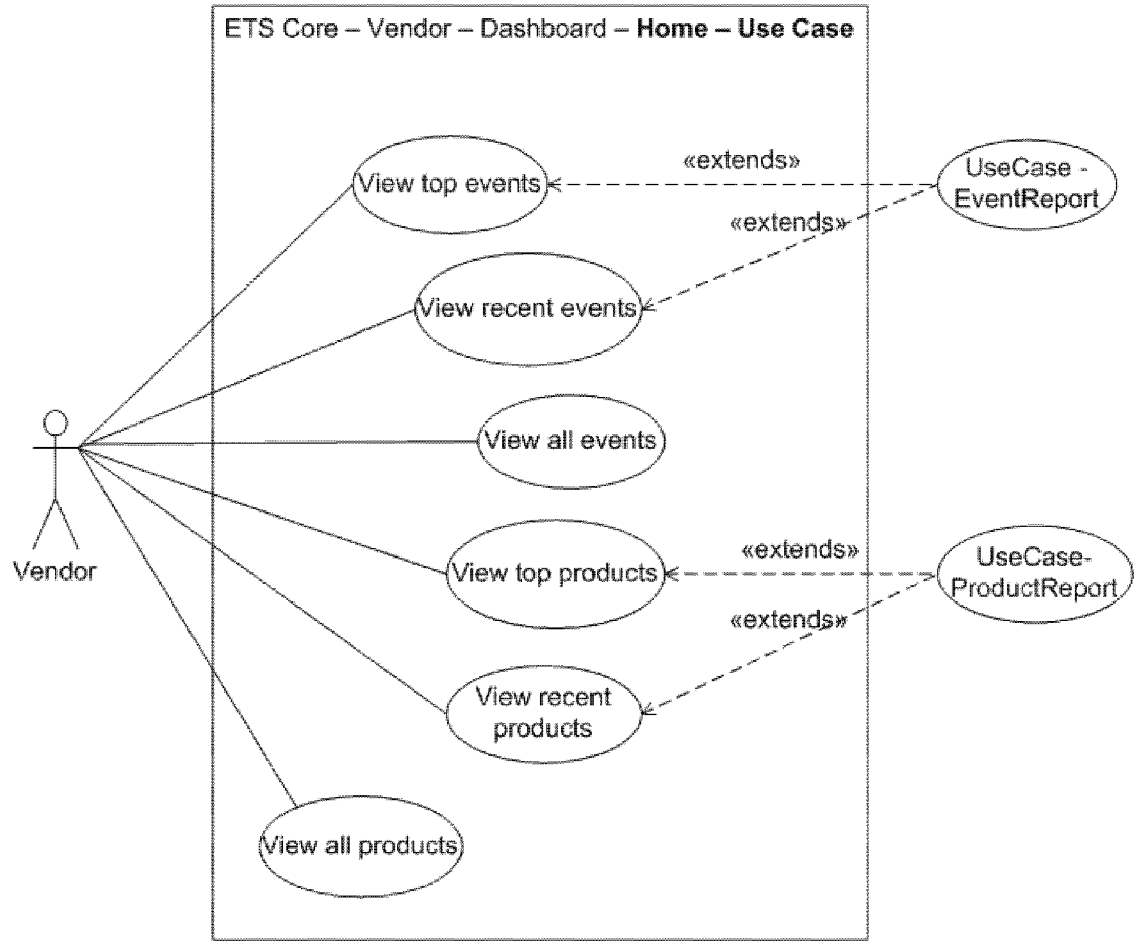
Figure 45:
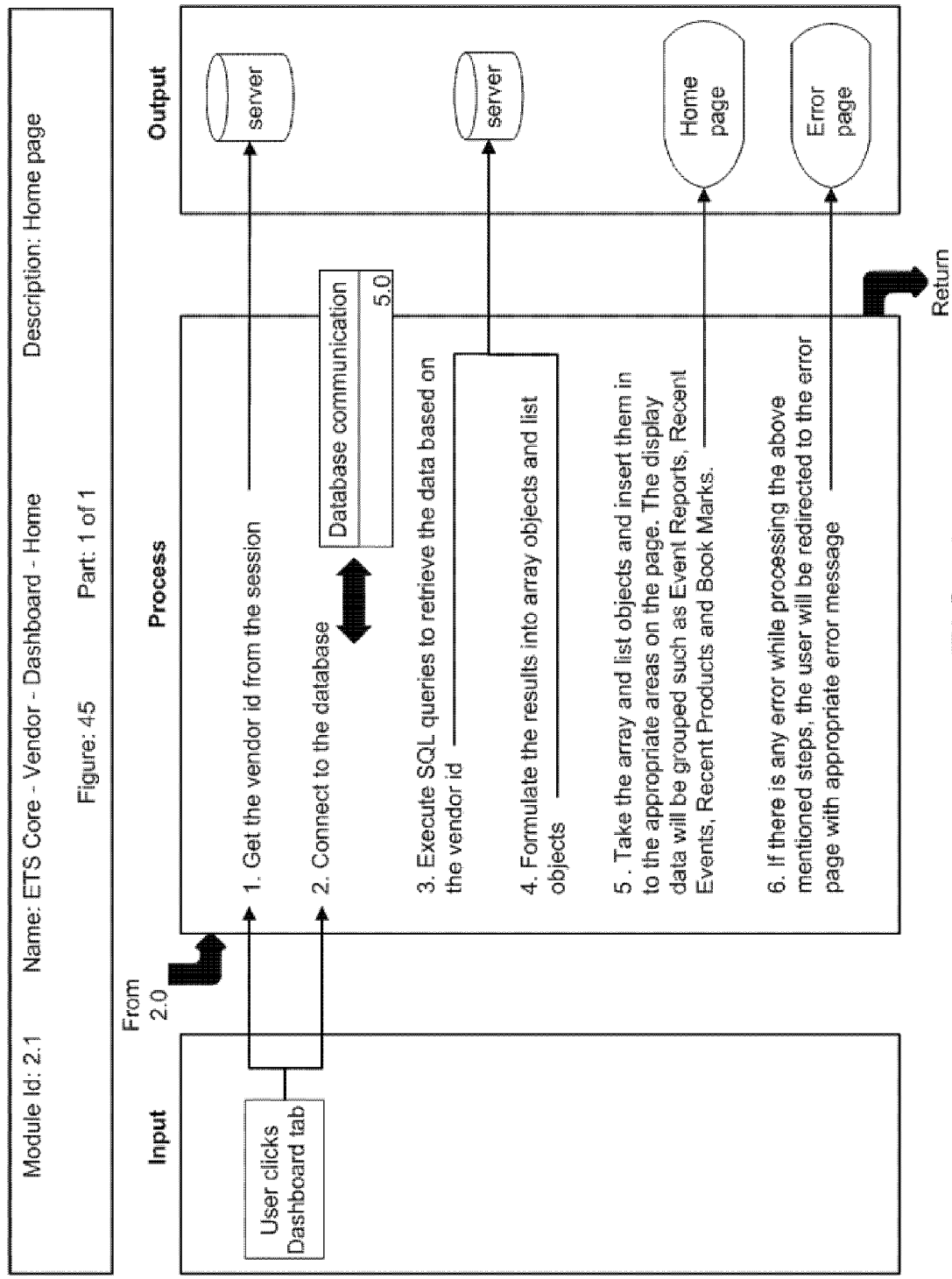
Figure 46:
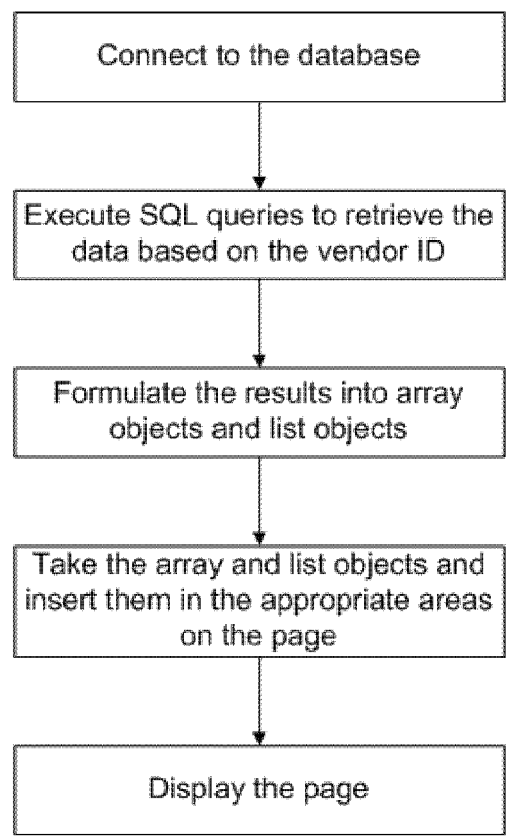
Figure 47:
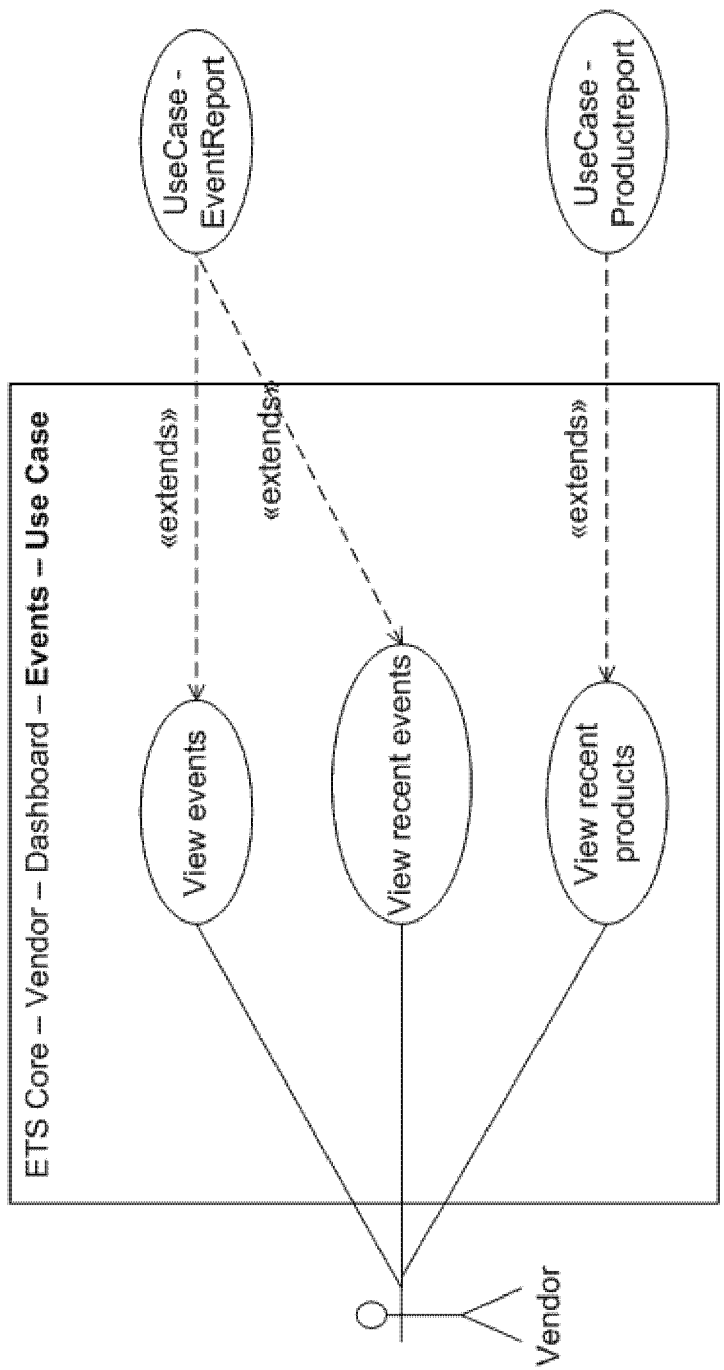
Figure 48:
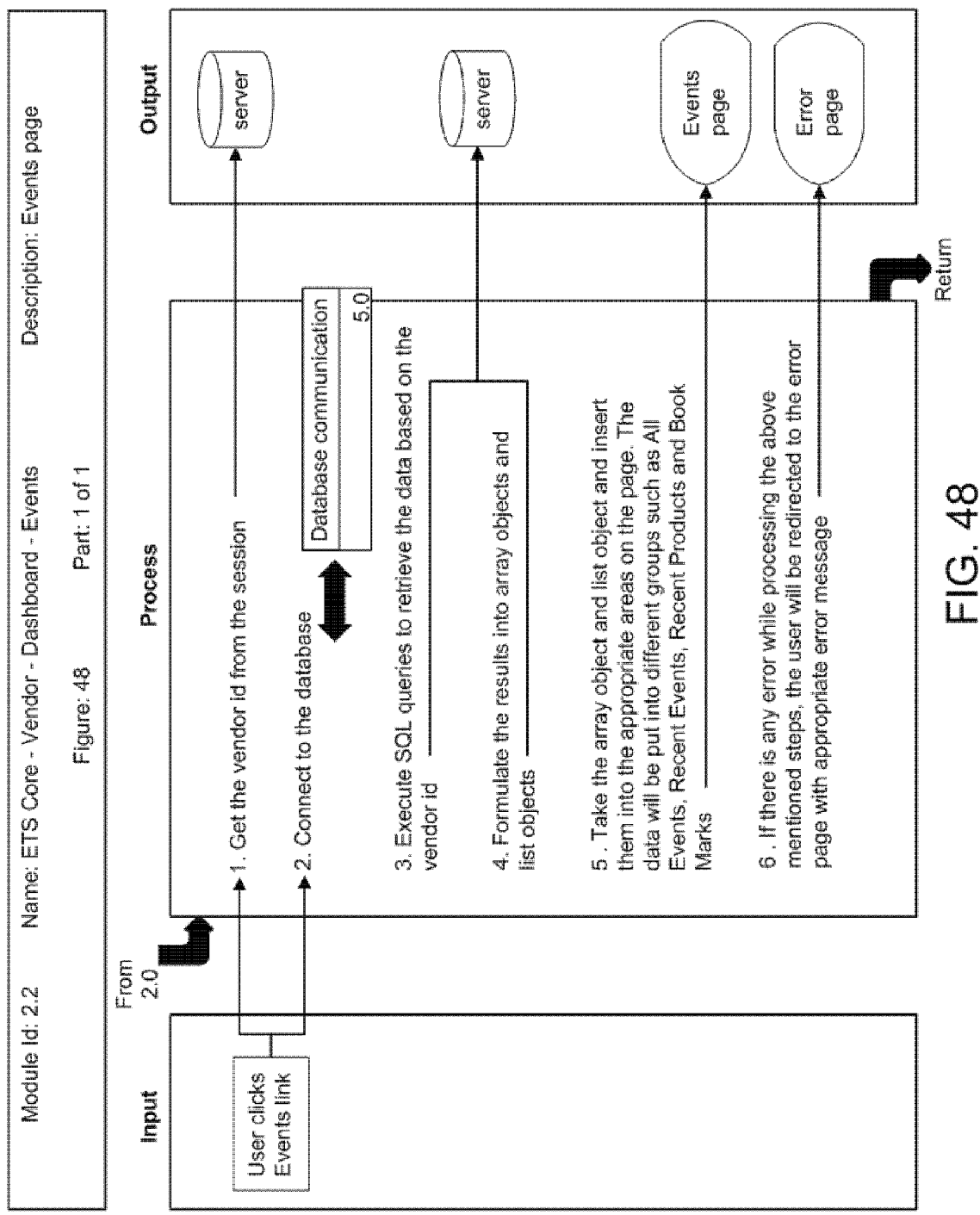
Figure 49:
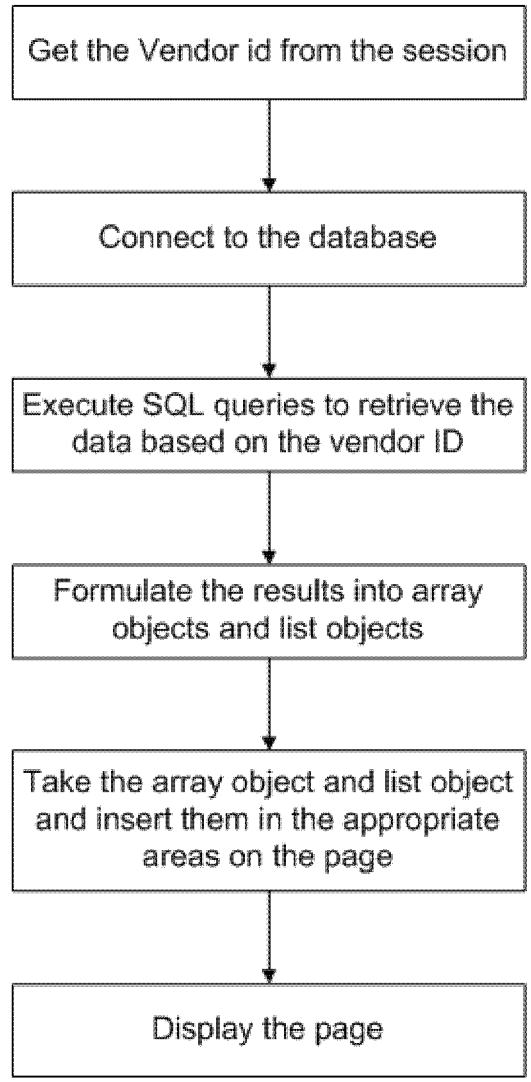
Figure 50:
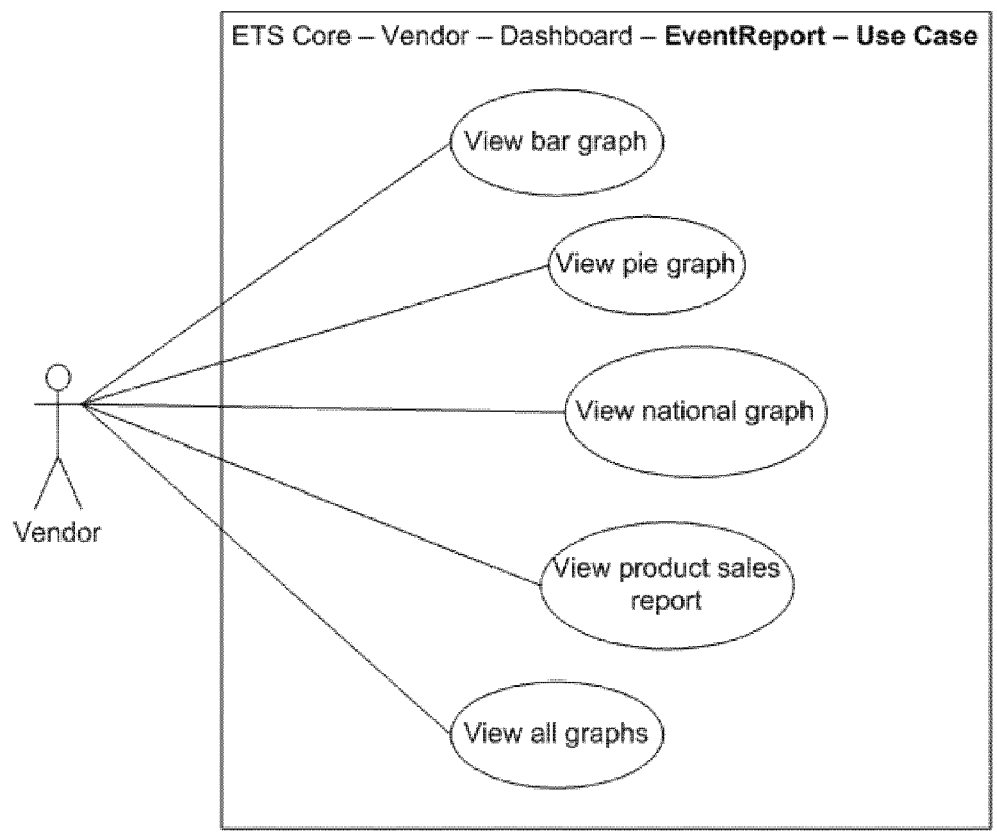
Figure 51:
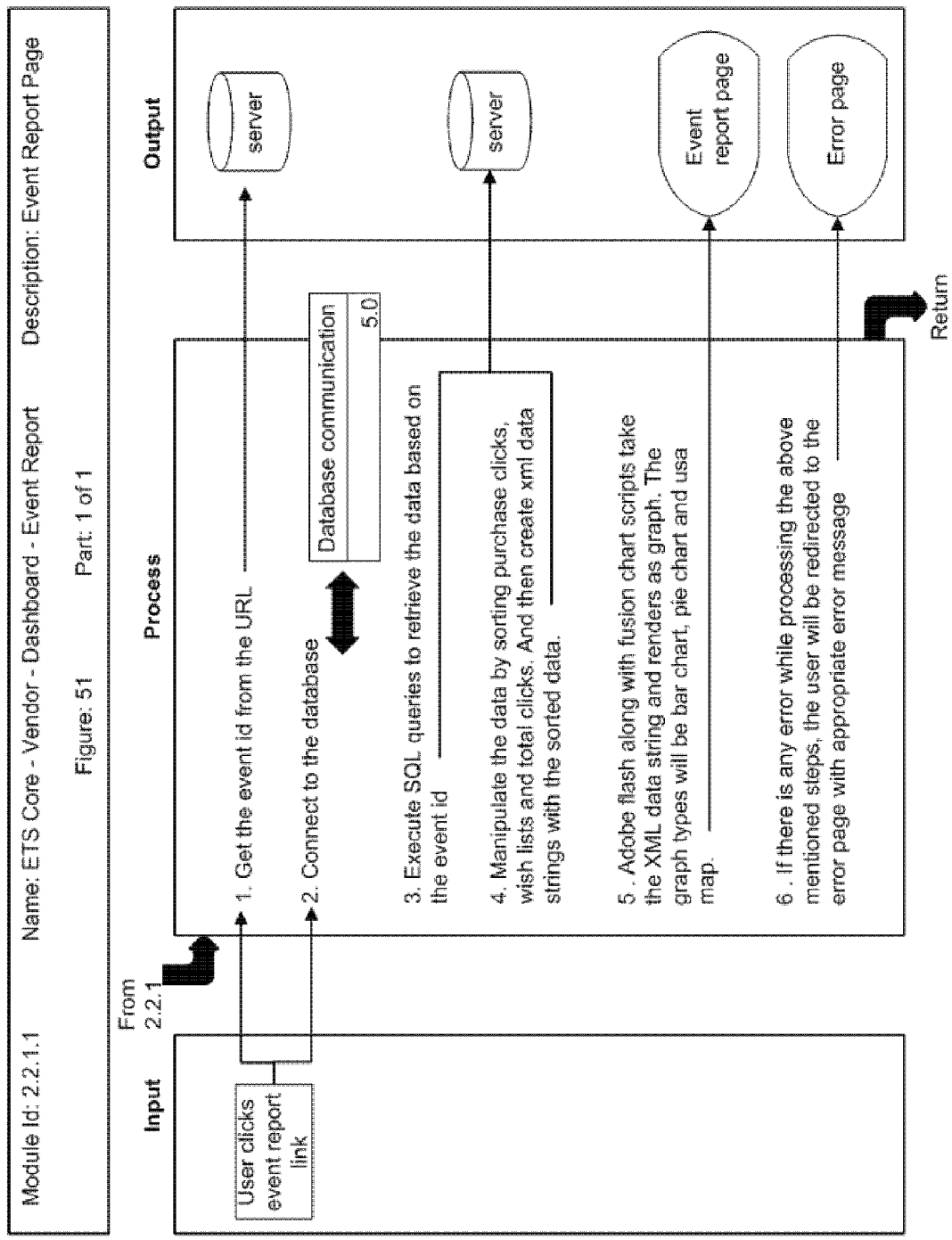
Figure 52:
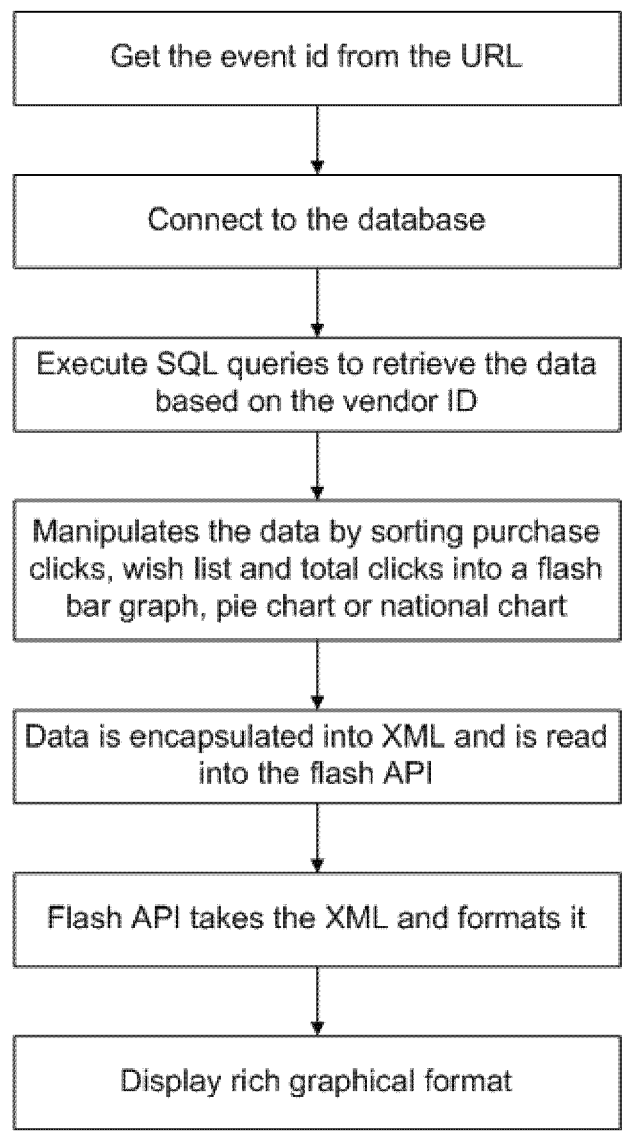
Figure 53:
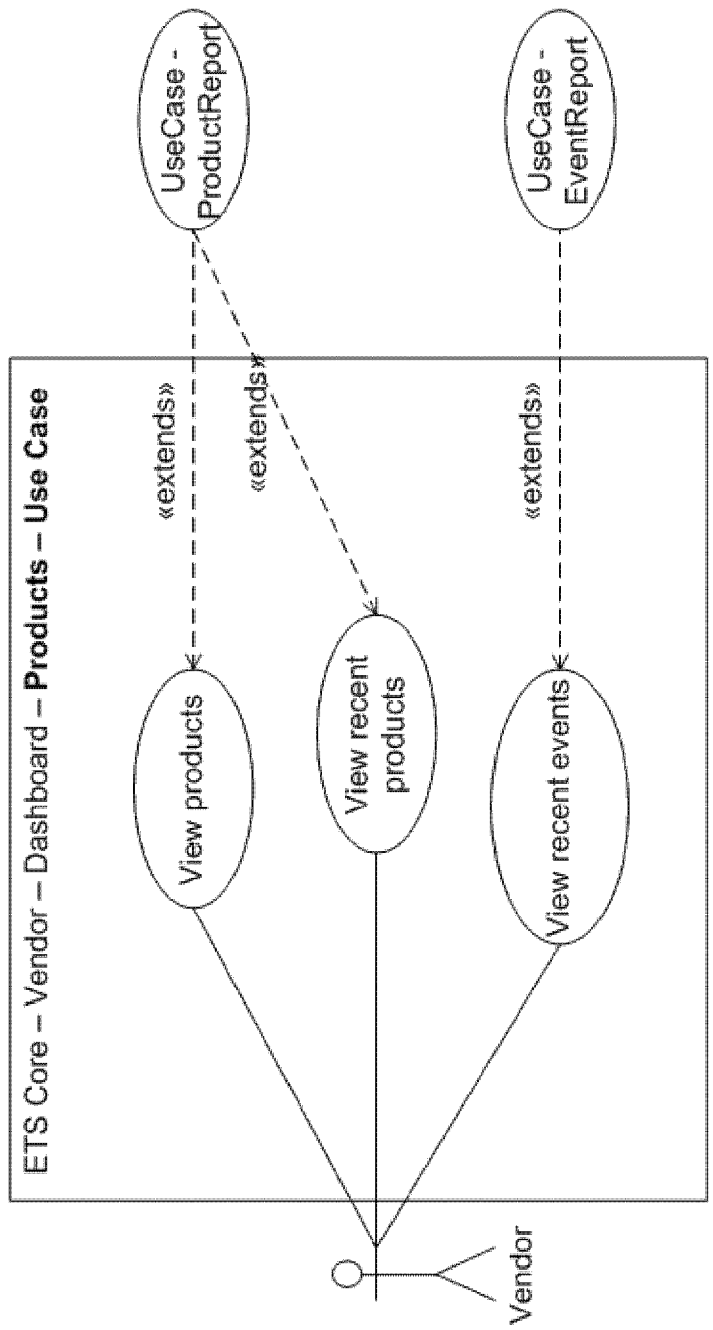
Figure 54A:
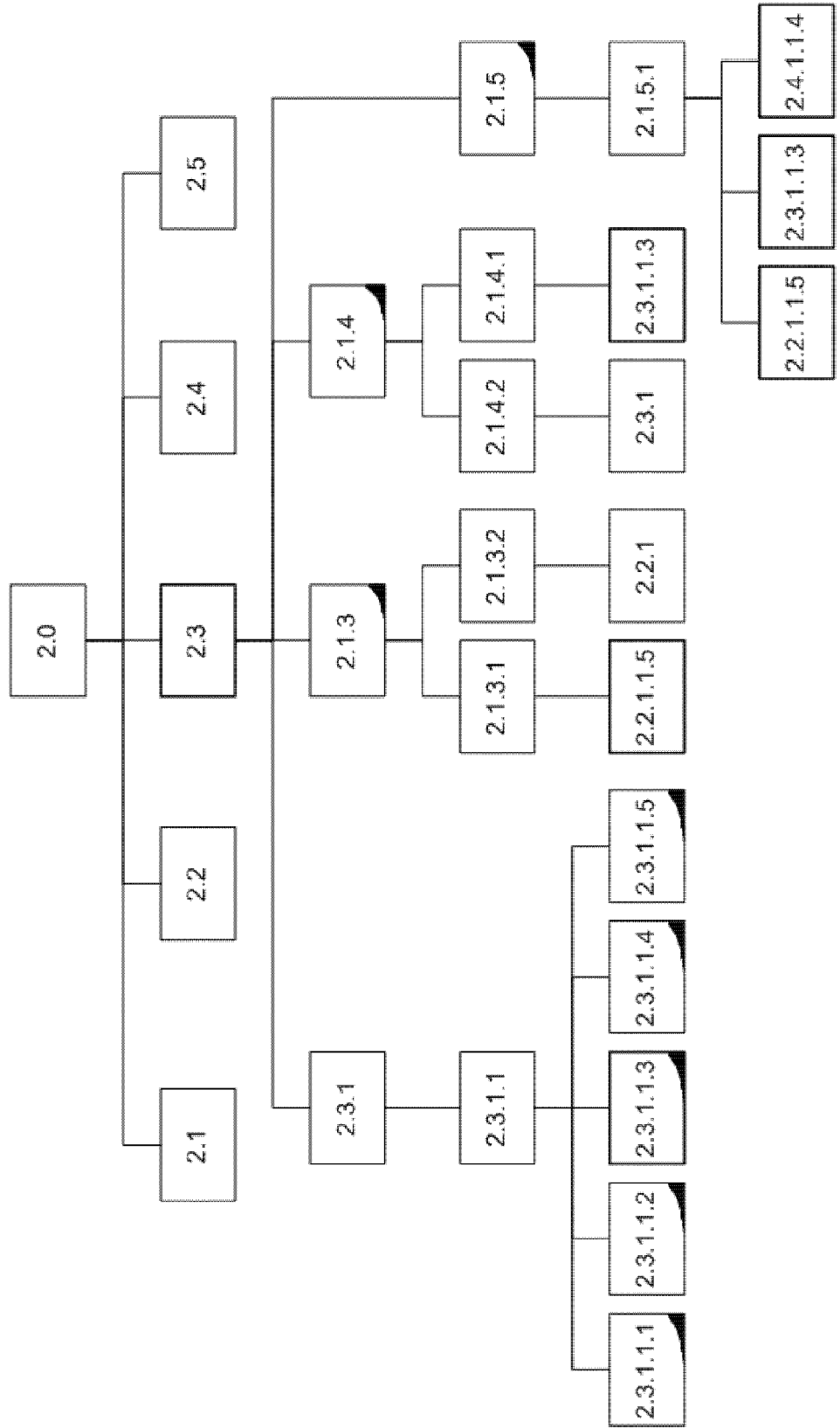
Figure 54B:
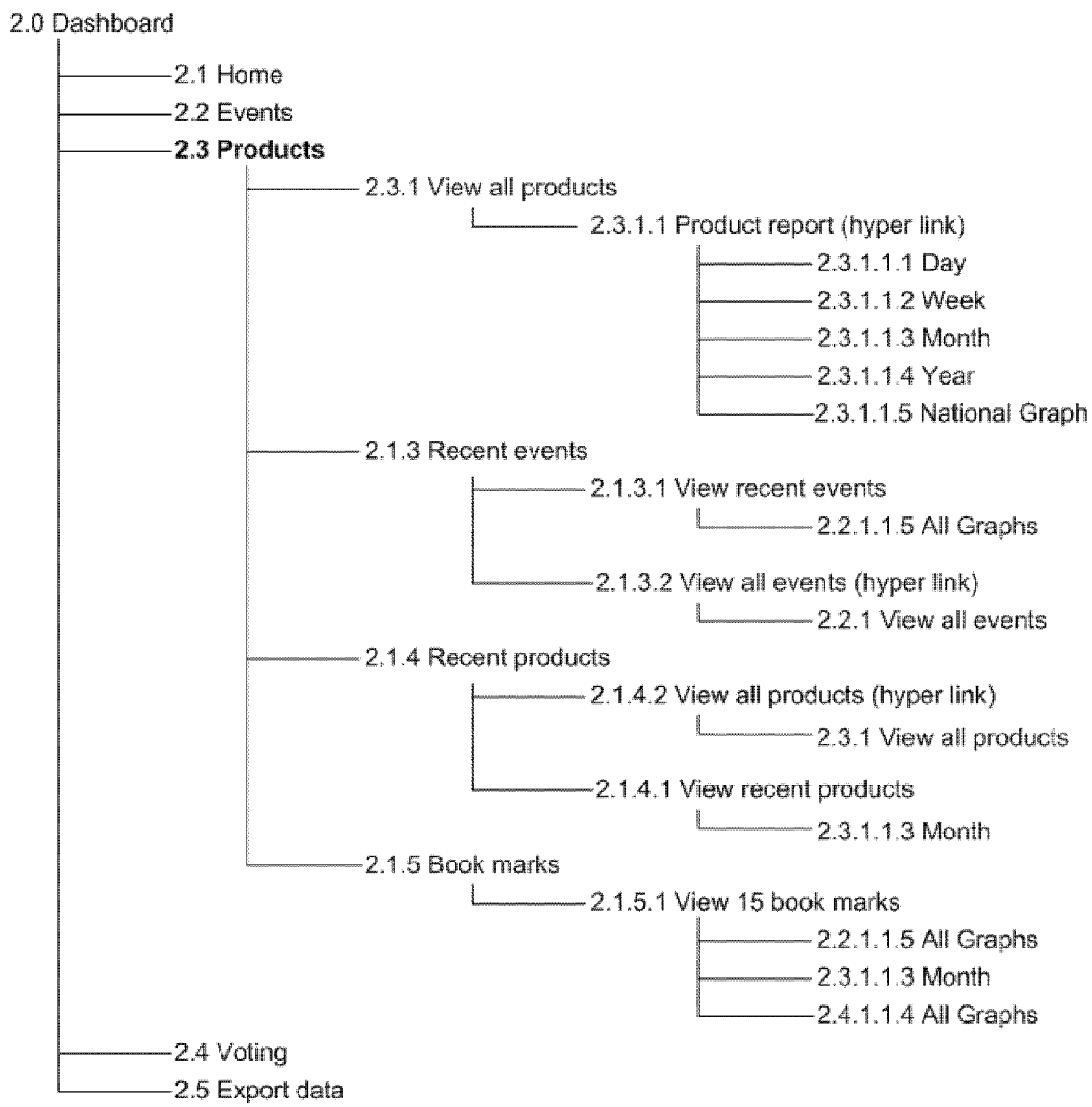
Figure 55:
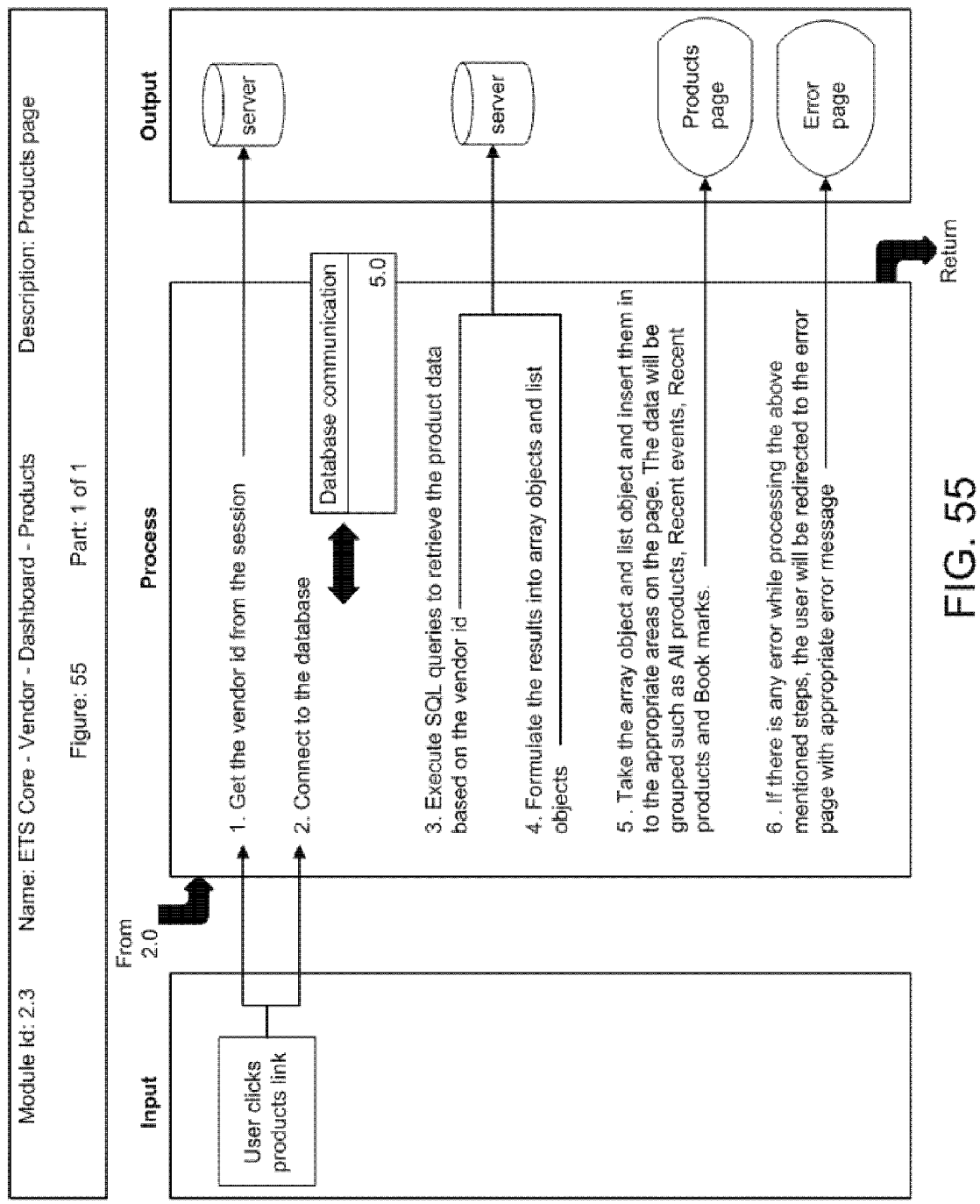
Figure 56:
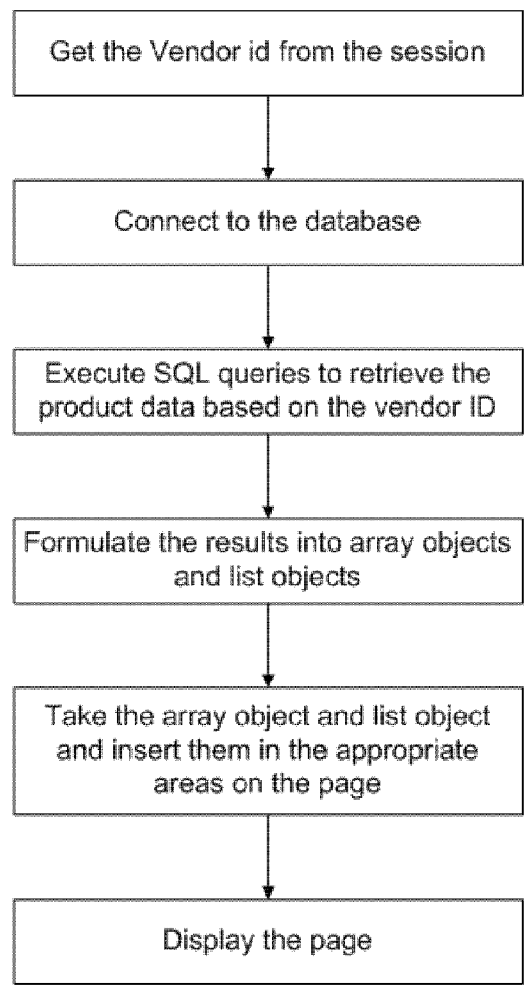
Figure 57:
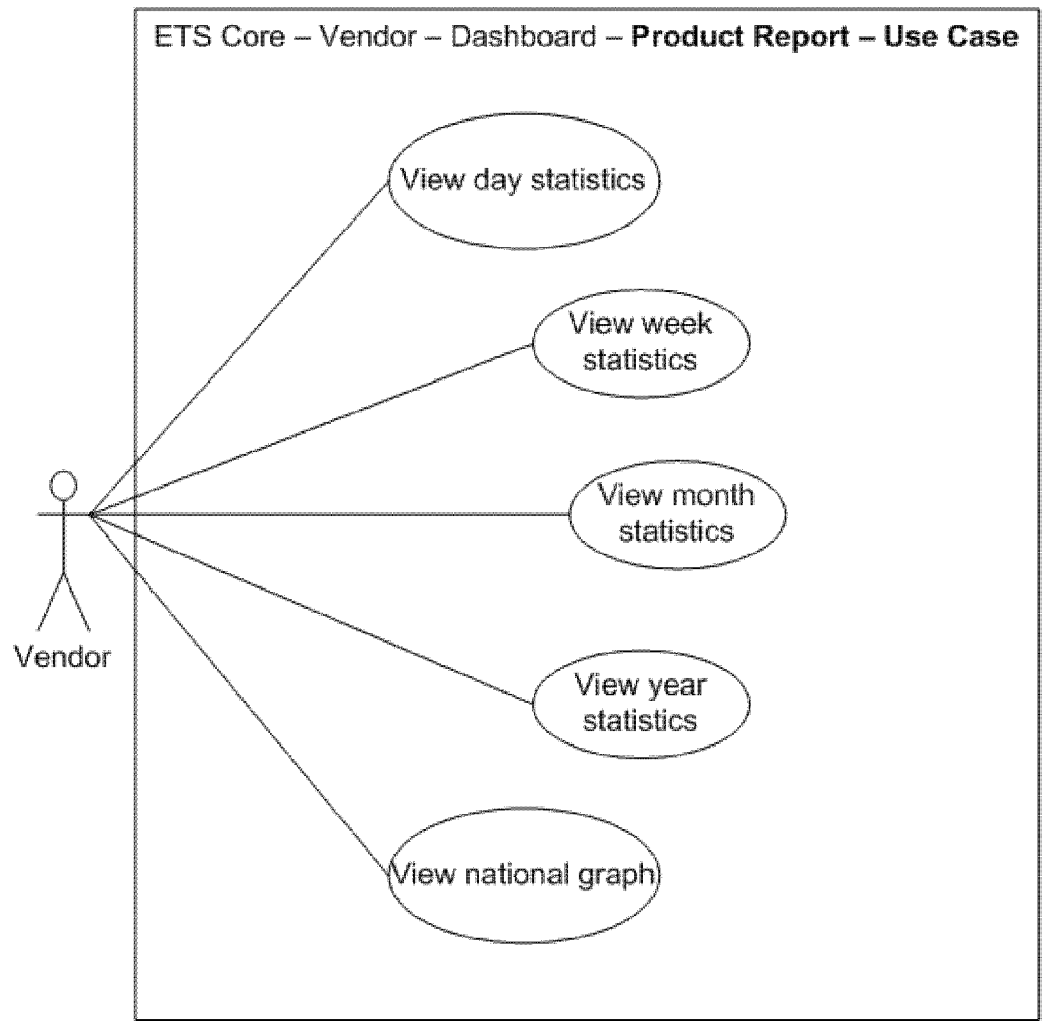
Figure 58A:
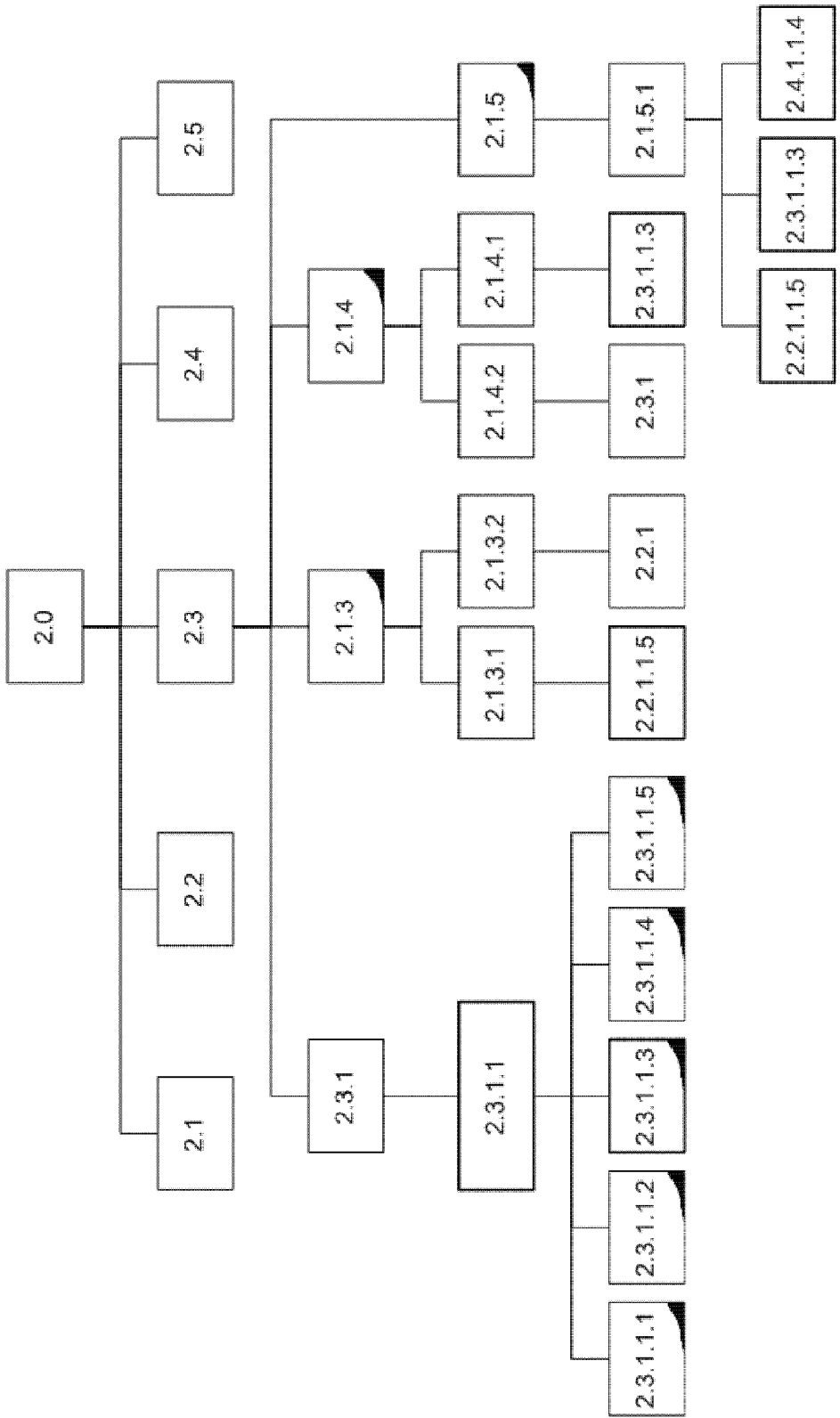
Figure 58B:
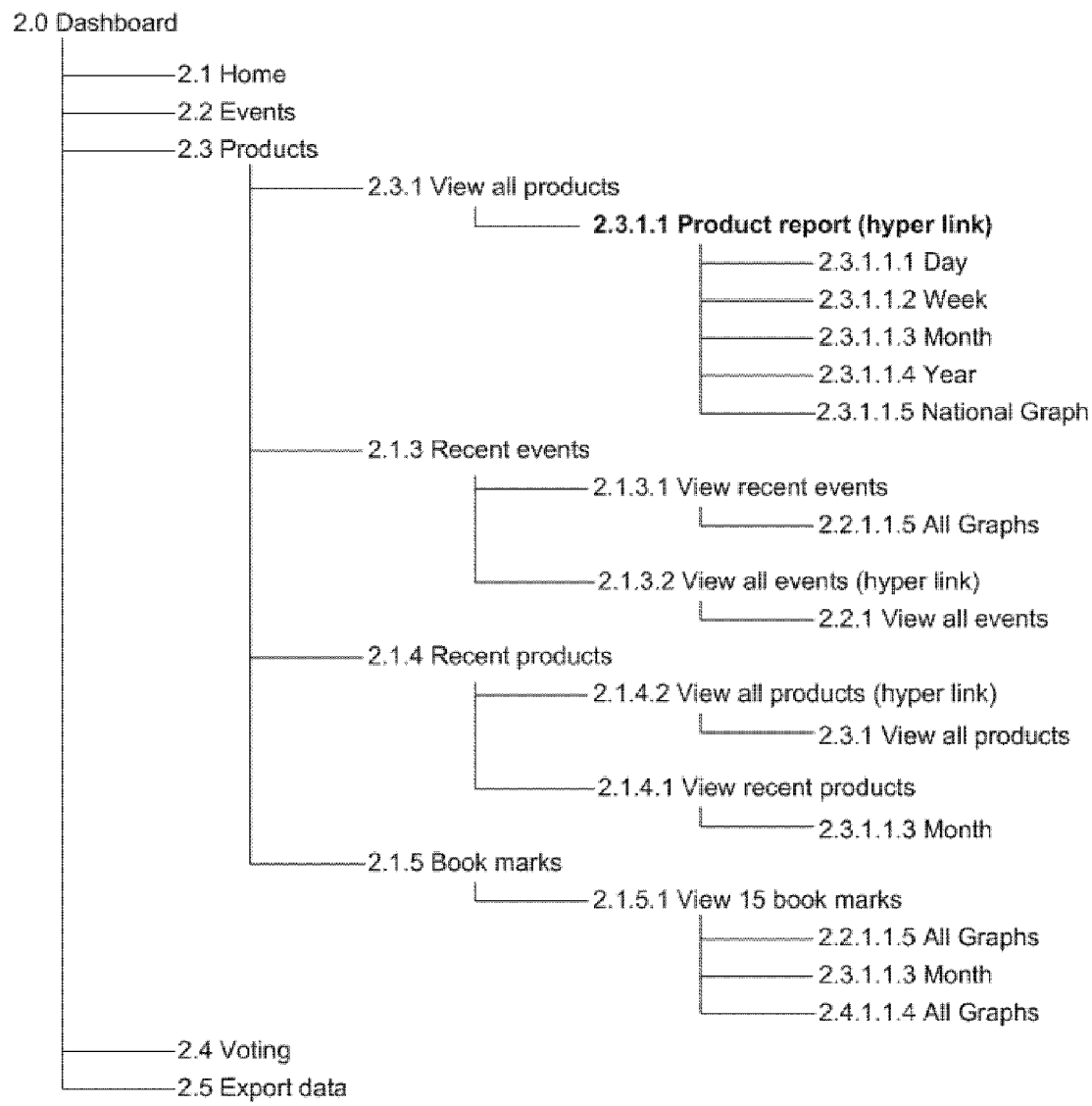
Figure 59:
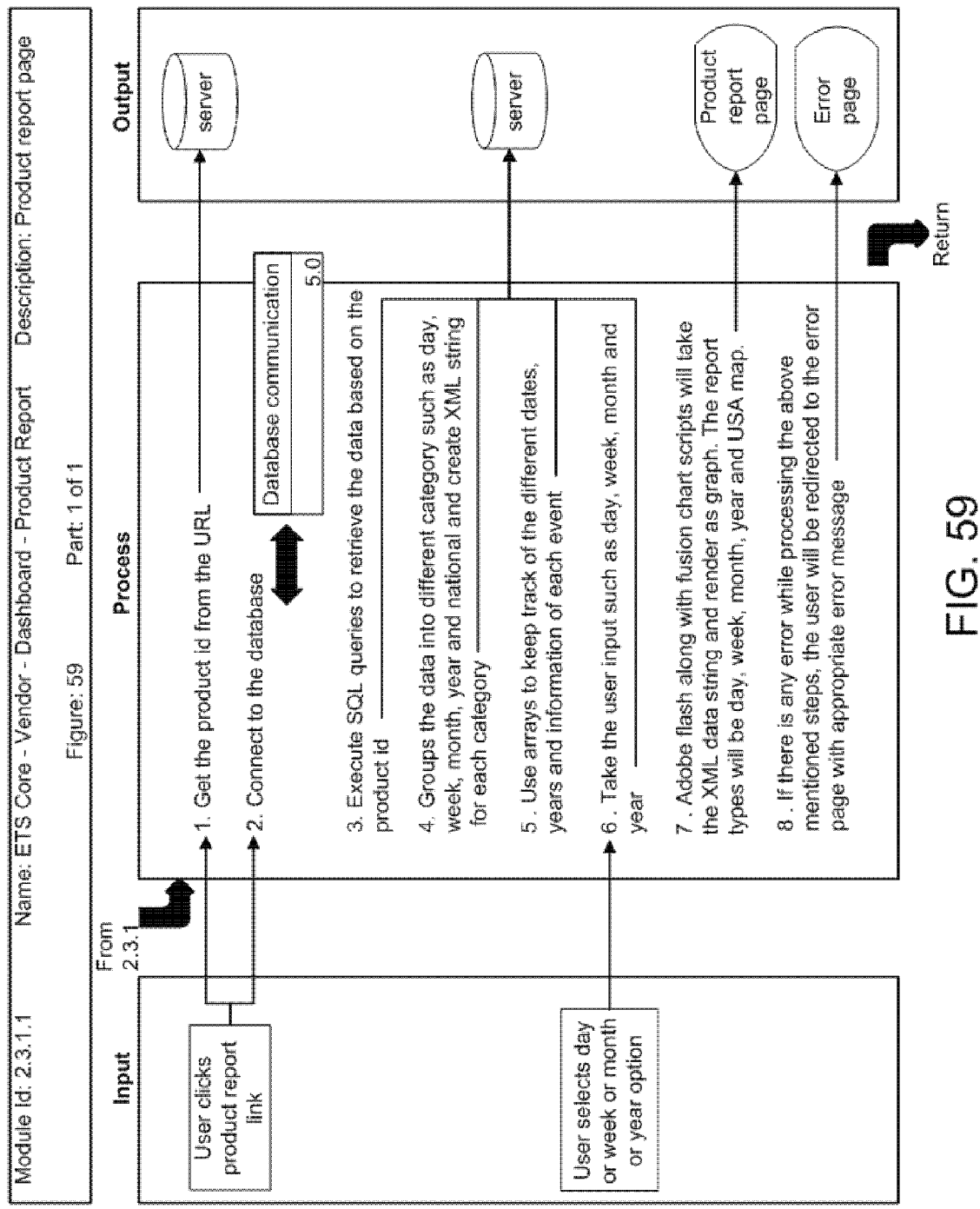
Figure 60:
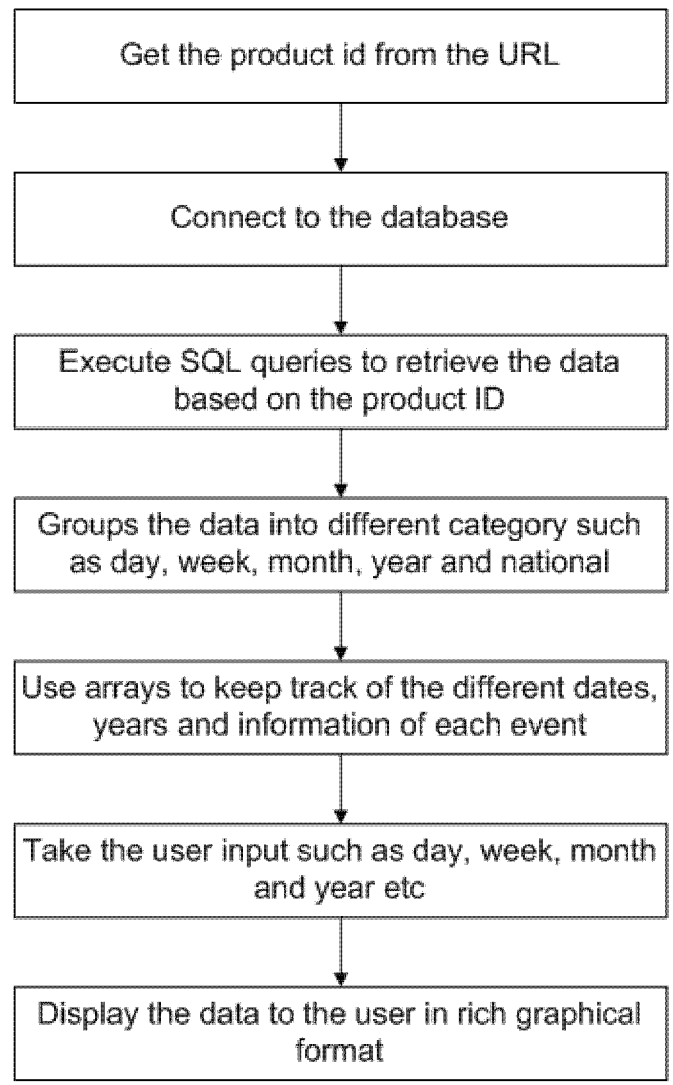
Figure 61:
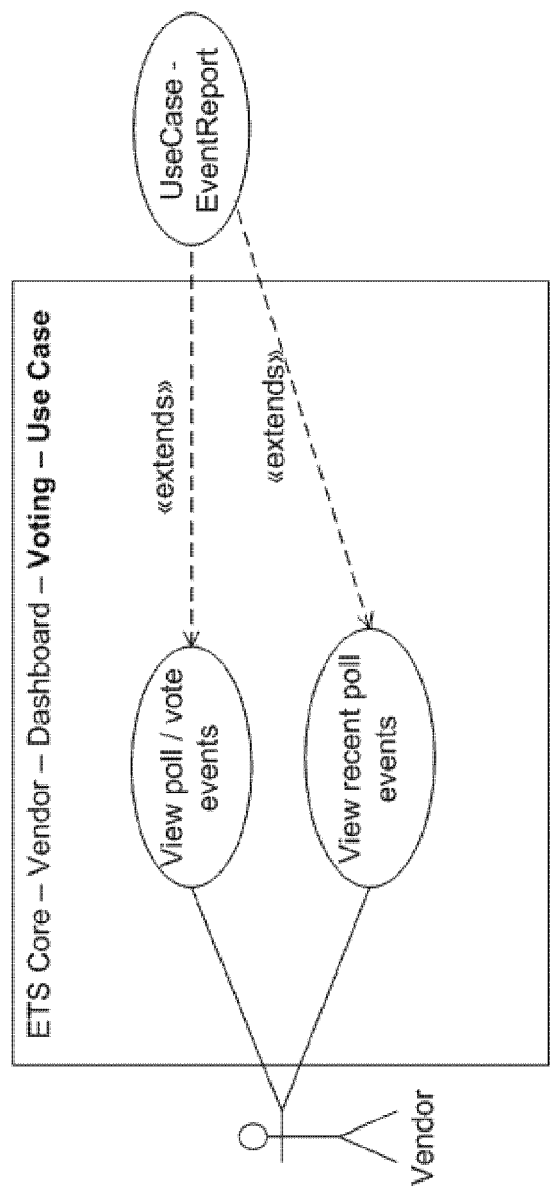
Figure 62A:
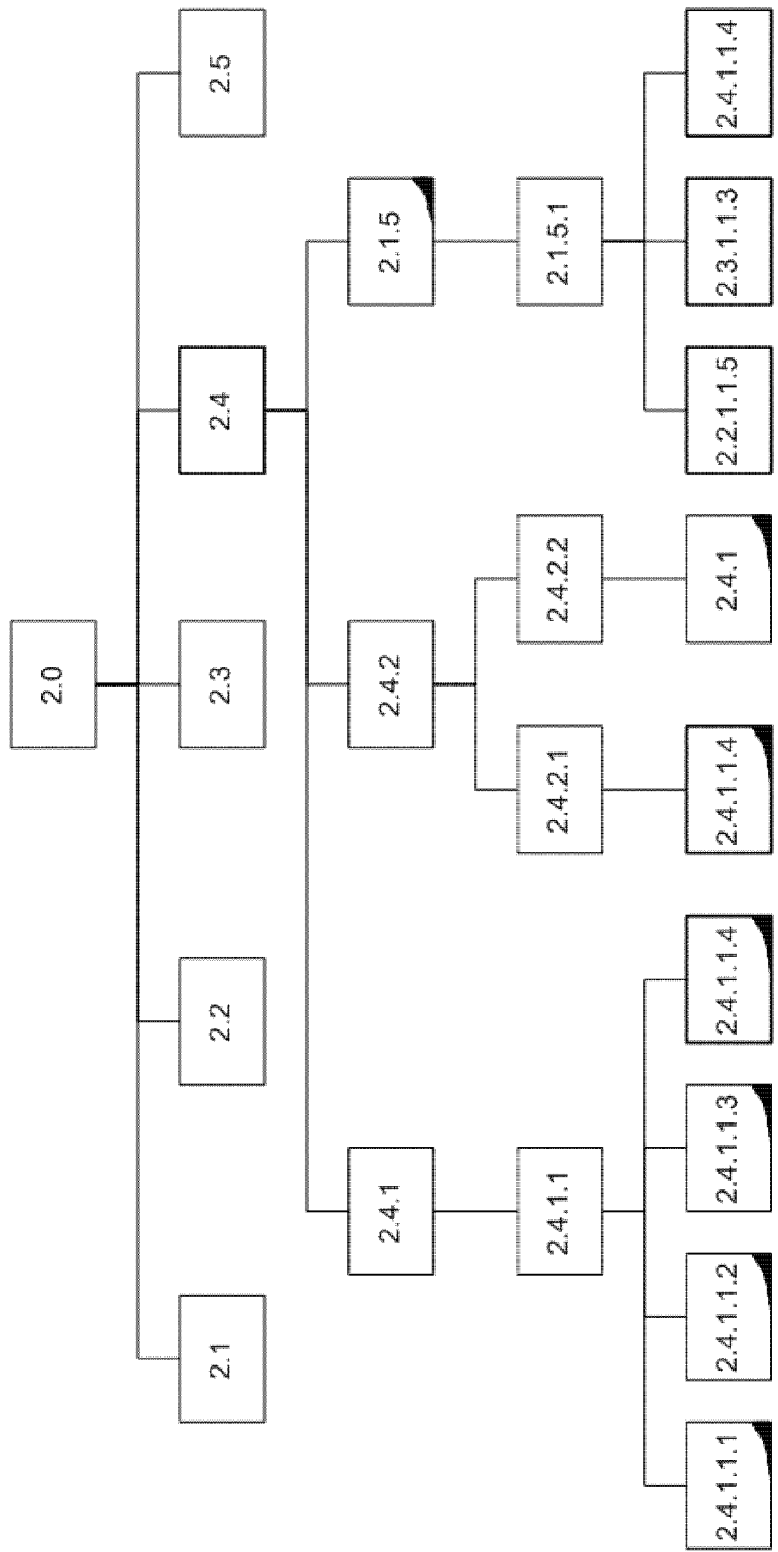
Figure 62B:
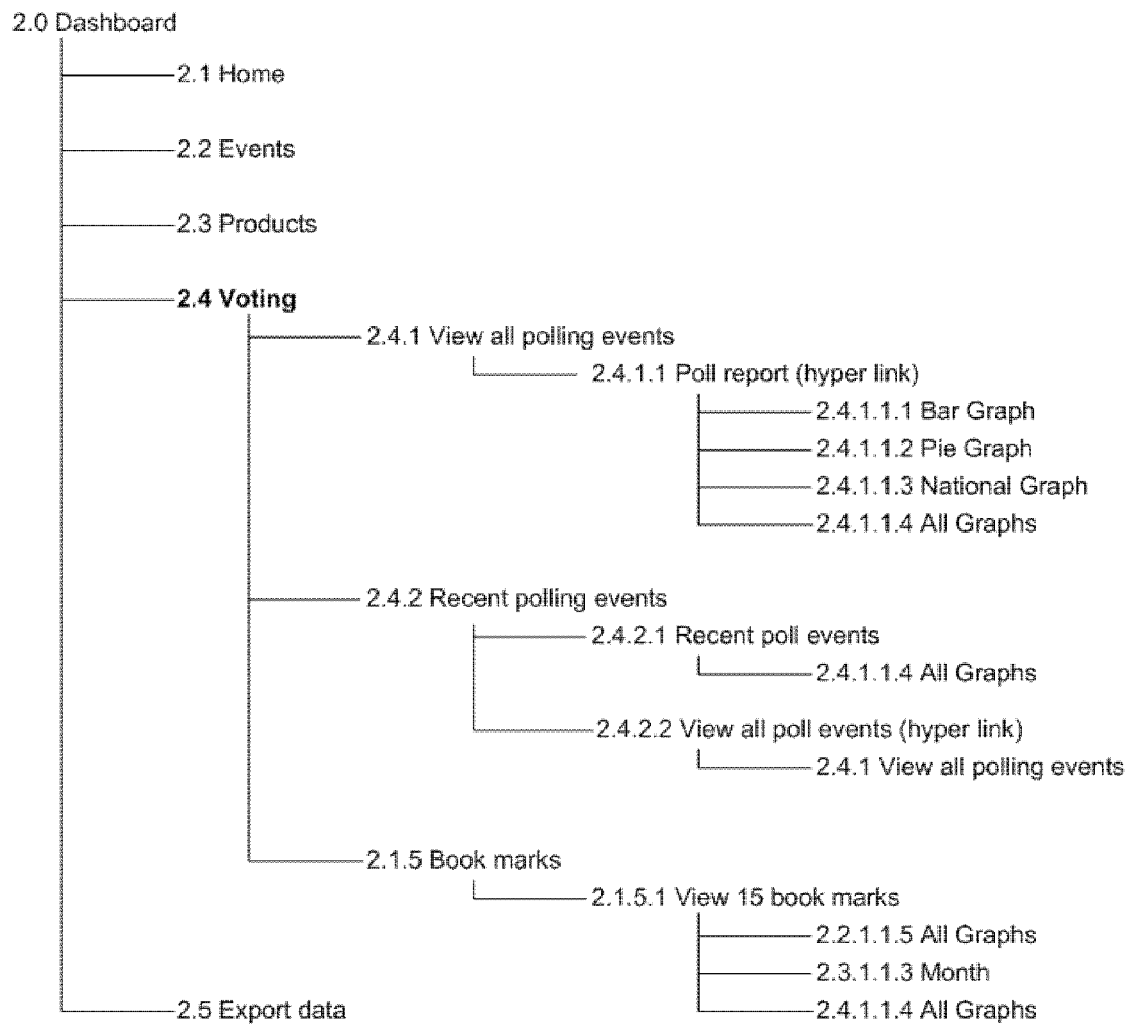
Figure 63:
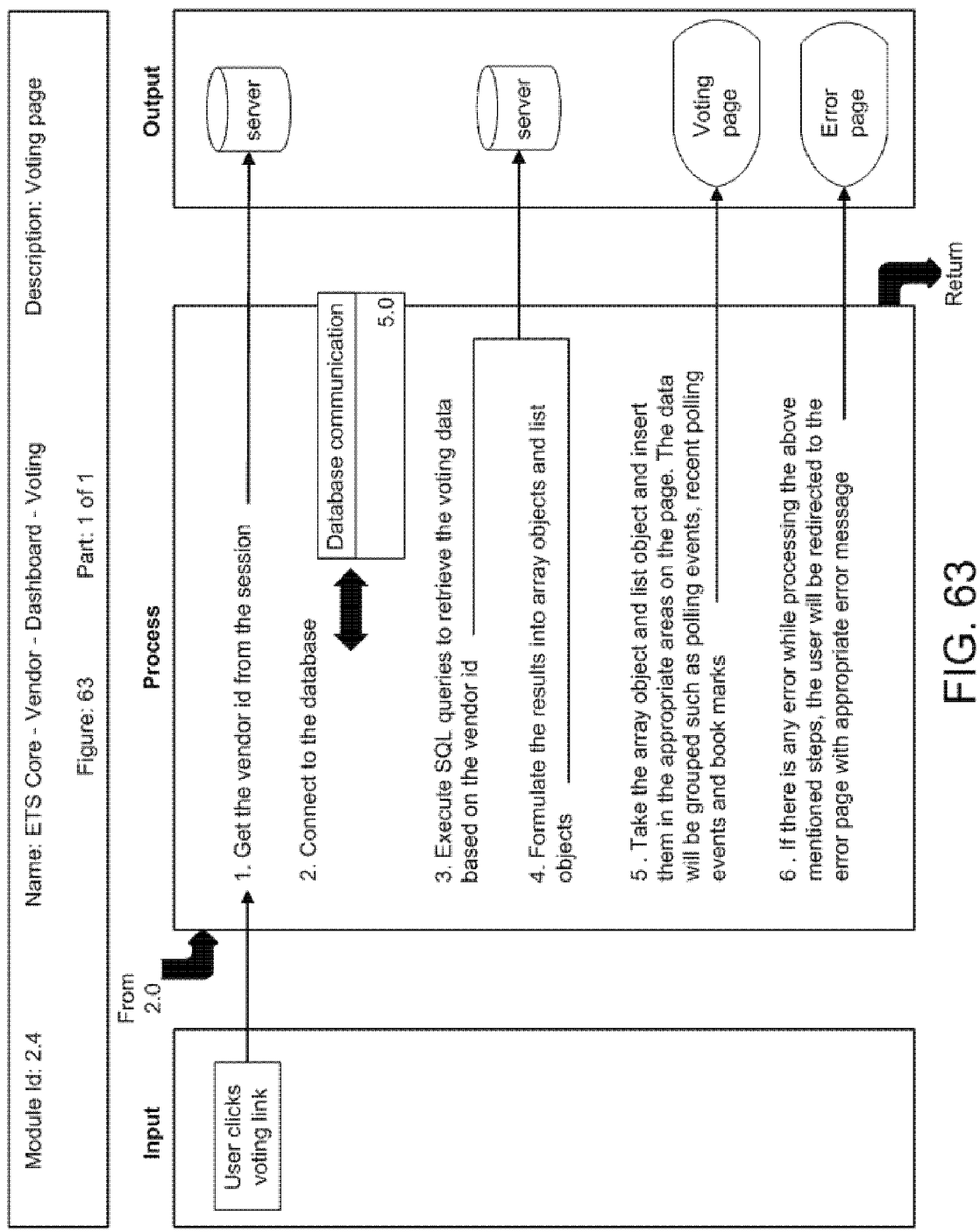
Figure 64:
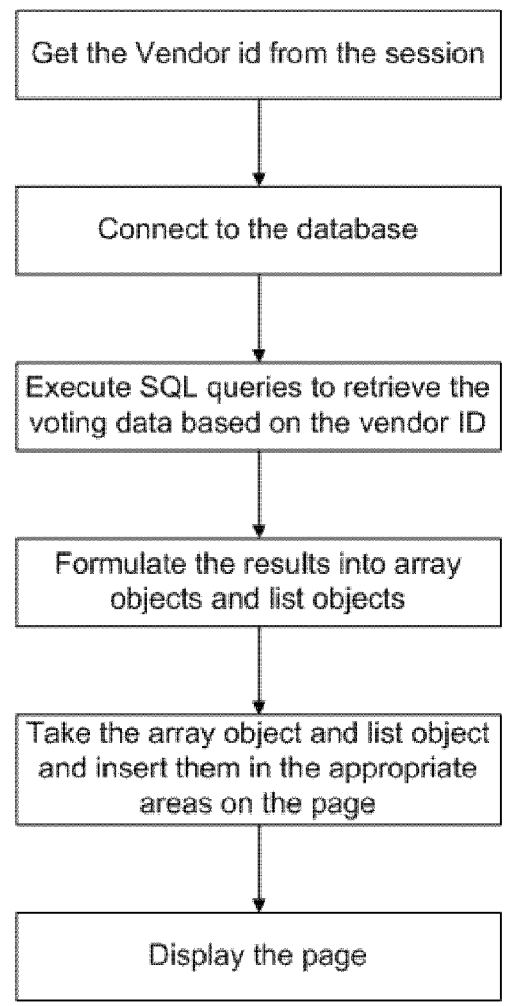
Figure 65A:
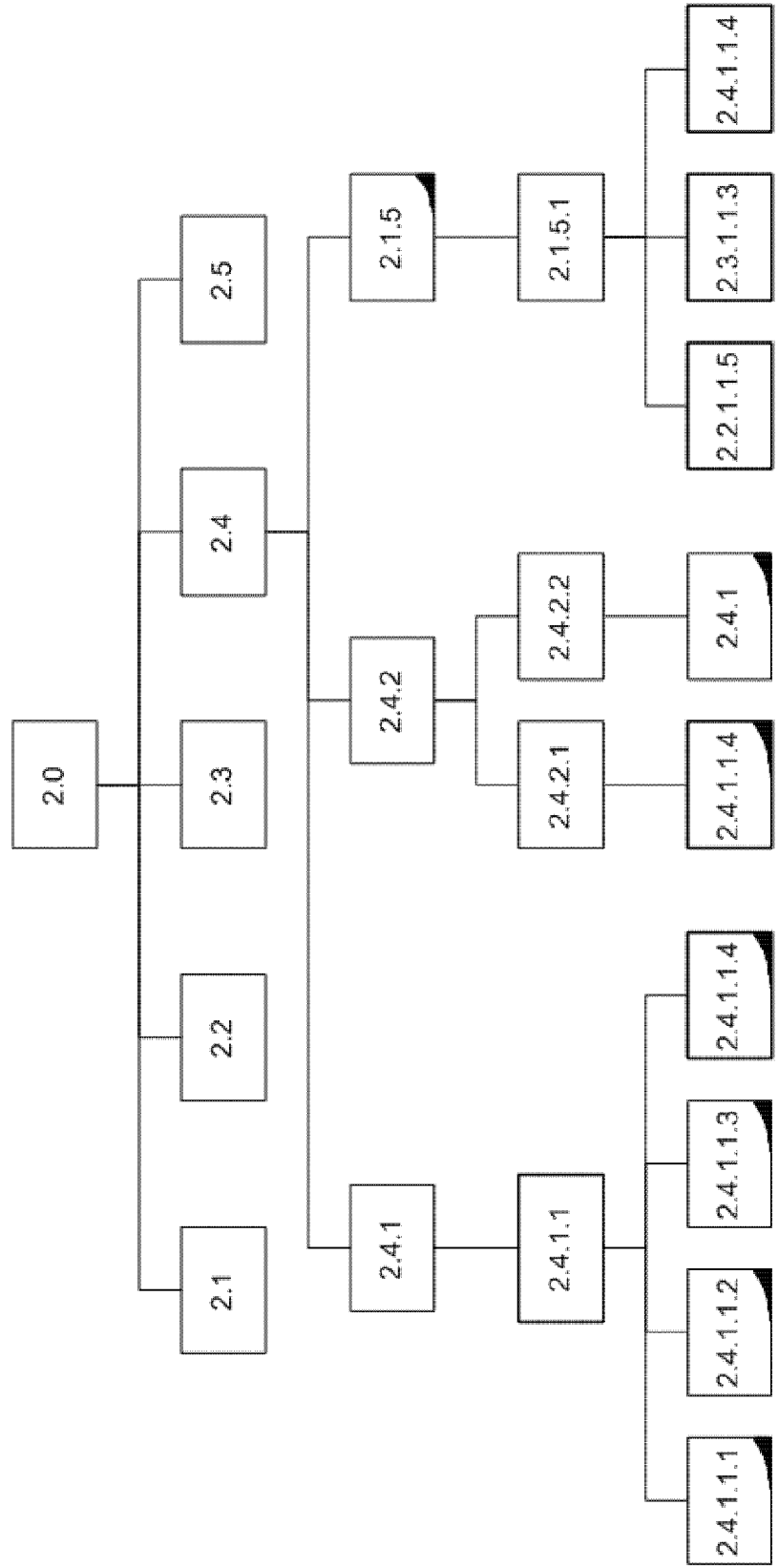
Figure 65B:
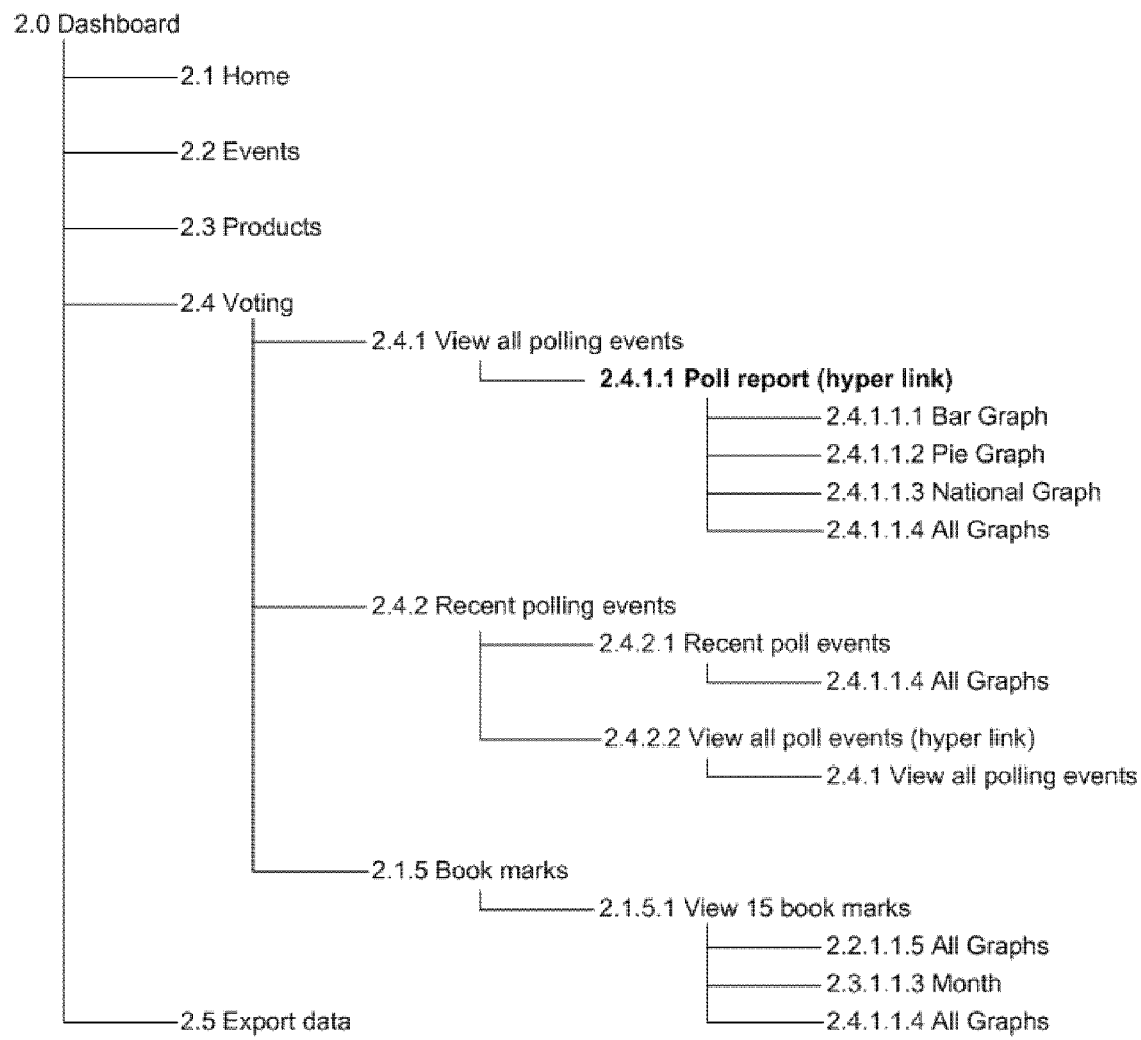
Figure 66:
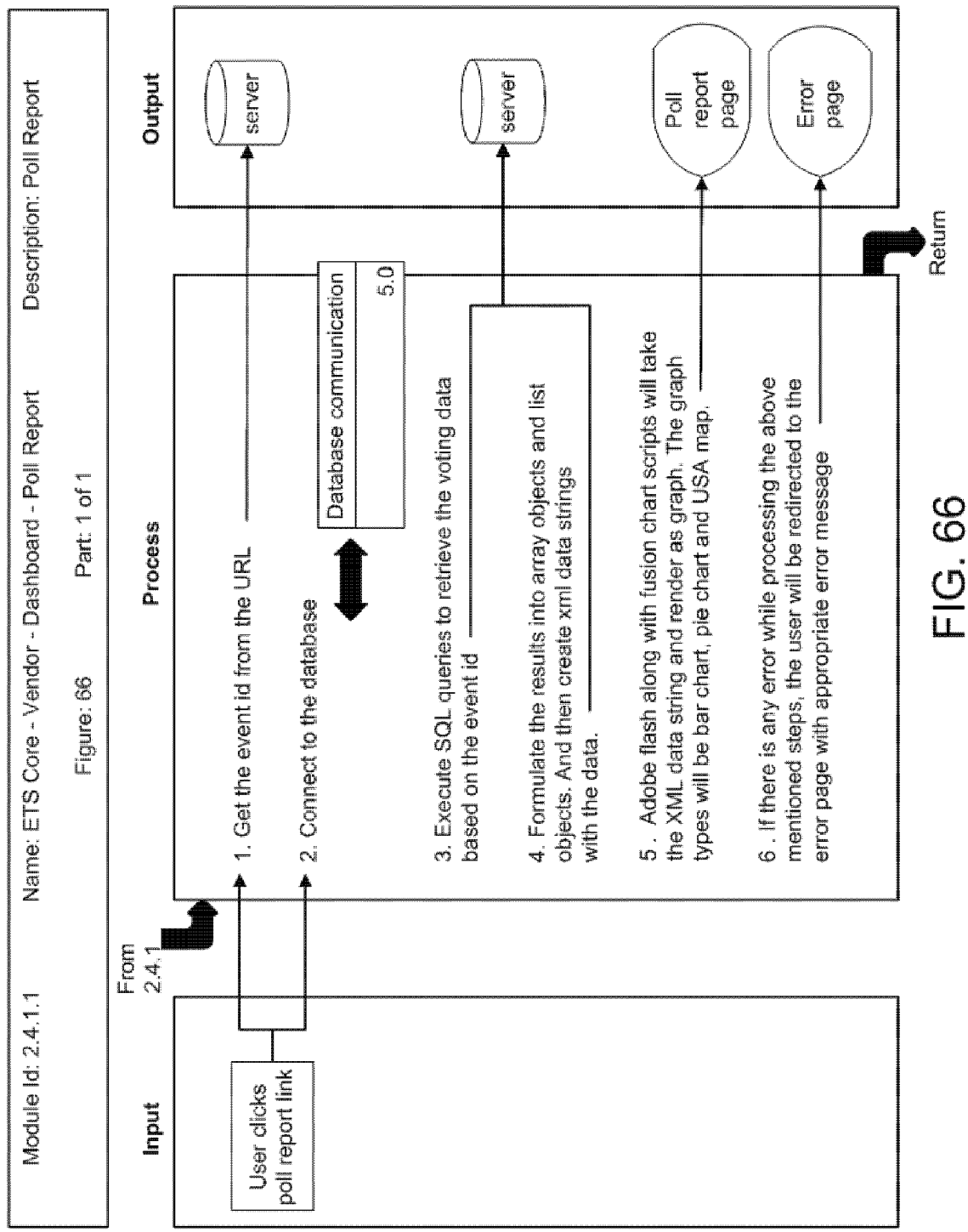
Figure 67:
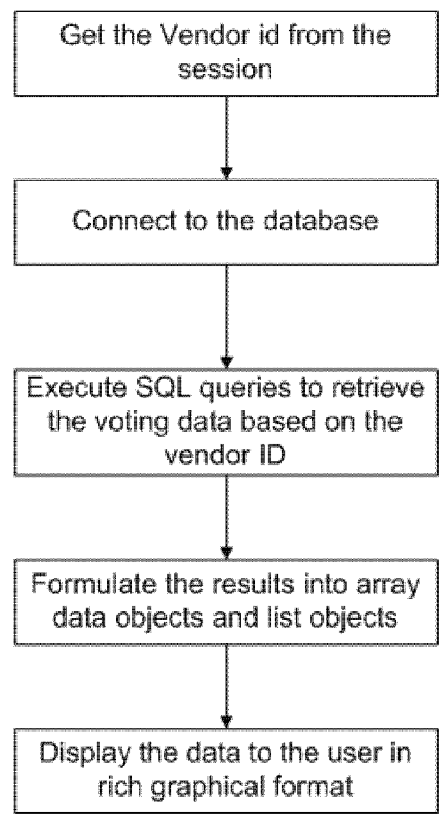
Figure 68:
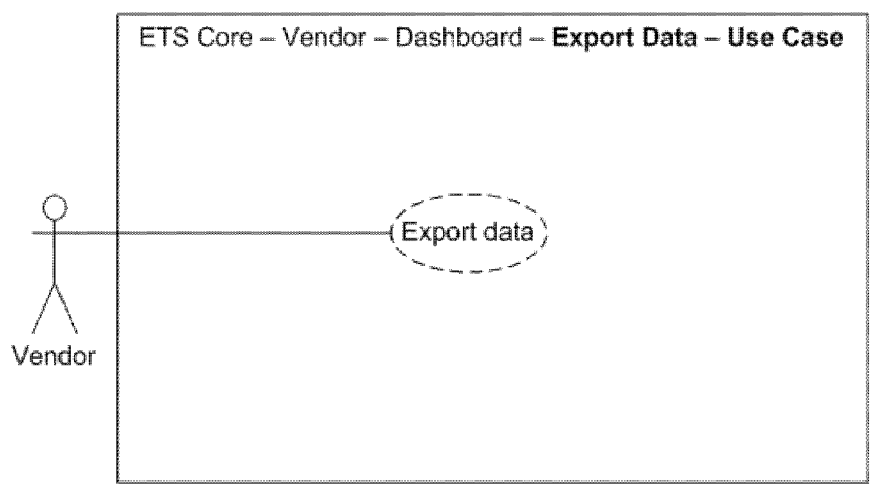
Figure 69A:
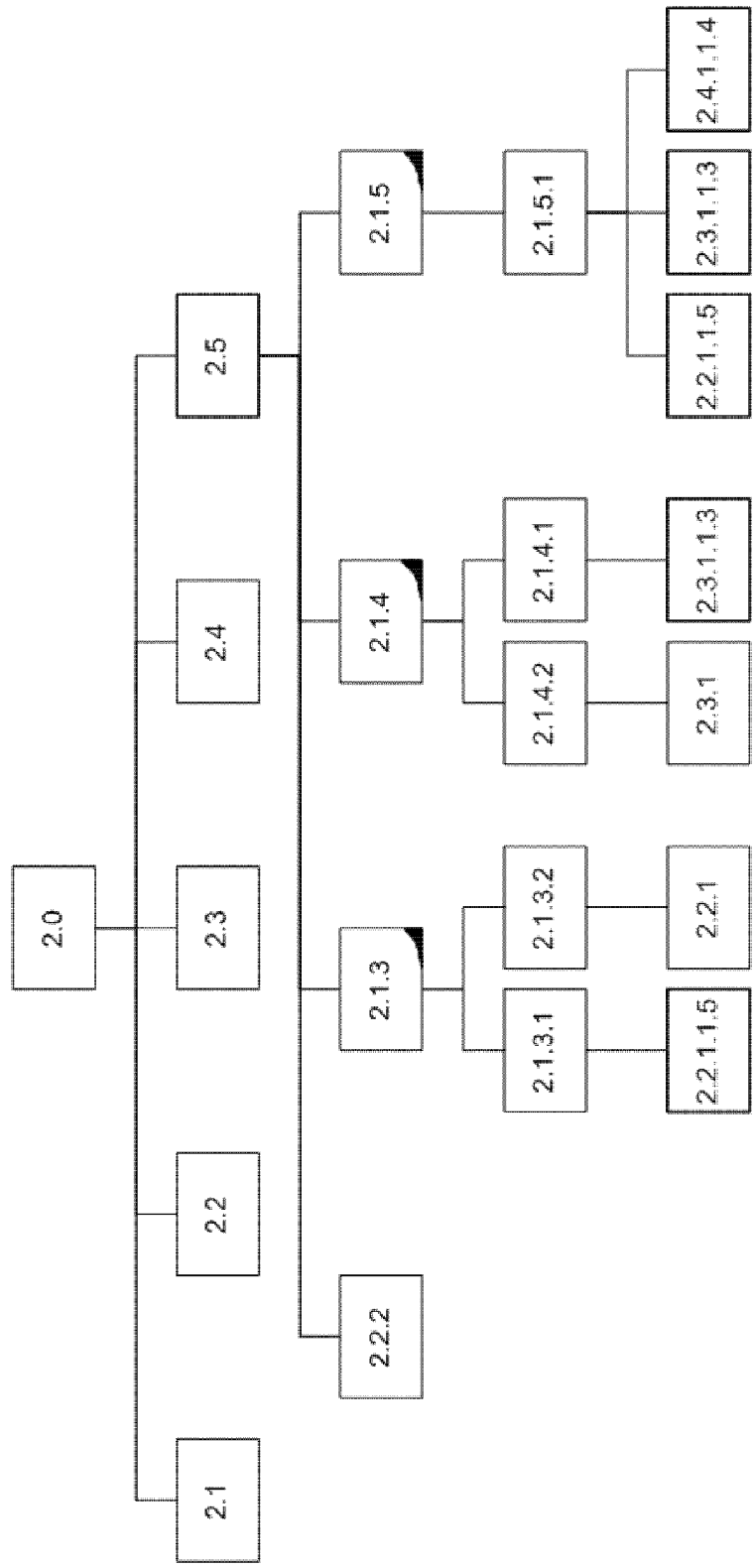
Figure 69B:
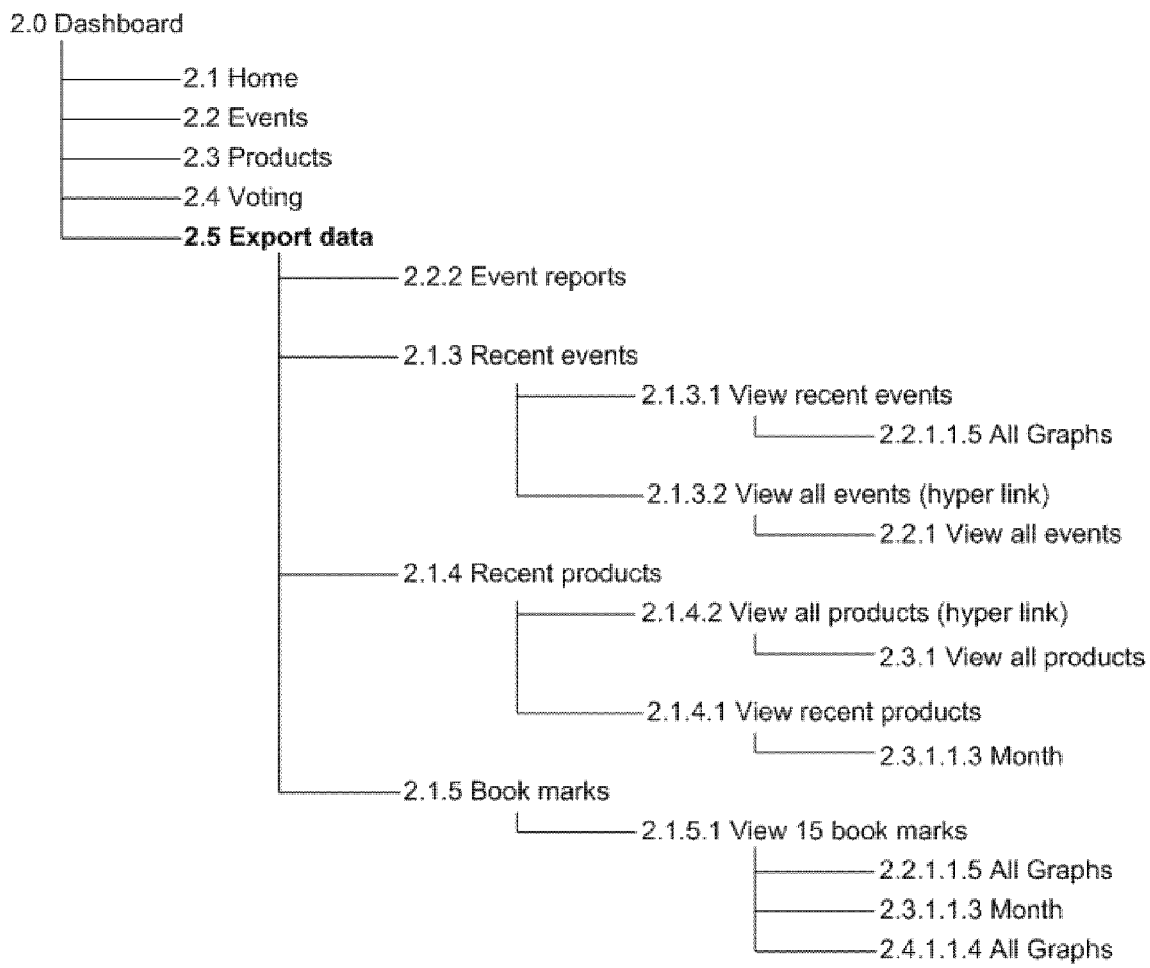
Figure 70:
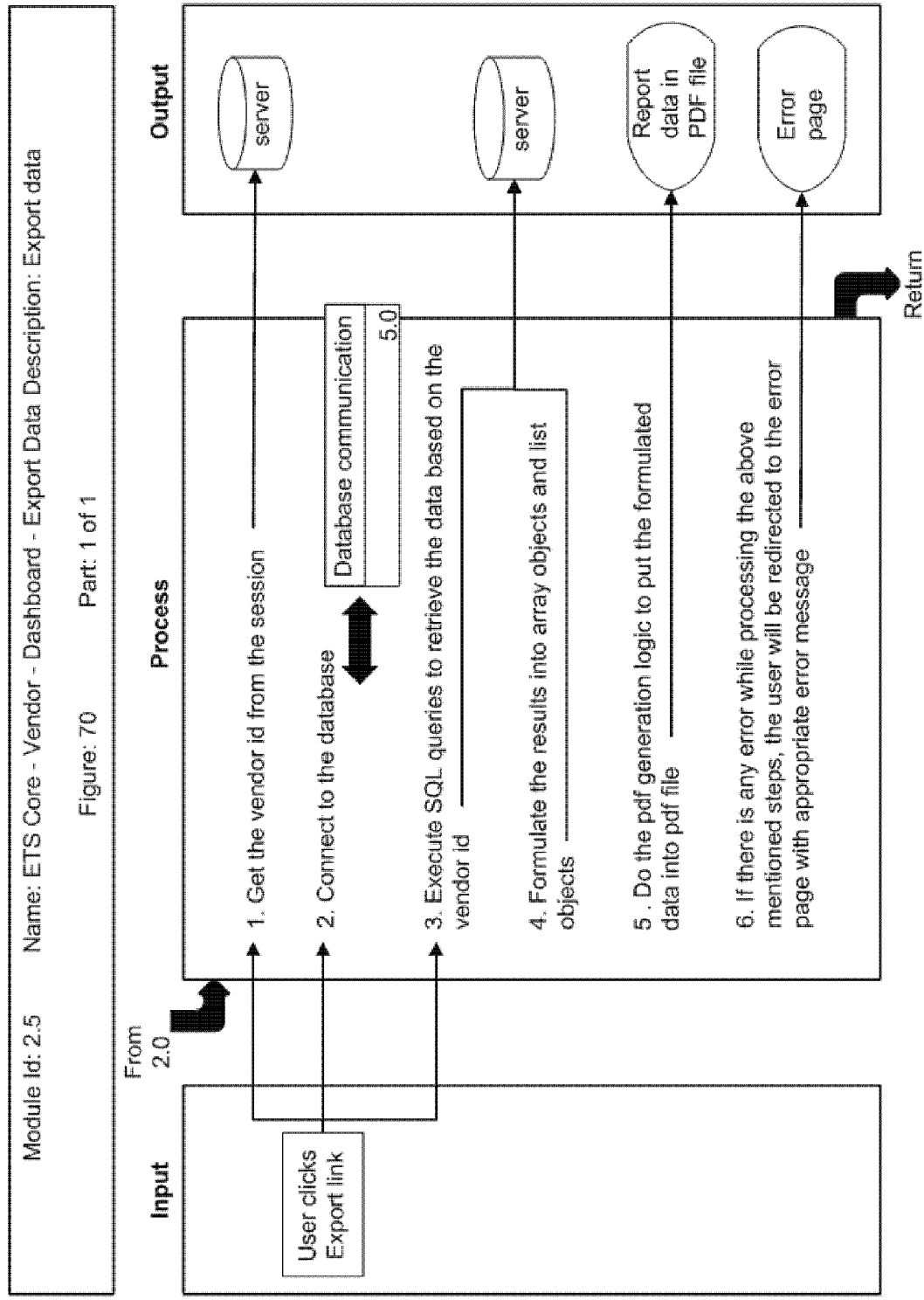
Figure 71:
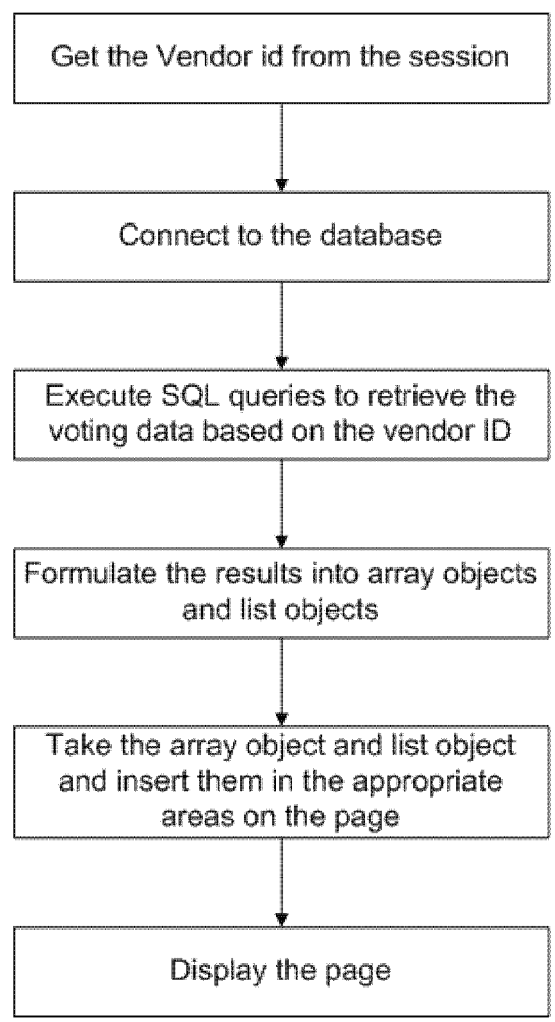
Figure 72:
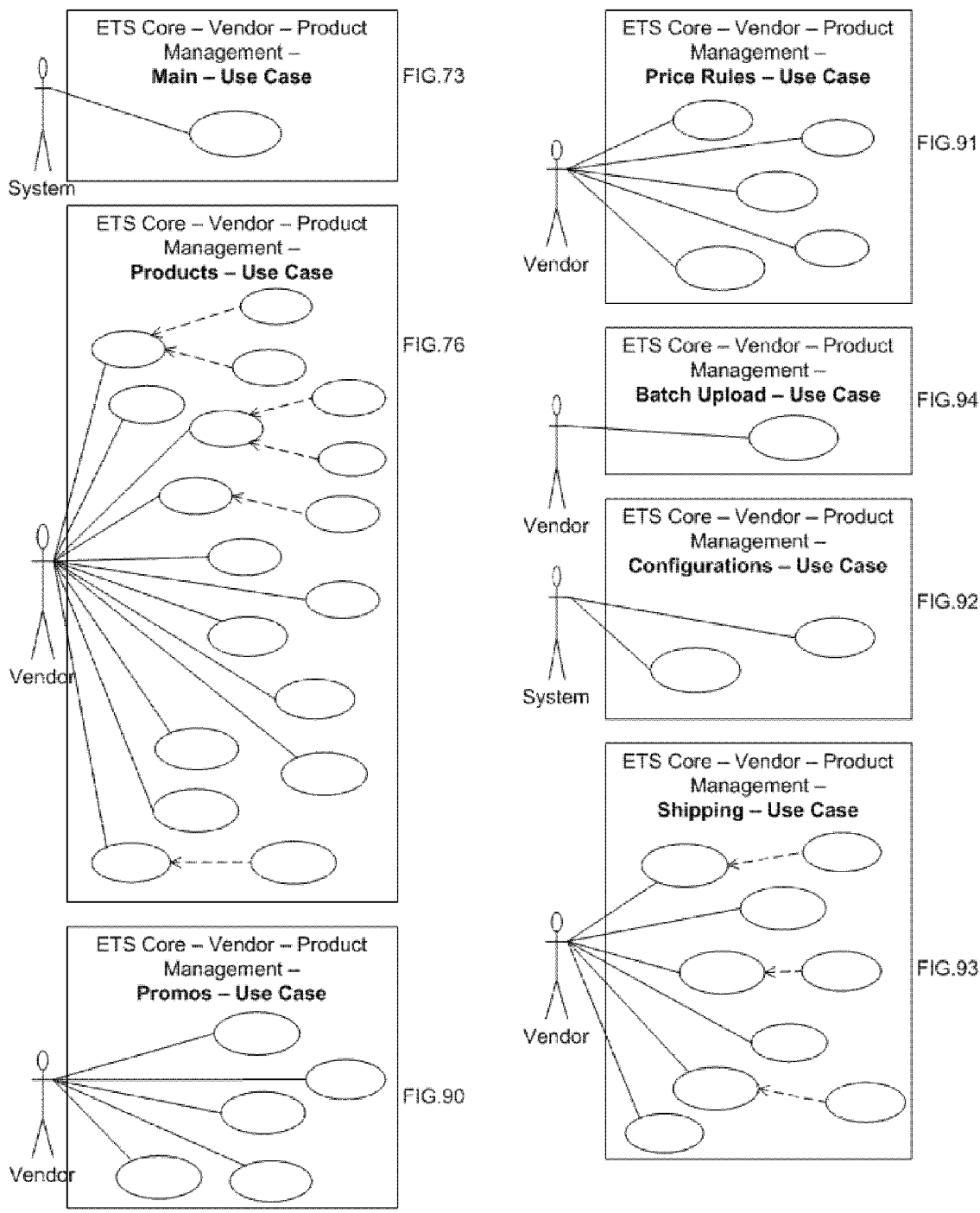
Figure 73:
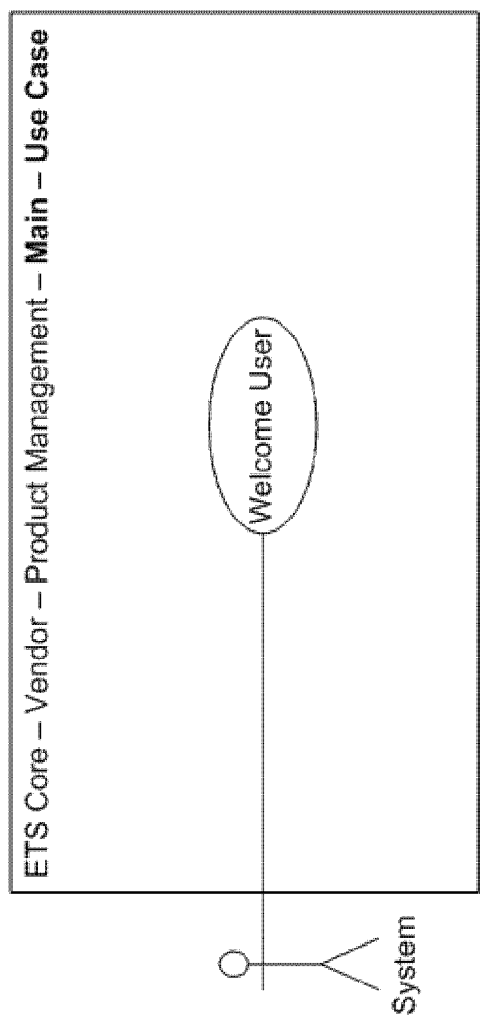
Figure 74A:
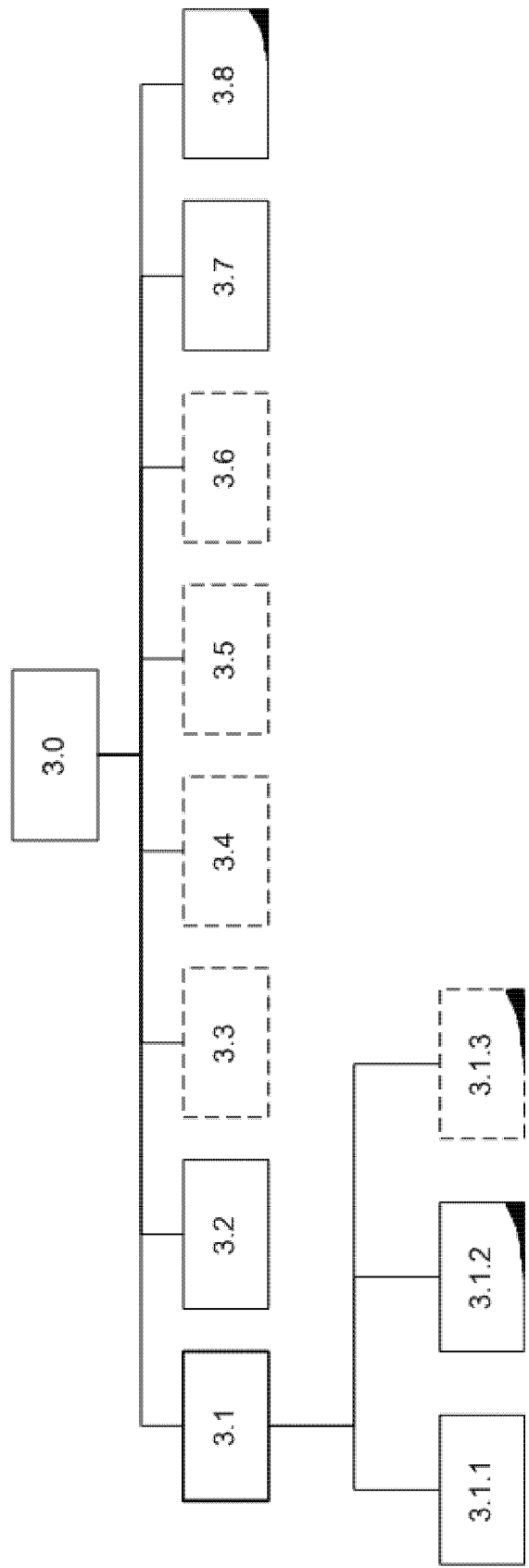
Figure 74B:
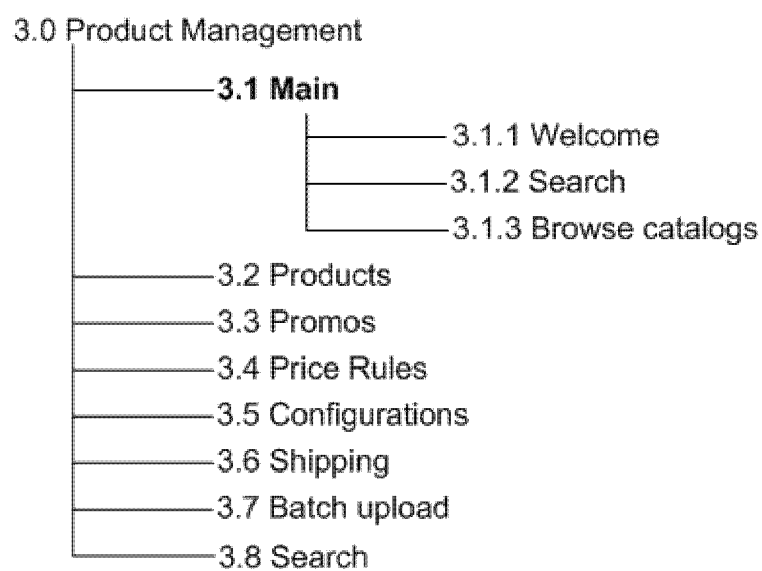
Figure 75:
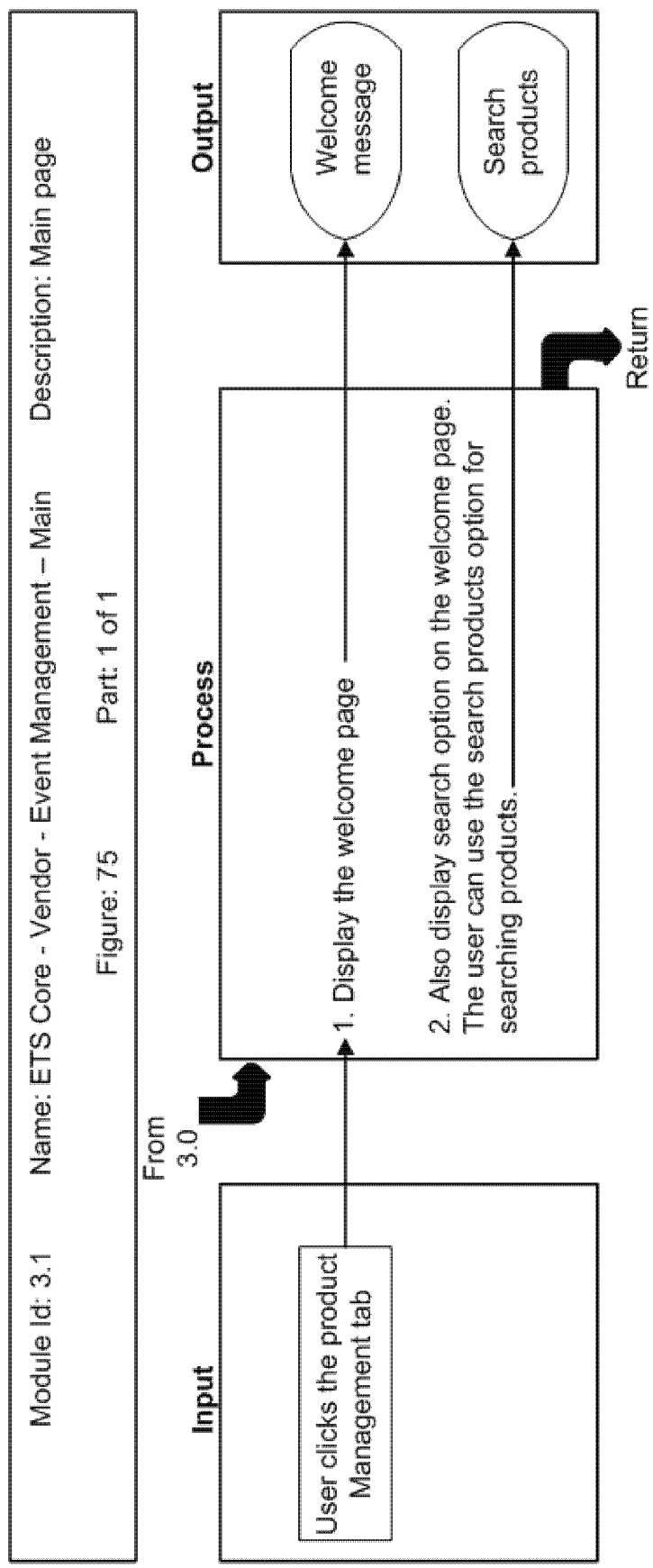
Figure 76:
Figure 77A:
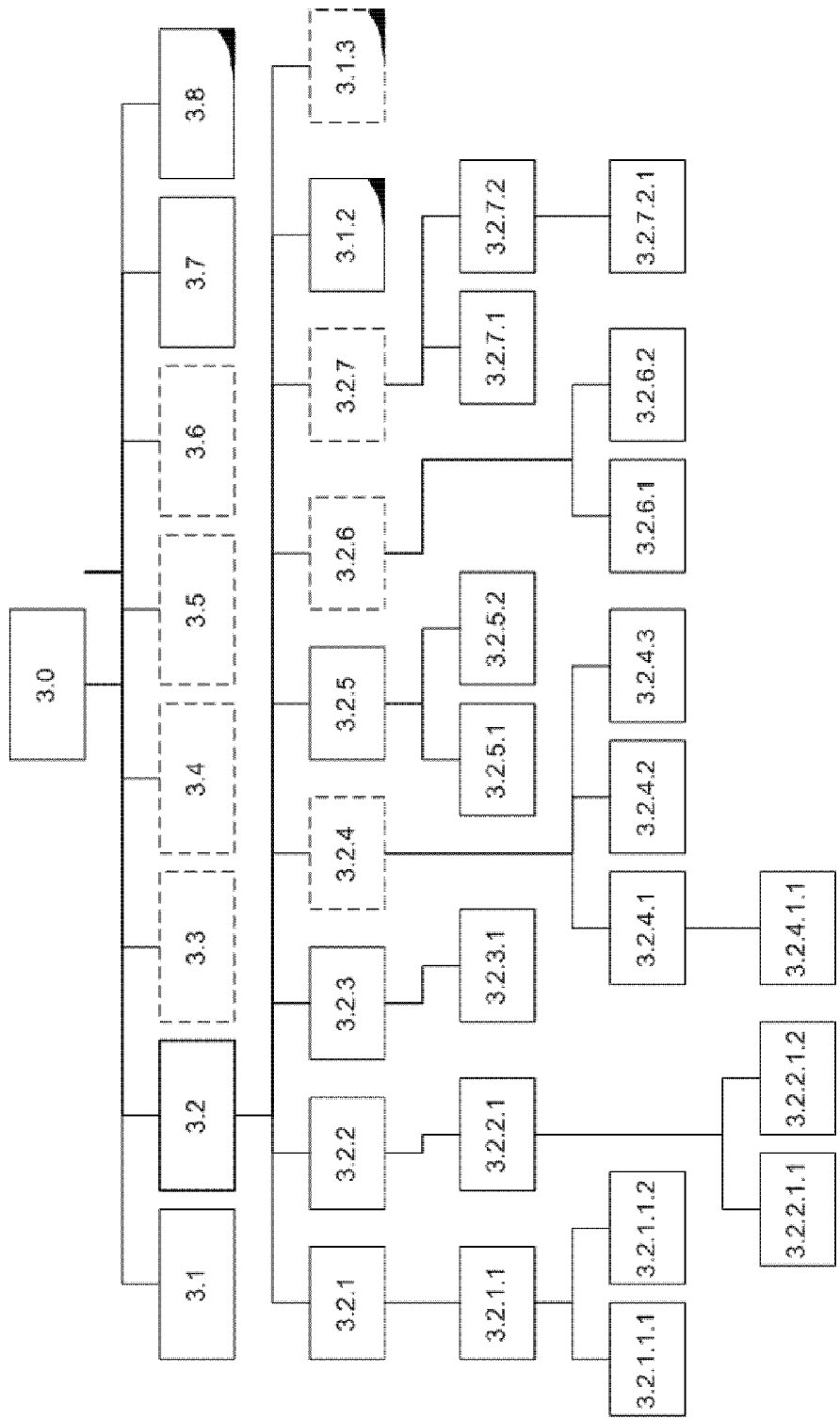
Figure 77B:
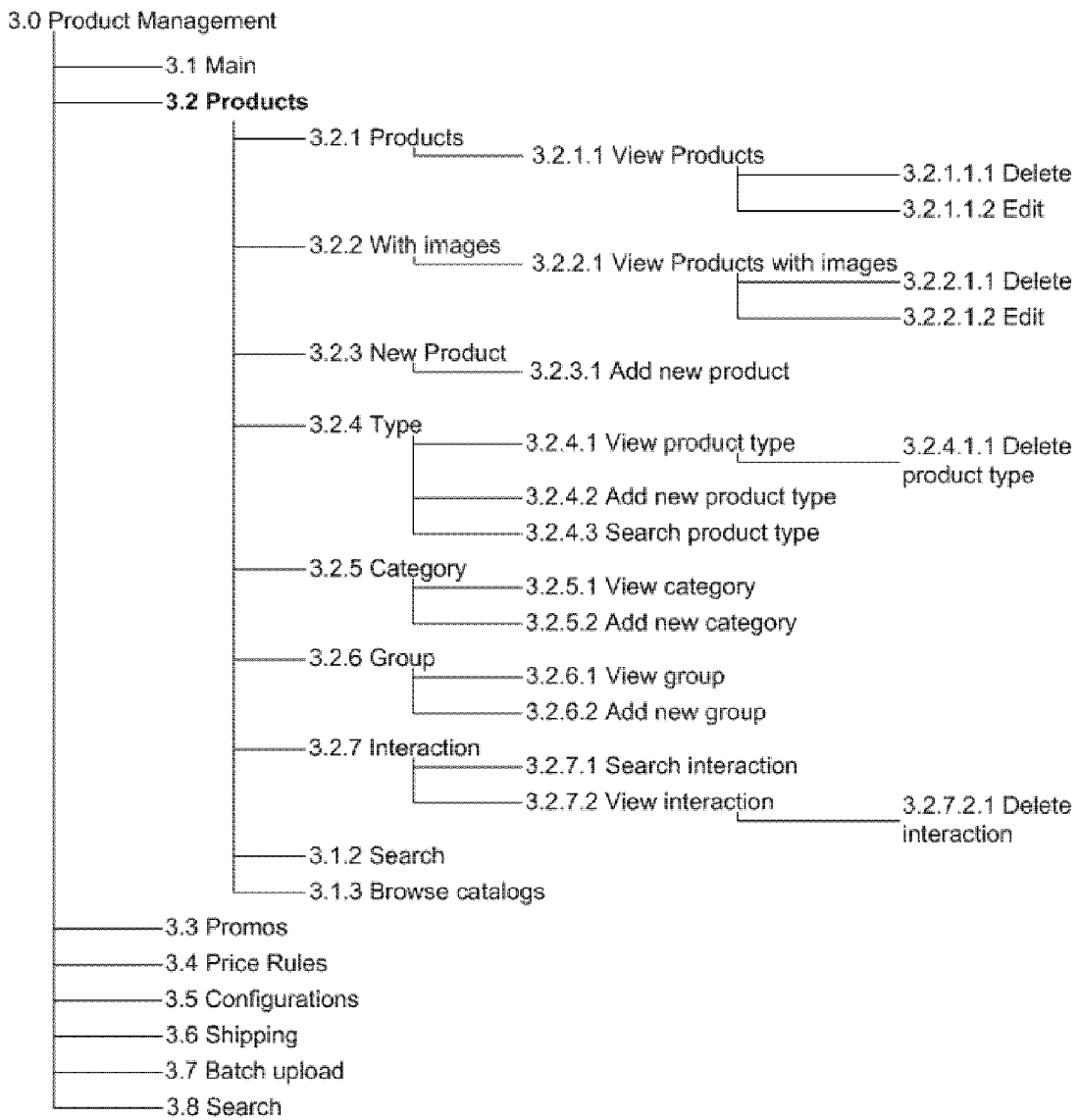
Figure 78A:
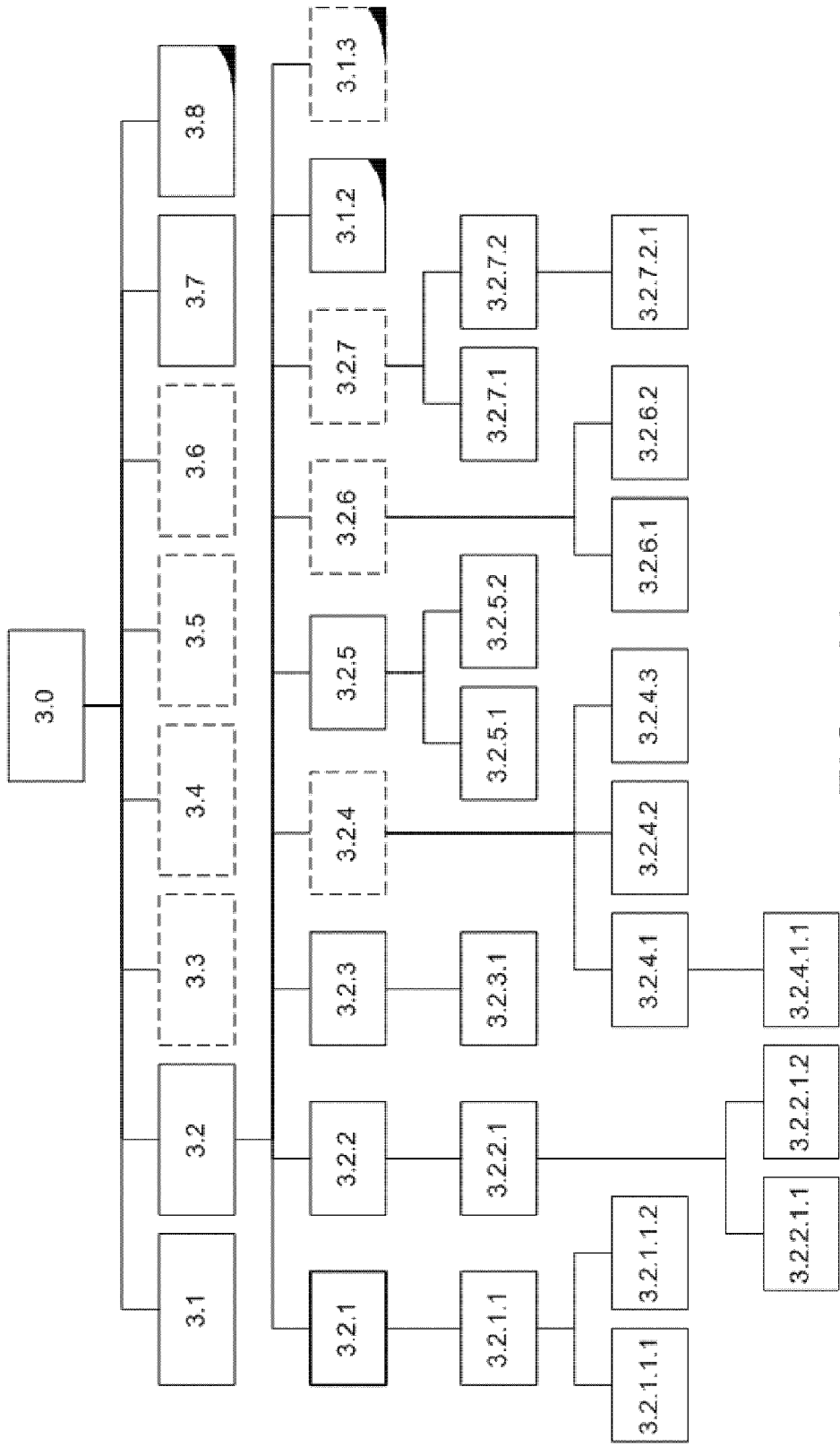
Figure 78B:
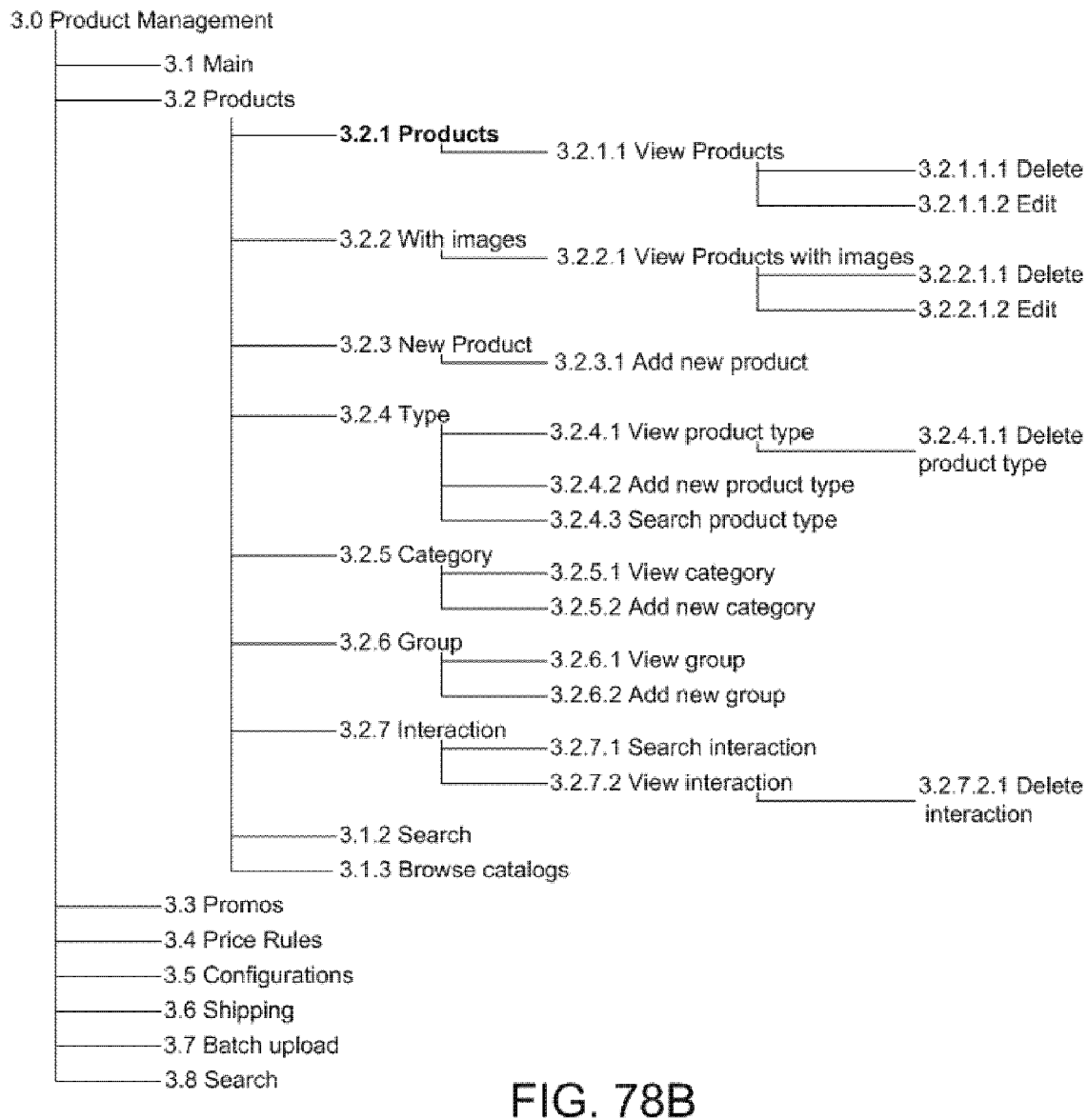
Figure 79:
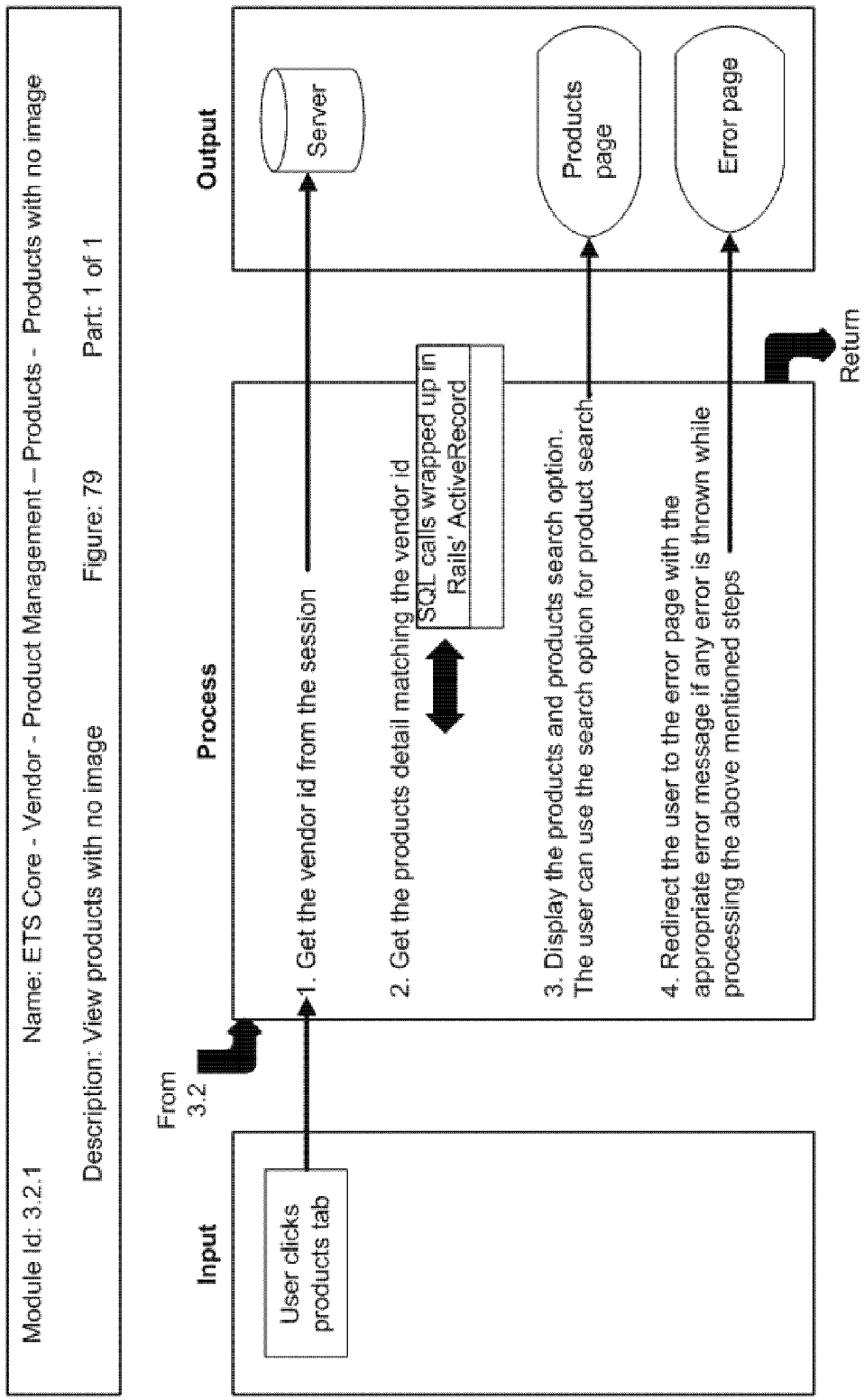
Figure 80A:
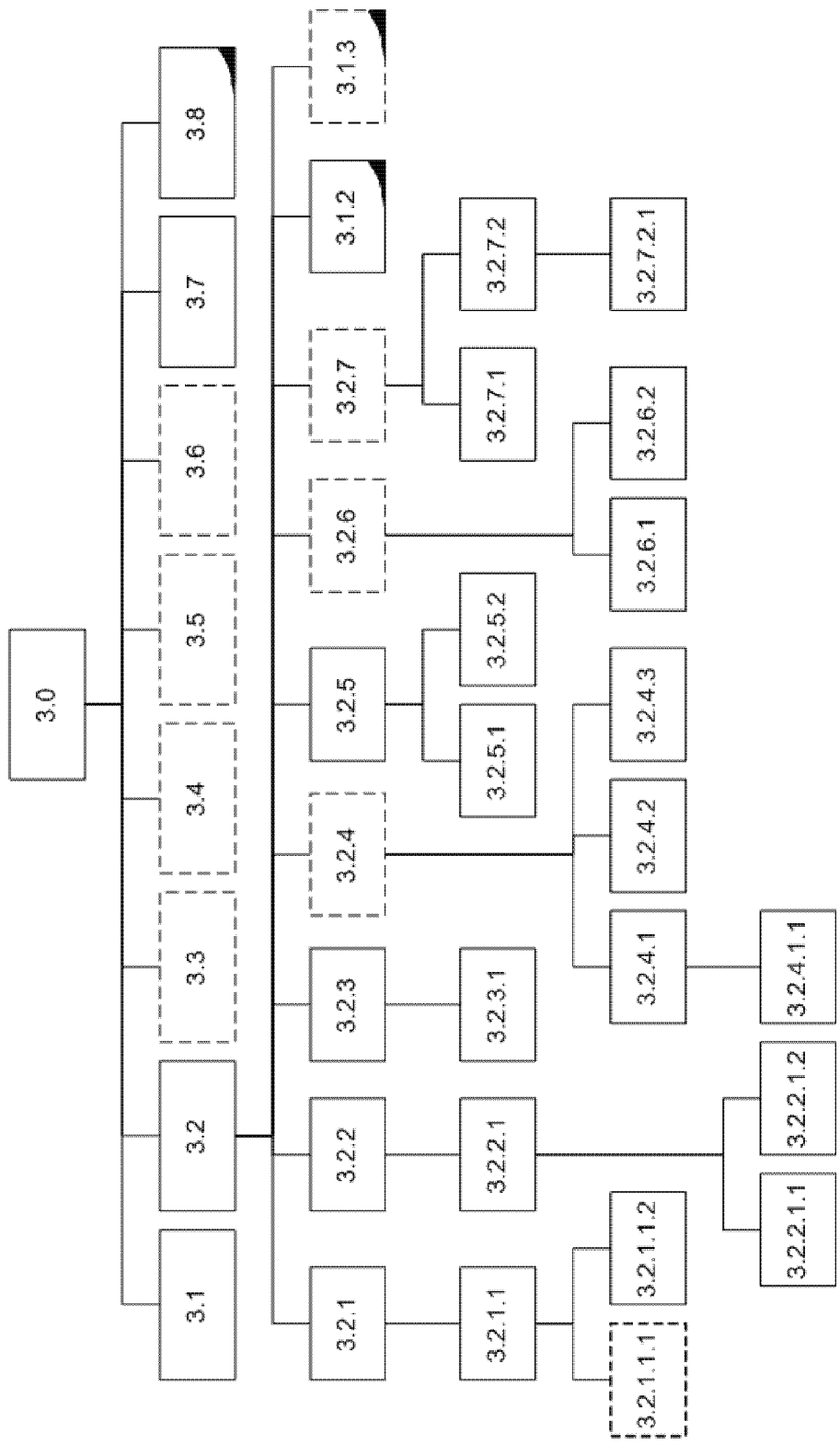
Figure 80B:
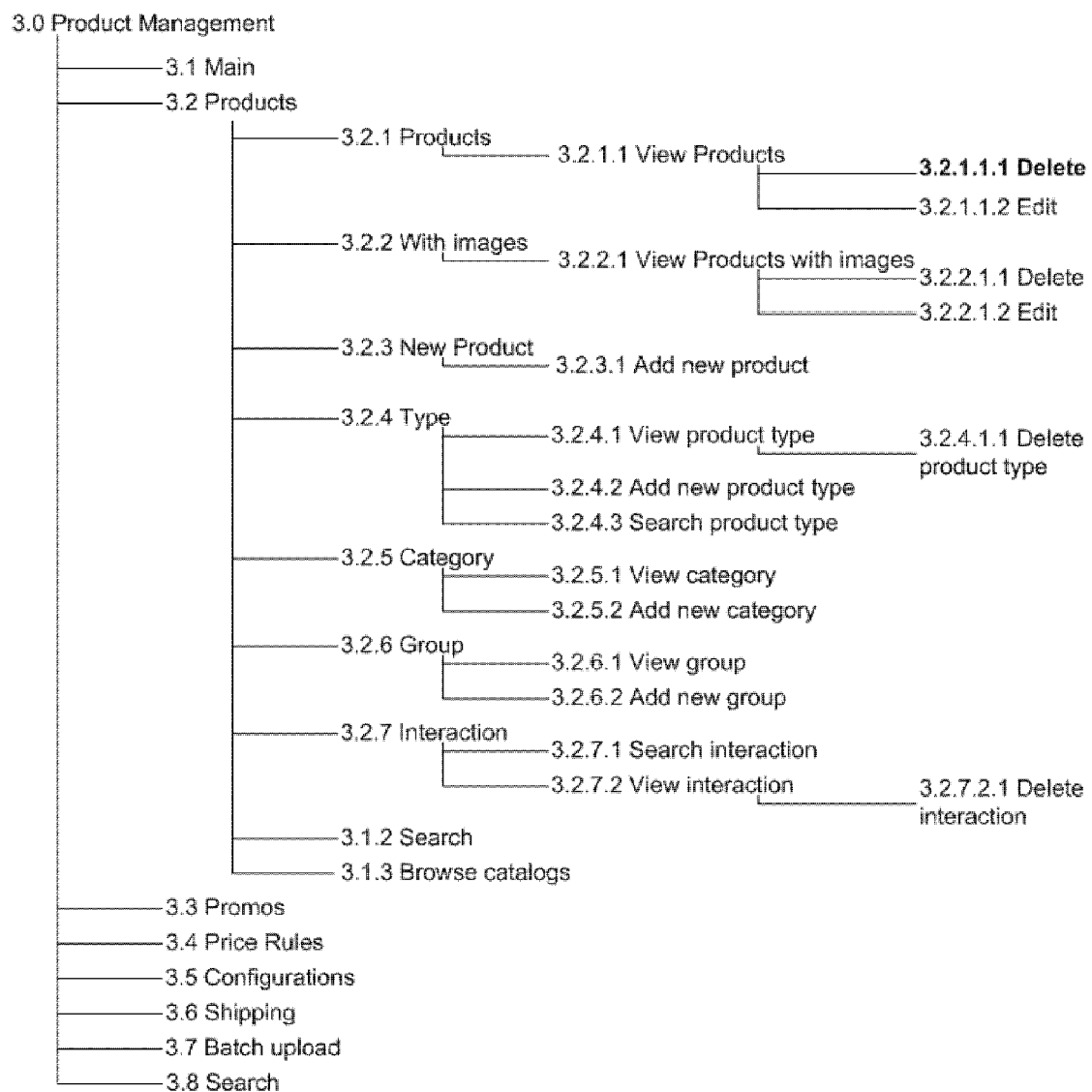
Figure 81:
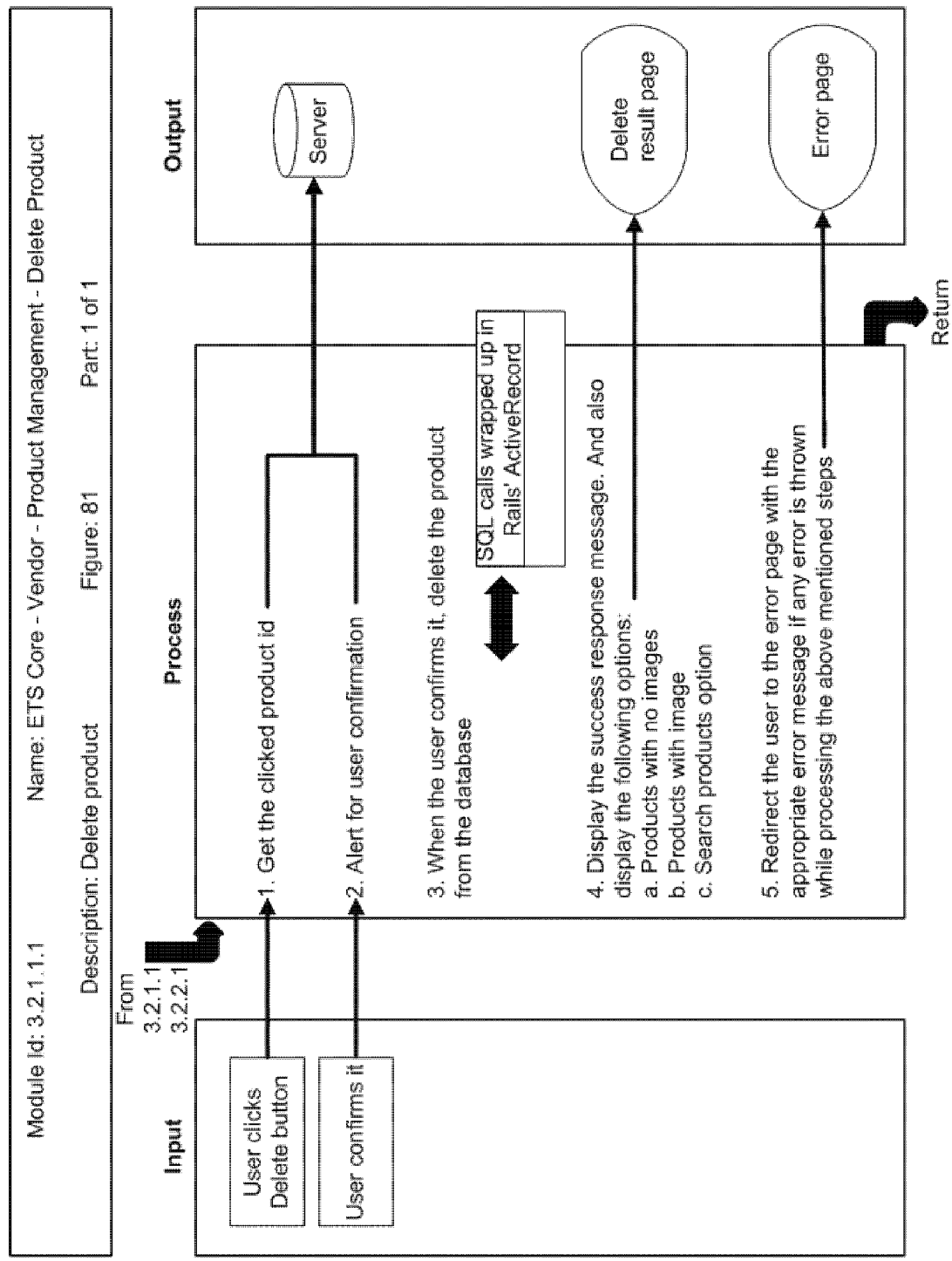
Figure 82A:
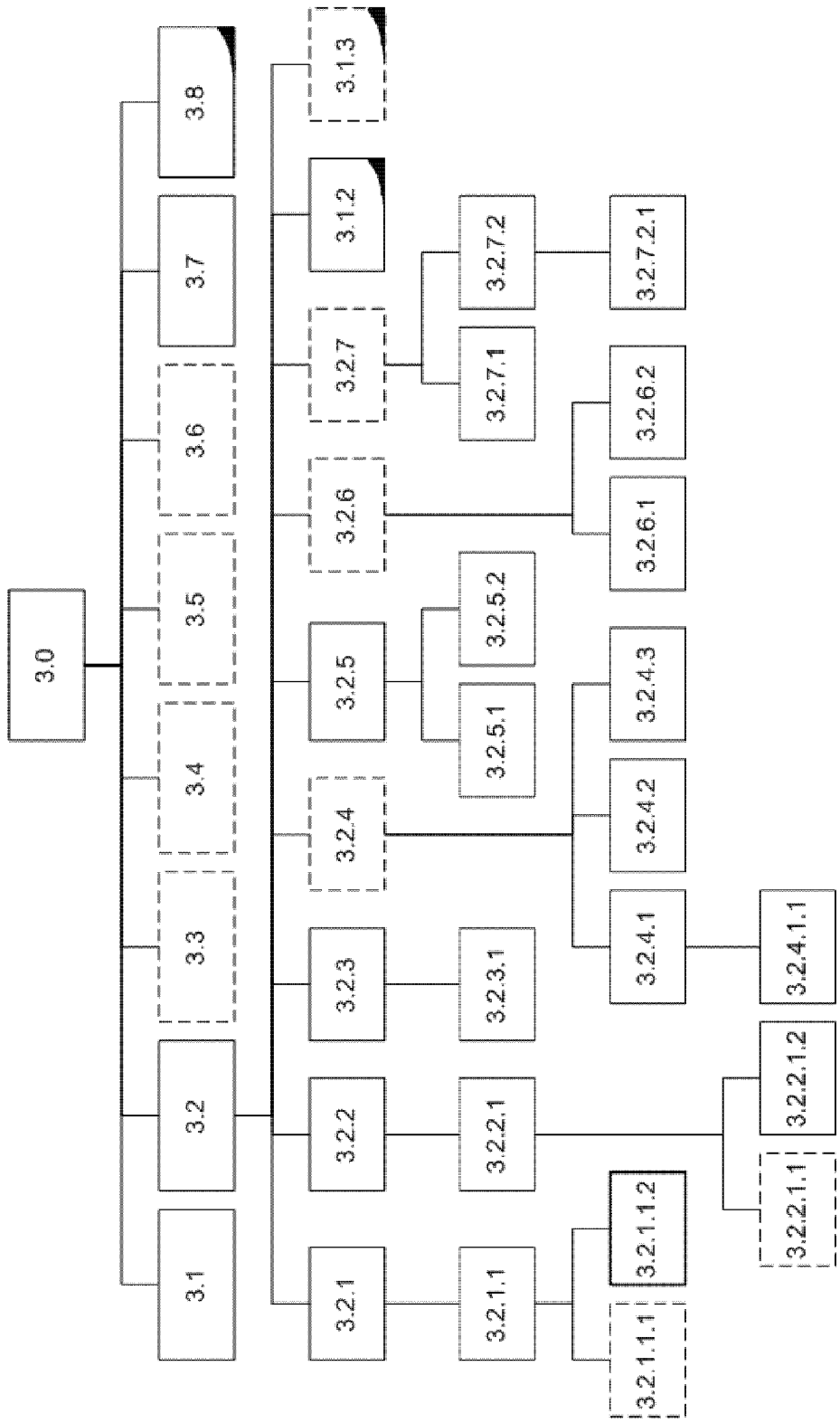
Figure 82B:
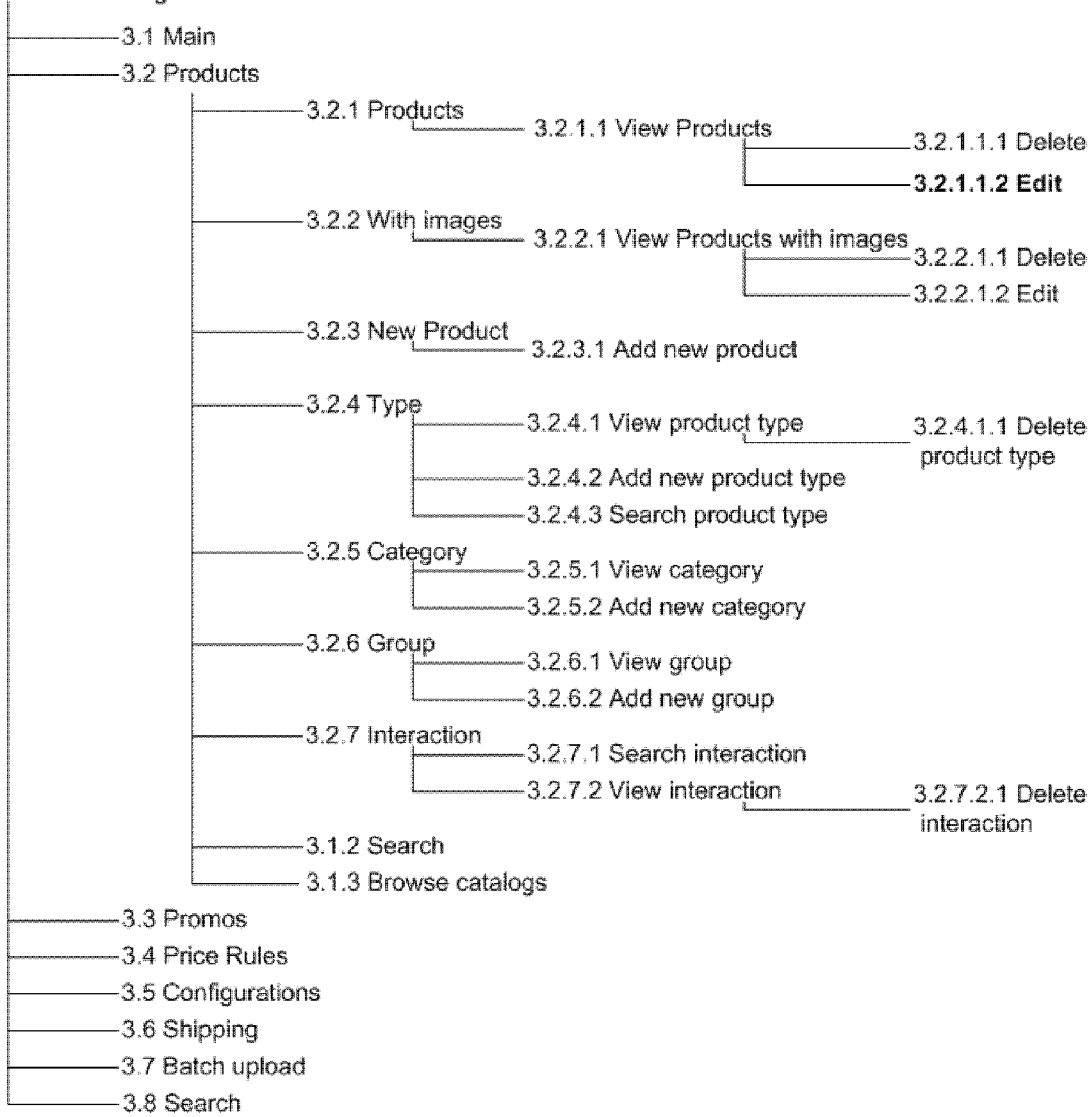
Figure 83:
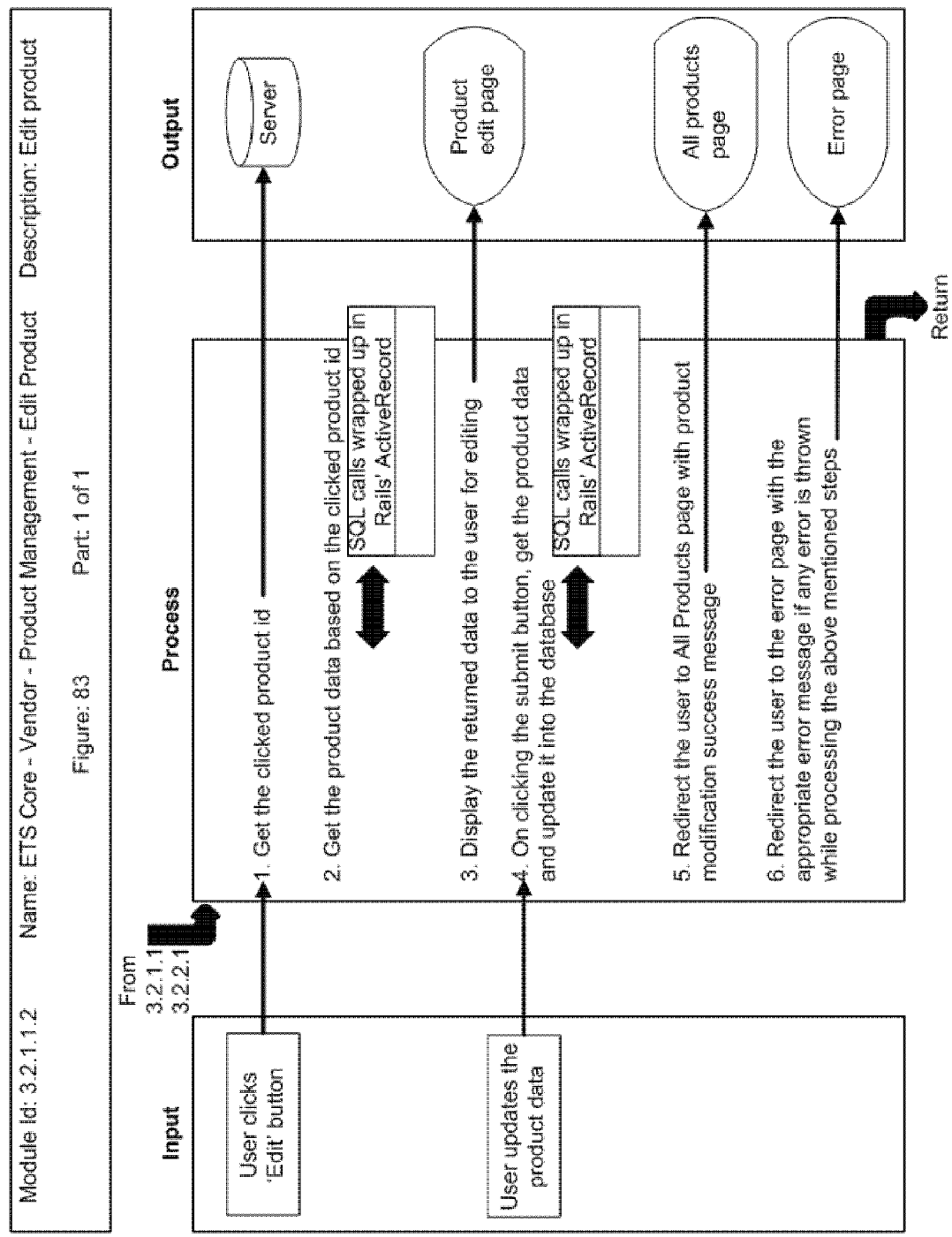
Figure 84A:
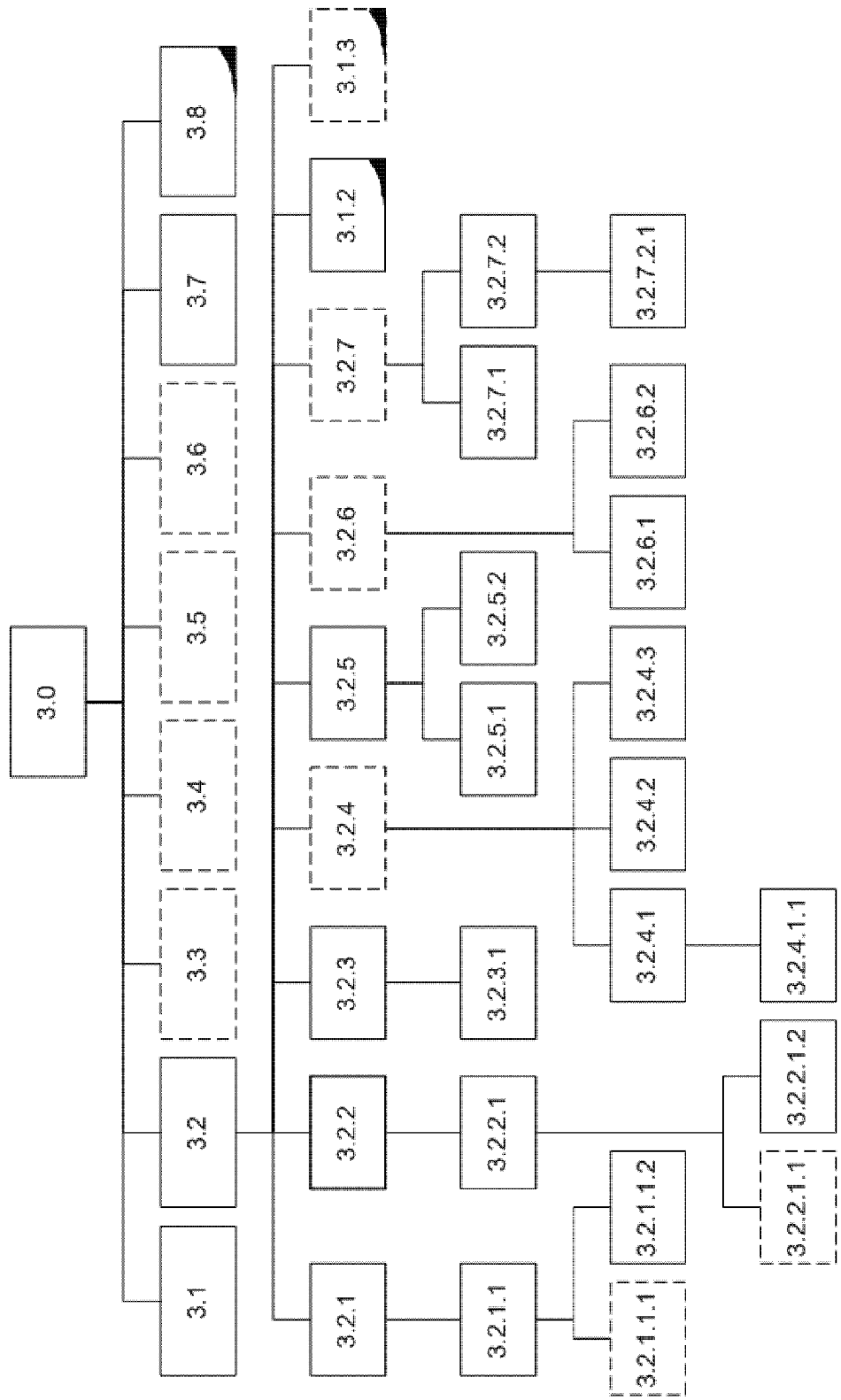
Figure 84B:
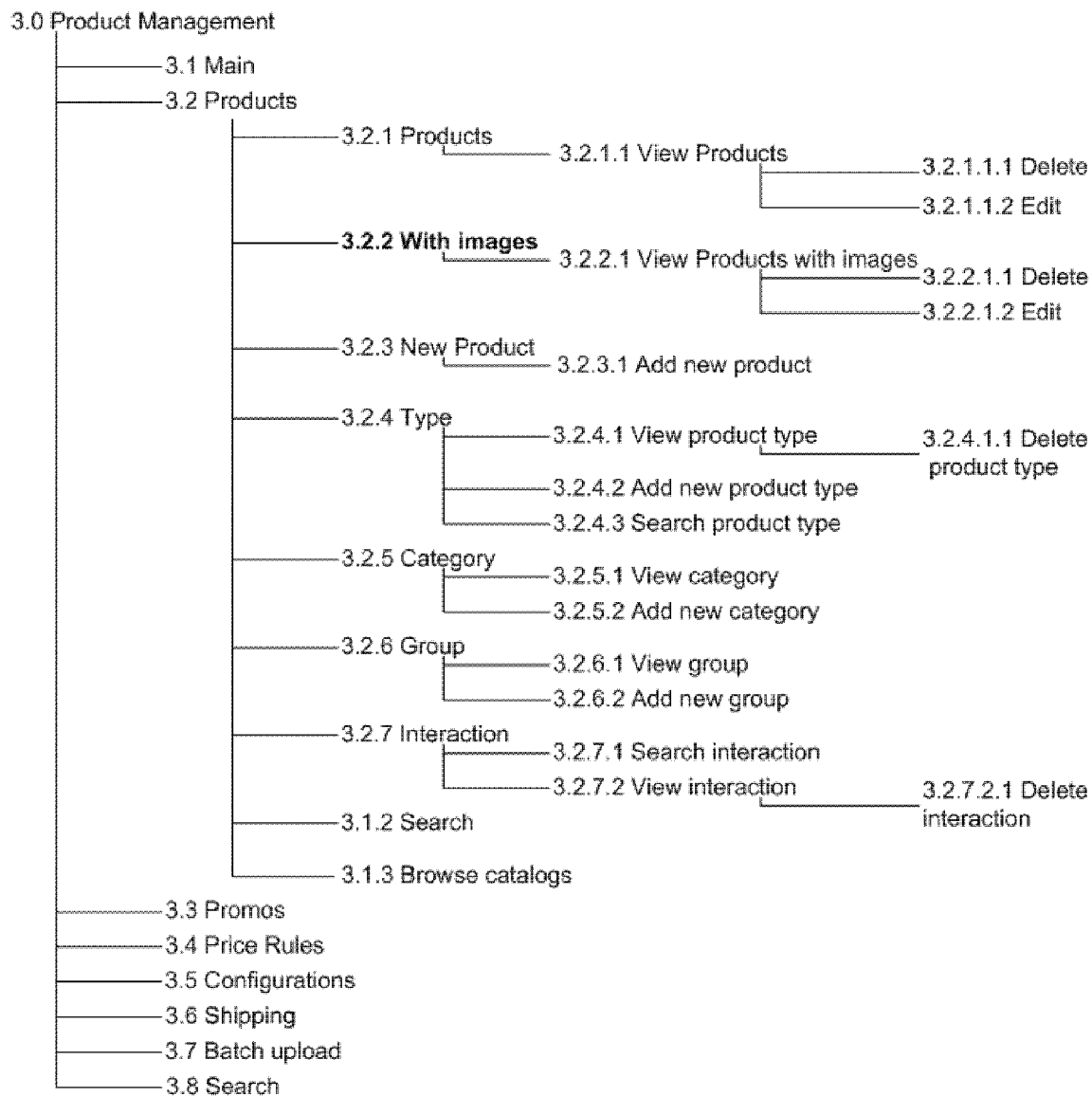
Figure 85:
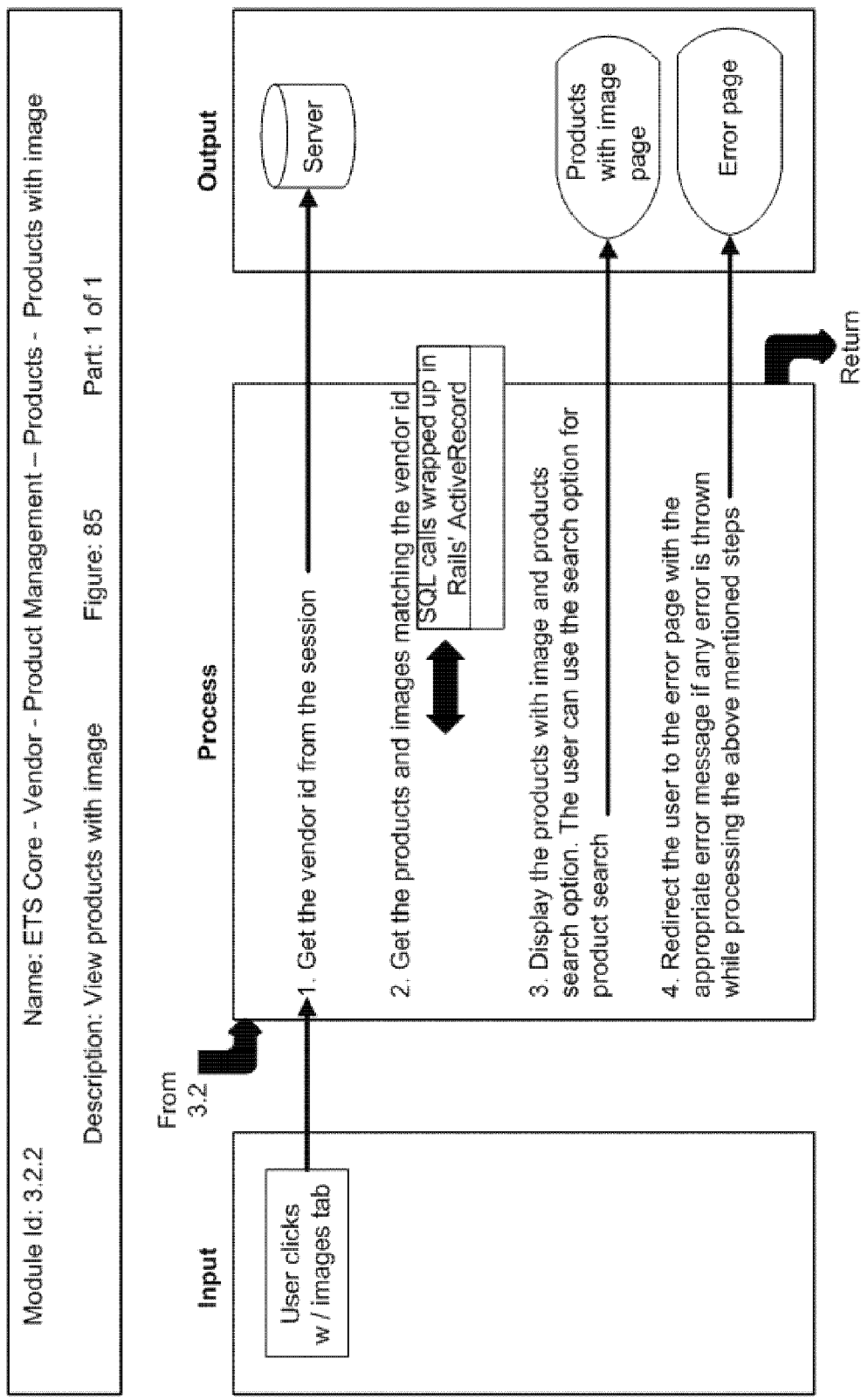
Figure 86A:
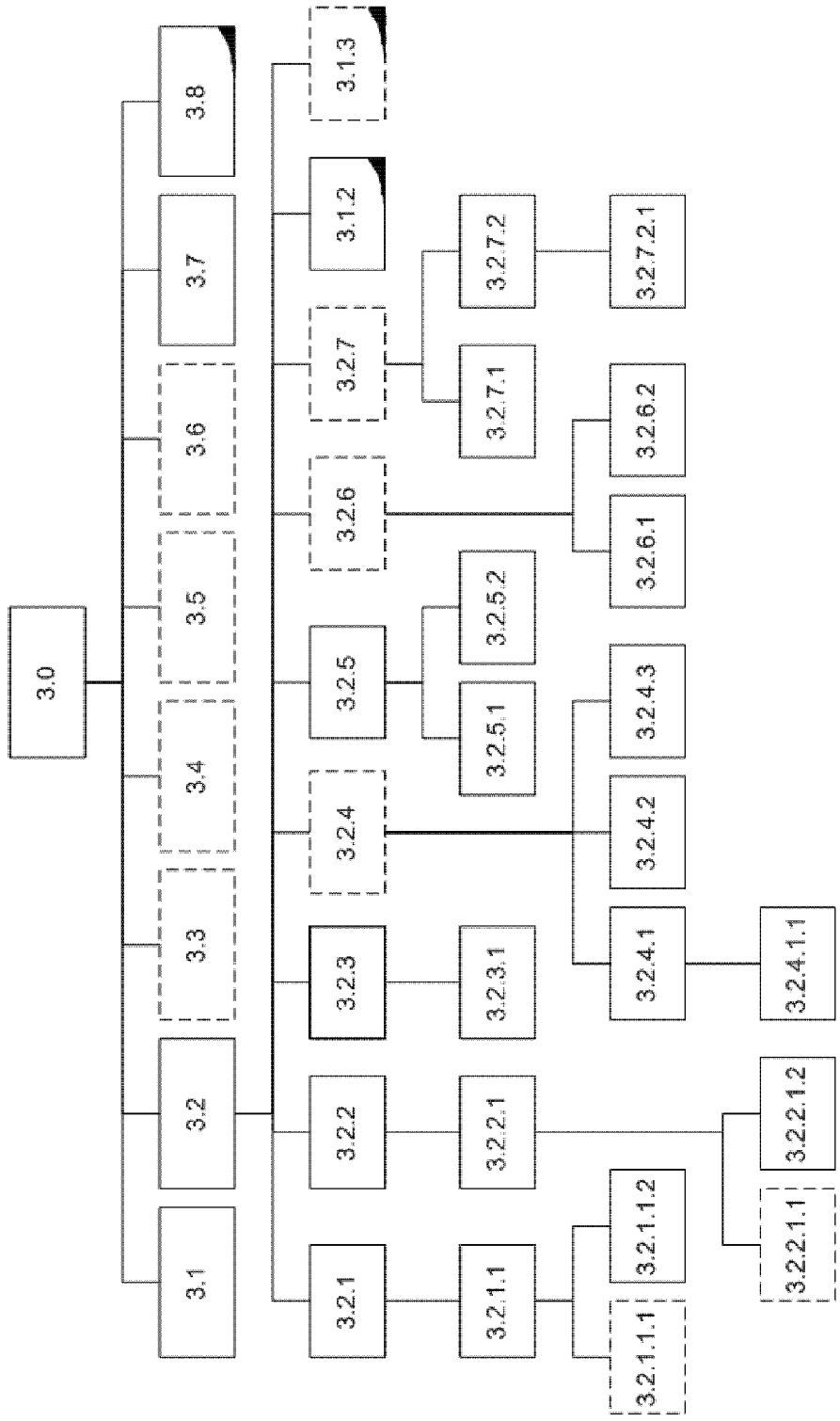
Figure 86B:
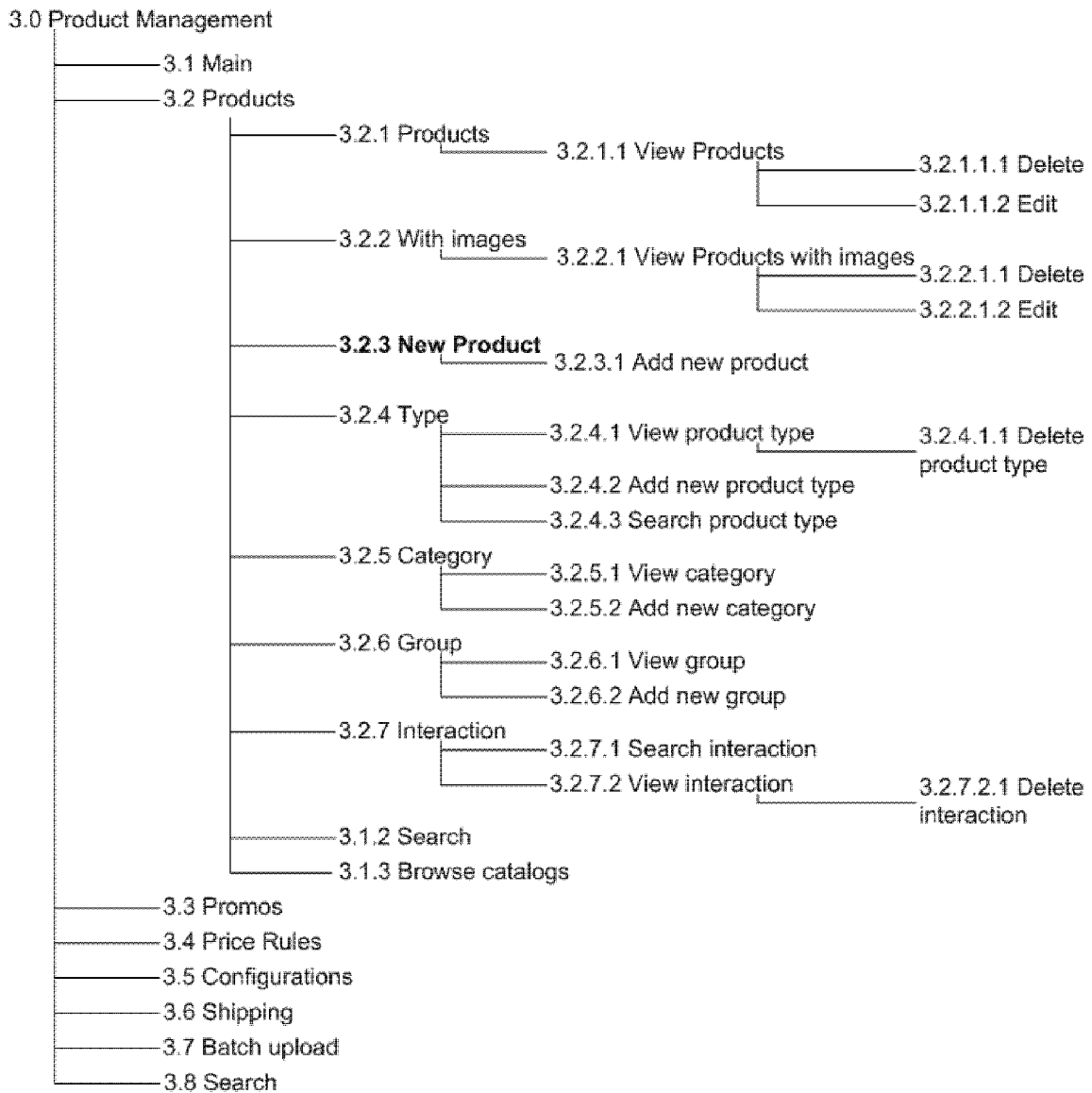
Figure 87:
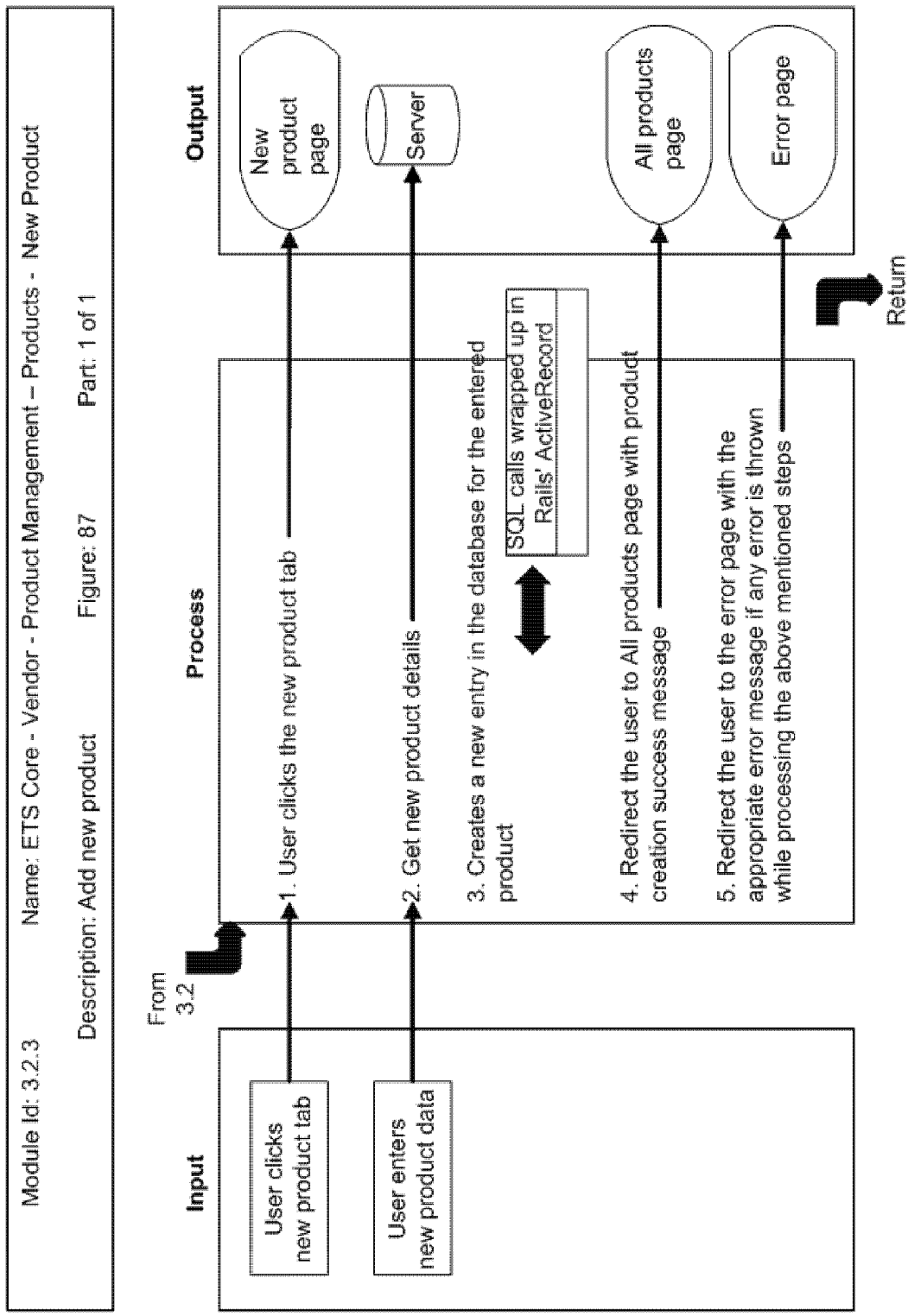
Figure 88:
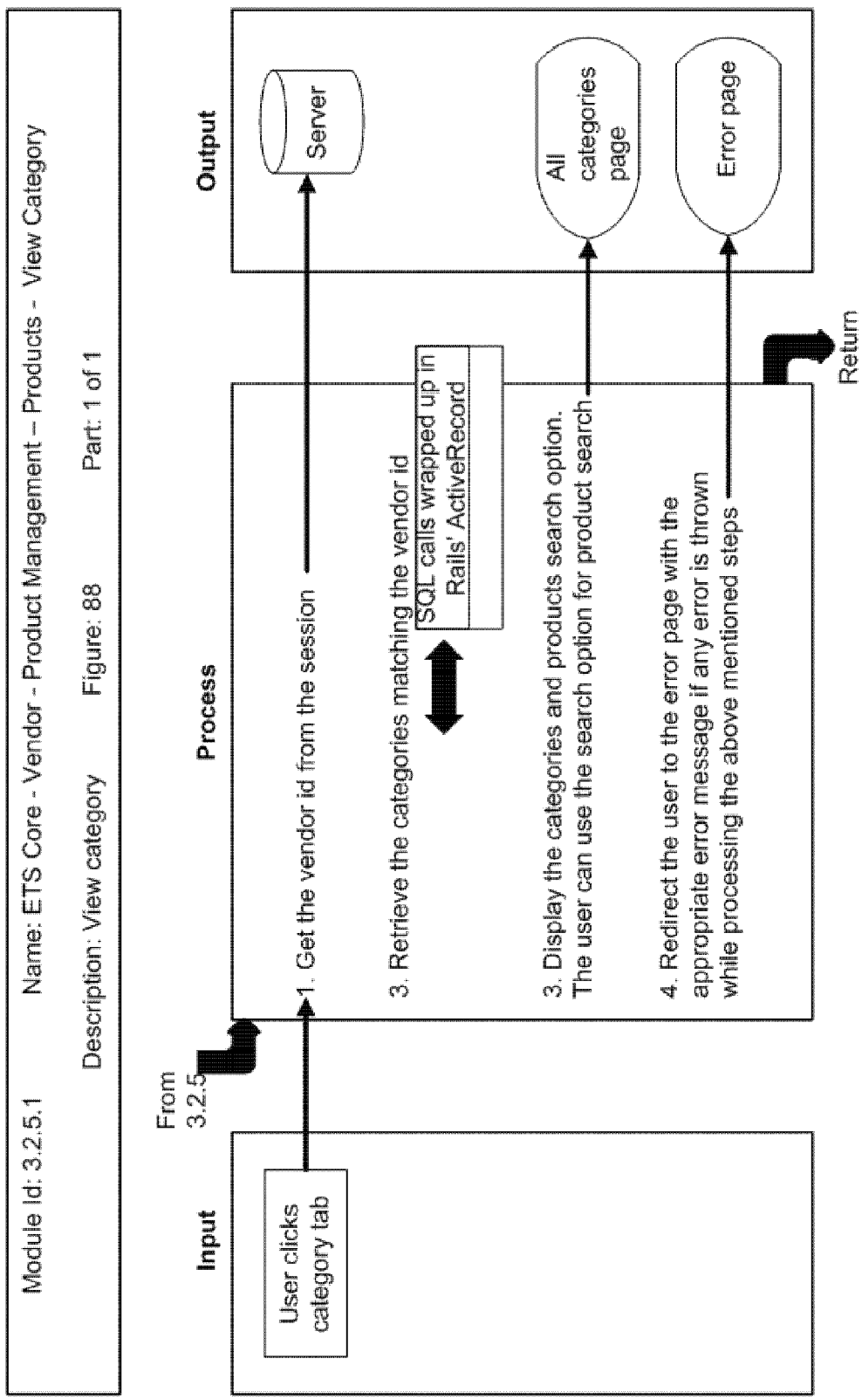
Figure 89:
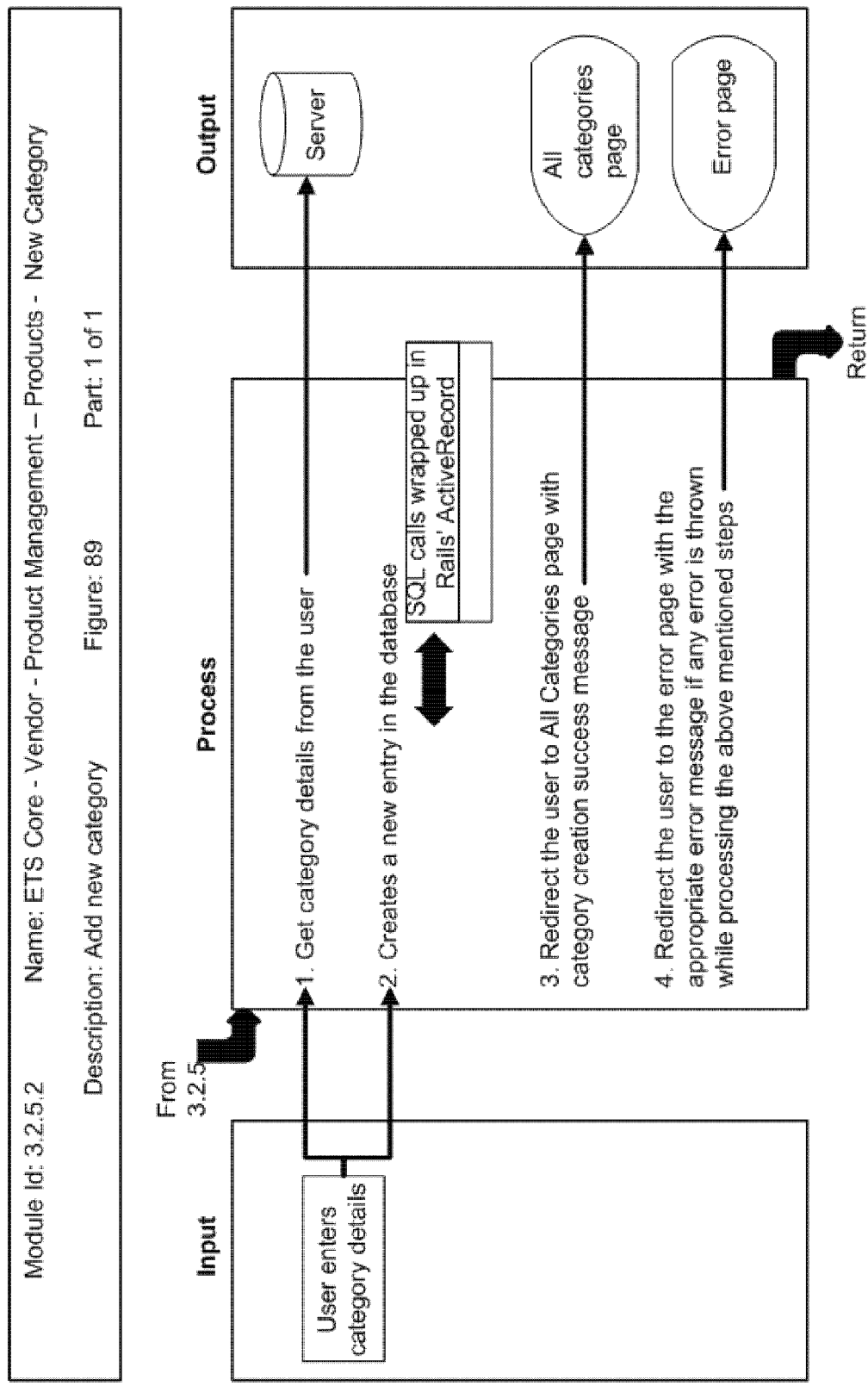
Figure 90:
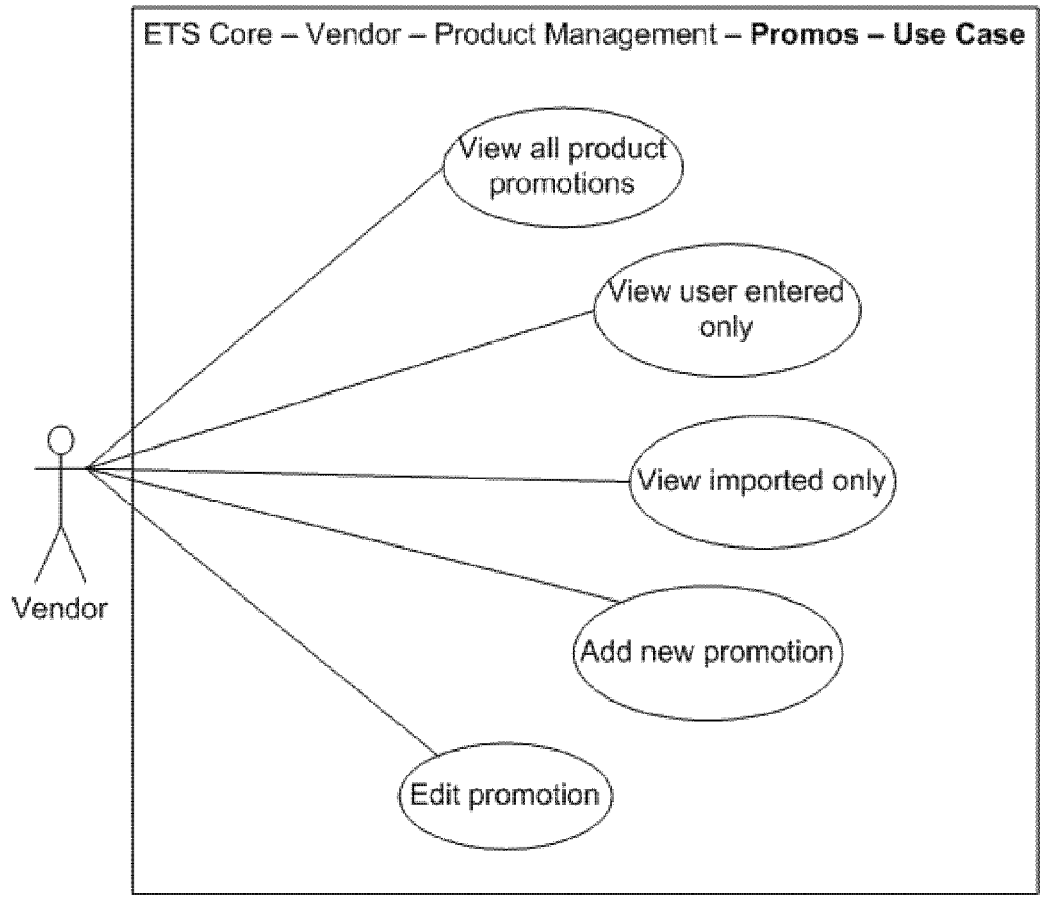
Figure 91:
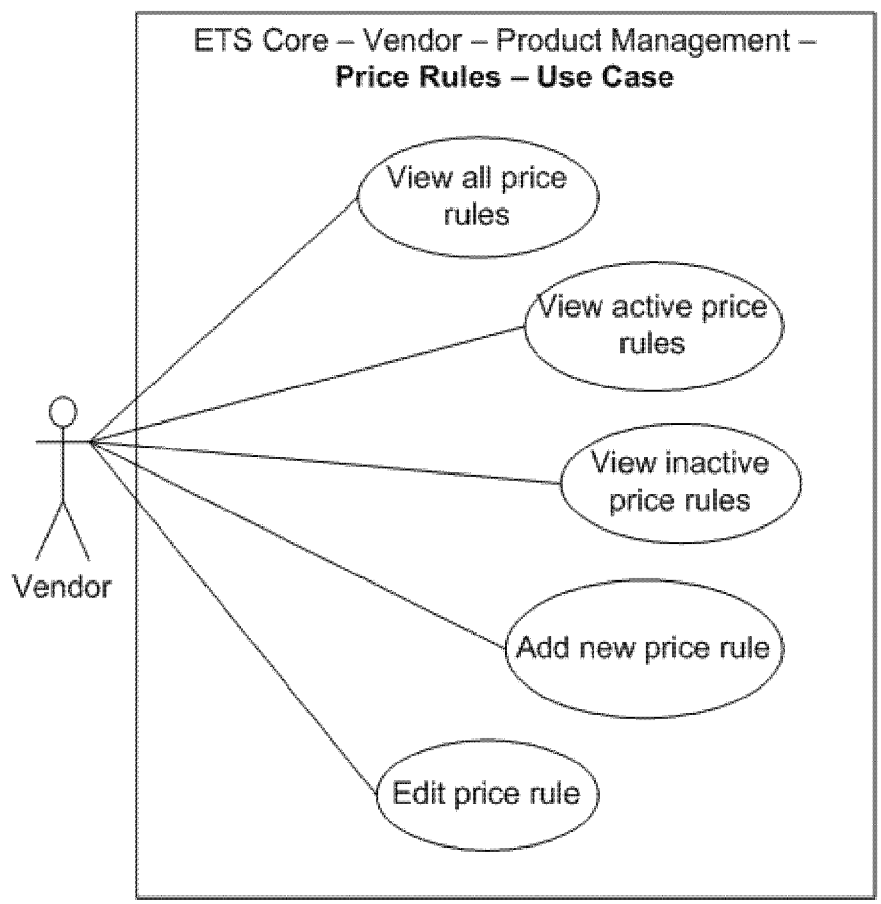
Figure 92:
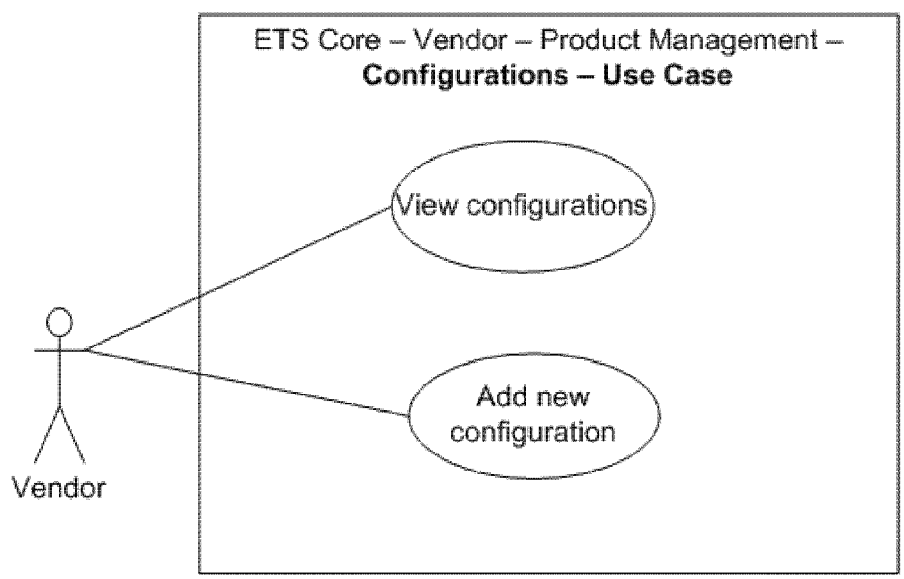
Figure 93:
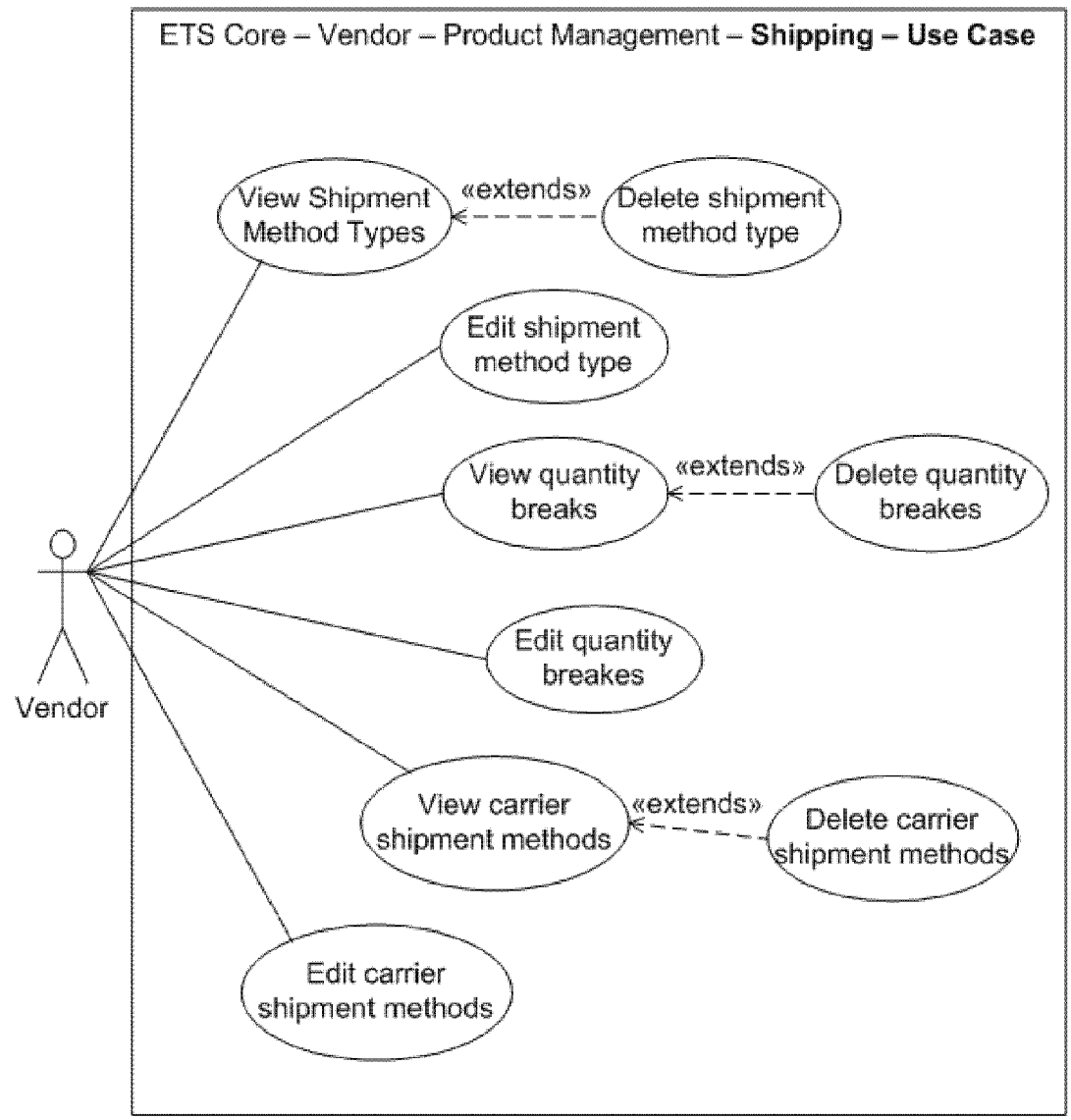
Figure 94:
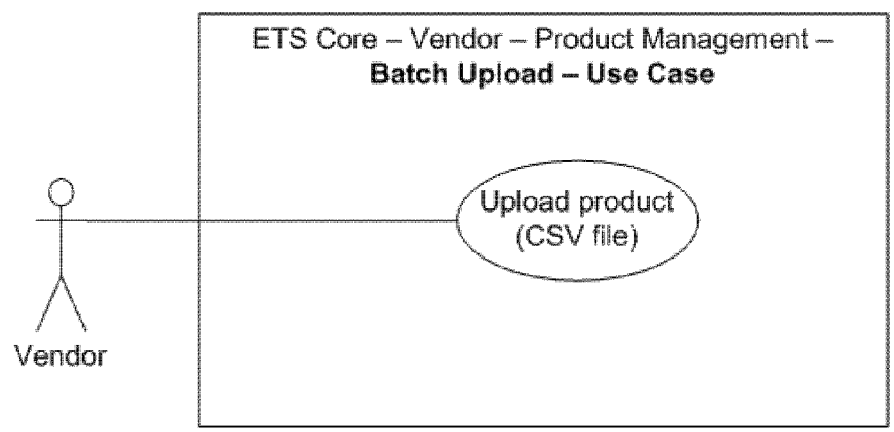
Figure 95A:
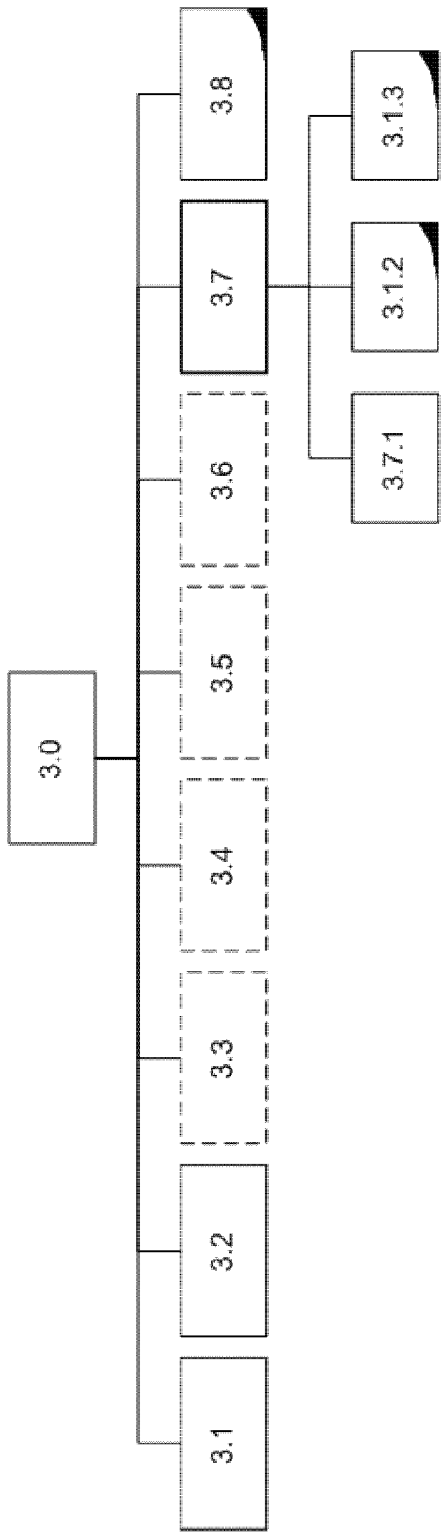
Figure 95B:
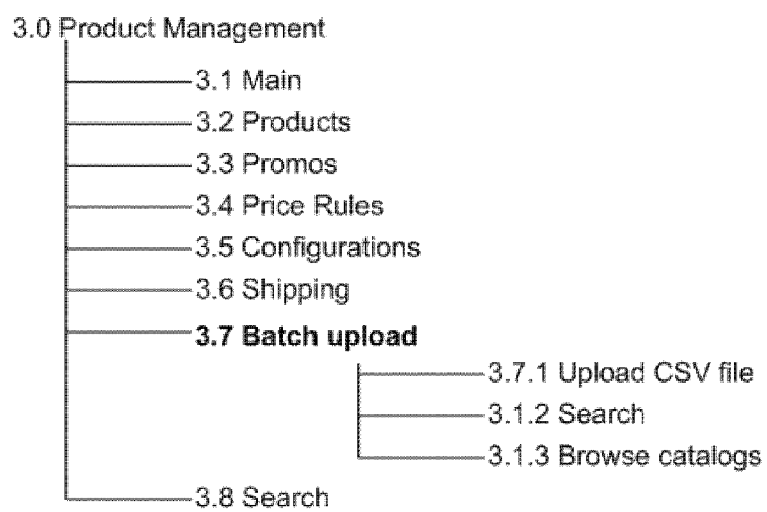
Figure 96:
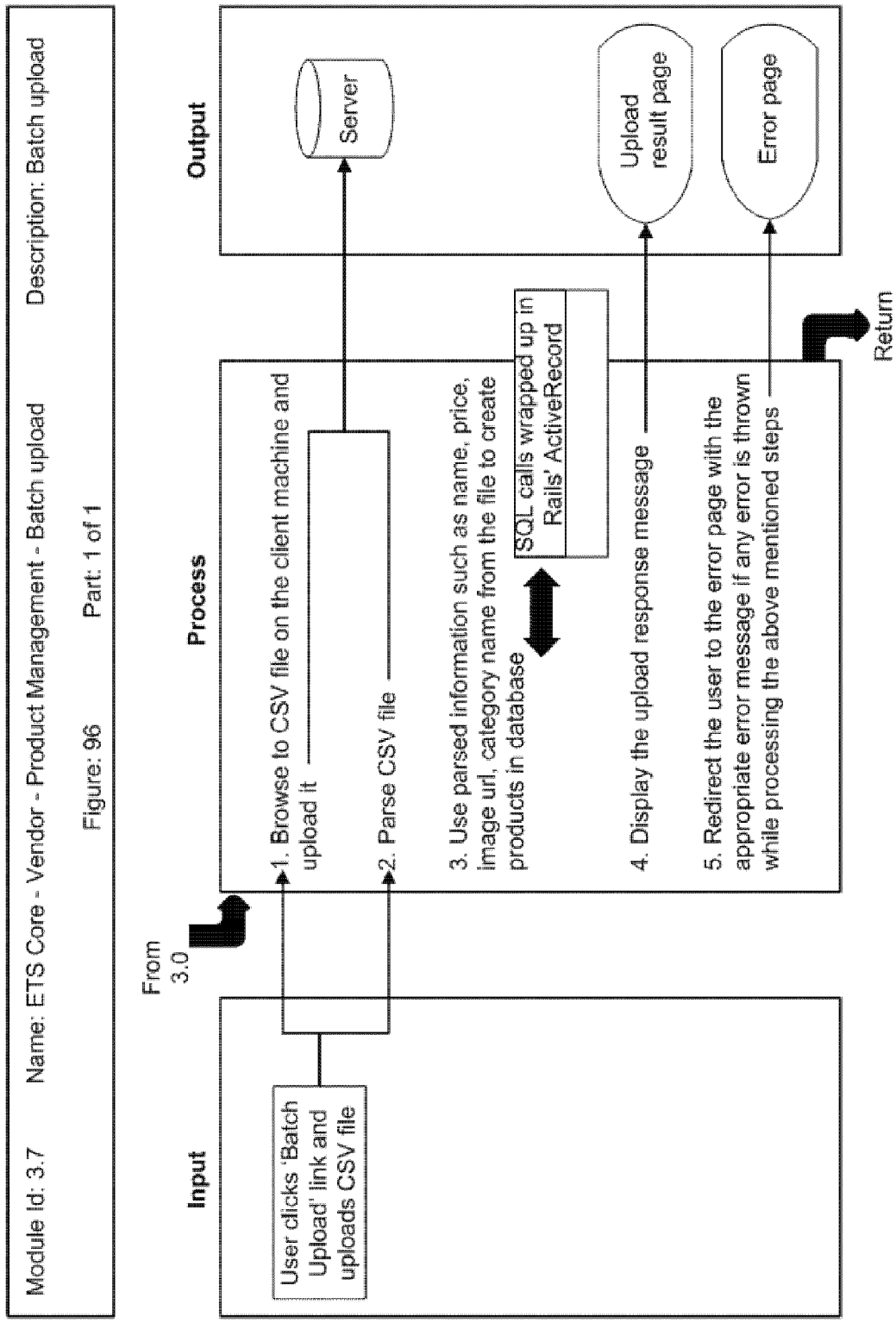
Figure 97:
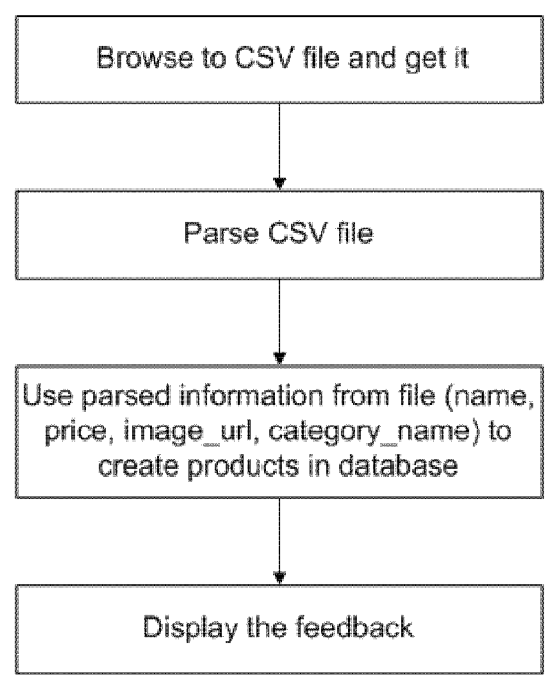
Figure 98A:
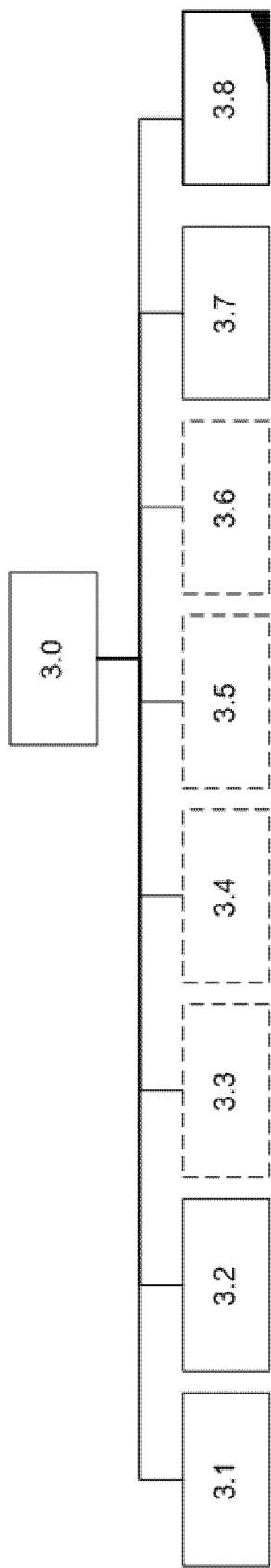
Figure 98B:
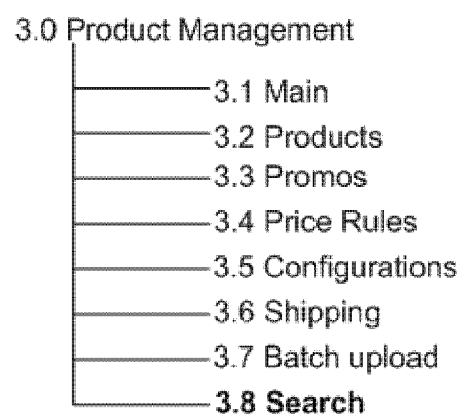
Figure 99:
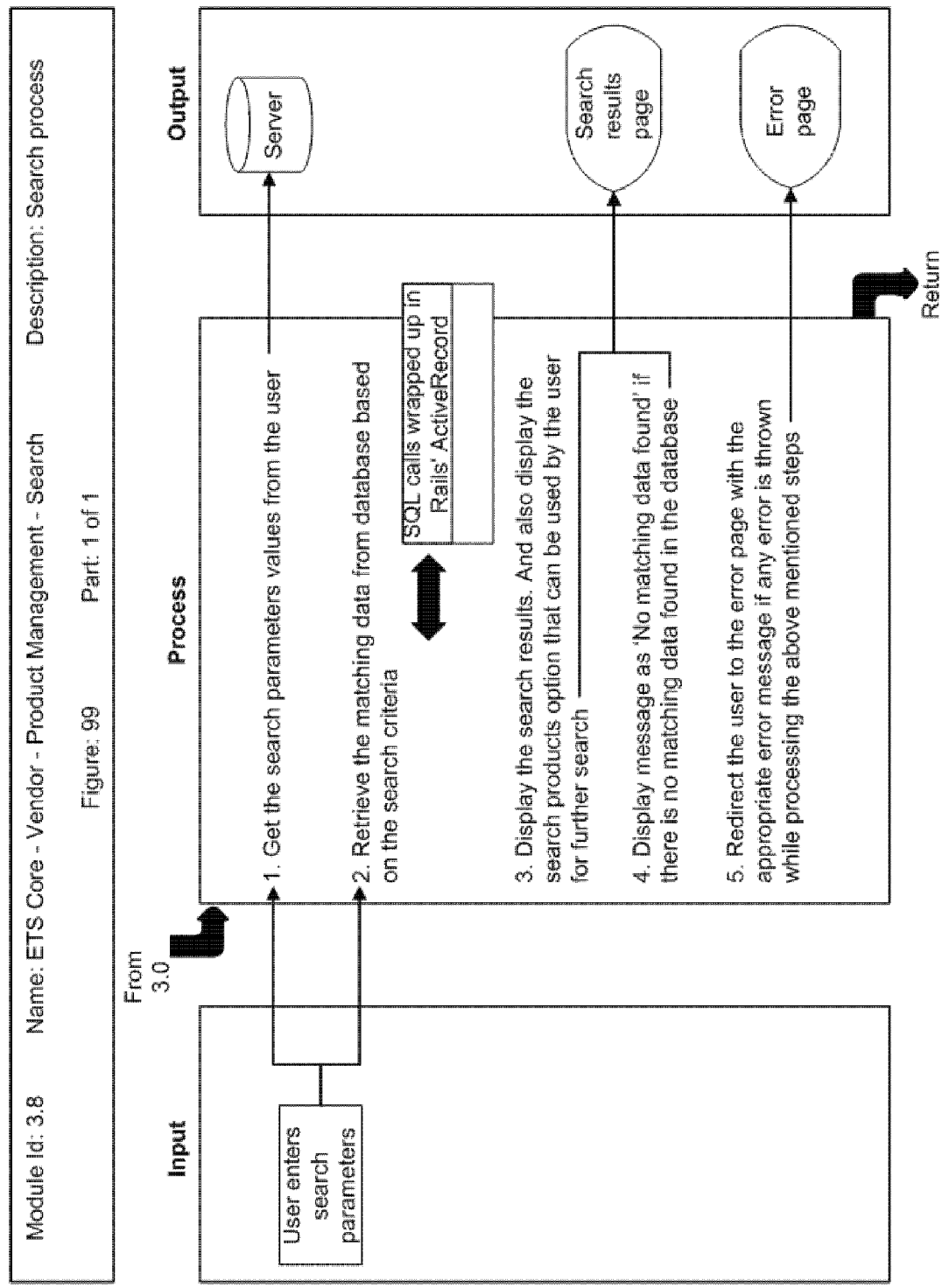
Figure 100:
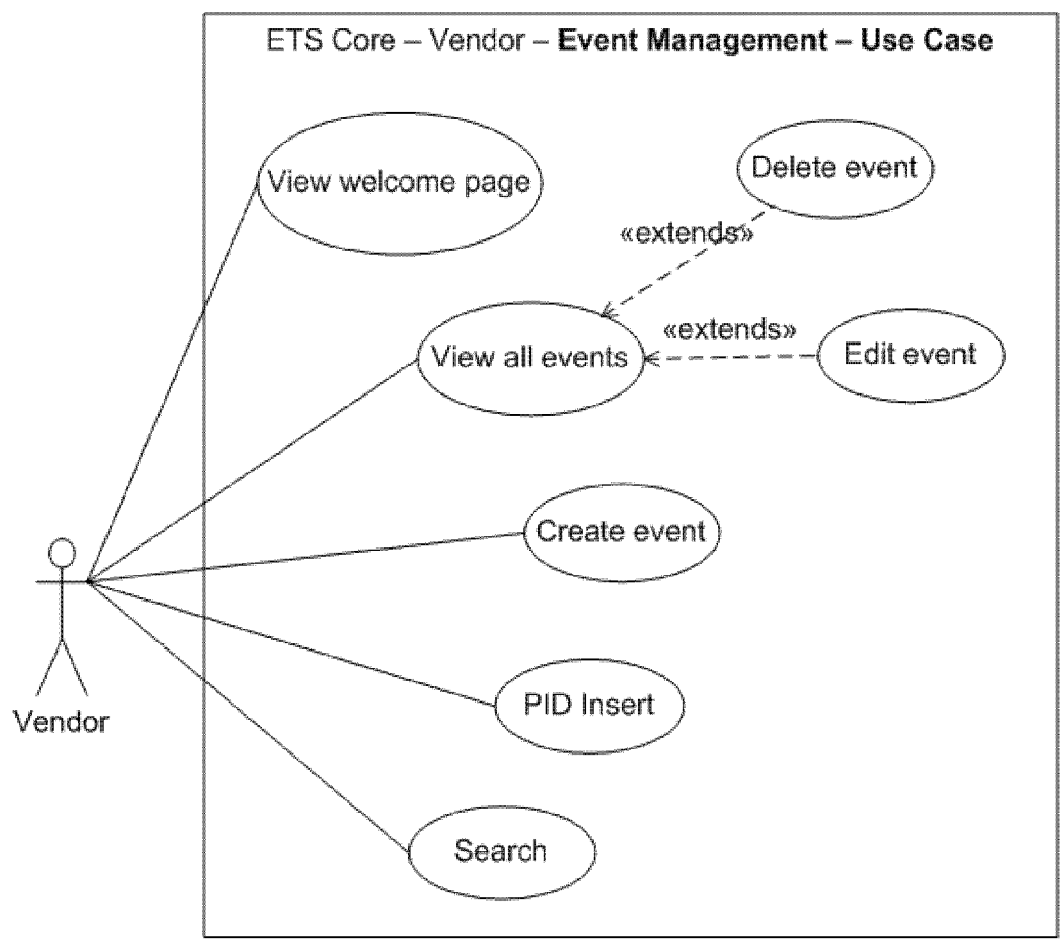
Figure 101A:
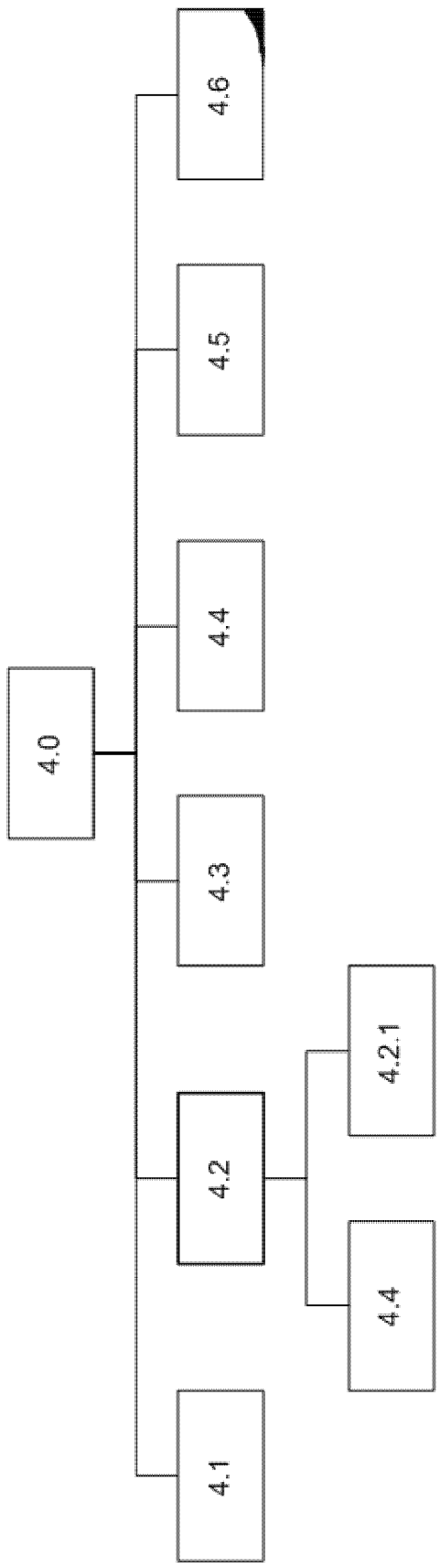
Figure 101B:
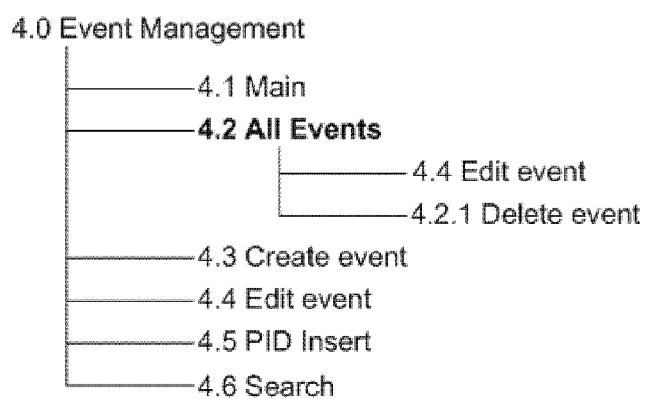
Figure 102:
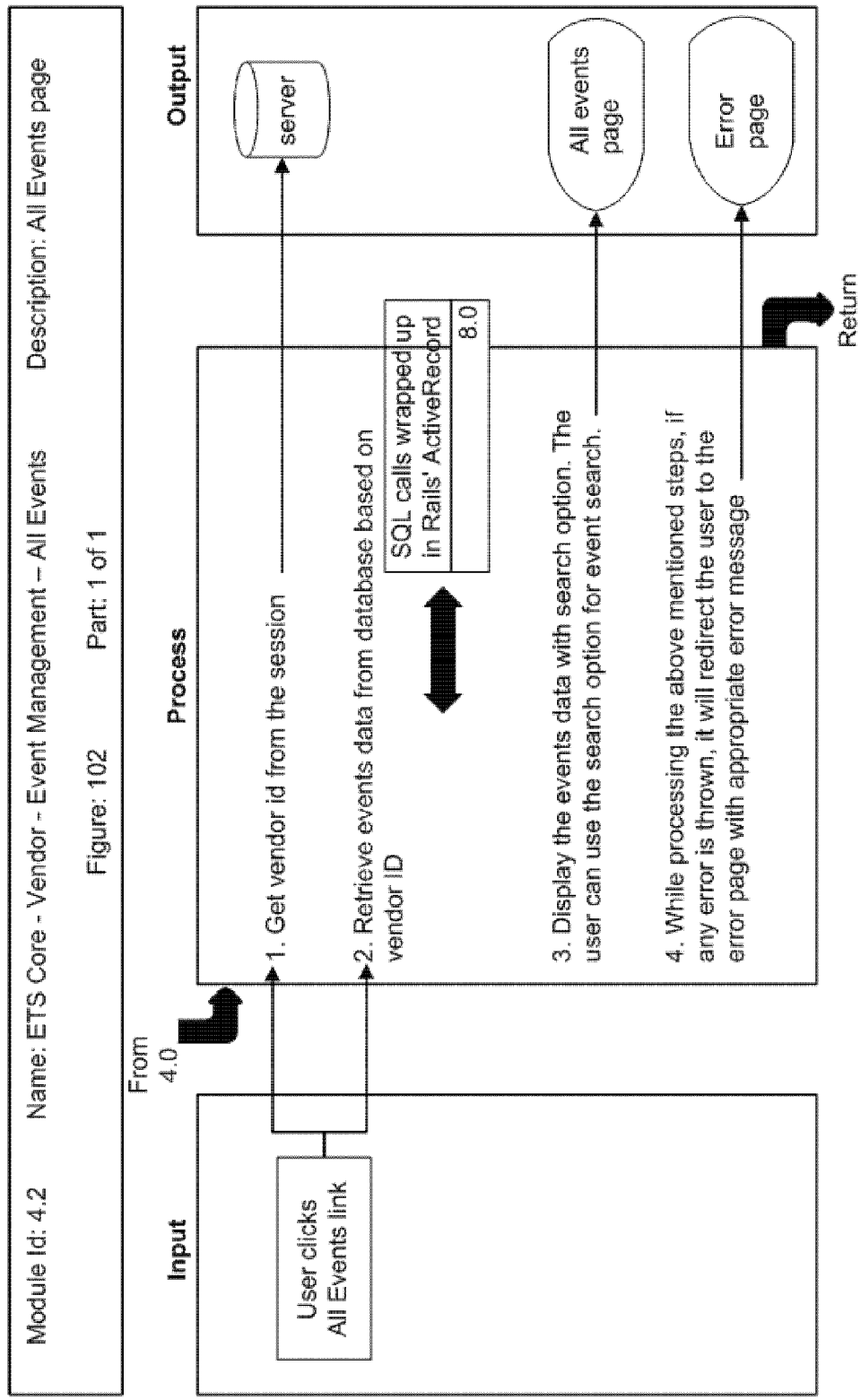
Figure 103A:
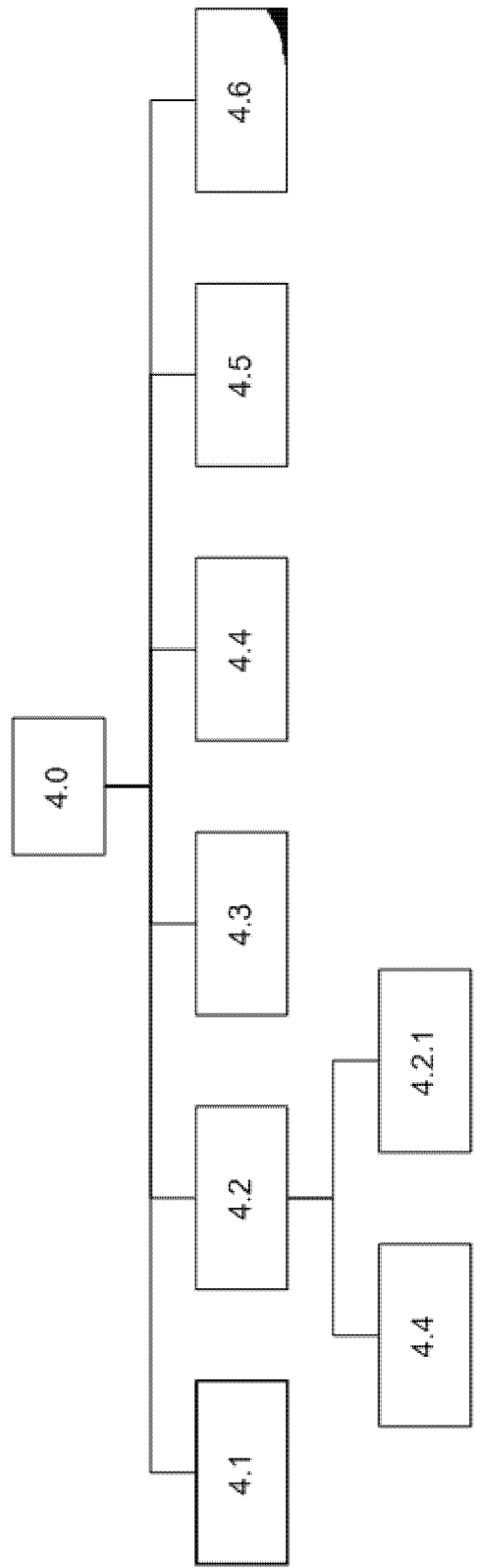
Figure 103B:
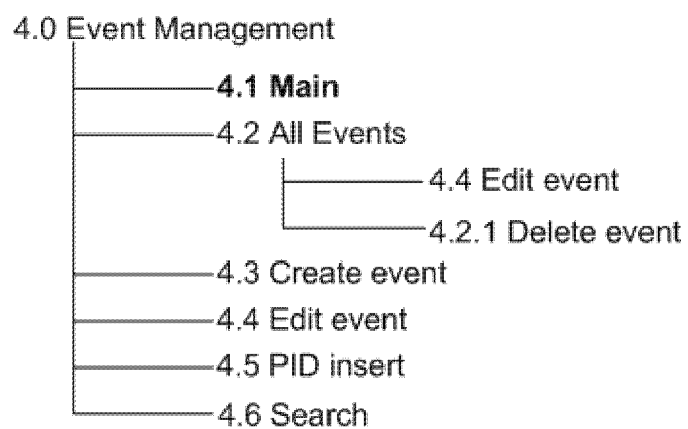
Figure 104:
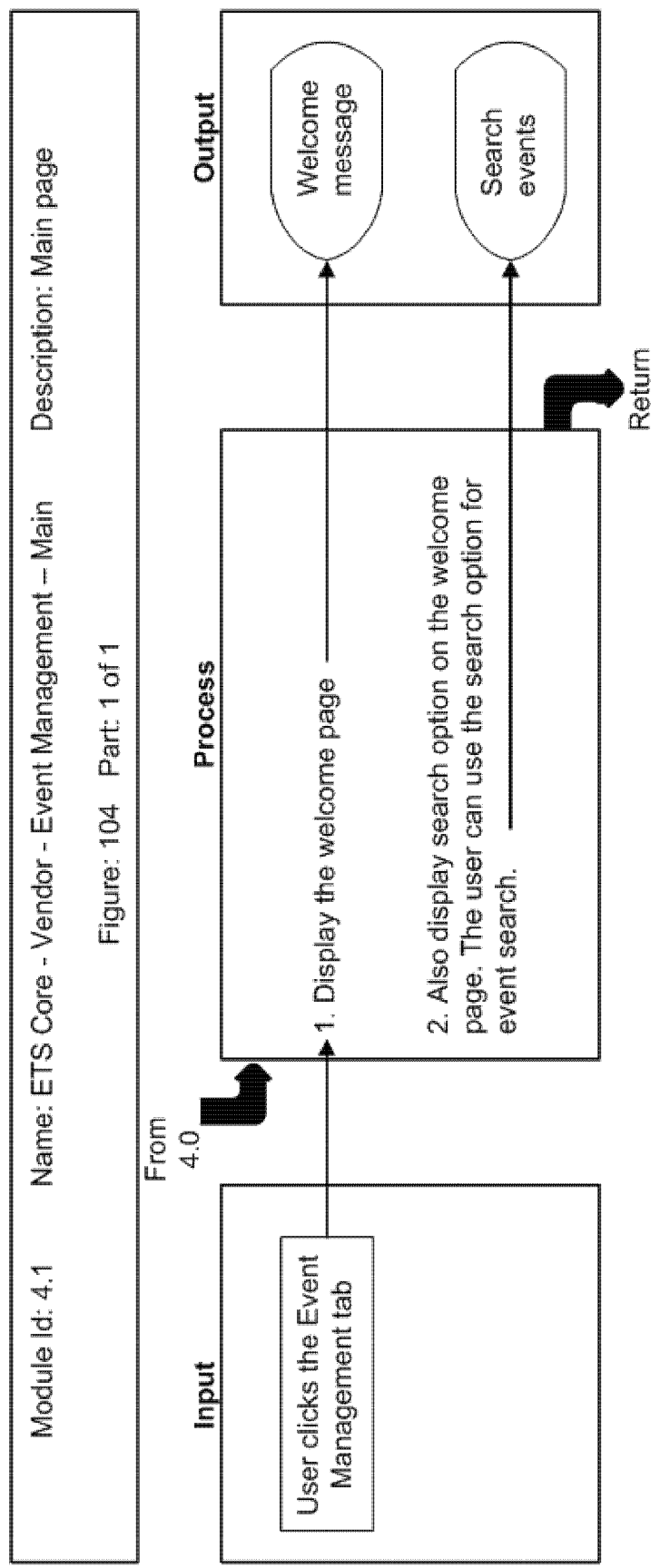
Figure 105A:
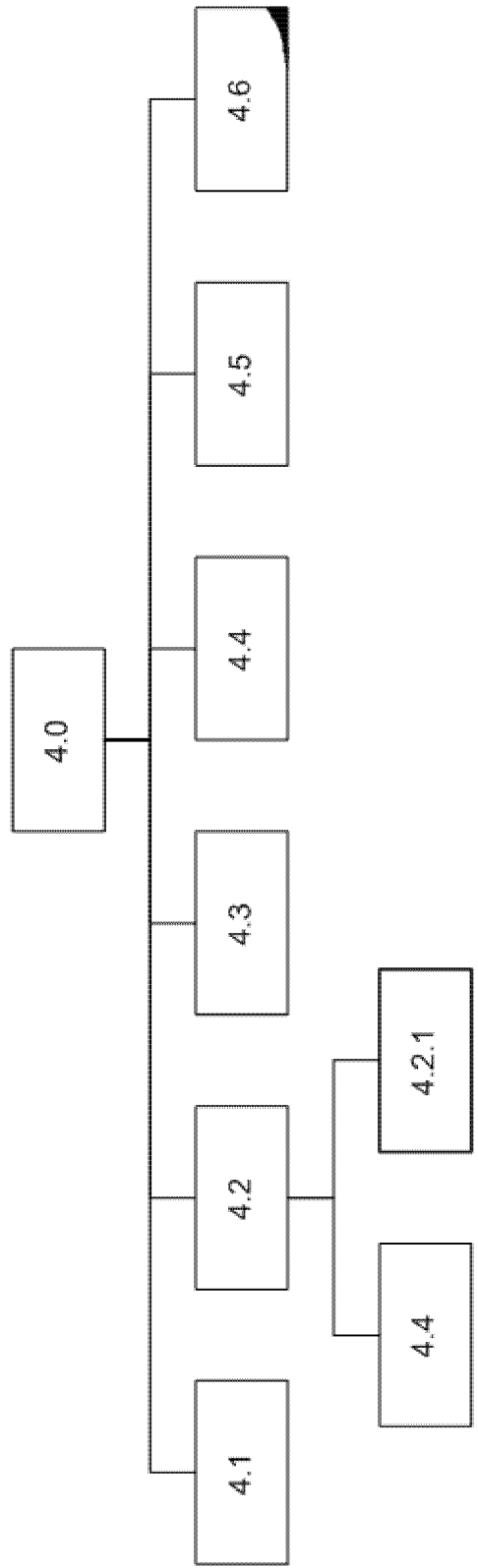
Figure 105B:
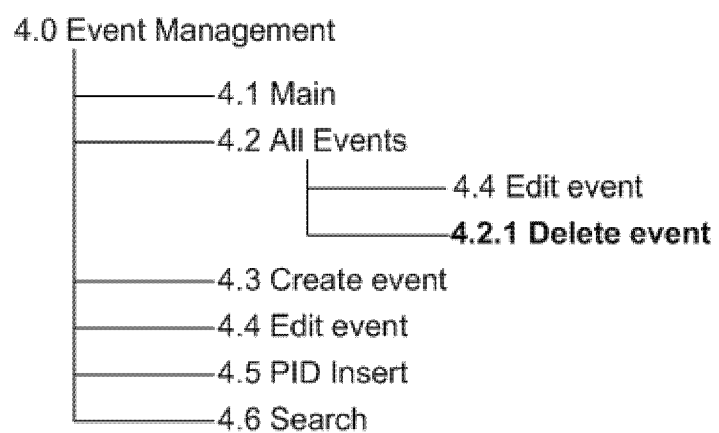
Figure 106:
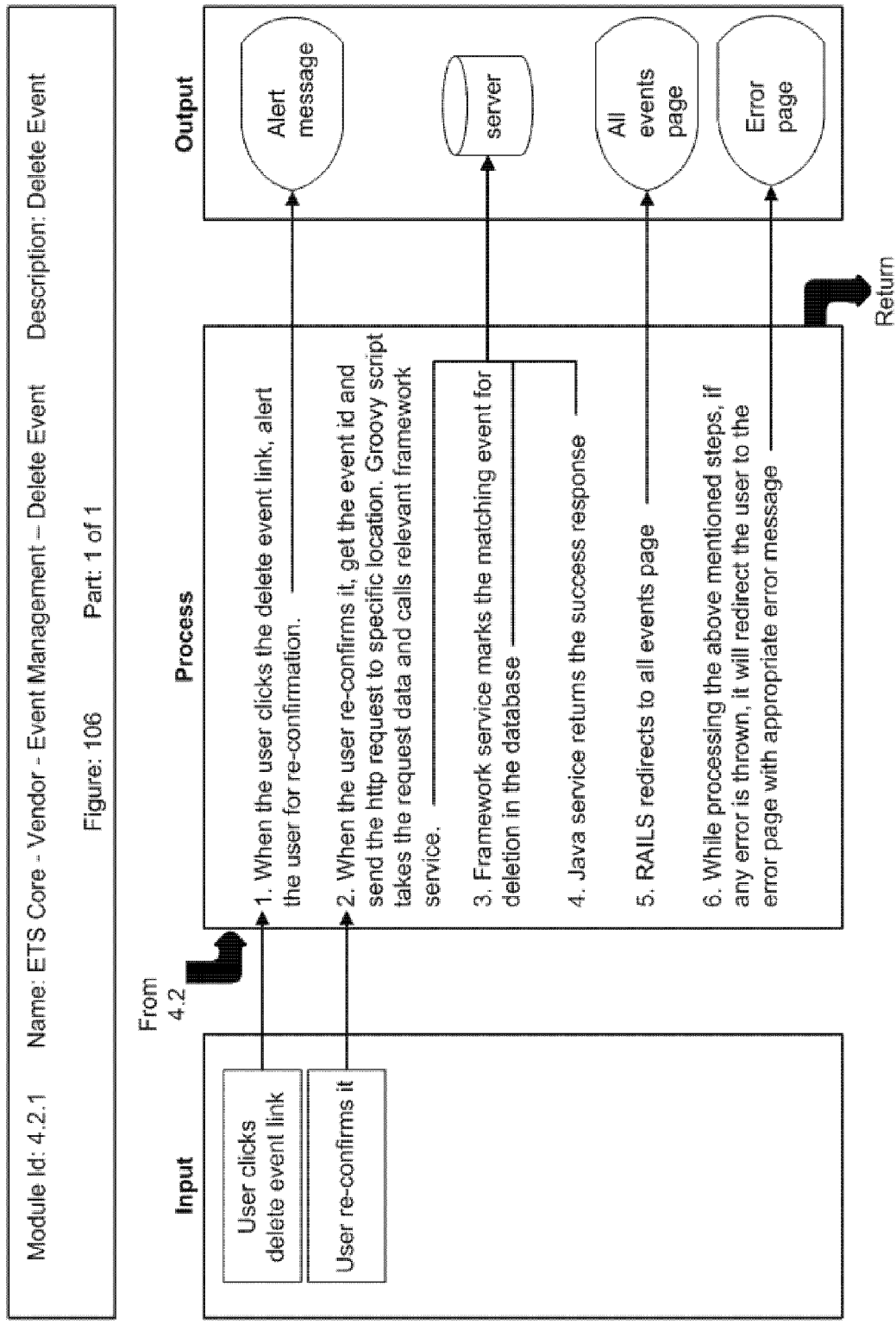
Figure 107:
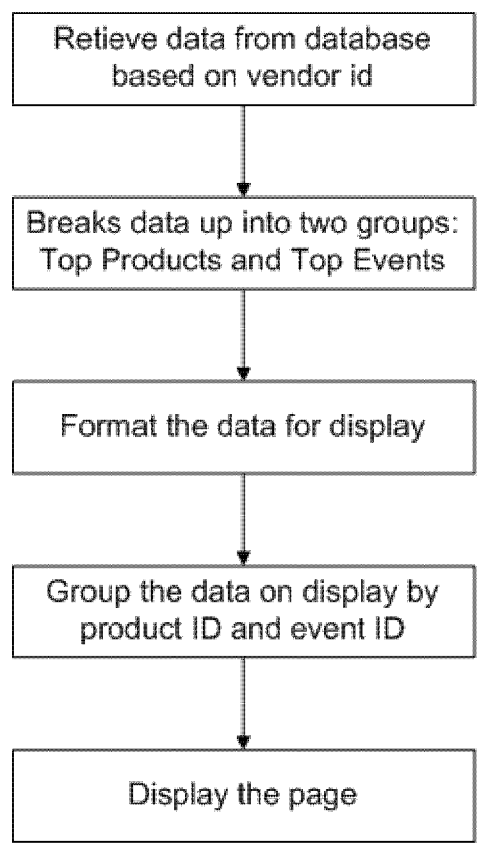
Figure 108A:
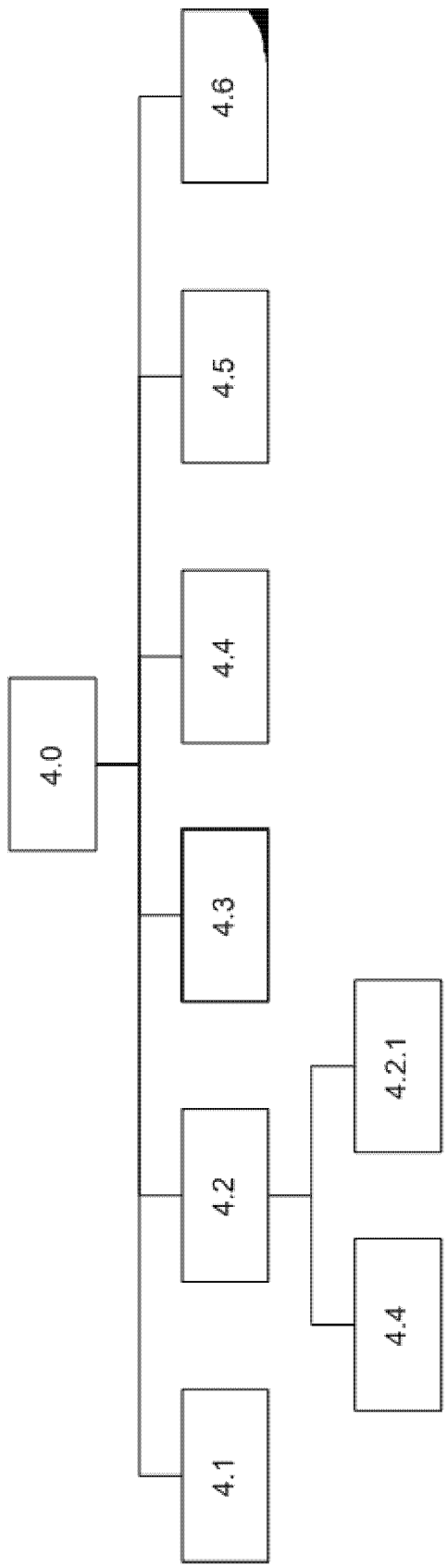
Figure 108B:
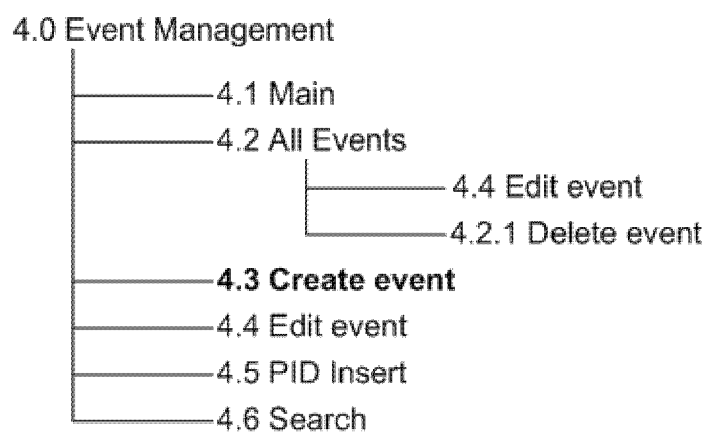
Figure 109:
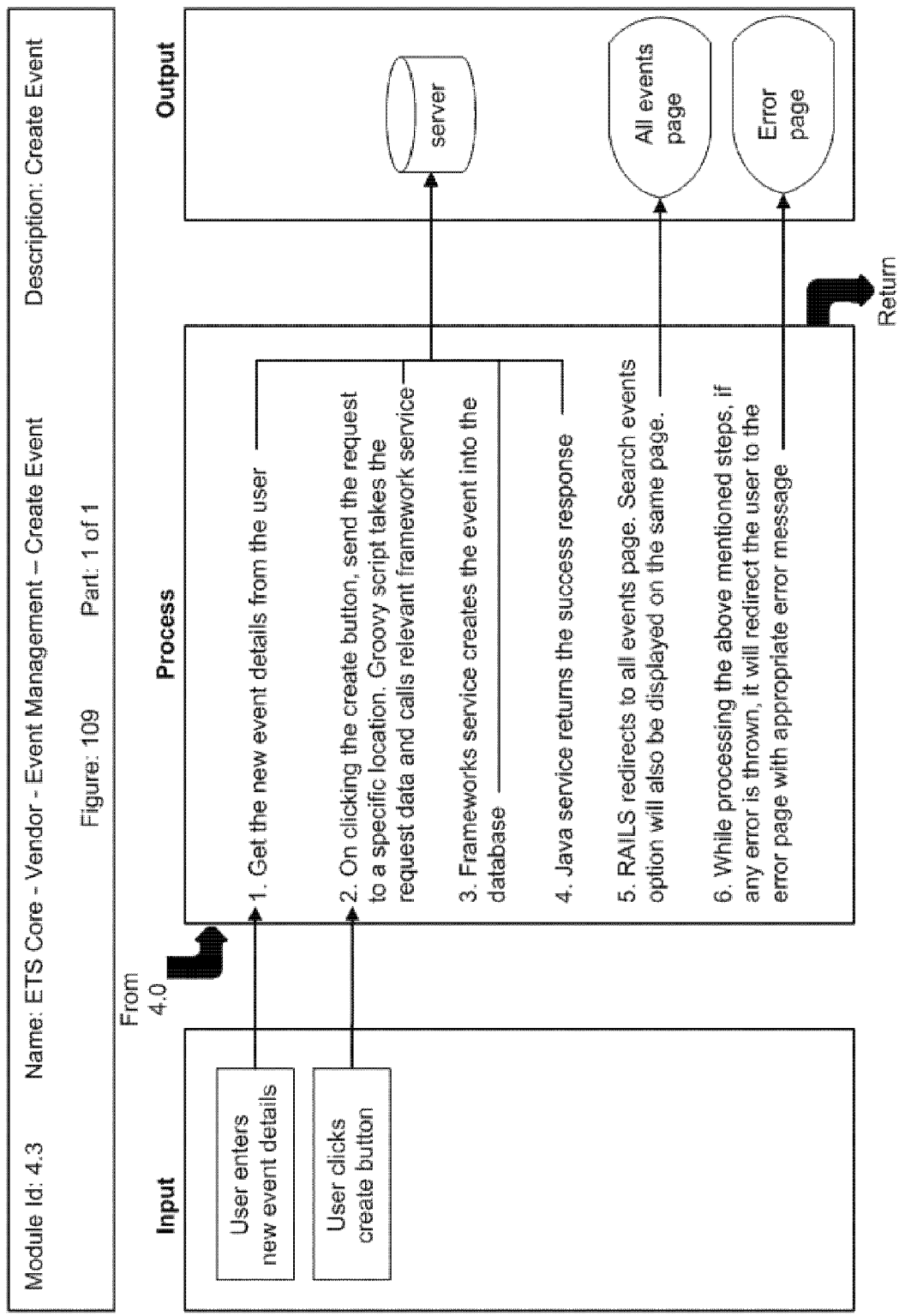
Figure 110:
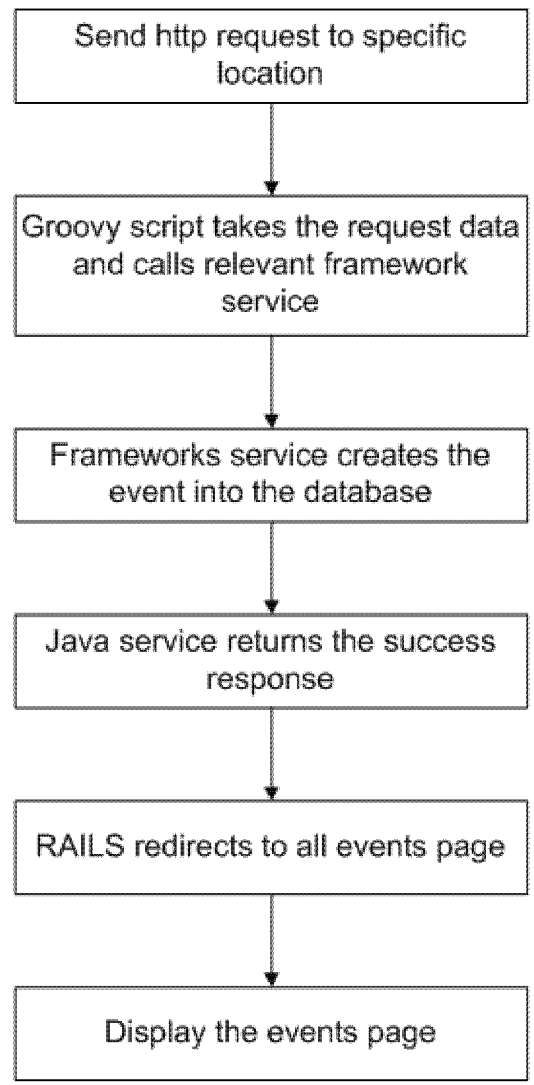
Figure 111:
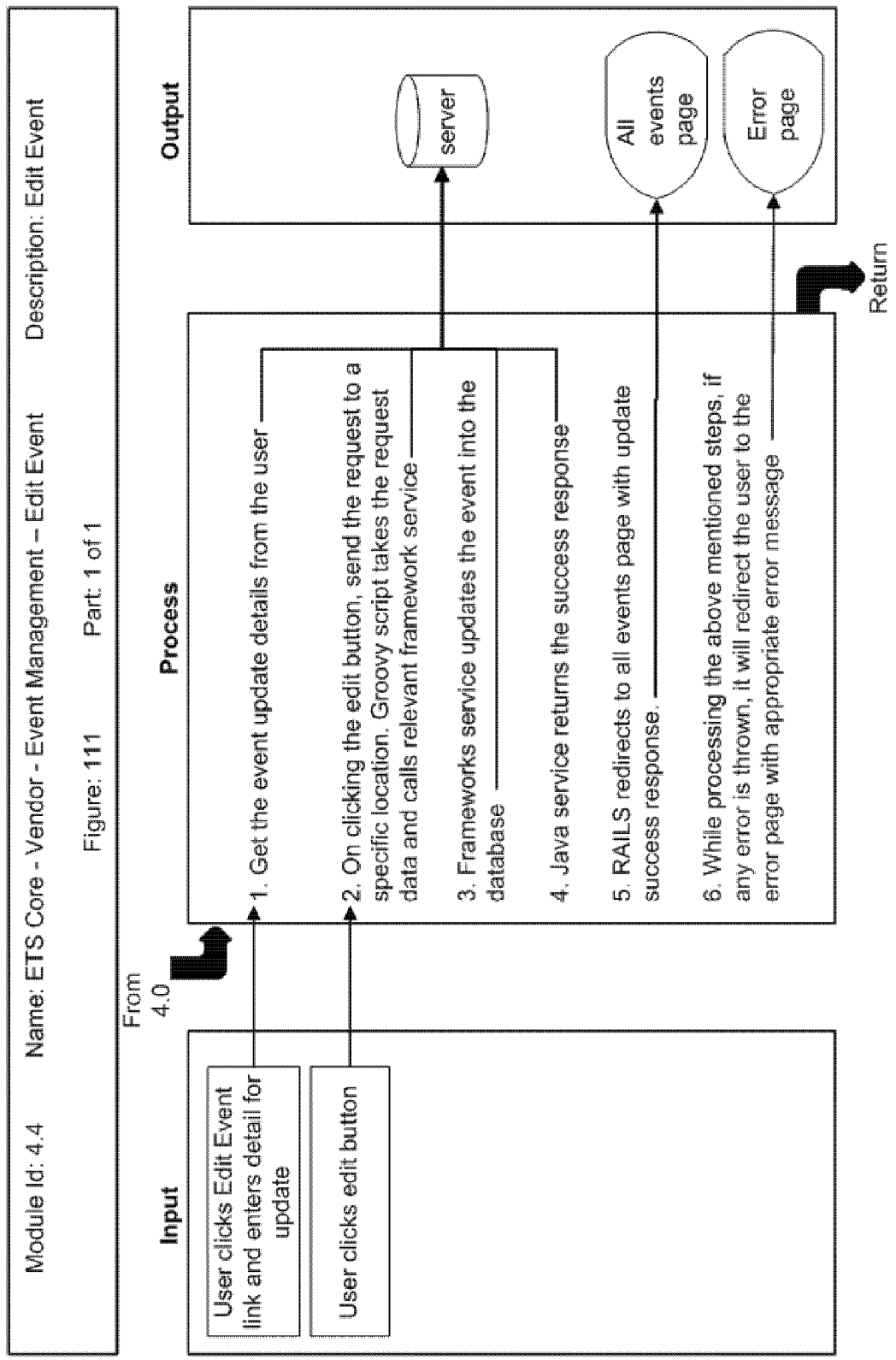
Figure 112:
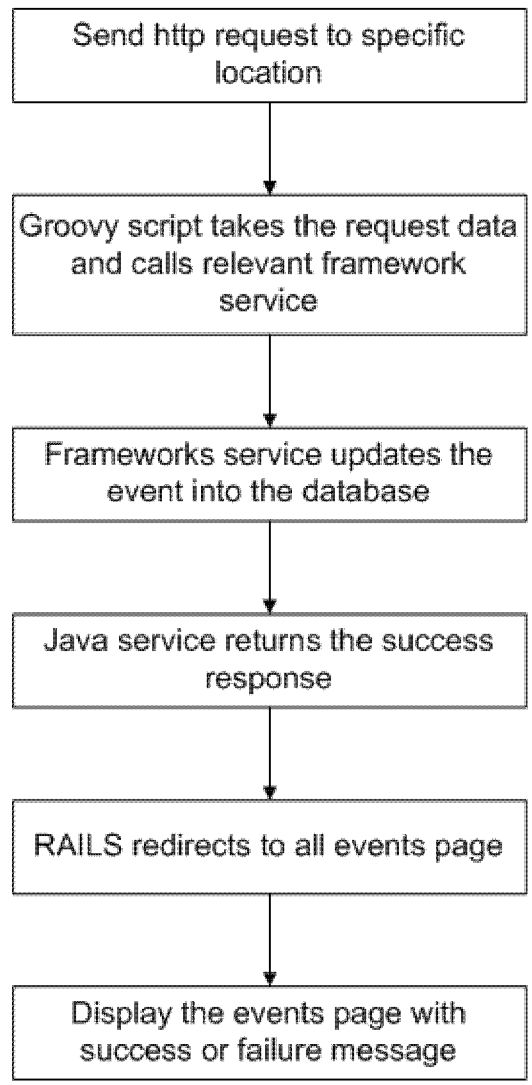
Figure 113A:
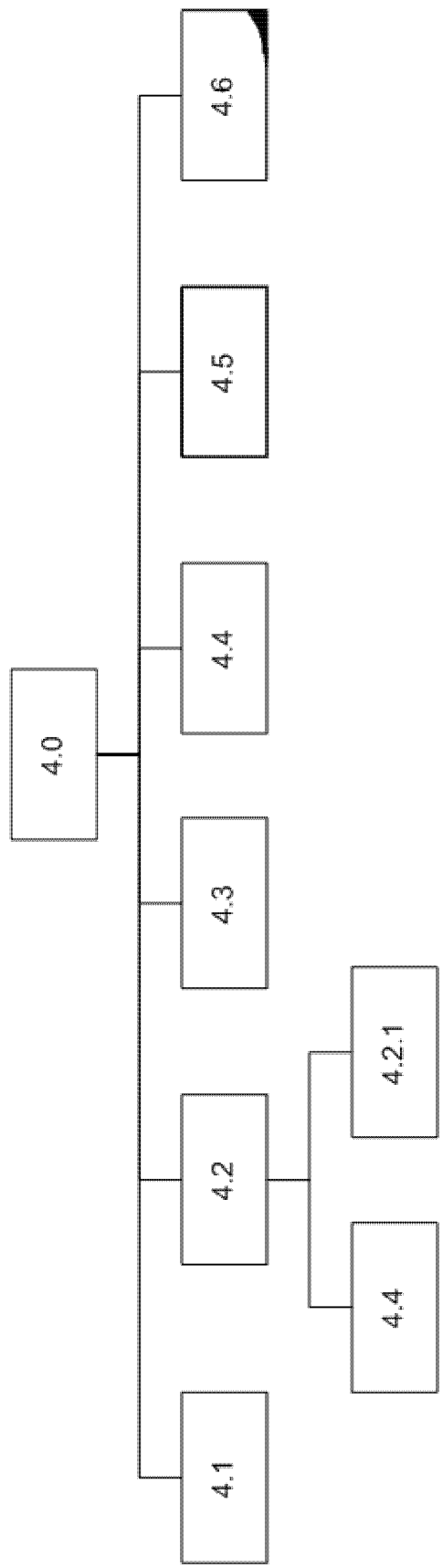
Figure 113B:
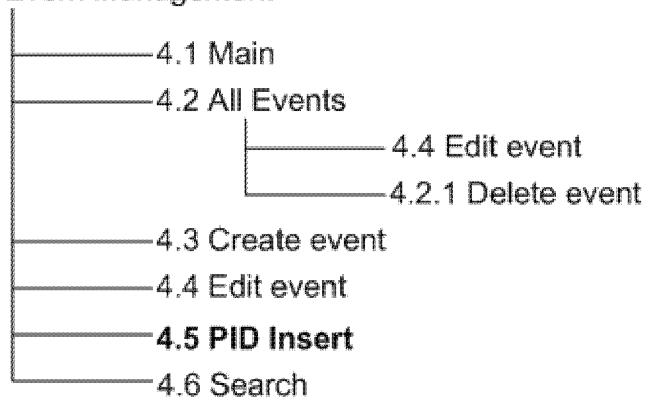
Figure 114:
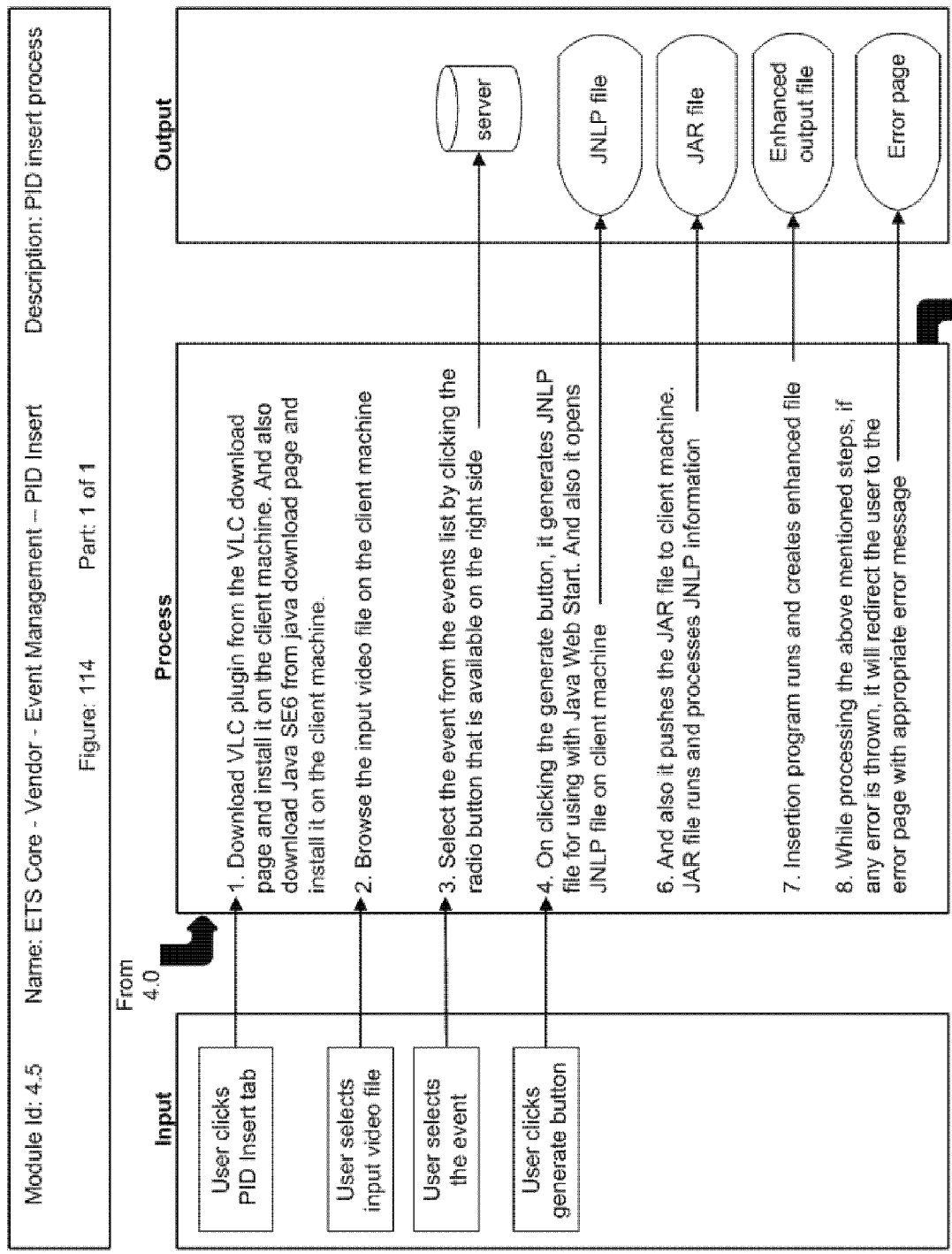
Figure 115:
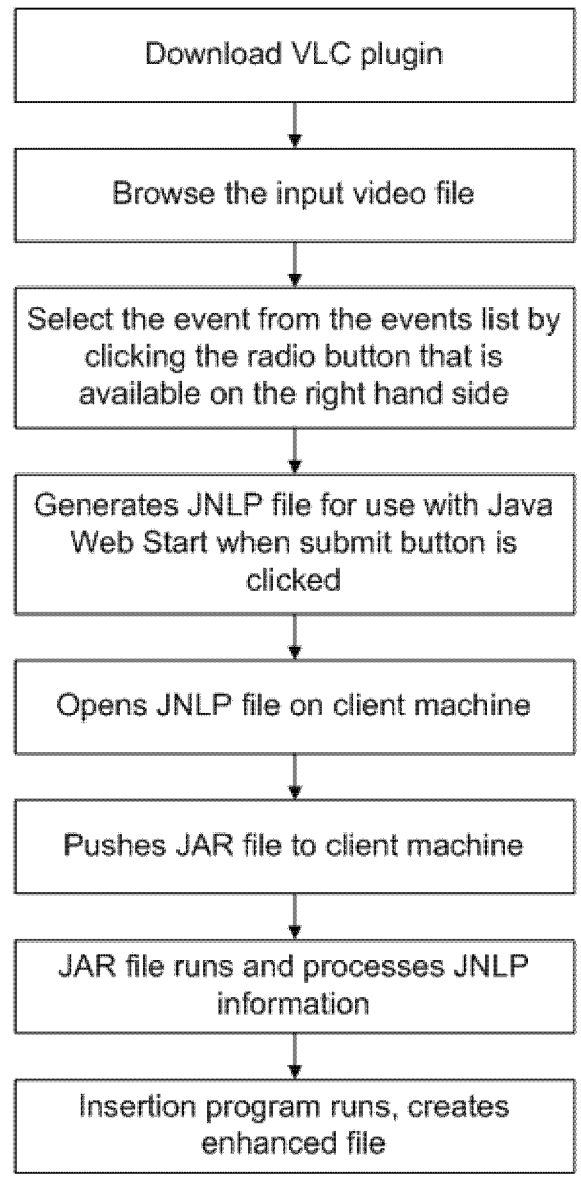
Figure 116A:
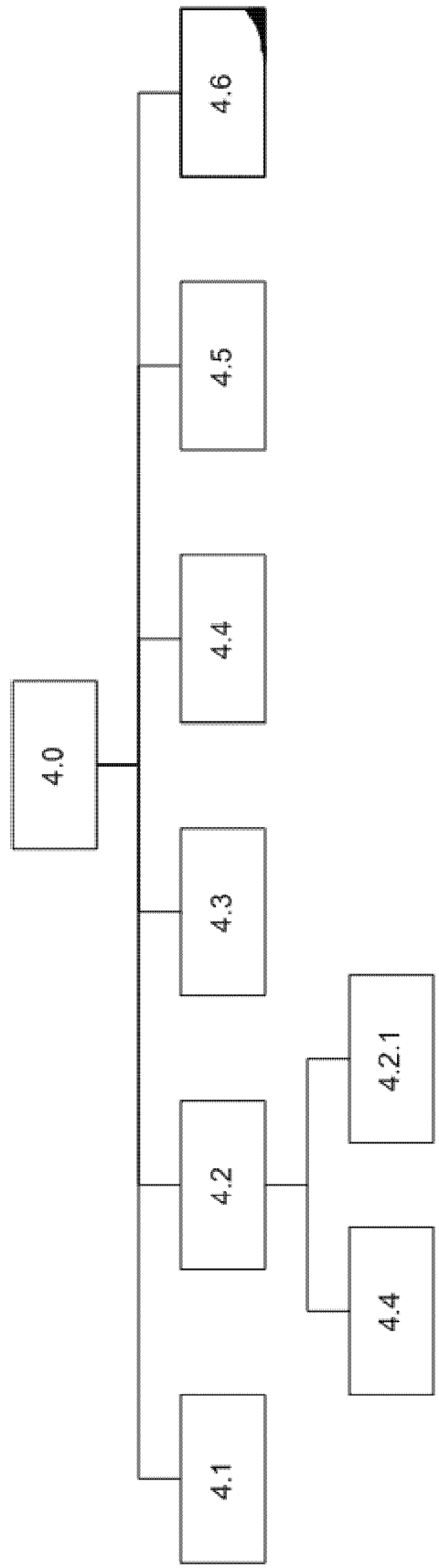
Figure 116B:
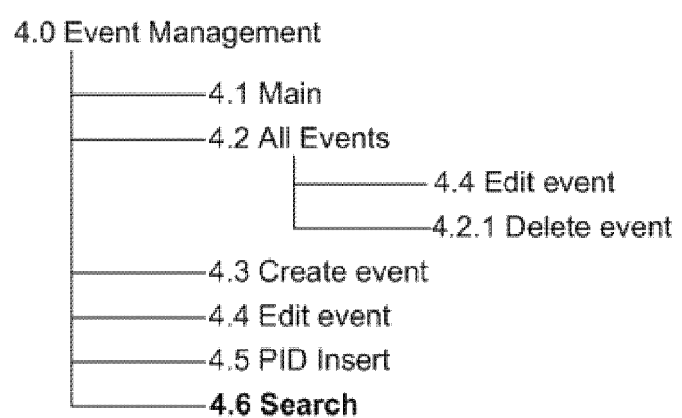
Figure 117:
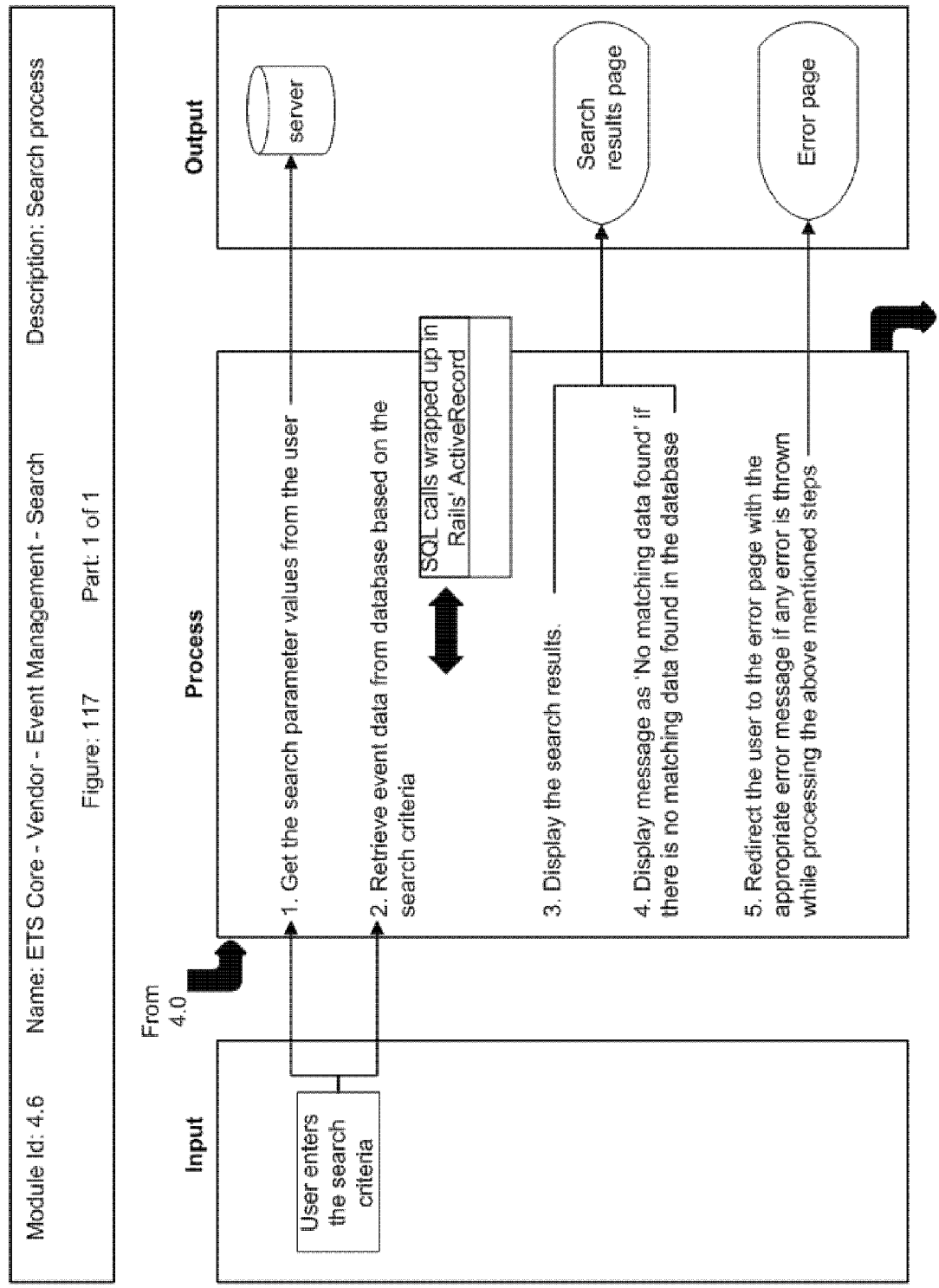
Figure 118A:
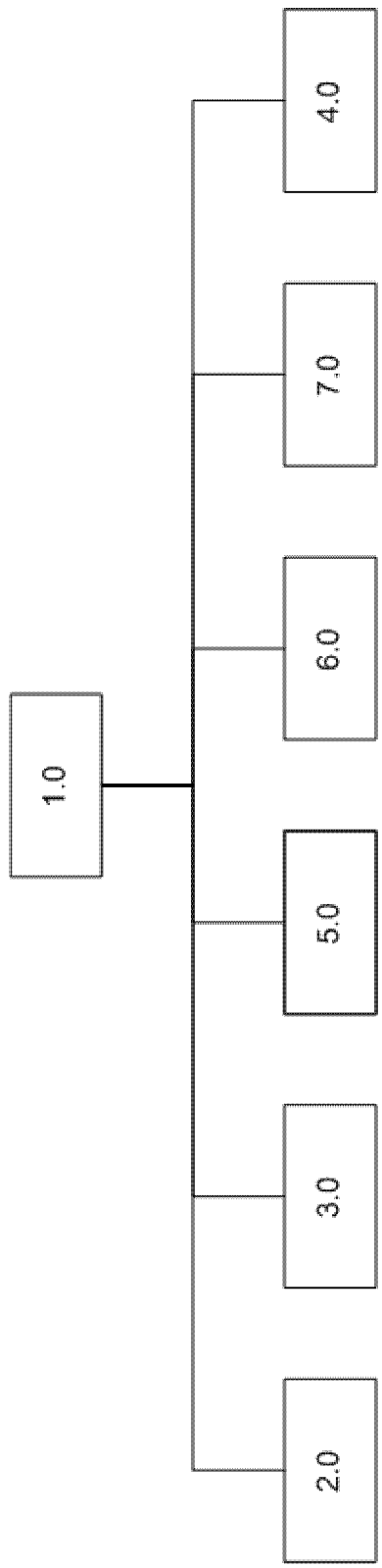
Figure 118B:
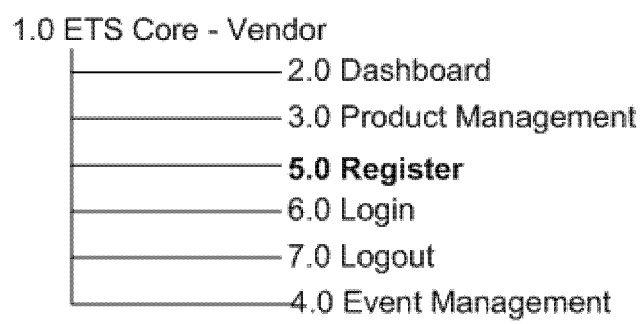
Figure 119:
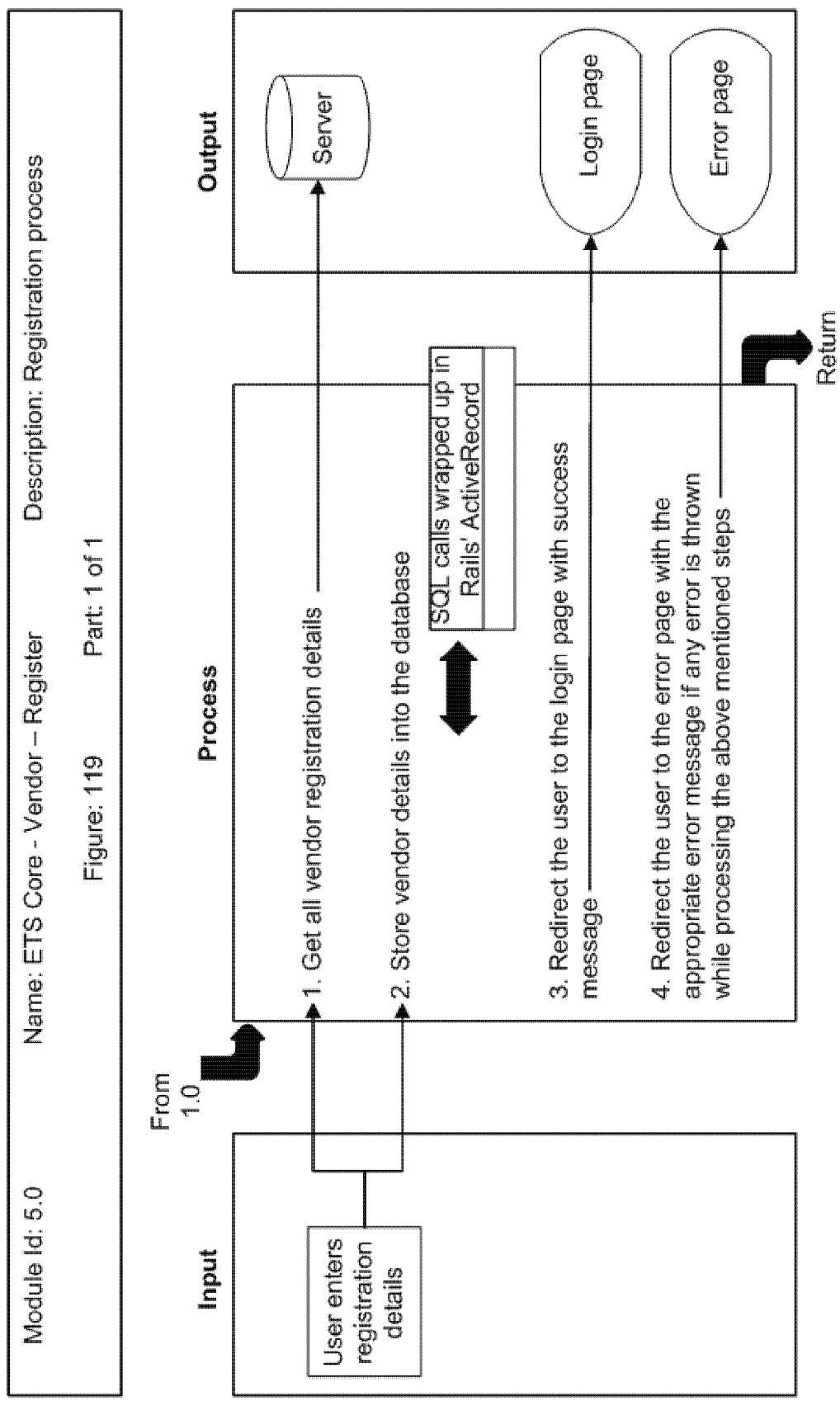
Figure 120A:
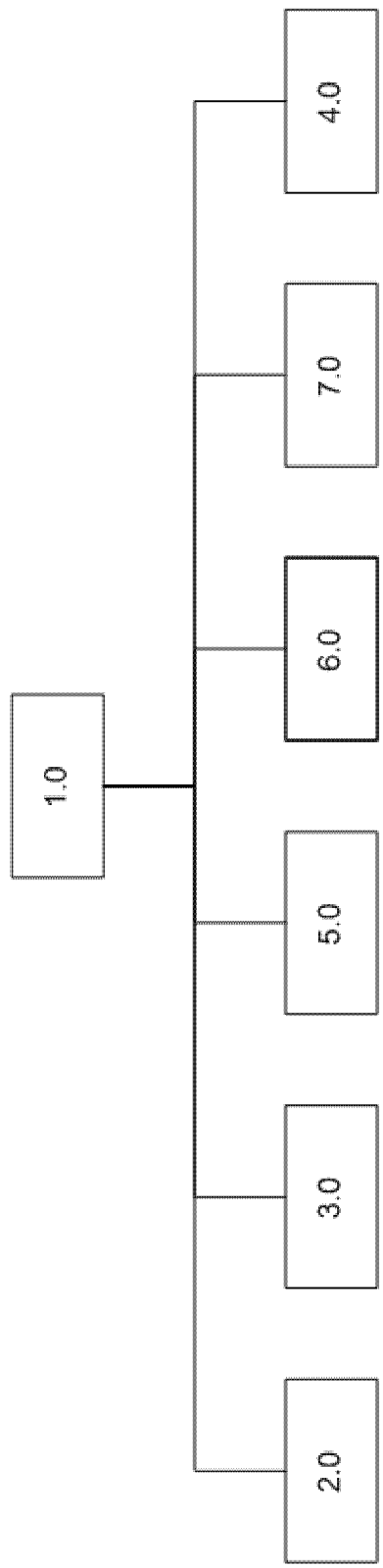
Figure 120B:
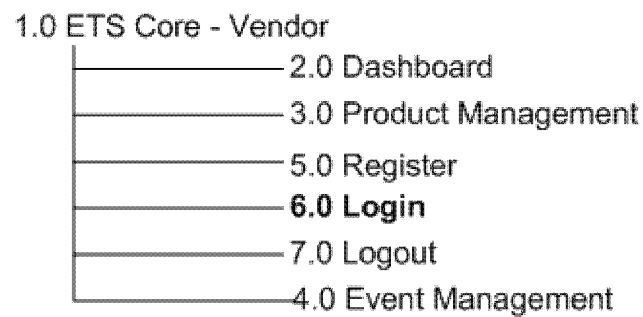
Figure 121:
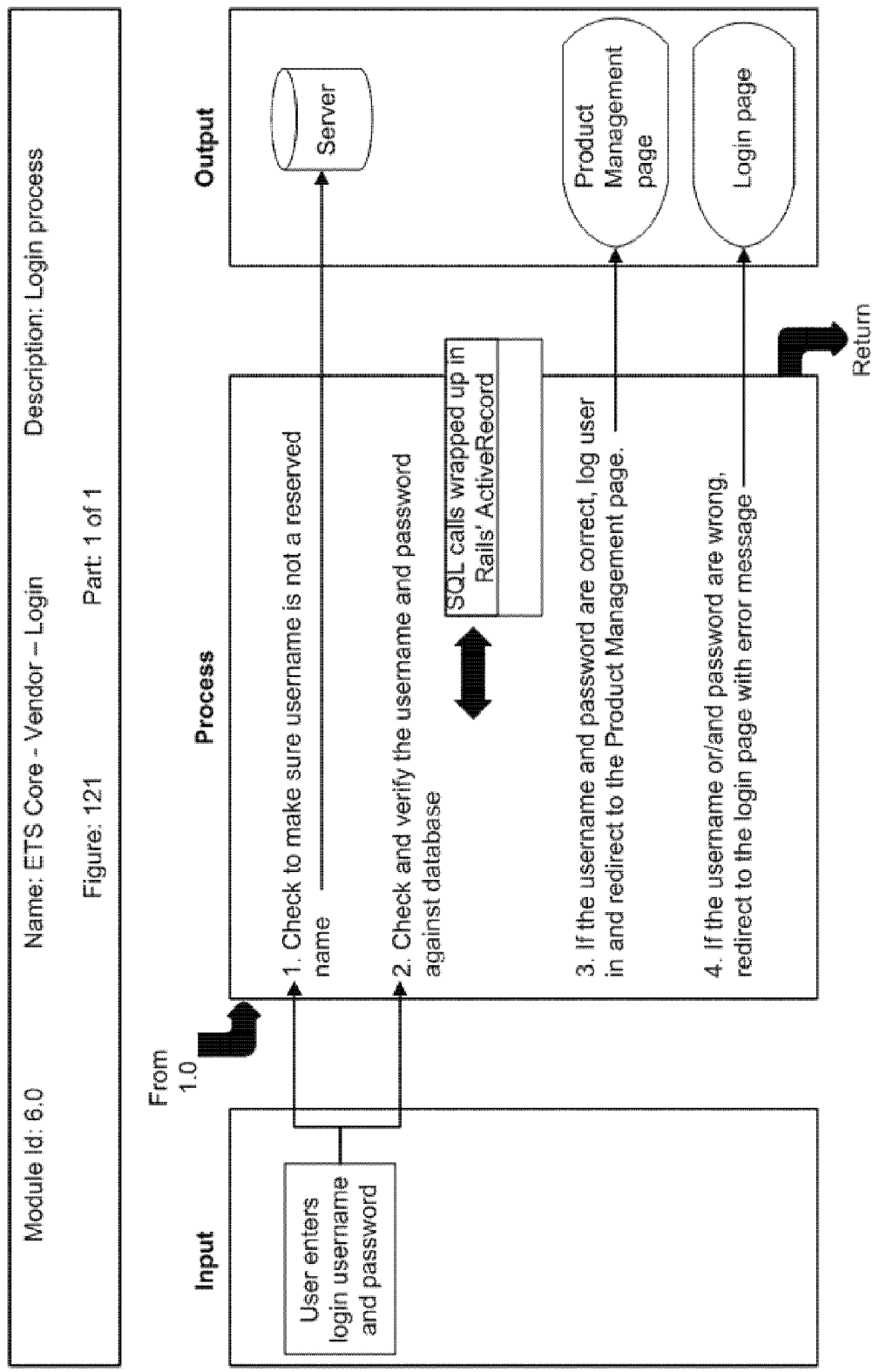
Figure 122A:
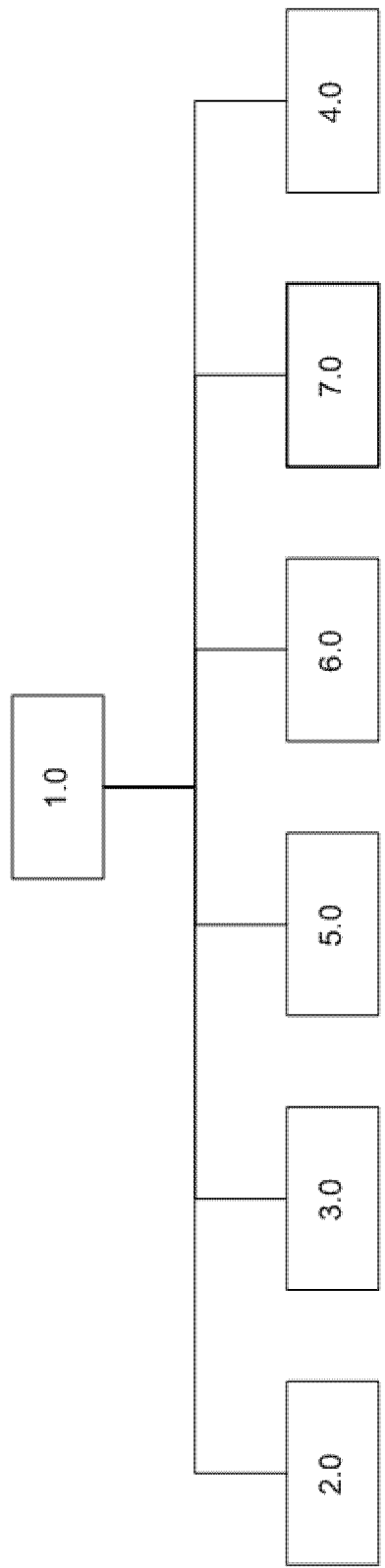
Figure 122B:
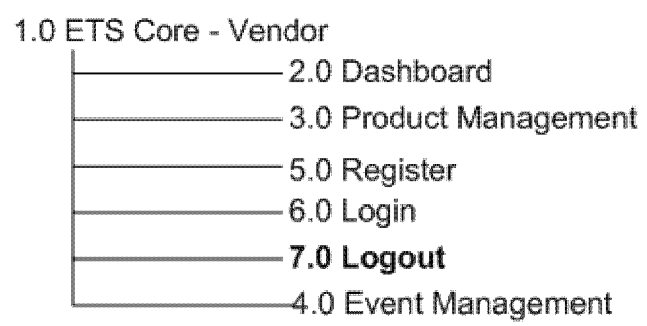
Figure 123:
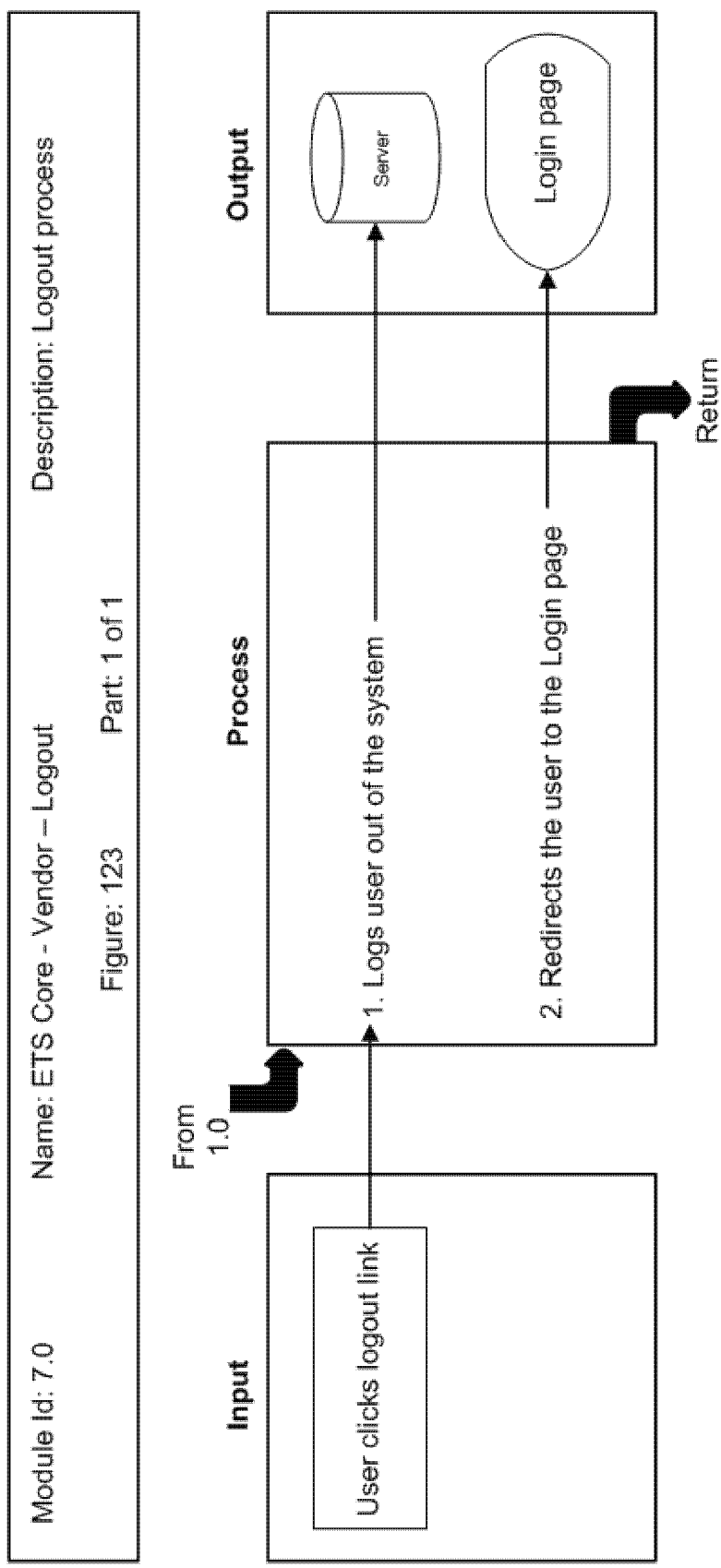
Figure 124:
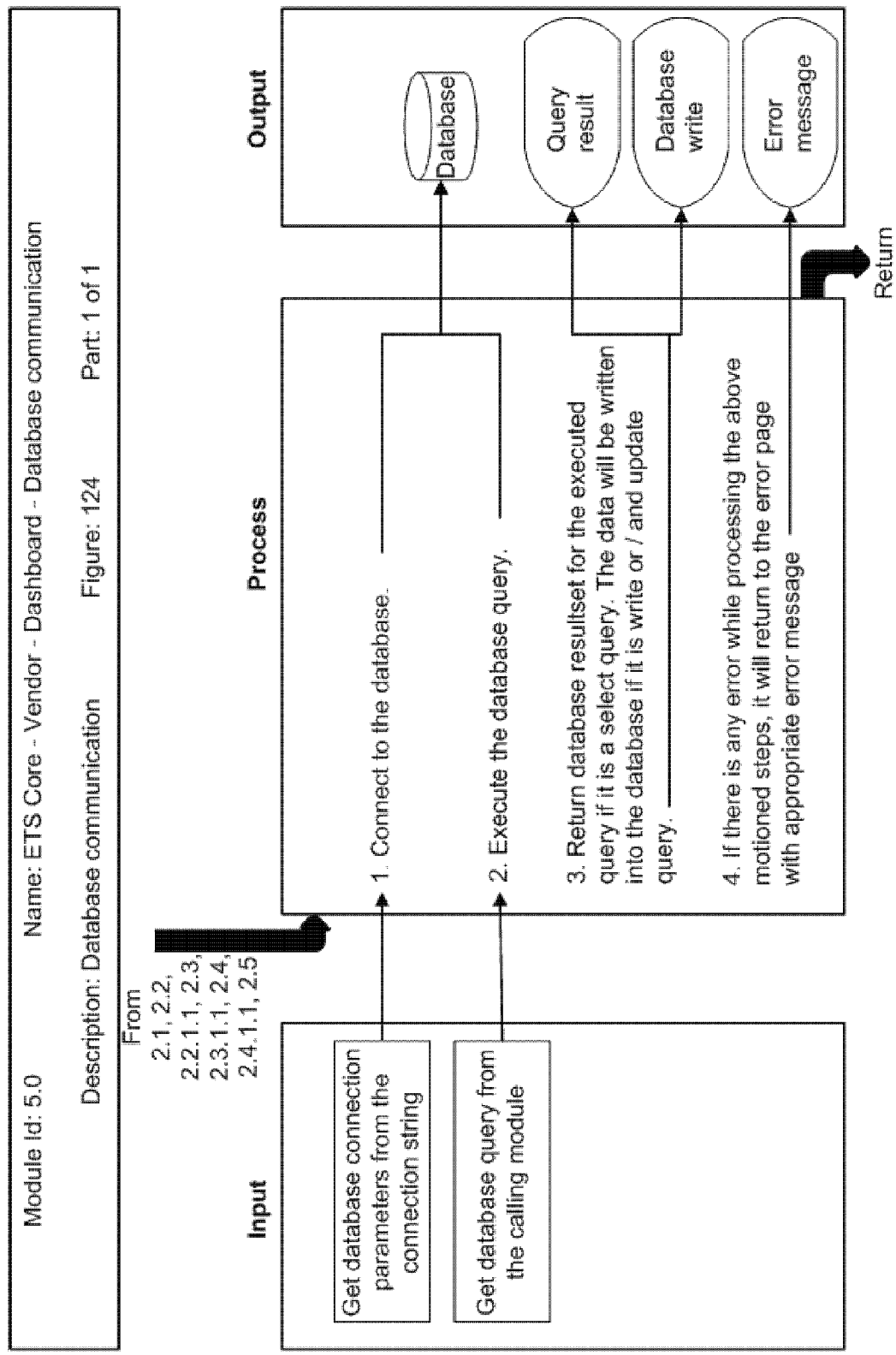

FIG. 20A Module 7.1 Go Shopping/Search Products—Hierarchy—HIPO Showing Module Numbers FIG. 20B Module 7.1 Go Shopping/Search Products—Naming Sub-Modules FIG. 21 Module 7.1 Go Shopping/Search Products—IPO FIG. 22A Module 7.2.1 Go Shopping/Product Detail—Hierarchy—HIPO Showing Module Numbers FIG. 22B Module 7.2.1 Go Shopping/Product Detail—Naming Sub-Modules FIG. 23 Module 7.2.1 Go Shopping/Product Detail—IPO FIG. 24A Module 7.2.2 Go Shopping/Wish List—Hierarchy—HIPO Showing Module Numbers FIG. 24B Module 7.2.2 Go Shopping/Wish List—Naming Sub-Modules FIG. 25 Module 7.2.2 Go Shopping/Wish List—IPO FIG. 26 Module 7.2.2 Go Shopping/Wish List—Architecture Flow FIG. 27A Module 7.2.3 Go Shopping/Add To Cart—Hierarchy—HIPO Showing Module Numbers FIG. 27B Module 7.2.3 Go Shopping/Add to Cart—Naming Sub-Modules FIG. 28 Module 7.2.3 Go Shopping/Add To Cart—IPO FIG. 29 Module 7.2.3 Go Shopping/Add To Cart—Architecture Flow FIG. 30A Module 7.3 Go Shopping/Cart Summary—Hierarchy—HIPO Showing Module Numbers FIG. 30B Module 7.3 Go Shopping/Cart Summary—Naming Sub-Modules FIG. 31 Module 7.3 Go Shopping/Cart Summary—IPO FIG. 32A Module 8.0 Shopping Cart—Hierarchy—HIPO Showing Module Numbers FIG. 32B Module 8.0 Shopping Cart—Naming Sub-Modules FIG. 33 Module 8.0 Shopping Cart—IPO FIG. 34 Module 8.0 Shopping Cart—Architecture Flow FIG. 35A Module 10.0 Register—Hierarchy—HIPO Showing Module Numbers FIG. 35B Module 10.0 Register—Naming Sub-Modules FIG. 36 Module 10.0 Register—IPO FIG. 37 Module 10.0 Register—Architecture Flow FIG. 38A Module 11.0 Login—Hierarchy—HIPO Showing Module Numbers FIG. 38B Module 11.0 Login—Naming Modules FIG. 39 Module 11.0 Login—IPO FIG. 40A Module 12.0 Logout—Hierarchy—HIPO Showing Module Numbers FIG. 40B Module 12.0 Logout—Naming Modules FIG. 41 Module 12.0 Logout—IPO ETS Core—Vendor Portal FIG. 42 Module 2.0 Dashboard—Conceptual Model
FIG. 43A Module 2.0 Dashboard—Hierarchy—HIPO Showing Module Numbers
FIG. 43B Module 2.0 Dashboard—Naming Modules
FIG. 44 Module 2.1 Dashboard/Home—Conceptual Model
FIG. 45 Module 2.1 Dashboard/Home—IPO
FIG. 46 Module 2.1 Dashboard/Home—Architecture Flow
FIG. 47 Module 2.2 Dashboard/Events—Conceptual Model
FIG. 48 Module 2.2 Dashboard/Events—IPO
FIG. 49 Module 2.2 Dashboard/Events—Architecture Flow
FIG. 50 Module 2.2.1.1 Dashboard/Event Report—Conceptual Model
FIG. 51 Module 2.2.1.1 Dashboard/Event Report—IPO
FIG. 52 Module 2.2.1.1 Dashboard/Event Report—Architecture Flow
FIG. 53 Module 2.3 Dashboard/Products—Conceptual Model
FIG. 54A Module 2.3 Dashboard/Products—Hierarchy—HIPO Showing Module Numbers
FIG. 54B Module 2.3 Dashboard/Products—Naming Sub-Modules
FIG. 55 Module 2.3 Dashboard/Products—IPO
FIG. 56 Module 2.3 Dashboard/Products—Architecture Flow
FIG. 57 Module 2.3.1.1 Dashboard/Product Report—Conceptual Model
FIG. 58A Module 2.3.1.1 Dashboard/Product Report—Hierarchy—HIPO Showing Module Numbers
FIG. 58B Module 2.3.1.1 Dashboard/Product Report—Naming Sub-Modules
FIG. 59 Module 2.3.1.1 Dashboard/Product Report—IPO
FIG. 60 Module 2.3.1.1 Dashboard/Product Report—Architecture Flow
FIG. 61 Module 2.4 Dashboard/Voting—Conceptual Model
FIG. 62A Module 2.4 Dashboard/Voting—Hierarchy—HIPO Showing Module Numbers
FIG. 62B Module 2.4 Dashboard/Voting—Naming Sub-Modules
FIG. 63 Module 2.4 Dashboard/Voting—IPO
FIG. 64 Module 2.4 Dashboard/Voting—Architecture Flow
FIG. 65A Module 2.4.1.1 Dashboard/Poll Report—Hierarchy—HIPO Showing Module Numbers
FIG. 65B Module 2.4.1.1 Dashboard/Poll Report—Naming Sub-Modules
FIG. 66 Module 2.4.1.1 Dashboard/Poll Report—IPO
FIG. 67 Module 2.4.1.1 Dashboard/Poll Report—Architecture Flow
FIG. 68 Module 2.5 Dashboard/Export Data—Conceptual Model
FIG. 69A Module 2.5 Dashboard/Export Data—Hierarchy—HIPO Showing Module Numbers
FIG. 69B Module 2.5 Dashboard/Export Data—Naming Sub-Modules
FIG. 70 Module 2.5 Dashboard/Export Data—IPO
FIG. 71 Module 2.5 Dashboard/Export Data—Architecture Flow
FIG. 72 Module 3.0 Product Management—Conceptual Model
FIG. 73 Module 3.1 Product Management/Main—Conceptual Model
FIG. 74A Module 3.1 Product Management/Main—Hierarchy—HIPO Showing Module Numbers
FIG. 74B Module 3.1 Product Management/Main—Naming Sub-Modules
FIG. 75 Module 3.1 Product Management/Main—IPO
FIG. 76 Module 3.2 Product Management/Products—Conceptual Model
FIG. 77A Module 3.2 Product Management/Products—Hierarchy—HIPO Showing Module Numbers
FIG. 77B Module 3.2 Product Management/Products—Naming Sub-Modules
FIG. 78A Module 3.2.1 Product Management/Products—Hierarchy—HIPO Showing Module Numbers
FIG. 78B Module 3.2.1 Product Management/Products—Naming Sub-Modules
FIG. 79 Module 3.2.1 Product Management/Products—IPO
FIG. 80A Module 3.2.1.1.1 Product Management/Products/Delete Product—Hierarchy—HIPO Showing Module Numbers
FIG. 80B Module 3.2.1.1.1 Product Management/Products/Delete Product—Naming Sub-Modules
FIG. 81 Module 3.2.1.1.1 Product Management/Products/Delete Product—IPO
FIG. 82A Module 3.2.1.1.2 Product Management/Products/Edit Product—Hierarchy—HIPO Showing Module Numbers
FIG. 82B Module 3.2.1.1.2 Product Management/Products/ Edit Product—Naming Sub-Modules
FIG. 83 Module 3.2.1.1.2 Product Management/Products/Edit Product—IPO
FIG. 84A Module 3.2.2 Product Management/Products/With Images—Hierarchy—HIPO Showing Module Numbers
FIG. 84B Module 3.2.2 Product Management/Products/With Images—Naming Sub-Modules
FIG. 85 Module 3.2.2 Product Management/Products/With Images—IPO
FIG. 86A Module 3.2.3 Product Management/Products/New Product—Hierarchy—HIPO Showing Module Numbers
FIG. 86B Module 3.2.3 Product Management/Products/New Product—Naming Sub-Modules
FIG. 87 Module 3.2.3 Product Management/Products/New Product—IPO
FIG. 88 Module 3.2.5.1 Product Management/Products/View Category—IPO
FIG. 89 Vendor—Module 3.2.5.2 Product Management/Products/Add New Category—IPO
FIG. 90 Module 3.3 Product Management/Promotions—Conceptual Model
FIG. 91 Module 3.4 Product Management/Price Rules—Conceptual Model
FIG. 92 Module 3.5 Product Management/Configurations—Conceptual Model
FIG. 93 Module 3.6 Product Management/Shipping—Conceptual Model
FIG. 94 Module 3.7 Product Management/Batch Upload—Conceptual Model
FIG. 95A Module 3.7 Product Management/Batch Upload—Hierarchy—HIPO Showing Module Numbers
FIG. 95B Module 3.7 Product Management/Batch Upload—Naming Sub-Modules FIG. 96 Module 3.7 Product Management/Batch Upload—IPO
FIG. 97 Module 3.7 Product Management/Batch Upload—Architecture Flow
FIG. 98A Module 3.8 Product Management/Search—Hierarchy—HIPO Showing Module Numbers
FIG. 98B Module 3.8 Product Management/Search—Naming Modules
FIG. 99 Module 3.8 Product Management/Search—IPO
FIG. 100 Module 4.0 Event Management—Conceptual View
FIG. 101A Module 4.0 Event Management—Hierarchy—HIPO Showing Module Numbers
FIG. 101B Module 4.0 Event Management—Naming Sub-Modules
FIG. 102 Module 4.0 Event Management—IPO
FIG. 103A Module 4.1 Event Management/Main—Hierarchy—HIPO Showing Module Numbers
FIG. 103B Module 4.1 Event Management/Main—Naming Sub-Modules
FIG. 104 Module 4.1 Event Management/Main—IPO
FIG. 105A Module 4.2.1 Event Management/Delete Event—Hierarchy—HIPO Showing Module Numbers
FIG. 105B Module 4.2.1 Event Management/Delete Event—Naming Sub-Modules
FIG. 106 Module 4.2.1 Event Management/Delete Event—IPO
FIG. 107 Module 4.2.1 Event Management/Delete Event—Architecture Flow
FIG. 108A Module 4.3 Event Management/Create Event—Hierarchy—HIPO Showing Module Numbers
FIG. 108B Module 4.3 Event Management/Create Event—Naming Sub-Modules
FIG. 109 Module 4.3 Event Management/Create Event—IPO
FIG. 110 Module 4.3 Event Management/Create Event—Architecture Flow
FIG. 111 Module 4.4 Event Management/Edit Event—IPO
FIG. 112 Module 4.4 Event Management/Edit Event—Architecture Flow
FIG. 113A Module 4.5 Event Management/PID Insert—Hierarchy—HIPO Showing Module Numbers
FIG. 113B Module 4.5 Event Management/PID Insert—Naming Sub-Modules
FIG. 114 Module 4.5 Event Management/PID Insert—IPO
FIG. 115 Module 4.5 Event Management/PID Insert—Architecture Flow
FIG. 116A Module 4.6 Event Management/Search—Hierarchy—HIPO Showing Module Numbers
FIG. 116B Module 4.6 Event Management/Search—Naming Sub-Modules
FIG. 117 Module 4.6 Event Management/Search—IPO
FIG. 118A Module 5.0 Register—Hierarchy—HIPO Showing Module Numbers
FIG. 118B Module 5.0 Register—Naming Modules
FIG. 119 Module 5.0 Register—IPO
FIG. 120A Module 6.0 Login—Hierarchy—HIPO Showing Module Numbers
FIG. 120B Module 6.0 Login—Naming Modules
FIG. 121 Module 6.0 Login—IPO
FIG. 122A Module 7.0 Logout—Hierarchy—HIPO Showing Module Numbers
FIG. 122B Module 7.0 Logout—Naming Modules
FIG. 123 Module 7.0 Logout—IPO
FIG. 124 Module 5.0 Database Communication

DETAILED DESCRIPTION OF THE INVENTION

Figure 1:
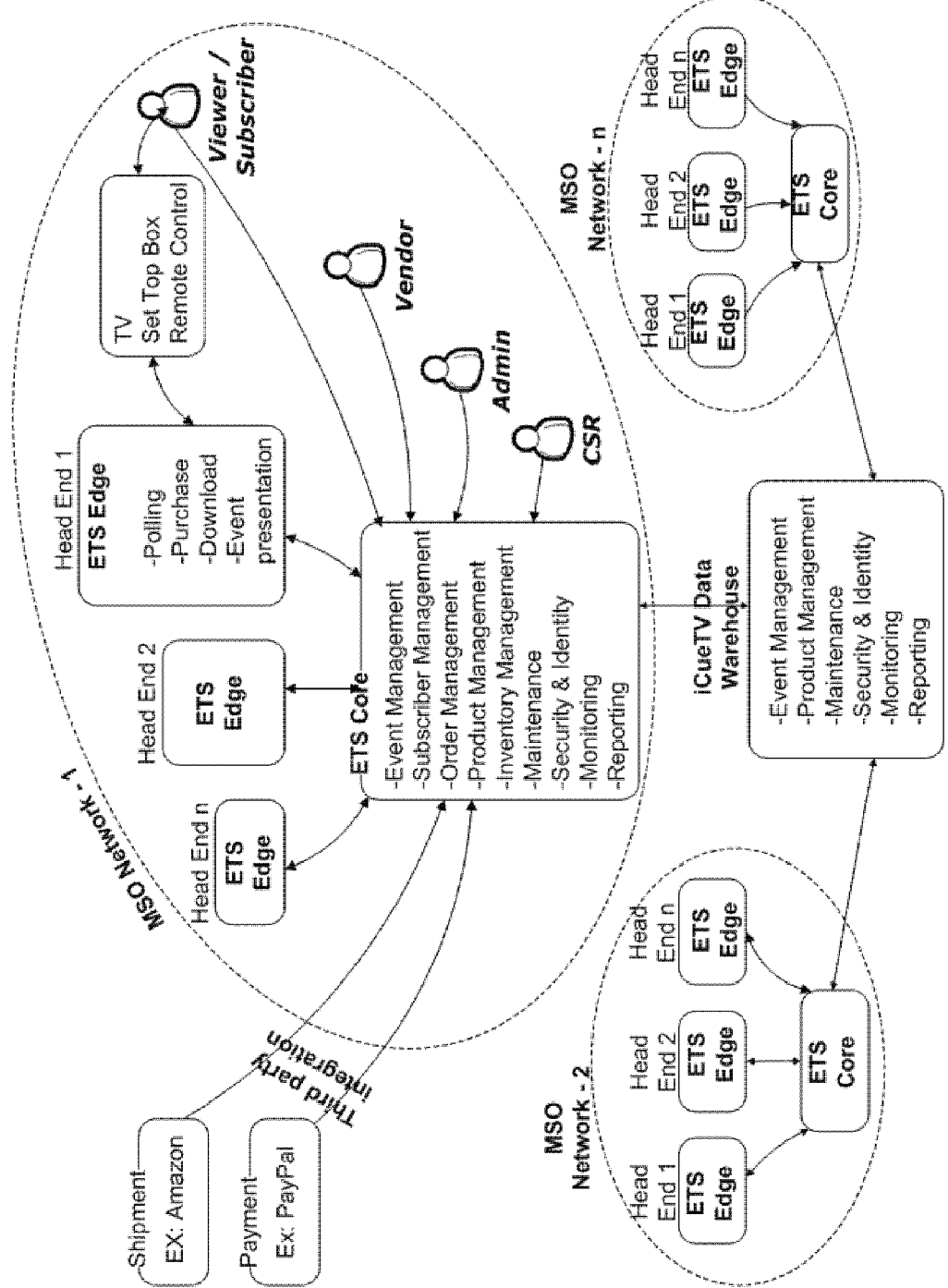
FIG. 1 Enhanced Television Service (ETS)—Conceptual Model

FIG. 1 shows a conceptual model of the ETS System that provides a high-level overview of the system. In a typical production scenario, there will be multiple MSO's and one ETS Core system. These MSO's will be geographically located and every MSO will have one ETS Edge. A TV viewer interacts with the set top box application using a remote control. The user data flows from the Set Top Box Application to the ETS Edge, and then the data flows to the ETS Core system. When an event is created in the ETS Core system, the event data flows to the ETS Edge and then to the Set Top Box Application.

The ETS Core controls:
event management;
subscriber management;
order management;
product management;
memory management;
inventory management;
maintenance;
security and identity;
monitoring; and
reporting.

The ETS Core communicates directly with the Data Warehouse which stores information regarding:
event management;
product management;
maintenance;
security and identity;
monitoring; and
reporting.

Third party vendors and shippers (e.g., Amazon) and payment processors (e.g., PayPal) communicate directly with the ETS Core through an MSO network, as do administrators (Admin) and customer service representatives (CSR). Each MSO network has a plurality of ETS Edge interfaces that provide geographically local viewer polling, purchasing, downloading, and event presentation.

Figure 2:
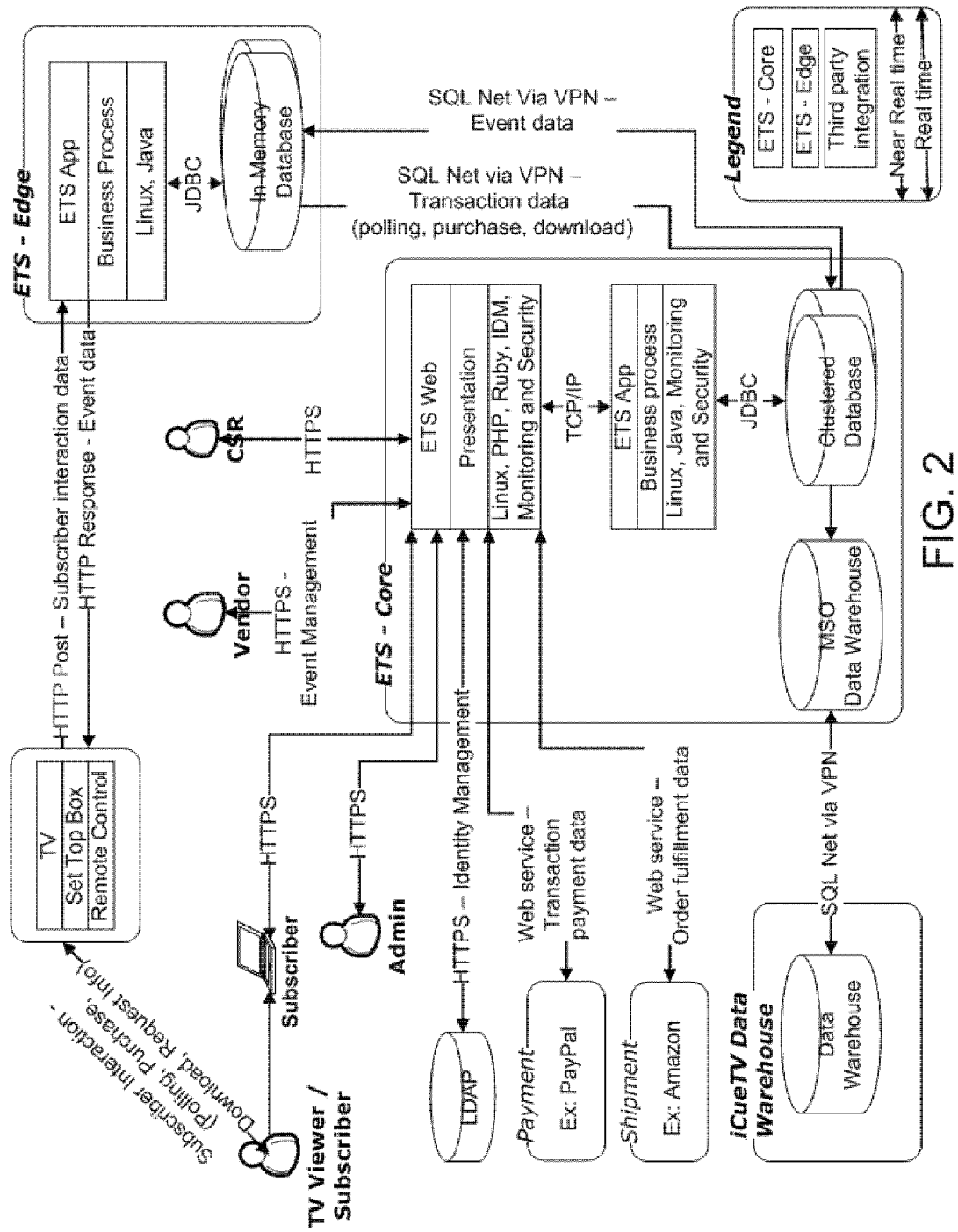
FIG. 2 Enhanced Television Service (ETS)—Logical Model

FIG. 2 is a logical model of the ETS system. It provides details about:
different tiers of the ETS system;
protocols used for communication;
data flow between the systems;
different types of users of the system; and
third party systems integration.

Whenever the subscriber interacts with the TV, he or she interacts using the Set-top Box (STB) that is associated with that TV. The customized application (Xlet) that is sitting on the STB will listen to these user interactions. The Xlet application will send the relevant requested data to the ETS Edge system and the ETS Edge will respond back to the Xlet. This transaction data will eventually go from ETS Edge to ETS Core system in real time or near real time basis. The ETS Core system will process the actual transaction. In the same way, when an event is created in the ETS Core system, that event data will be distributed to the relevant ETS Edges. When an ETS Edge receives a request from the TV subscriber, the relevant event data will be sent back to the Xlet in the form of the response.

Figure 3:
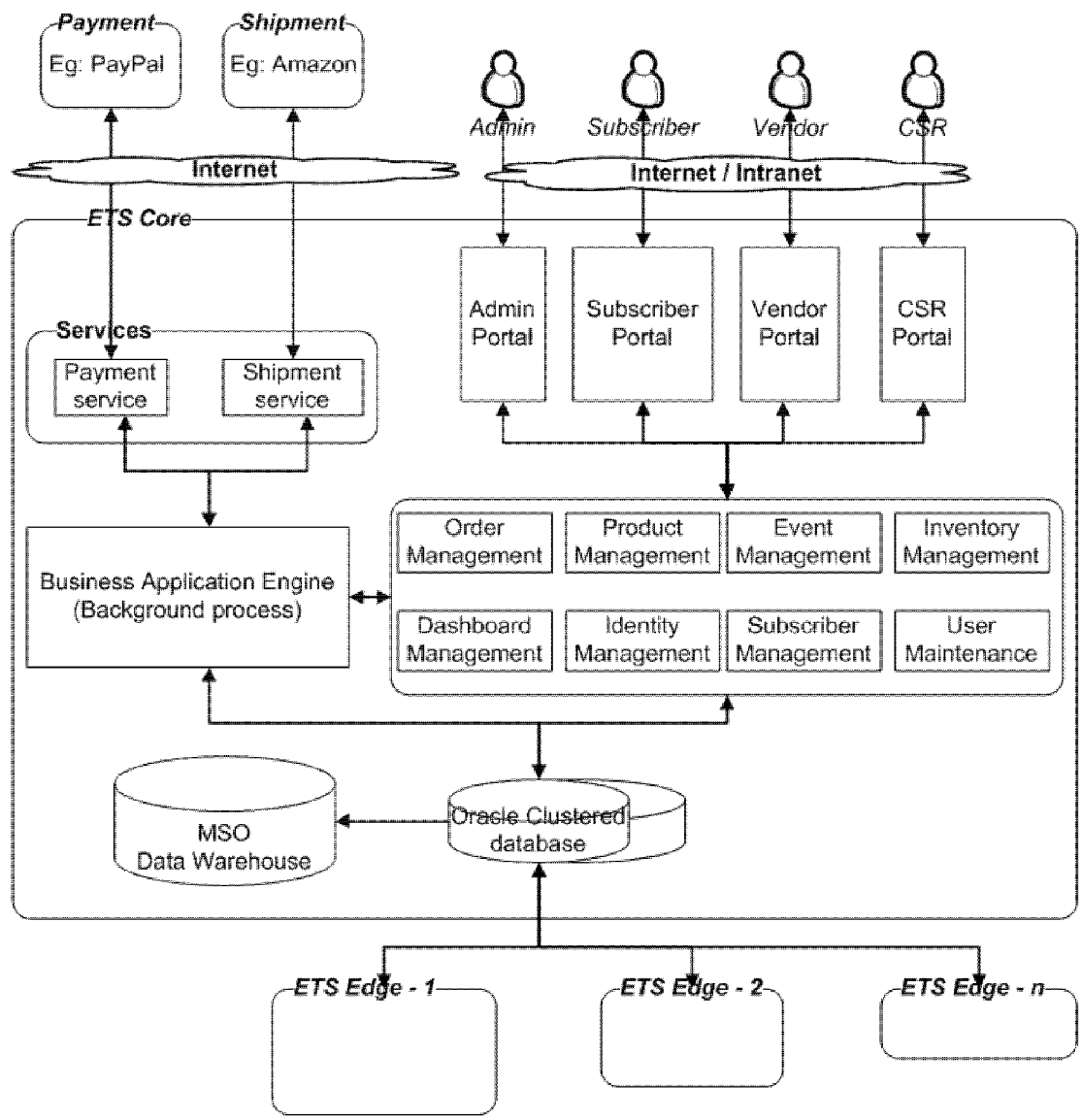
FIG. 3 Enhanced Television Service (ETS)—Core—Components

FIG. 3 shows the components of the ETS Core. The ETS Core system will contain the following components:
Web Portals
Business Application Engine
Common Business Services
Third Party Integration Services Web Portals Web portals use the ETS Core system. These portals are developed by using web scripting languages to render predefined user interfaces so that the user can log into the portal, and can perform activities such as view past and current transactions, purchase products, update profiles, etc. The web server of each of the portals communicates with the ETS Core system for each user request, and it is the ETS Core system which actually applies the relevant business logic to each and every user activity, updates the database, and returns the result back to the portal which renders the view page to the user. The ETS Core system has the following web portals:

Administrator Portal

Administrator portal gives the complete ability for the administrator of the system. To add/remove new users manually, add/remove products manually, check out the detailed transactions. Manipulate the transactions etc. CSR staff will have the role to act as administrators for the complete systems. Administrator can also assign privileges to different users of the system.

Subscriber Portal

Subscriber portal is the place where the user is able to manage their orders and wish list. It also displays products to the user based on user interests in hot deals page. The User can check their activity history on timely basis. User can also download the products based on the requests they made on the TV.

Vendor Portal

Vendor Portal allows vendors/advertisers to define events that are going to be displayed on TV when the commercial or program is broadcasted. Vendor portal also has reporting ability. The reporting includes, but not limited to events, products and geographical region. Vendor Portal allows vendors to add products (electronic or physical) and update existing vendor created products.

CSR Portal

The CSR portal will be used by the CSR to support the customers.

Business Application Engine

Business Application Engine comprises the logic to process the User requests and automate transaction processing. It inserts the order into the core system and applies business logic into it. It contacts the payment gateway to charge the user for the product (if it is a product sale). All successful transactions will be forwarded to an internal or third party fulfillment center. The confirmation of the transaction will be sent from the third party billing and fulfillment systems. Product sale, download request and voting are all handled as a part of this subsystem.

Common Business Services

Common Business Services can be accessible from any portal and includes the following services:

Order Management
Product Management
Event Management
Inventory Management
Dashboard Management
Identity Management
Subscriber Management
User Maintenance
Order Management Customer, Vendor, MSO, System and CSR portals can use this module to see the orders submitted in the system. It allows activities to be applied to the order such as create, cancel, return, and fulfill, etc. It will maintain item status and order status. If there are any updates in processing the order, it will notify the user by sending an appropriate email.

Product Management

This module allows products to be created, updated, or deleted.

Event Management

Events can be created, updated, or deleted by using this module. On creation or update, the event management portal automatically generates a sample application view which allows a user to preview the interactive application that will be shown on the television.

Inventory Management

The portals will use this module to manage the inventory of products. It allows tracking of product inventory levels and display in what warehouses the product resides.

Allows vendors, MSO's, and the system to move products from one fulfillment house to another.

Allows updating pick items.

Allows vendor to track its shipped inventory items via the pick item display.

Intelligently routes fulfillment request to alternate fulfillment houses if products are not available at the primary fulfillment house.

Identity Management

The portals will use this module for user authentication and authorization. This module houses, imports, and normalizes data from different user groups that connect to the ETS system.

Third party Integration Services

These services are used to integrate with third party vendors and include the following:

Datacenter Service

Datacenter service will be used to send the aggregated polling data in real time to the broadcasting data center so that it can be sent to the event location such as a stadium to show the result on the stadium screen.

Shipment Service

Third party fulfillment service can be used for outsourcing fulfillment processing. System uses third party fulfillment web services to forward order details directly into their systems and the order will be fulfilled by third party and on subsequent requests will return the status of the order from third party fulfillment.

Payment Service

Payment processing and user detail verification uses PayPal service. PayPal service takes the user details and charges the method user requested after validating details given by the user. (Need to rewrite these and do it similar to the third party fulfillment).

If the user initiates a transaction that requires payment (purchasing product, downloading digital goods, requesting information through different media, and/or voting), the payment service module will charge the specified amount to the user account by communicating with a payment gateway. The payment system decides what are the proper gateways to talk with depending upon the user payment type. There are different types of gateways both internal and external to the ETS system including credit card gateways, gift card gateways, and third party payment processors. This module updates the user account with the payment processing status. If the payment processing fails, it sends an email to the user with the status, related details, and the actions that the user needs to take to process the transaction.

Customer History

Customers can view their history of interaction with the ETS third party applications (TV and mobile) through the ETS. Users may also view their voting histories, information requests, and purchases.

Software Used

| | |
|---|---|
| The ETS Core system | Java, JSP, Ruby on Rails, PHP, Ofbiz, Tomcat Application server, Oracle clustered database |

Hardware Used

The staging environment is configured as such:
CentOS(RHEL) version 5.1 64-bit is running with a custom compiled kernel 2.6.25.2
There are FOUR servers setup in a semi-cluster array.
The specifications of each individual blade server are as follows.
    Dual Xeon 2.33 GHZ Woodcrest
    8 GB Memory
    146 GB SCSI Drive in Redundant RAID array
Server One is the core, server Two is the core DB server.
Server Three is the Edge, Server Four is the edge DB server.

Core Business Requirements

The business requirements for the ETS Core system can be detailed in two categories:

Functional Requirements:

1) Third Party API

A standard application programming interface (API) that provides third-party developers the ability to utilize CORE services for order processing, billing and fulfillment. This is a programmatic (API) interface not a presentation layer interface so the system is capable of providing "hooks" into our system to process order generated by third parties.

2) Dashboard and Reports

A standard and secure interface for vendor and partners to view their event performance and information in near real-time dashboard and be capable of generating ad-hoc reports views on the same data. Report generating metrics should be based on: Event ID, Product ID, Geography or DMA, Event Type (IR, Polling, Purchase, Digital), Event Coverage (National/Regional/Local), # of Transactions Completed, # of Transactions Canceled, # of Transactions Added to WISH LIST, # of Transactions (Volume), Transaction Price (Dollar Amount, Fee, Ad Sponsored, etc.), Transactions Frequency (per minute, hour, day, week, month, year, quarter, etc.), Transactions Payment Type (Visa, Amex, Discover, etc.), Transactions Denied (e.g. problem with payment, account blocked, etc.), Transaction Shipping Type (Overnight, Standard, Email, Cellular, etc.), By Vendor (Events, Transactions, Fulfillment Site, etc.), By MSO (Events, Transactions, etc.) Main or summary reporting should include Number of Transactions, Transaction Totals by MSO/Region, etc A shipping service module will select a shipment carrier that is offered by the fulfillment house. The carriers included are USPS, UPS, and FedEx. It will then calculate the total amount by getting the rate from the selected carrier through carriers provided API.

3) Product Management

Product identification of images, group/party, pricing, multiple item discount, product (Good/Digital Good/Service), category, features, description, inventory, storage, supplier, fulfillment methods, fulfillment logic tiers—One to many(e.g. warehouse A, then B, then C), geography or DMA, availability period, status, SKU, ISBN, Catalog ID, UPC code, DMA or Region Deployment Requirements, etc.

4) Background Processing

Based on the event type and/or geographic location of MULTIPLE or SINGLE transactions, the CORE system needs to be capable of intelligently acting on those INCOMING requests and be capable of acting on them in a number of ways.

5) Events and Event Panels

Allow the creation of unique events and event panels to be displayed on TV via a web interface.

A standard and secure interface for Vendor and Partners to create, manage, upload event and product data (bulk and per item).

Allow the creation of unique events and event panels at the CORE that will be replicated out to the EDGE servers based on specific event and geographic criteria (e.g. Event Coverage—National/Regional/Local, Geography or DMA, etc.) to be displayed on TV via a web interface.

Ability to distribute Event and Product data (iBug info) to different EDGE centers based on demand, region, time of day, etc.

6) Wish List

Ability to manage WISH LIST items (view/initiate order/checkout/remove) from the Portals (Admin, Subscriber and CSR).

7) Data Warehouse

Ability to feed all transaction data into a data warehousing system at the CORE.

24 hours per day, 7 days per week.

8) Monitoring Management

Proactive alert system tied to each process/service (e.g. Nagios for application monitoring, Management agents for hardware monitoring, Remote BIOS system level access to hardware.

Ability to provide a management and administrative interface to the CORE system (Hardware/System/Software) from both internal (within/local to the CORE network) and external (outside/remote to the CORE network) access methods.

Portals Requirements:

The ETS Core system will have the following web portals:
1—Admin
2—Subscriber
3—Vendor
4—CSR The ETS Core software is described in the drawings using several diagrammatic representations. First, there are high-level conceptual models that describe the structures and functions of the main components. This is followed by HIPO diagrams. HIPO was a diagrammatic documentation system for software developed by IBM. Information regarding this system can be found in IBM Publication GC20-1851-1 entitled: "HIPO—A Design Aid and Documentation Technique." It was originally designed to promote "structured programming." However, since the introduction of "object oriented programming," HIPO has fallen into disuse. Nonetheless, it is still an excellent tool for describing software systems. HIPO is an acronym that stands for Hierarchy plus Input, Process, Output. HIPO documentation comprises a series of diagram charts.

The first chart in each series is a hierarchy chart. This chart, appearing like a corporate organization chart, displays the calling relationship between the various system modules. Each module appears as a block in the diagram. Lines connect these modules to show their hierarchy. Hierarchy is further shown by assigning numeric labels to the modules. Normally, the highest order module would be labeled 1.0. Modules immediately below it hierarchically would be labeled 2.0, 3.0, 4.0, . . . , and so on. Modules hierarchically below 2.0 (for example) would be labeled 2.1, 2.2, 2.3, . . . , and so on. Modules hierarchically below 2.1 (for example) would be labeled 2.1.1, 2.1.2, 2.1.3, . . . and so on. Therefore, by looking at the numeric label of any module, one can determine its level of hierarchy. A black triangle located at the corner of the module block indicates that the module is re-used many times either as a subroutine or as an object.

Following the hierarchy chart, each module depicted on that chart receives an IPO chart. The IPO chart is divided into three columns. The leftmost column represents INPUT. The rightmost column represents OUTPUT. The central column represents PROCESS. This is where the various steps in the process are described. Most of the information in the INPUT and OUTPUT columns is graphical (e.g., representing terminals, hard drives, printers, etc.). Most of the information in the PROCESS columns is descriptive text showing the procedural steps. Arrows connect the PROCESS column to the INPUT and OUTPUT columns to show data flow.

Each IPO chart may have an Extended Description showing notes about the various steps in the process. These act almost like footnotes in a document. They are usually too detailed or extraneous to include in the steps denoted in the PROCESS column.

Finally, many modules have architecture flow diagrams that show a linear flow of the procedures executed by those modules The basic ETS Core portals are described as follows:

1) Admin

A standard, plug-able (into existing MSO administration portals) secure interface for Customer Service Representatives (CSR's), Managers & Administrators to have access to an event, order, subscriber, product, inventory, maintenance, monitoring, reporting and security management ALL based on their job responsibilities and roles to limit system access.

Edit User details
Edit Order details anytime
Edit Wish list details anytime
Ability to commit all/some of the batched transactions
Ability to create Vendors
Monitors system performance
View/Edit Order/Transaction/Payment process progress

TABLE 1

ADMINISTRATIVE PORTAL (Overview)

1.0 ETS Core - Admin
2.0 Catalog
3.0 Customer Service
4.0 Facility
5.0 Party
6.0 Web Tools Table 1 represents an overview of the Administrative Portal of the ETS Core system. FIG. 4 is a HIPO Hierarchy diagram showing the organization of the Administrative Portal software modules. In this chart, the detailed organization of the modules is shown. The hierarchy indicates the calling sequence for each of the modules. Therefore, for example, Module 1.0 (ETS Core—Admin) calls Module 2.0 (Catalog), which in turn calls Module 2.1 (Main). The six main functions shown in Table 1 are expanded to form six branches further comprising additional software modules. Table 2 also shows the Administrative Portal hierarchy. This is the software used by Customer Service Representatives (CSR's), Managers and Administrators to create new entries in the catalog, to service customers with problems, to perform web site updates, and to control server status. FIG. 5 is an architecture flow chart of this last function. It illustrates the sequence of computer activities performed by a Controller. The Controller sets up user sessions, and associates them with the appropriate product, session, and event information. It establishes communication with Framework Services, and creates an individualized markup file from Java templates. Once this file is created, the information therein is displayed to the user.

TABLE 2

ADMINISTRATIVE PORTAL 1.0 ETS Core - Admin
  2.0 Catalog
    2.1 Main
    2.2 Features
    2.3 Promos
    2.4 Price Rules
    2.5 Stores
    2.6 The Saurus
    2.7 Reviews
    2.8 Configurations
    2.9 Subscriptions
    2.10 Shipping
  3.0 Customer Service
    3.1 Order List
    3.2 Find Orders
    3.3 Order Entry
    3.4 Returns
    3.5 Requirements
    3.6 Reports
    3.7 Status
  4.0 Facility
    4.1 Main
    4.2 Facilities
    4.3 Facility Groups
    4.4 Inventory Item Labels
    4.5 Shipments
  5.0 Party
    5.1 Main
    5.2 Find
    5.3 Create
    5.4 Link Party
    5.5 Communications
    5.6 Visits
    5.7 Classifications
    5.8 Security
    5.9 Address Match Map
    5.10 Invitation
  6.0 Web Tools
    6.1 Main
    6.2 Status Since Server Start
    6.3 Job List
    6.4 Cache Maintenance
    6.5 Logging
    6.6 Artifact Inf 2) Subscriber A Subscriber is a TV subscriber who registers his or her profile with the ETS system.

A standard, plug-able (into existing MSO subscriber portals) and secure interface for MSO subscribers to manage their subscriber accounts (opt-in/out of service, manage single or multiple profiles per household, passwords, security settings, payment methods, shipping preferences, loyalty accounts general interests for more targeted offers via portal, etc.)

TABLE 3

SUBSCRIBER PORTAL (Overview)

1.0 ETS-Core Subscriber
2.0 My Orders
3.0 My Downloads

TABLE 3-continued

SUBSCRIBER PORTAL (Overview)

4.0 My Wish List
    5.0 My Profile
    6.0 My Votes
    7.0 Go Shopping
    8.0 Shopping Cart
    9.0 Support
    10.0 Register
    11.0 Login
    12.0 Logout Table 3 represents an overview of the Subscriber Portal. The Subscriber Portal will provide the following functionalities,
  Register profile
  If already registered, allow them to log into the system
  View/edit user details
  View/edit order details before being committed
  View/edit Wish List details before being committed
  Buy a featured item
  Buy a wish list item FIG. 6 is a high-level conceptual view of the Subscriber Portal and the functions performed by that software. Shown in the drawing are all of the shopping options that may be exercised by a Subscriber using his or her remote. The user may shop for products associated with a current program, may browse a catalog of products, may cast votes, etc. FIG. 7 shows the high-level HIPO hierarchy of the Subscriber Portal. This chart corresponds to the one in Table 3.

TABLE 4

SUBSCRIBER PORTAL 1.0 ETS-Core Subscriber
    2.0 My Orders
      2.1 Search Order History
      2.2 View Orders
      7.3 Cart Summary
      7.4 Special Orders
    3.0 My Downloads
      7.1 Search Products
      3.1 View Downloads
      7.3 Cart Summary
      7.4 Special Orders
    4.0 My Wish List
      7.1 Search Products
      4.1 View Wish List
      7.3 Cart Summary
      7.4 Special Orders
    5.0 My Profile
      7.1 Search Products
      5.1 View Personal Information
      5.2 View Contact Information
      5.3 View Payment & Shipping Information
      7.3 Cart Summary
      7.4 Special Orders
    6.0 My Votes
      7.1 Search Products
      6.1 View Votes
      7.3 Cart Summary
      7.4 Special Orders
    7.0 Go Shopping
      7.1 Search Products
      7.2 View Featured Products
        7.2.1 Product Detail
        7.2.2 Wish List
        7.2.3 Add to Cart
      7.3 Cart Summary
      7.4 Special Orders
    8.0 Shopping Cart
      7.1 Search Products
      8.1 View Shopping Cart
      7.3 Cart Summary TABLE 4-continued

SUBSCRIBER PORTAL 7.4 Special Orders
    9.0 Support
    10.0 Register
    11.0 Login
    12.0 Logout FIG. 8 is a HIPO Hierarchy diagram showing the calling sequence of modules for processing orders by the Subscriber Portal. In the My Orders module 2.0, the user works with a virtual shopping cart, placing and removing items into the cart, and viewing the cart before finalizing an order. Note that Cart Summary (7.3) and Special Offers (7.4) are actually subroutines that are called from Module 7.0—Go Shopping. In fact, these two subroutines (i.e., 7.3 and 7.4) are invoked by Modules 2.0 through 8.0 of the Subscriber Portal software. FIG. 9 is an IPO diagram showing the sequence of steps performed by the My Orders module (2.0). Each Subscriber has a unique ID, and the database keeps track of what is currently in the shopping cart of that user along with his or her order history. The Subscriber accesses the system using his or her TV remote control.

Not all of the Subscriber's purchases are physical products requiring shipment. Subscribers download various software and data files from the system as well. FIG. 10 is a HIPO Hierarchy diagram showing the calling sequence of modules for processing downloads. Except for the fact that items are not physically shipped, downloaded products are handled in much the same way as physical products. A user fills up his or her shopping cart with downloads, and after checkout, the downloads become available to the user immediately. A user may view download orders along with personal historical data. FIG. 11 is an IPO diagram showing the sequence of steps performed by the My Downloads module (3.0).

A Subscriber has the option of setting up a Wish List (Module 4.0). This function is similar to those performed by invoking My Orders (2.0) or My Downloads (3.0) except that nothing is actually purchased. The Wish List is there for future or potential purchases. It is accessible by the Subscriber as well as trusted third parties. FIG. 12 is a HIPO Hierarchy diagram showing the calling sequence of modules for processing wish lists. FIG. 13 is an IPO diagram showing the sequence of steps performed by the Wish List module (4.0).

Upon becoming a Subscriber, a profile is set up for the user and maintained in the server database. Contained within the profile is personal information, shipping and payment information, preferences, order history, etc. A Subscriber may access his or her profile. FIG. 14 is a HIPO hierarchy diagram showing the calling sequence of modules for processing Subscriber profile data. FIG. 15 is an IPO diagram showing the sequence of steps performed by the My Profile module (5.0).

A Subscriber uses his or her remote control to perform two principal functions—shopping and voting. When a Subscriber votes, that user communicates his or her opinion to the cable service provider via the ETS Core software. Voting occurs in response to queries made to the user. The user presses specific keys in response to the queries. In this case, votes would be transmitted in real time. Voting can also be part of shopping. Once again, the user accesses the Shopping Cart. He or she may search products and answer questions regarding those products. In this case, votes would be queued in the shopping cart for batch submission. FIG. 16 is a HIPO hierarchy diagram showing the calling sequence for processing Subscriber votes. Note the repetition of Modules 7.1, 7.3, and 7.4. The only module unique to My Votes (6.0) is View Votes (6.1). FIG. 17 is an IPO diagram showing the sequence of steps performed by the View Votes module (6.1).

The Go Shopping software (Module 7.0) represents to primary reason for cable companies to implement the ETS system. Currently, advertisers display their products on television hoping that viewers will purchase these products. They blast commercials onto television sets knowing that the more exposure they receive, the greater number of products will be purchased. Generally, advertisers do not know what associated program or what time slots produce the best results. There are general parameters, but the exact source of incentives to purchase is mostly unknown. Some advertisers provide toll-free telephone numbers for viewers to call. In response, many viewers call those numbers immediately to place orders. A few call later, but most viewers do not take the time to call. Once the telephone number disappears from a viewer's memory, the advertiser can be assured that the viewer will not call. Use of a remote control, already in the user's hand, makes purchase of a product easy and immediate. In response to an advertisement, a user can click a product into his or her shopping cart, and can submit orders after the program finishes. In addition, advertisements may now be "pushed" while the program is still running. For example, during a program, a symbol appears on the bottom of the screen. A user knows that when such a symbol appears, he or she may press a button on the remote control to get more information. Yet, the program continues to run, and the view is uninterrupted. The information may be in the form of a vote request or of a special purchase offer. A great benefit of the system is that an advertiser now knows the source of the purchase and can better plan future advertising.

FIG. 18 is a HIPO hierarchy diagram showing the modular calling sequence of the Go Shopping software (7.0). Not only is Module 7.0 complex, but so also is View Featured Products (7.2). Note that Modules 7.1, 7.3, and 7.4, belonging to Module 7.0, are the subroutines that are also called by Modules 1.0 through 6.0. FIG. 19 is an IPO diagram of the sequence of steps in Module 7.0. The HIPO hierarchy diagram of FIG. 20 highlights Module 7.1—Search Products, and FIG. 21 is an IPO diagram for that module.

Within the software of Module 7.2—View Featured Products is Module 7.2.1—Product Detail. FIG. 22 highlights this module, and FIG. 23 is an IPO diagram showing the sequence of steps for Product Detail (7.2.1). Similarly, FIG. 24 is a HIPO hierarchy diagram of Module 7.0 with Module 7.2.2— Wish List highlighted. A wish list is a group of shopping cart entries that are not immediately purchased, but may be purchased later. A Subscriber's wish list may be reviewed by the Subscriber or anyone else that he or she may designate as long as there are items in the shopping cart. For example, future brides or expectant mothers may register for preferred gifts using this system, and friends and family can purchase these gifts for them by using their own remote controls. FIG. 25 is an IPO diagram showing the sequence of steps to Module 7.2.2. FIG. 26 represents the architecture flow chart for this module.

Module 7.2.3 is used to add items to the shopping cart. The HIPO hierarchy diagram of FIG. 27 highlights this module. FIG. 28 is an IPO diagram showing the sequence of steps required to add items, and FIG. 29 represents the architecture flow chart. The HIPO hierarchy diagram of FIG. 30 highlights Module 7.3—Cart Summary, and FIG. 31 is the IPO diagram therefor. Module 8.0—Shopping Cart controls viewing of the cart contents. FIG. 32 is a HIPO diagram representing the modular calling sequence for this module. FIG. 33 is an IPO diagram for Module 8.0, and FIG. 34 is an architecture flow chart for this module.

Finally, there remain the Subscriber Portal administrative functions of registration, login, and logout. These functions are represented by FIGS. 35 through 41. FIGS. 35, 38, and 40 are HIPO hierarchy diagrams of those functions, respectively, while FIGS. 36, 39, and 41 are their respective IPO diagrams. FIG. 37 is the architecture flow chart for Module 10.0— Register.

3) Vendor

A standard and secure interface for vendor and partners to view their event performance and information in near real-time dashboard and be capable of generating ad-hoc reports to screen, email or document format (e.g. PDF, ODS, CSV, Tab-delimited, etc.) Report generating metrics should be based on:

Event ID,
Product ID,
Geography or DMA,
Event Type (IR, Polling, Purchase, Digital),
Event Coverage (National/Regional/Local),
of Transactions Completed,
of Transactions Canceled,
# of Transactions Added to WISHLIST,
# of Transactions (Volume),
Transaction Price (Dollar Amount, Fee, Ad Sponsored, etc.),
Transactions Frequency (per minute, hour, day, week, month, year, quarter, etc.),
Transactions Payment Type (Visa, Amex, Discover, etc.),
Transactions Denied (e.g. problem with payment, account blocked, etc.),
Transaction Shipping Type (Overnight, Standard, Email, Cellular, etc.),
By Vendor (Events, Transactions, Fulfillment Site, etc.),
By MSO (Events, Transactions, etc.)

Main or summary reporting should include:
# of Transactions,
Transaction Totals by MSO/Region,
Upload products (single/batch)
Create events
Receive a schedule/event id list
Check how each product is performing
Checks how each event is doing.
Deletes products
Assigns how do they accept payments
Assigns what are the different shipping methods available
Assigns local/remote warehouses to product fulfillment options
Upload digital goods to support local hosting
Upload Remote URLs for digital downloads
Chooses which geographical location this event should be played in.
Should be able to cancel the order in their warehouse
Should be able to access the warehouse data with applied rules

TABLE 5

VENDOR PORTAL (Overview)

1.0 ETS-Core Vendor
2.0 Dashboard
3.0 Product Management
4.0 Event Management
5.0 Register TABLE 5-continued

| VENDOR PORTAL (Overview) |
| --- |
| 6.0 Login |
| 7.0 Logout |

Table 5 shows an overview of the hierarchy of the Vendor Portal, while Table 6 shows the entire detailed hierarchy of the Vendor Portal. The three principal functional software modules of the Vendor Portal are the Dashboard (2.0), Product Management (3.0), and Event Management (4.0).

TABLE 6

| VENDOR PORTAL |
| --- |
| 1.0 ETS-Core Vendor |
| 2.0 Dashboard |
|   2.1 Home |
|   2.2 Events |
|     2.2.1 View Event Report |
|       2.2.1.1 Event Report |
|   2.3 Products |
|     2.3.1 View Product Report |
|       2.3.1.1 Product Report |
|   2.4 Voting |
|     2.4.1 View All Polling Events |
|       2.4.1.1 Poll Report (hyperlink) |
|         2.4.1.1.1 Bar Graph |
|         2.4.1.1.2 Pie Graph |
|         2.4.1.1.3 National Graph |
|         2.4.1.1.4 All Graphs |
|     2.4.2 Recent Polling Events |
|     2.1.5 Bookmarks |
|   2.5 Export Data |
| 3.0 Product Management |
|   3.1 Main |
|     3.1.1 Welcome |
|     3.1.2 Search |
|     3.1.3 Browse Catalog |
|   3.2 Products |
|     3.2.1 Products |
|       3.2.1.1 View Products |
|         3.2.1.1.1 Delete |
|         3.2.1.1.2 Edit |
|     3.2.2 With Images |
|       3.2.2.1 View Prod. wi. Image |
|         3.2.2.1.1 Delete |
|         3.2.2.1.2 Edit |
|     3.2.3 New Product |
|       3.2.3.1 Add New Product |
|     3.2.4 Type |
|       3.2.4.1 View Product Type |
|         3.2.4.1.1 Delete Prod. Type |
|       3.2.4.2 Add New Prod. Type |
|       3.2.4.3 Search Product Type |
|     3.2.5 Category |
|       3.2.5.1 View Category |
|       3.2.5.2 Add New Category |
|     3.2.6 Group |
|       3.2.6.1 View Group |
|       3.2.6.2 Add New Group |
|     3.2.7 Interaction |
|       3.2.7.1 Search Interaction |
|       3.2.7.2 View Interaction |
|         3.2.7.2.1 Delete Interaction |
|     3.1.2 Search |
|     3.1.3 Browse Catalog |
|   3.3 Promos |
|   3.4 Price Rules |
|   3.5 Configurations |
|   3.6 Shipping |
|   3.7 Batch Upload |
|     3.7.1 Upload CSV File |
|     3.1.2 Search |
|     3.1.3 Browse Catalog |
|   3.8 Search |
| 4.0 Event Management |

TABLE 6-continued

| VENDOR PORTAL |
| --- |
|   4.1 Main |
|   4.2 All Events |
|     4.2.1 Edit Event |
|     4.2.2 Delete Event |
|   4.3 Create Event |
|   4.4 Edit Event |
|   4.5 PID Insert |
|   4.6 Search |
| 5.0 Register |
| 6.0 Login |
| 7.0 Logout |

FIG. 42 shows the conceptual model of the Dashboard (Module 2.0) of the Vendor Portal. From this figure, the viewer can readily observe the basic functions that are available to vendors. FIG. 43 is a HIPO hierarchy diagram of the Dashboard (2.0) showing its five major components:

Home (2.1),
Events (2.2),
Products (2.3),
Voting (2.4), and
Export Data (2.5).

FIG. 44 shows a conceptual model of the Dashboard—Home functionality. This module enables viewing and reporting by the vendor. FIG. 45 is an IPO diagram showing the procedural steps of the Home (2.1) module. FIG. 46 is an architecture/flow chart for this module. FIG. 47 shows a conceptual model of the Dashboard—Events functionality. This is also a viewing and reporting module. FIG. 48 is an IPO diagram showing the procedural steps of the Events (2.2) module, and FIG. 49 is an architecture/flow chart for this module. The Events (2.2) module calls sub-modules (see Table 6), among which is Module 2.2.1.1—Event Report. FIG. 50 shows a conceptual model of the functionality of this reporting module. This report displays product sales, and can invoke bar graphs, pi graphs, and national graphs. FIG. 51 is an IPO diagram showing the procedural steps of the Event Report (2.2.1.1) module, and FIG. 52 is an architecture/flow chart for this module.

FIG. 53 shows a conceptual model of the Dashboard—Products functionality. Once again, this model enables viewing and reporting by the vendor. FIG. 54 is a HIPO hierarchy diagram showing the calling sequence for the Products module. FIG. 55 is an IPO diagram showing the procedural steps of the Products (2.3) module, and FIG. 56 is an architecture/flow chart for this module. Like its Events (2.2) module counterpart, the Dashboard—Products (2.3) module calls sub-modules (see Table 6), among which is Module 2.3.1.1—Product Report. FIG. 57 shows a conceptual model of the functionality of this reporting module. FIG. 58 is a HIPO hierarchy diagram showing the calling sequence for the Product Report (2.3.1.1) module, FIG. 59 is an IPO diagram showing its procedural steps, and FIG. 69 is an architecture/flow chart for this module.

The third principle function in the Vendor Portal/Dashboard is that which a vendor may access Subscriber voting results. This is represented by Module 2.4—Dashboard—Voting. FIG. 61 shows a conceptual model of the Voting (2.4) module. FIG. 62 is a HIPO hierarchy diagram showing the calling sequence of the Voting (2.4) module. FIG. 63 is an IPO diagram for this module, and FIG. 64 is an architecture flow chart for this module. Once again, referring to Table 6, the Voting (2.4) module calls several sub-modules, among which is Module 2.4.1.1—Dashboard/Poll Report. FIG. 65 is a HIPO hierarchy flow chart for the Poll Reporting module.

FIGS. 66 and 67 are IPO diagrams and architecture/flow charts for this module, respectively.

The final Dashboard sub-module is Export Data (2.5). FIG. 68 shows a conceptual model of this module. FIG. 69 is a HIPO hierarchy diagram showing the calling sequence for the Dashboard—Export Data (2.5) module. There are four data streams that can be exported:
- Event Reports (2.2.2),
- Recent Events (2.1.3),
- Recent Products (2.1.4), and
- Bookmarks.
    FIG. 70 is an IPO diagram for Export Data (2.5) showing the procedural steps for this module, and FIG. 71 is an architecture/flow chart for this module.

A principle function of the Vendor Portal is to allow the vendor to perform Product Management. This software is available in Module 3.0. FIG. 72 shows a conceptual model of the Product Management function as seen from the vendor's viewpoint. Once again, refer to Table 6 to visualize the entire detailed hierarchy of the Product Management function within the Vendor Portal. The eight principal sub-modules of the Product Management (3.0) module are:
- 3.1 Main
- 3.2 Products
- 3.3 Promos
- 3.4 Price Rules
- 3.5 Configurations
- 3.6 Shipping
- 3.7 Batch Upload
- 3.8 Search.

FIG. 73 shows a conceptual model of the Main (3.1) module. FIG. 74 is a HIPO hierarchical diagram showing the calling sequence for this module. Main (3.1) is basically an entry to the Product Management function. It welcomes the user (3.1.1), and enables the Search (3.1.2) and Browse Catalog (3.1.3) functions. FIG. 75 is an IPO diagram for the Main (3.1) module.

FIG. 76 shows a conceptual model of the Products (3.2) module. With this software module, a vendor may perform maintenance on the product database. FIG. 77 is a HIPO hierarchy diagram of this module. As can be seen, product images can be stored and transmitted to a Subscriber. The Products module permits maintenance of the products with their respective images.

FIG. 78 is a HIPO hierarchy diagram of Module 3.2.1—Products (not to be confused with its parent Module 3.2). Both Modules 3.2 and 3.2.1 have the same name. Module 3.2.1 is invoked by Module 3.2. See Table 6 for their respective positions in the Vendor Portal hierarchy. FIG. 79 is an IPO diagram for Module 3.2.1. As may be observed from FIG. 79 and from Table 6, Module 3.2.1 has sub-modules. Module 3.2.1.1—View Products further comprises two sub-modules: Module 3.2.1.1.1—Delete Product and Module 3.2.1.1.2 Add Product. FIG. 80 is a HIPO hierarchy diagram for Module 3.2.1.1.1—Delete Product, and FIG. 81 is an IPO diagram for the same module. Likewise, FIG. 82 is a HIPO hierarchy diagram for Module 3.2.1.1.2—Edit Product, and FIG. 83 is an IPO diagram for the same module.

FIG. 84 is a HIPO hierarchy diagram of Module 3.2.2—With Images. This module is used to maintain an image database for each product. FIG. 85 is an IPO diagram for this module. FIG. 86 is a HIPO hierarchy diagram of Module 3.2.3—New Product. This module is used to add products to the database and to make these products available to Subscribers.

Products can have an associated Category Identification. Module 3.2.5

Category is the software module that allows maintenance of the Category database. FIGS. 88 and 89 are both IPO diagrams describing the procedural steps taken by Module 3.2.5.1—View Category and Module 3.2.5.2—Add New Category, respectively.

FIG. 90 shows a conceptual model of the Promotions sub-module (3.3) called by the Product Management module (3.0). FIG. 91 shows a conceptual model of the Price Rules sub-module (3.4), and FIG. 92 shows a conceptual model of the Configurations sub-module (3.5). FIG. 93 shows a conceptual model of the Shipping sub-module (3.6).

FIG. 94 shows a conceptual model of the Batch Upload sub-module (3.7). FIG. 95 is a HIPO hierarchy diagram of Module 3.7—Batch Upload. Note that the only unique sub-module in the hierarchy of Module 3.7 is Module 3.7.1—Upload CSV File. The other two sub-modules called by Module 3.7 are Module 3.1.7—Search and Module 3.1.3—Browse Catalog. These two sub-modules are subroutines contained within Module 3.1—Main. FIG. 96 is an IPO diagram showing the calling sequence for Module 3.7, and FIG. 97 is an architecture/flow chart for this module.

Finally, FIG. 98 is a HIPO hierarchy diagram of Module 3.8—Search, and FIG. 99 is its IPO counterpart.

The third major component of the Vendor Portal is Event Management. FIG. 100 shows a conceptual view of the functionality of Event Management from the viewpoint of the vendor. Event Management has five major functional components:
- View Welcome Page
- View All Events
- Create Event
- PID Insert
- Search Furthermore, View All Events further comprises the maintenance functions of editing and deleting events. The calling sequence is shown in FIG. 101, which is the HIPO hierarchy diagram for Module 4.0—Event Management. FIG. 102 is an IPO diagram for this module.

PID insertion is a unique feature of the system. This module allows the insertion of event data into the private data stream of a video, thus creating an enhanced video file. Additionally, it uses external software such as VLC plug-in and Java Web to create a more user friendly interface for input of timing and product selection options prior to enhancement.

FIG. 103 is the HIPO hierarchy diagram for Module 4.1—Main, and FIG. 104 is the IPO diagram for this module. FIGS. 105, 106, and 107 are the HIPO hierarchy diagram, the IPO diagram, and the architecture/flow chart for Module 4.2.1—Delete Event, respectively. FIGS. 108, 109, and 110 are the HIPO hierarchy diagram, the IPO diagram, and the architecture/flow chart for Module 4.3—Create Event, respectively. FIGS. 111 and 112 are the IPO diagram and architecture/flow chart for Module 4.4—Edit Event, respectively. FIGS. 113, 114, and 115 are the HIPO hierarchy diagram, the IPO diagram, and the architecture/flow chart for Module 4.5—PID Insert, respectively. The final module in Event Management is Module 4.6—Search, respectively. FIGS. 116 and 117 are the HIPO hierarchy diagram and IPO diagram for this module, respectively.

Finally, the Vendor Portal hosts the three vendor functions:
- 5.0—Register
- 6.0—Login
- 7.0—Logout The HIPO hierarchy diagrams and IPO diagrams for these modules are shown in FIGS. 118 through 124.

4) CSR (Customer Service Representatives)

This portal allows a CSR the ability to manage Subscriber orders (e.g. place orders on hold or cancel, change order payment method should a preferred payment method be denied, change shipping preferences—method/address. If an order has not been sent out for fulfillment and other ecommerce site CSR services, etc.) placed via the set-top box application or e-commerce shopping cart interface.

Log into the system with elevated rights to complete the tasks required
    View/Edit User details
    View/Edit Order details before/after being committed
    View/Edit wish list details before/after being committed
    Upload [batch of] Products
    Edit/View Events
    View schedule/Event ID list
    Ability to check product availability/status
    Request product deletions
    View the different Vendor shipping methods available
    View the Vendor local/remote warehouses for product fulfillment options
    View/Edit digital goods to support local hosting
    View/Edit Upload Remote URLs for digital downloads
    View/Edit which geographical location this event should be played in.
    Able to view/cancel the order in his warehouse
    Able to view warehouse data with applied rules
    View all the batched transactions not committed
    View vendor details
    Monitors system performance
    View Order/Transaction/Payment process progress Non Functional Requirements:

The following non functional requirements needs to be addressed by the system,

1) Accessibility

Internal/External access (Intranet/Internet)

Manageability of the CORE system (Hardware/System/Software) from both internal (within/local to the CORE network) and external (outside/remote to the CORE network) access methods.

2) Security

Secure storage of sensitive information (user ID, passwords, credit cards, address, etc.) within EACH of the CORE system(s).

Roles based security (Admin, Vendor, Subscriber, and CSR). Role based security to all portals and resources.

Ability to secure ALL data exchange (receive and transmit) to the EDGE from the CORE with little effect on performance. VPN should be the standard unless secure transactions can be realized via other methods (secure database transactions, etc.)

Ability to secure ALL data exchange (receive and transmit) to external third-party entities (PayPal Payflow, Amazon, etc.)

3) Availability

The system requires 99.999% "Five nines" uptime requirement for the service.

| Total Downtime (HH:MM:SS) | | | |
| --- | --- | --- | --- |
| Availability | per day | per month | per year |
| 99.999% | 00:00:00.4 | 00:00:26 | 00:05:15 |

4) Manageability and Maintenance

Ease of use and system management

Ease of maintenance and expansion without affecting 100% uptime requirement

5) Scalability (User Base)

Ability to process an average of 250k-500k/sec transactions or requests from 1200-1500 EDGE sites 6) Audit Ability Ability to audit the transactions and comply with future financial regulations like Sarbanes-Oxley (audit capabilities on all record changes, report on every user who has access to any system and how they obtained that access, etc.).

Load balancers distribute the traffic among web servers that are configured in the cluster. All servers are clustered so that when one specific server goes down, the counter part in the cluster will provide the service. Eventually, the system will provide high availability and scalability.

Additional Features

Social Networking

A social networking module will integrate the subscriber portal with third party social networking systems such as Facebook, Twitter, and MySpace. If the user has an account with the above mentioned systems, and opts in, the user can share his or her ETS activities with the social networks.

Roaming Profile

Once a registered user in the ETS system within Core, a customer profile is replicated to other CORE systems at multiple MSO's. This roaming profile customer account allows for a customer to interact with an interactive event on television on a different MSO's network even though the customer is not a subscriber of that MSO.

Combination of MUX with OCAP

PID Inserter combines video stream and data stream and multiplexes them to form an enhanced video stream.

GLOSSARY

Within the Present Application, the Applicant is his own lexicographer. Definitions presented in the glossary supersede the plain and ordinary meaning of the defined terms.

| | |
| --- | --- |
| ETS | Enhanced Television Services |
| HTTP | Hyper Text Transfer Protocol |
| VPN | Virtual Private Network |
| STB | Set-top Box |
| CSR | Customer Service Representative |
| T-commerce | Television Commerce |
| API | Application Programming Interface |
| MSO | Multi-Service Operator |
| MUX | Multiplexer |

I claim:

1. A system to enable a TV viewer to interact with content broadcast onto a television set by a service provider over a subscriber television network allowing the TV viewer to use a remote control to interact with the content, the remote control comprising electronic switches, wherein the remote control transmits signals to a set-top box, said system comprising:

a) at least one multiple cable television system network comprising hardware and software components, b) a back-end hardware and software component that resides with the service provider and which interacts with the at least one multiple cable television system network; said back-end software component further comprising:
  i) an event management component;
  ii) a subscriber management component;
  iii) an order management component;
  iv) a product management component;
  v) an inventory management component;
  vi) a maintenance component;
  vii) a security and identity component;
  viii) a monitoring component; and
  ix) a reporting component and,
c) said system further comprising a central data base,
  wherein the at least one multiple cable television system network functions at the service provider; and
  wherein each of the at least one multiple cable television system network further comprises: at least one front-end hardware and software component that handles TV user interaction with the subscriber television network, and
  wherein each of the at least one multiple cable television system network further comprises:
    i) a component that permits the TV viewer to purchase products;
    ii) a component that permits the TV viewer to download software or data;
    iii) a component that permits the TV viewer to vote or be polled;
    iv) a component that permits the TV viewer to request information;
    v) a component that permits the TV viewer to initiate a call to action control, wherein said call to action is a request for a return communication with detailed information regarding an event or product; and
    vi) a component that permits authentication of TV viewers.

2. The system of claim 1 wherein the at least one front-end hardware and software component that handles TV user interaction with the subscriber television network further comprises:
  a set-top box application bundle; and
  a front-end control sub-system;
  wherein:
    a) the set-top application bundle resides in the set-top box, accepts TV viewer input from the remote control, and transmits the TV viewer input to a proxy sub-system;
    b) the front-end control sub-system responds to the request by transmitting said response back to the set-top application bundle using XML format protocol; and
    c) the set-top box application bundle sends the response to the television set so the TV viewer can view the data on the television as a response to the viewer input.

3. The system of claim 1 wherein each of the at least one multiple cable television system network software component further comprises a component that permits the TV viewer to view a transaction history.

4. The system of claim 1 wherein the at least one multiple cable television system network accumulates transactions and transmits them to the back-end hardware and software component in batches for later processing.

5. The system of claim 1 wherein the at least one front-end hardware and software component that handles TV user interaction with the subscriber television network further comprises:
  a set-top box application bundle;
  a proxy sub-system further comprising a deployed web application and a TV works 2-way package library; and
  a front-end control sub-system;
  wherein:
    a) the set-top application bundle resides in the set-top box, accepts TV viewer input from the remote control, and transmits it to the proxy sub-system;
    b) the proxy sub-system sends the same request to the front-end control sub-system;
    c) the front-end control sub-system responds to the request by transmitting said response back to the proxy sub-system using XML format protocol;
    d) the proxy sub-system converts the XML into EBIF format data;
    e) the proxy sub-system transmits the converted EBIF data back to the set-top box application bundle as a response; and
    f) the set-top box application bundle sends the EBIF data to the television set so the TV viewer can view the data on the television as a response to the viewer input.

6. The system of claim 5 wherein the front-end control sub-system further comprises an application server and a data base.

7. The system of claim 1 wherein the back-end hardware and software component further communicates with third-party vendors and payment service providers, thereby allowing the TV viewer to interact with said third-party vendors and payment service providers using the remote control.

8. The system of claim 7 wherein communication between the back-end hardware and software component and the third-party vendors and payment service providers takes place over the internet.

9. The system of claim 7 wherein the back-end software component further comprises:
  a) an administrative portal that handles communications with system administrators;
  b) a subscriber portal that handles direct communications with the TV viewer;
  c) a vendor portal that handles communications with third-party vendors and payment service providers; and
  d) a customer service portal that handles communications with customer service representatives.

10. The system of claim 7 wherein the back-end software component further comprises:
  a) an order management component that processes product orders from the TV viewer;
  b) a product management component that maintains product images, pricing, discounts, categories, features, descriptions, inventory, storage, supplier, fulfillment methods, and fulfillment logic;
  c) an event management component that further comprises vendor maintenance functions of editing and deleting events;
  d) an inventory management component serves as a vendor interface to product inventory data;
  e) a dashboard management component that serves as a secure interface for the third-party vendors and payment service providers to view data on their event performance and information in near real-time and to generate ad-hoc reports from said data;
  f) an identity management component;
  g) a subscriber management component wherein the subscriber is the TV viewer; and
  h) a user management component wherein the user is the vendor.

11. The system of claim 1 wherein the subscriber management software component provides the following functionality to the TV viewer:

the TV viewer can search for products available for purchase;
the TV viewer can search the TV viewer's order history;
the TV viewer can view current unfulfilled orders;
the TV viewer can view pending downloads;
the TV viewer can view the TV viewer's recorded profile;
the TV viewer can view votes that were cast by the TV viewer;
the TV viewer can the manage TV viewer's wish list;
the TV viewer can manage a virtual shopping cart;
the TV viewer can move items from the wish list to the shopping cart and from the shopping cart to the wish list;
the TV viewer can initiate a call to action control, wherein said call to action is a request for a return communication with detailed information regarding an event or product;
the TV viewer can receive and respond to special offers; and
the TV viewer can obtain help and support which further comprises engaging in a chat with customer service representatives, obtain customer service contact numbers, view video tutorials, and view a site map.

12. The system of claim 1 wherein the business application engine component further comprises the logic to process TV viewer requests and automate transaction processing by inserting the order into the back-end software component and applying business logic into the back-end software component, wherein:
  a) said business application engine contacts a payment gateway to charge the TV viewer for a purchased product;
  b) said business application engine transmits all successful transactions to an internal or third party fulfillment center;
  c) said business application engine transmits a confirmation of successful transactions; and
  d) said business application engine handles product sales, download requests, and voting.

13. The system of claim 1 further comprising a payment service software module that charges a specified monetary amount to an account associated with the TV viewer by communicating with payment gateways, wherein:
  a) said monetary amount is calculated from purchases or downloads;
  b) the payment service software module authorizes payment gateways; and
  c) the payment service software module updates the account associated with the TV viewer with a payment processing status.

14. The system of claim 13 wherein the payment service software module communicates with the TV viewer via email.

15. The system of claim 1 wherein the event management component creates, updates and deletes events, and when events are created or updated, the event management component generates a sample application view for an interactive application, wherein said sample application view allows the TV viewer to preview the interactive application that will be shown on the television.

16. The system of claim 1 wherein the inventory management component:
  a) tracks product inventory levels and product warehouse locations;
  b) allows vendors to move products from one fulfillment house to another;
  c) updates pick items;
  d) allows vendors to track shipped inventory items via a pick item display; and
  e) intelligently routes fulfillment requests to alternate fulfillment houses if products are not available at a primary fulfillment house.

17. The system of claim 1 wherein the identity management module authenticates and authorizes TV viewers.

18. The system of claim 17 wherein the identity management module retains, imports, and normalizes data from different user groups that connect to the system.

19. The system of claim 1 wherein said system allows the insertion of event data into the private stream of a video, thus creating an enhanced video file, using external software to create a friendly user interface for input of timing and product selection options prior to enhancement.

* * * * *